US006654727B2

(12) United States Patent
Tilton

(10) Patent No.: US 6,654,727 B2
(45) Date of Patent: Nov. 25, 2003

(54) METHOD OF SECURITIZING A PORTFOLIO OF AT LEAST 30% DISTRESSED COMMERCIAL LOANS

(76) Inventor: Lynn Tilton, 3575 S. Ocean Blvd., Highland Beach, FL (US) 33487

(*) Notice: Subject to any disclaimer, the term of this patent is extended or adjusted under 35 U.S.C. 154(b) by 0 days.

(21) Appl. No.: 10/053,925

(22) Filed: Jan. 18, 2002

(65) Prior Publication Data

US 2003/0101120 A1 May 29, 2003

Related U.S. Application Data

(60) Provisional application No. 60/334,344, filed on Nov. 29, 2001.

(51) Int. Cl.[7] .......... G06F 17/60
(52) U.S. Cl. .......... 705/36
(58) Field of Search .......... 705/36, 33, 35–39; 205/30–31

(56) References Cited

U.S. PATENT DOCUMENTS

| | | | | |
|---|---|---|---|---|
| 4,739,478 A | | 4/1988 | Roberts et al. | |
| 4,752,877 A | | 6/1988 | Roberts et al. | |
| 5,193,056 A | | 3/1993 | Boes | |
| 5,704,045 A | | 12/1997 | King et al. | |
| 5,870,720 A | | 2/1999 | Chusid et al. | |
| 5,946,668 A | | 8/1999 | George | |
| 5,950,175 A | | 9/1999 | Austin | |
| 6,018,721 A | | 1/2000 | Aziz et al. | |
| 6,058,377 A | * | 5/2000 | Traub et al. | 705/36 |
| 6,061,662 A | | 5/2000 | Makivic | |
| 6,067,533 A | | 5/2000 | McCauley et al. | |
| 6,078,904 A | | 6/2000 | Rebane | |
| 6,253,191 B1 | | 6/2001 | Hoffman | |

FOREIGN PATENT DOCUMENTS

WO WO 01/09782 A2 * 7/2000 .......... G06F/17/60

OTHER PUBLICATIONS

Stephen Kleege, Mellon Inspires Bad Bank Plans for Property Portfolios, Feb. 5, 1991, American Banker, p. 1.*

Peter Humphreys,Securitization Trends, 1998, International Financial Law Review, pp. 1–6.*

Charles Stone et al, Synthetic Securitization, 1999, Securitization Conduit, vol. 2, No. 4, pp. 3–4.*

Secured Lender, 1997, pp. 78–79.*

M J Shaw et al, Inductive Learning for Rick Classification, 1990, pp. 47–53 Asset–Backed Securities Week, Swap–Dependent Synthetic Securities: Rating Criteria, 1996, pp.1–2.*

* cited by examiner

*Primary Examiner*—Hyung-Sub Sough
*Assistant Examiner*—Richard C Fults
(74) *Attorney, Agent, or Firm*—Katten Muchin Zavis Rosenman

(57) ABSTRACT

A platform and a securitization methodology that provides lenders with an opportunity to maximize the returns on their distressed commercial credit facilities and overcomes the obstacles that have historically precluded the securitization of distressed commercial loans. The present invention is based upon an underlying portfolio of at least 30% distressed commercial loans for securitization that emulates the predictability and regularity of the cash flow and recovery characteristics of a portfolio of generally performing commercial loans, thus eliminating crucial historical barriers to securitization of such distressed commercial loans, such as the absence of predictable and regular cash flows and predictable recoveries. The methodology of the present invention takes a specified mix of distinct classifications of distressed commercial loans with specified characteristics in confluence with structural specifications, such as specific reserves and safeguards, to create a synthetic asset class that emulates the characteristics of a portfolio of performing loans.

35 Claims, 87 Drawing Sheets

STEP 194, FIG. 3

FINANCIAL SUMMARY

- BORROWER NAME
- PERIOD (e.g., "LTM")
- PERIOD END DATE
- NET REVENUES
- GROSS PROFIT & GP%
- EBIT & EBIT%
- CAPITAL EXPENDITURES
- SENIOR INTEREST EXPENSE
- TOTAL INTEREST EXPENSE
- INTEREST INCOME
- NET INTEREST EXPENSE
- EBIT/TOTAL INTEREST
- EBITDA/TOTAL INTEREST
- EBITDA-CAPX/TOTAL INT
- EBIT/SENIOR INTEREST
- EBITDA/SENIOR INTEREST
- EBITDA-CAPX/SENIOR INT
- EBIT/NET INTEREST
- EBITDA/NET INTEREST
- EBITDA-CAPX/NET INT
- SENIOR DEBT
- TOTAL DEBT
- BOOK EQUITY
- CASH
- NET DEBT
- SR DEBT/CAPITALIZATION
- TOT DEBT/CAPITALIZATION
- NET DEBT/CAPITALIZATION
- SR DEBT/EBITDA
- TOTAL DEBT/EBITDA
- NET DEBT/EBITDA

DUE DILIGENCE REPORT (MAY BE VIEWED ON SCREEN OR PRINTED)

BORROWER

- BORROWER NAME
- BORR. ID NUMBER
- EQUITY MARKET
- STOCK SYMBOL
- SEC FILING STATUS
- MOODY'S INDUSTRY GROUP
- S&P INDUSTRY GROUP
- BUSINESS DESCRIPTION AND BUSINESS MODEL
- GEOGRAPHIC SCOPE
- CAUSES OF FINANCIAL WEAKNESS/DISTRESS
- PERFORMANCE DRIVERS & ADVISORS
- GOVERNING LEGAL DOC &
- STATUS OF THE "BIG-FOUR:"
  - MATURITY EXTENTION
  - SUBORDINATION
  - DECREASE IN INTEREST RATE
  - INCREASE IN COMMITMENT
- RISK EXPOSURES
- EQUITY SPONSORSHIP & SUBORDINATED FINANCING
- ADDITIONAL INFORMATION

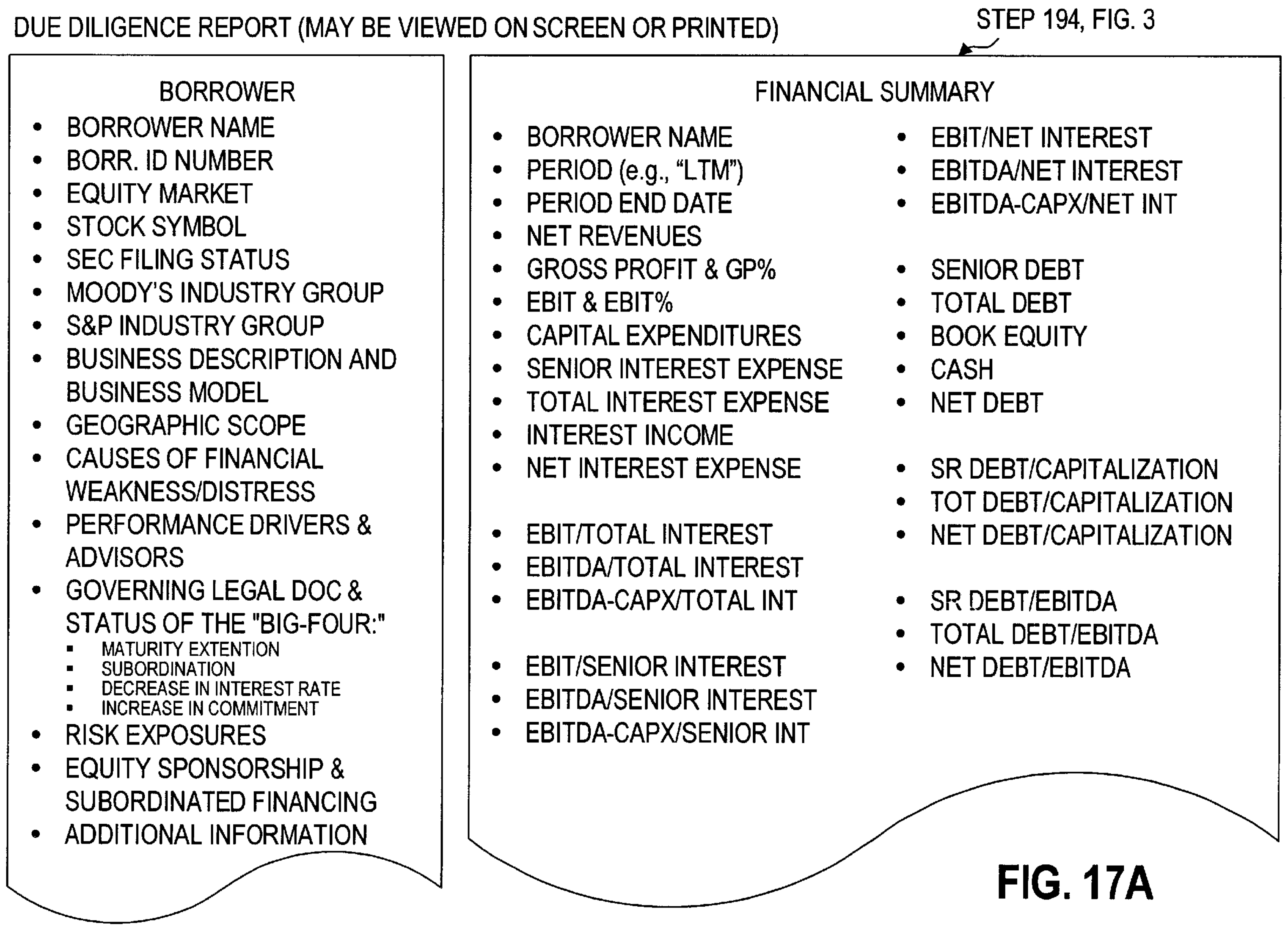

FIG. 17A

DUE DILIGENCE REPORT (MAY BE VIEWED ON SCREEN OR PRINTED)

WORKOUT

- BORROWER NAME
- REVENUE ASSUMPTION TO DETERMINE DEBT CAPACITY
- EBITDA ASSUMPTION TO DETERMINE DEBT CAPACITY
- CAPX ASSUMPTION TO DETERMINE DEBT CAPACITY
- EBITDA-CAPX ASSUMPTION TO DETERMINE DEBT CAPACITY
- TARGET EBITDA-CAPX/INT
- MAXIMUM INTEREST EXP.
- ASSUMED INTEREST RATE
- TOTAL DEBT CAPACITY

- CASH: F/S, LOW, HIGH
- A/R: F/S, LOW, HIGH
- REL A/R: F/S, LOW, HIGH
- INVENTORY: F/S, LOW, HI
- OCA: F/S, LOW, HIGH
- REL OCA: F/S, LOW, HIGH
- TOT CA: F/S, LOW, HIGH

- EMI: F/S, LOW, HIGH
- PP&E: F/S, LOW, HIGH
- GOODWILL: F/S, LOW, HIGH
- REL NCA: F/S, LOW, HIGH
- UNREL NCA: F/S, LOW, HIGH
- TOT ASSETS: F/S/, LOW, HIGH
- WIND-DOWN: LOW, HIGH
- TRUSTEE: LOW, HIGH
- PROFESS'L: LOW, HIGH
- ADMIN EXP: LOW, HIGH
- AMT AVAIL: LOW, HIGH

- CAPITAL STRUCTURE
- CONTROL OBJECTIVE OR REQUIREMENT

- COLLATERAL MANAGER STRATEGY AND NARRATIVE DESCRIPTION OF THE WORKOUT

PRICING SUMMARY

FOR EACH LOAN:
- TOTAL COMMITMENT OFFERED BY LENDER
- FUNDED PRINCIPAL OFFERED BY LENDER
- PRICE
- PAYMENT FOR FUNDED PRINCIPAL
- CREDIT FOR UNFUNDED PRINCIPAL
- NET INVOICE (SUMMED FOR ALL LOANS )
- AGGREGATE COMMITMENT
- AGGREGATE FUNDED PRIN.
- WEIGHTED AVERAGE PRICE FOR FUNDED PRINCIPAL
- AGGREGATE PAYMENT FOR FUNDED PRINCIPAL
- AGGREGATE CREDIT FOR UNFUNDED PRINCIPAL
- AGGREGATE NET INVOICE

FIG. 17B

DUE DILIGENCE REPORT (MAY BE VIEWED ON SCREEN OR PRINTED)

- BORROWER
- OBLIGOR
- CURRENCY
- PRIORITY & SECURITY
- REVOLVING OR TERM
- ORIGINAL FACILITY DATE
- FORM OF SYNDICATION
- SMALL LOAN AGREEMENT
- CURRENT AGREEMENT
- DATE LATEST AMENDMENT
- LATEST FORBEARANCE #
- FORBEARANCE DATE
- FORBEARANCE EXPIRATION
- ORIGINAL COMMITMENT
- GUARANTORS
- DEGREE OF SUPPORT
- COLLATERAL PACKAGE
- BANKRUPTCY STATUS
- BANKRUPTCY FILING DATE
- BANKRUPTCY COURT
- COVENANT COMPLIANCE

- %VOTE REQUIRED TO WAIVE
  LOAN INFO PER LOAN
- FIXED INTEREST RATE
- CASH COMPONENT
- PIK COMPONENT
- LIBOR MARGIN
- PRIME MARGIN
- DEFAULT INTEREST MARGIN
- REVOLVING COMMIT FEE
- LETTER OF CREDIT RATE
- INTEREST PAYMENT STATUS
- INTEREST DEFAULT DATE
- INTEREST RATE OPTION
- CURRENT CONTRACTUAL INTEREST RATE
- CURRENT CASH INTEREST PAYMENT RATE
- AMENDED FINAL MATURITY
- PRINCIPAL PAYMENT STATUS

- PRIN PMT DEFAULT DATE
- DATE OF LOAN BALANCES
- GLOBAL COMMITMENT
- GLOBAL FUNDED PRIN
- % HELD BY SELLER
- % OFFERED BY SELLER
- COMMIT HELD BY SELLER
- FUNDED HELD BY SELLER
- COMMIT OFFERED
- FUNDED PRIN OFFERED
- COMMENTS

---

- AMORTIZATION SCHEDULE

- SCHEDULE OF BANKS

FIG. 17C

DUE DILIGENCE REPORT (MAY BE VIEWED ON SCREEN OR PRINTED)

FINANCIAL INFORMATION AND ANALYSIS

- BORROWER NAME
- HEADINGS FOR TIME PERIODS OF FIN INFO

INCOME STATEMENT
- NET SALES
- COST OF SALES (COGS)
- GROSS PROFIT (LOSS)
- OTHER OPERATING INCOME
- SG&A EXPENSE
- MANAGEMENT FEE
- RESTRUCTURING CHARGE
- ASSET IMPAIRMENT
- TOTAL OPERATING EXP
- OPERATING INCOME
- UNCONSOLIDATED SUBS
- SR SECURED INTEREST
- OTHER INTEREST EXPENSE
- INTEREST INCOME
- CURRENCY GAIN(LOSS)
- G(L) ASSET DISPOSALS
- NON-OPERATING INC(EXP)
- NONRECURRING G(L)
- PRE-TAX INCOME
- INCOME TAX (BENEFIT)
- MINORITY INTEREST
- NET INCOME FROM CONTINUING OPERATIONS BEFORE EXTRAORDINARY
- DISCONTINUED OPNS.
- EXTRAORDINARY ITEM
- NI (LOSS) BEFORE PFD DIV
- PREFERRED DIVIDENDS
- NI (LOSS)
- FOOTNOTES

I/S MARGIN ANALYSIS
- GROSS MARGIN %
- OPERATING MARGIN %
- PRE-TAX MARGIN %

- EBIT
- DEPRECIATION & AMORT
- EBITDA (UNADJUSTED)
- EBITDA (ADJUSTED)
- CAPITAL EXPENDITURES
- EBITDA - CAPEX

SENIOR INTEREST COVERAGE
- EBIT/SENIOR INTEREST
- EBITDA/SENIOR INTEREST
- EBITDA-CAPX/SR INTEREST

TOTAL INTEREST COVERAGE
- EBIT/TOTAL INTEREST
- EBITDA/TOTAL INTEREST
- EBITDA-CAPX/TOT INTEREST

FIG. 17D

DUE DILIGENCE REPORT (MAY BE VIEWED ON SCREEN OR PRINTED)

FINANCIAL INFORMATION AND ANALYSIS

NET INTEREST COVERAGE
- EBIT/NET INTEREST
- EBITDA/NET INTEREST
- EBITDA-CAPX/NET INT

AUDITOR INFORMATION

BALANCE SHEET
- CASH & EQUIVALENTS
- ACCOUNTS RECEIVABLE
- INVENTORIES
- OTHER CURRENT ASSETS
- TOTAL CURRENT ASSETS
- EQUITY METHOD INVESTMENTS
- PROPERTY, PLANT, & EQUIPMENT, NET
- INTANGIBLES AND OTHER NON-CURRENT ASSETS
- TOTAL ASSETS
- SENIOR SECURED SHORT-TERM DEBT
- CURRENT MATURITIES OF SR SECURED LONG-TERM DEBT
- OTHER SHORT-TERM DEBT AND CURRENT MATURITIES
- ACCOUNTS PAYABLE
- OTHER CURRENT LIABILITIES
- TOTAL CURRENT LIABILITIES
- SR SECURED LONG-TERM DEBT
- OTHER LONG-TERM DEBT
- DEFERRED INCOME TAXES
- OTHER NON-CURRENT LIABILITIES
- TOTAL LIABILITIES
- PREFERRED EQUITY
- COMMON EQUITY
- RETAINED EARNINGS
- TOTAL LIABILITIES AND SHAREHOLDERS' EQUITY
- TOTAL SR SECURED DEBT
- TOTAL DEBT
- NET DEBT

CAPITALIZATION RATIOS
- SENIOR DEBT/CAPTIAL.
- TOTAL DEBT/CAPITAL.
- NET DEBT/CAPITAL

LEVERAGE RATIOS
- SR SEC DEBT/EBITDA
- TOTAL DEBT/EBITDA
- NET DEBT/EBITDA

FOOTNOTES

FIG. 17E

| | A | B | C | D | E | F | G | H | I |
|---|---|---|---|---|---|---|---|---|---|
| 1 | **USES OF FUNDS** | | | **SOURCE OF FUNDS** | | | | | |
| 2 | Aggregate Loan Commitments | 1,000,000 | | | | | | | |
| 3 | Aggregate Funded Principal | 850,000 | | | | Funded Capital | Unfunded Capital | Committed Capital | % |
| 4 | | | | Class A1/A2 Revolving Notes | | 335,907 | 50,043 | 385,950 | 60.69% |
| 5 | Payment for Funded Principal | 467,500 | | Class A-3 Term Notes | | 250,000 | | 250,000 | 39.31% |
| 6 | Additional purchase price | 85,000 | | | | 585,907 | | 635,950 | 100.00% |
| 7 | Less: Unfunded discount | (67,500) | | Class B Notes | | 47,750 | | 47,750 | |
| 8 | | 485,000 | | Total Class A and B Debt | | 633,657 | | 683,700 | |
| 9 | Senior Interest Reserve Account | 101,000 | | | | | | | |
| 10 | Subordinated Int Reserve Account | 11,500 | | Class C Discount Notes | | | | | |
| 11 | Unfunded Rev Disc Acct (URDA) | 67,500 | | Par: | 101,673 | 85,000 | | 85,000 | |
| 12 | Overadvance Reserve Account | 7,500 | | | | | | | |
| 13 | Closing Expenses | 32,150 | | Equity Account | | 22,000 | | 22,000 | |
| 14 | Professional Fee Account | 1,600 | | TOTAL SOURCES | | 740,657 | | 790,700 | |
| 15 | Interest rate cap | 1,700 | | | | | | | |
| 16 | Expense Account | 250 | | | | | | | |
| 17 | SUBTOTAL | 708,200 | | | | | | | |
| 18 | Class A-3 Revolving Reserve | 32,457 | | | Class A-1/A-2 Revolv. Note Availability | | | 50,043 | 60.66% |
| 19 | TOTAL USES | 740,657 | | | Class A-3 Revolving Reserve | | | 32,457 | 39.34% |
| 20 | | | | | Total | | | 82,500 | 100.00% |
| 21 | Aggregate Unfunded Principal | 150,000 | | | | | | | |
| 22 | Less: To be funded from URDA | 67,500 | | | | | | Must Equal Zero ---> | 0.03% |
| 23 | To be funded jointly by CL-A Revolving Note | | | | | | | | |
| 24 | Availability and CL A- Rev Reserve | 82,500 | | | | | | | |

FIG. 22

INTEREST COLLECTION ACCOUNT (1210)

RECEIVES INTEREST PROCEEDS FROM LOANS
AND
INTEREST EARNED ON CASH IN THE FOLLOWING ACCOUNTS
INTEREST COLLECTION ACCOUNT
PRINCIPAL COLLECTION ACCOUNT
CASH COLLATERAL ACCOUNT
SENIOR INTEREST RESERVE ACCOUNT
SUBORDINATED INTEREST RESERVE ACCOUNT
UNFUNDED REVOLVER DISCOUNT ACCOUNT
OVERADVANCE RESERVE ACCOUNT
CLOSING EXPENSE ACCOUNT
PROFESSIONAL FEE ACCOUNT
EXPENSE ACCOUNT
CLASS A-3 REVOLVING RESERVE ACCOUNT

PRINCIPAL COLLECTION ACCOUNT (1212)

RECEIVES PRINCIPAL PROCEEDS FROM LOANS
LESS: AMOUNT USED TO FUND REVOLVERS OR OTHER UNFUNDED COMMITMENTS

PROFESSIONAL FEES ACCOUNT (1214)

USED TO PAY FEES AND EXPENSES OF PROFESSIONALS (*E.G.*, ATTORNEYS, ADVISORS) HIRED BY COLLATERAL MANAGER IN CONNECTION WITH MANAGEMENT OF LOAN PORTFOLIO.

EXPENSE ACCOUNT (1215)

USED TO PAY OTHER FEES AND EXPENSES INCURRED BY THE SPE

FIG. 29A

METHOD OF SECURITIZING A PORTFOLIO OF AT LEAST 30% DISTRESSED COMMERCIAL LOANS

CROSS REFERENCE TO RELATED APPLICATIONS

This application claims priority of U.S. patent application serial No. 60/334,344, filed on Nov. 29, 2001, hereby incorporated by reference.

BACKGROUND OF THE INVENTION

1. Field of the Invention

The present invention relates generally to asset securitization and, more particularly, to a system and method for use in securitizing a portfolio of at least 30% (and up to 100%) distressed commercial credit facilities, such that all of the securities above the equity or equity-like tranches issued by a bankruptcy-remote special purpose entity to finance the acquisition of the portfolio of distressed commercial credit facilities are eligible to receive investment grade ratings.

2. Description of the Prior Art

A credit facility is considered "distressed" if the borrower's financial ability to honor its obligations comes into question. Common indicators that a borrower (or group of related borrowers, hereafter referred to collectively as the "borrower") may have financial difficulty in repaying its debt include a breach of financial covenants, a payment or technical default of other debt obligations, or a trading value for the borrower's debt significantly lower than other debt with similar coupon and maturity features. Not all distressed credit facilities are in default (e.g., as recognized by Standard & Poor's ("S&P"), a company may be current on its bank loan obligations while being in technical or financial default on its other subordinated debt, resulting in significant near-term risk that the borrower will ultimately default on its obligations) (Albulescu, Henry, Bergman, Sten, and Leung, Corwin, "Distressed Debt CDOs: Spinning Straw Into Gold," S&P Structured Finance, May 7, 2001, hereafter, "Spinning Straw Into Gold"). As used herein, "distressed credit facilities" and "distressed loans" are those commercial loans in which there has been a default by a borrower to make a payment or payments to a lender and/or a likelihood of a default has been identified by a lender in connection with the borrower's obligation to make a payment to the lender.

Distressed loans are known to be subject to increased monitoring and may be subject to special accounting treatment. If a lender is a bank or other regulated entity, such distressed assets may subject the lender to increased capital requirements and regulatory scrutiny.

Lenders previously have had a limited number of alternatives for dealing with distressed credit facilities. One alternative is for the lender to continue to hold its distressed credit facilities. This option, however, imposes a number of additional costs on the lender. For example, a lender who retains distressed assets may need to employ specialized personnel and/or commit other management resources to manage and handle work-outs of the distressed loans, and establish appropriate reserves for loss contingencies. The process of working with problem borrowers to recover on distressed credit facilities is time-intensive and requires special skills and resources of a lender, often not readily or plentifully available to the lender on a cost-effective basis. If the lender is a bank or similarly regulated entity, the lender may need to establish reserves to ensure the lender's compliance with applicable regulatory requirements. Retaining distressed assets may further risk giving interested third parties, such as regulators, stockholders and financial analysts, a negative perception of the lender's portfolio quality and management acumen, and may expose the lender to potential further loss if a distressed borrower's creditworthiness continues to deteriorate. In addition, in the case of revolving loans where a lender has approved a line-of-credit for a borrower, the lender may have a contingent obligation to lend additional monies to an already faltering borrower.

Another alternative traditionally available to the lender is to sell a distressed credit facility to "vulture" investors at a cash price representing a significant discount to the outstanding principal. This alternative may eliminate applicable regulatory pressure on the lender caused by the presence of the distressed credit facility on the lender's financial statements and may also eliminate the lender's risk of future losses from the credit facility. However, it is a costly remedy because of the immediate and likely steep losses that the lender incurs as a result of the sale at a discount.

Traditionally, there has been little market for a "one-by-one" sale of distressed credit facilities; to the extent such a market has existed, it has been characterized by punitive pricing and illiquidity. Middle-market syndicated loans (i.e., aggregate credit facilities of less than $100 million, for example, with five or fewer lenders participating in any of the credit facilities) and single-lender facilities often can be sold only to predatory investors in bulk-loan sales at substantial discounts, again resulting in steep losses to the lender. Loan losses from such sales not only have obvious economic repercussions, but also generally have unfavorable effects on the financial institution from the perception of interested third parties (e.g., regulators, investors and financial analysts) who may interpret the loan losses as an indication that the lender's assets generally are of poor quality and that the management of the lender is imprudent or incompetent. As a result, lenders, hoping to minimize their losses, often resort to the liquidation of borrowers with distressed credit facilities at much reduced recoveries.

Each of these options has a number of significant disadvantages for a lender. Consequently, lenders historically have been forced to weigh distasteful alternatives with a goal of developing a strategy for handling distressed credit facilities that a lender believes to be the least onerous. Because virtually any portfolio of outstanding credit facilities is likely to include some distressed credit facilities, lenders almost invariably are required to devote substantial time and capital to developing and implementing acceptable strategies for handling their distressed credit facilities.

Securitization of distressed credit facilities has previously generally been unavailable as an alternative for lenders. In a traditional securitization of commercial or corporate credit facilities and/or high yield loans, a portfolio of generally performing credit facilities, characterized generally by regular cash flows and predictable recoveries, is sold by a lender or lenders to a bankruptcy-remote special purpose entity (an "SPE," e.g., a bankruptcy-remote special purpose trust, corporation or limited liability company) that finances the purchase by issuing asset-backed securities, (e.g., notes or bonds) and equity and/or equity-like securities to its investors. "Bankruptcy remote", as used herein, has the meaning common in securitization transactions of an entity which, due to governance provisions in its organizational documents, agreements with equity owners and creditors, or other measures, is less likely to be subject to a petition in bankruptcy than a normal operating company. The underlying pool of generally performing credit facilities is used to secure or collateralize the asset-backed securities issued to investors in the SPE and/or to the lender or lenders from whom the credit facility pool is acquired. Heretofore, securitizations of commercial credit facilities or high yield bonds have been comprised principally of relatively high quality collateral with predictable and scheduled interest and principal payments, thus assuring predictable and regular cash flows and recoveries. The asset-backed senior and mezzanine debt instruments issued by the SPE in a securitization of such commercial credit facilities or high yield bonds are known to have received investment grade ratings (e.g., ratings of Baa2/BBB-, or better) from credit rating agencies (e.g. S&P, Moody's Investor Services ("Moody's") and Fitch, Inc. ("Fitch")) based upon the predictable, regular stream of cash flows (i.e., interim payments of interest and principal) and the predictable recoveries (i.e., actual aggregate payouts of interest and principal) generated by the underlying debt asset pool, resulting in a high degree of certainty that the SPE can meet in a timely manner all of its debt service obligations, including principal and interest. The achievement of such investment grade ratings for the asset-backed senior and mezzanine debt securities issued by the SPE allows the SPE to finance the acquisition of the credit facility portfolio on a cost-effective basis (investment grade securities generally bearing a significantly lower interest rate than non-investment grade securities and generally being more easily sold in the marketplace).

On the other hand, portfolios which include, for example, 30% or more of distressed commercial credit facilities previously have been characterized by the unpredictability and irregularity of their cash flows (sometimes referred to as "lumpiness") and recoveries resulting from the low quality of the distressed debt assets comprising a substantial portion of (or all) the portfolio. Prior to the present invention, this unpredictability and irregularity of cash flows and recoveries has precluded lenders from securitizing such a portfolio of distressed credit facilities on a cost effective basis, because of the inability to obtain all investment grade ratings for the asset-backed debt securities issued above the equity or equity-like tranche or tranches and used to finance the acquisition of the distressed credit facility portfolio. As used herein, the phrases "equity or equity-like tranche or tranches," "equity or equity-like tranches," "equity or equity-like instruments," "equity or equity-like securities" or words to similar effect include, for example, non-investment grade payment-in-kind (PIK) securities, securities whose tax characterization is uncertain, securities without a capped return, and securities that have a yield that is not commensurate with having an investment grade rating. Without the ability to obtain investment grade ratings, it was impractical for a lender to securitize a portfolio of distressed commercial credit facilities because it would be too costly to support the interest cost of the asset-backed debt instruments issued in the securitization above the equity or equity-like instruments issued (investment grade securities generally bearing a significantly lower interest rate than non-investment grade securities).

Credit rating agency ratings for asset-backed securities are determined based on various parameters including cash flow modeling of the proposed transaction, stressing defaults and their timing, recovery rates and their timing, and liquidity needs. However, while the fundamentals of the rating process remain the same, the analytical emphasis and the assumptions used for rating a portfolio of 30% or more distressed credit facilities differ in response to the specific characteristics of distressed debt. (See, "Spinning Straw Into Gold.") For example, a typical SPE involved in a securitization of performing commercial credit facilities is stressed by a credit rating agency based on defaults and their timing. However, for an SPE whose underlying assets include 30% or more of distressed commercial credit facilities, a substantial portion of the loans in the pool are either already defaulted or expected to default. Thus, stressing defaults as a principal focus would not properly demonstrate the likely performance of the portfolio. Rather, recoveries, which are the primary driver of performance in a portfolio of distressed commercial credit facilities, are also stressed with the level of stress depending upon the credit rating sought.

Prior to the present invention, there has not been a system and method to achieve all investment grade ratings for the asset-backed securities above the equity or equity-like instruments an SPE issues to its investors and/or the lender or lenders as part of the purchase price for the portfolio of distressed commercial credit facilities, and thus there has not been a system or method to achieve pricing for the securitization of a portfolio of 30% or more distressed credit facilities comparable to that of a securitization of a performing loan pool. Investment grade ratings for the asset-backed securities issued by a distressed debt SPE result in a low cost of capital for the SPE, which allows the SPE the time to achieve the necessary recoveries on the underlying distressed assets and allows for ease of placement of the SPE's asset-backed securities in the marketplace in a manner and at prices comparable to those of SPEs whose underlying assets are performing commercial credit facilities or high yield bonds. Thus, there is a need for a method for securitizing a portfolio which includes, for example, at least 30% or more of distressed commercial credit facilities on an efficient cost-effective basis.

SUMMARY OF THE INVENTION

The present invention offers a platform and a securitization methodology that provides lenders with an opportunity to maximize the returns on their distressed commercial credit facilities and overcomes the obstacles that have historically precluded the securitization of distressed commercial credit facilities. The present invention is based upon an underlying portfolio of at least 30% (and up to 100%) distressed commercial credit facilities for securitization that emulates the predictability and regularity of the cash flow and recovery characteristics of a portfolio of performing credit facilities, thus eliminating crucial historical barriers to securitization of such credit facilities, such as the absence of predictable cash flows and recoveries. The methodology of the present invention takes a specified mix of distinct classifications of distressed credit facilities with specified characteristics in confluence with structural specifications for an SPE, such as specific reserves and safeguards, to create a synthetic asset class that emulates the cash flow and recovery characteristics of an SPE containing a portfolio (which may be of dissimilar size) of performing credit facilities. As such, the portfolio of distressed credit facilities is amenable to securitization and the issuance of asset-backed debt securities (above any equity or equity-like tranche or tranches of securities issued by the SPE) all of which are eligible to receive investment grade ratings.

According to one aspect of the present invention, an SPE purchases a portfolio of at least 30% (and up to 100%) of distressed commercial credit facilities from a lender for an aggregate purchase price comprised of (i) a cash purchase price comparable to what the lender would have received in a bulk sale into the marketplace, or realized on a net, discounted cash flow basis if the lender had retained the distressed credit facility portfolio and utilized its internal workout effort, and (ii) an additional investment grade asset or assets with a value on the date of purchase, for example, in the range of 10–15% of the face amount of the aggregate funded amounts included in the distressed credit facility portfolio.

The benefits of the present invention to a lender include the improvement of important financial ratios monitored by credit rating agencies and financial analysts, such as the ratio of non-performing loans to assets, the ability to free up valuable economic and regulatory capital and the opportunity to outsource the time-intensive and resource-expensive workout effort. Given identical default and recovery parameters (e.g., 50% of the loans will be in default of current interest payments within 18 months; those that have defaulted will not pay interest for two years; those that default will recover at best, for example, 60% of par (face) value; and those that do not default will recover, for example, 85% of par value), the methodology of the present invention provides a lender with a more cost-effective alternative than maintaining the distressed commercial credit facility portfolio on its balance sheet and utilizing its internal workout effort to manage and collect the loans.

The present invention also allows the lender to replace the distressed commercial credit facilities on its balance sheet with cash and investment grade assets with an aggregate value likely to be substantially greater than the amount the lender otherwise would have received in a "straight sale" for cash to a distressed asset investor or other third party. Furthermore, the methodology of the present invention also allows a lender to remove distressed commercial credit facilities from its balance sheet with the opportunity of receiving economic benefits likely greater than would be realized on a net discounted cash flow basis through internal workout efforts by the lender if the lender had retained the distressed assets.

BRIEF DESCRIPTION OF THE DRAWING

These and other advantages of the present invention will be understood with reference to the following specification and attached drawing wherein:

FIGS. 17A–17E illustrate exemplary due diligence reports for use with the present invention.

FIG. 22 is an exemplary spreadsheet representation of the SPE capital structure in accordance with the present invention.

DETAILED DESCRIPTION

Overview of the Process

The methodology of the present invention includes: (1) a portfolio of performing (if any) and at least 30% distressed commercial credit facilities selected to meet predetermined borrower and industry diversity criteria; (2) a self-amortizing and static SPE; (3) a mechanism to fund any unfunded revolver commitments; (4) a methodology to provide additional liquidity to certain borrowers; (5) a model and structure that aggregates the anticipated cash flows and which facilitates the requisite credit rating agency stress tests premised upon multiple default and recovery assumptions; (6) a methodology for the determination of optimum levels of interest reserves that ensure the timely repayment of interest on the investment grade debt issued in connection with the securitization of the underlying portfolio of distressed credit facilities; and (7) a capital structure designed in classes (or "tranches") and sized for receipt of investment grade ratings on all of its asset-backed debt components (above any equity or equity-like securities the SPE may issue).

Figure 1:
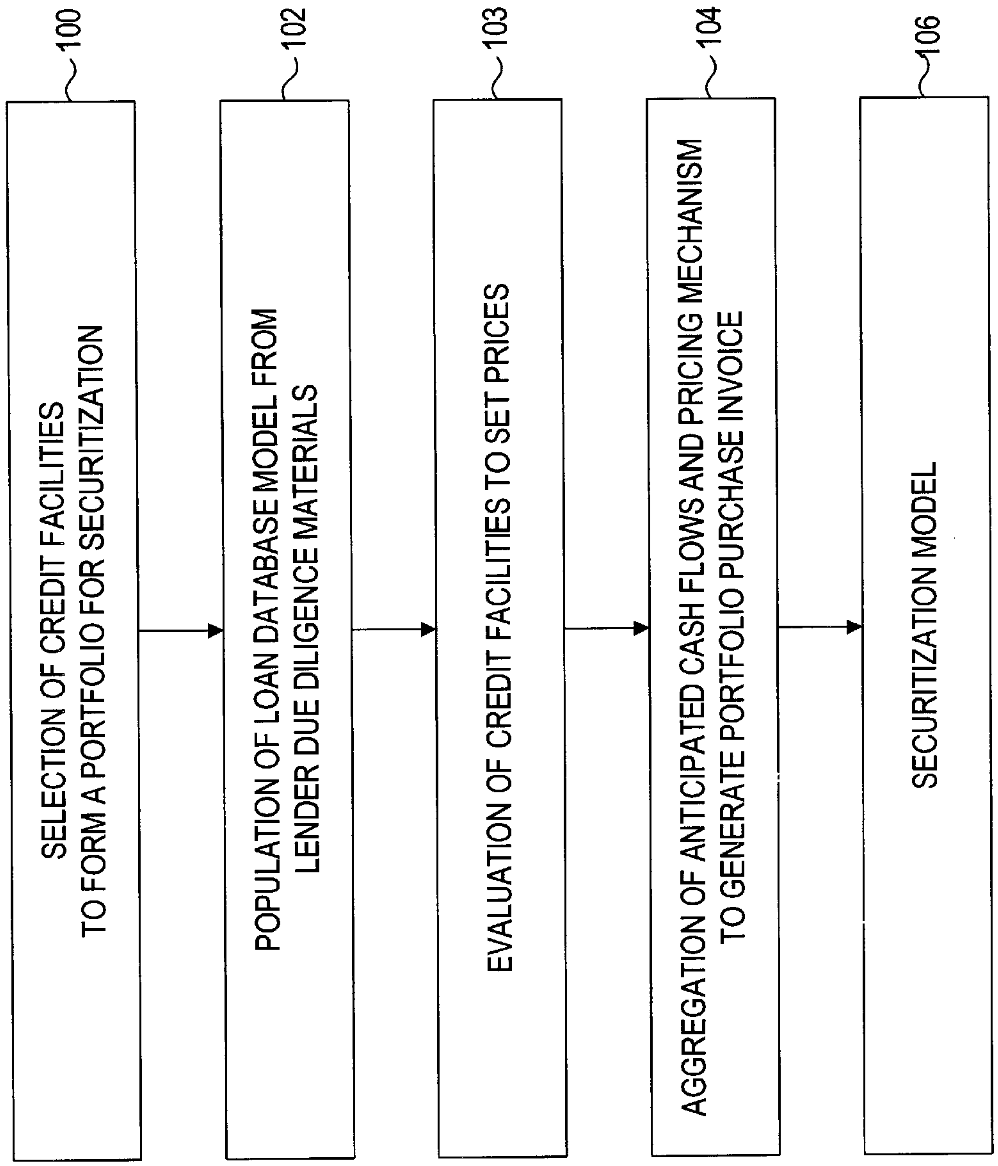
FIG. 1 is a block diagram of a process for securitization of a portfolio with 30% or more distressed commercial credit facilities in accordance with the present invention.

A high-level overview of a method of developing a securitization model for portfolios with at least 30% distressed commercial credit facilities in accordance with the principles of the present invention is illustrated in FIG. 1. The following description, which is to be viewed as illustrative only, is premised upon a portfolio of credit facilities of a lender or lenders containing at least 30% (and up to 100%) distressed commercial credit facilities and upon establishing a capital structure or securitization within an SPE collateralized by the portfolio of credit facilities. These procedures are expected to be performed by the manager for the securitized portfolio (such managers may act as structuring consultants, administrators for the SPEs and collection agents for the credit facilities (referred to hereafter as the "collateral manager")). The method of the present invention makes possible the securitization of such a portfolio of assets with highly unpredictable and irregular cash flow characteristics and highly unpredictable recoveries resulting in the issuance of one or more tranches of investment grade debt instruments to investors and the lender (in addition to the cash purchase price paid to the lender for the distressed credit facility portfolio), notwithstanding the distressed state of the underlying collateral pool.

Initially, in accordance with the principles of the present invention, a tentative portfolio of at least 30% distressed commercial credit facilities is selected for sale by a lender or lenders in connection with a proposed securitization, as illustrated in step 100 in FIG. 1 and as described in more detail below in connection with the illustrative example in FIGS. 2A–2D. Thereafter, appropriate due diligence information regarding the selected credit facilities in the initial, tentative portfolio is obtained by the collateral manager from the lender and stored in a database, for example, a collection of templates, one for each credit facility in the initial, tentative distressed asset portfolio in step 102, as described in more detail below in connection with the illustrative example in FIGS. 3–11. The data is selected based upon on analysis of applicable credit rating agency studies regarding cash flow and recovery statistics of senior secured commercial loans in a manner that provides the lender, the credit rating agencies and any insurers of the investment grade asset-backed securities issued in connection with the securitization, with the information commonly used in connection with pricing negotiations, and rating and underwriting criteria, respectively. This data allows credit rating agencies and insurers, if any, to evaluate the underlying credit facilities in the portfolio solely from that data and other information included in the database, thereby eliminating the need (and the related additional manpower, expense and time inefficiencies) for the credit rating agencies or insurers to review the loan documentation underlying each individual credit facility, to enable the credit rating agencies to "shadow rate" the credit facilities in the portfolio solely from the information contained in the database. Using this data, anticipated cash flows for the credit facilities in the portfolio are determined and aggregated, and a pricing mechanism is determined, as represented by step 104 in FIG. 1, and a securitization model or capital structure is developed in step 106. A detailed description of the aggregation process and the development of a securitization model is discussed below in connection with the illustrative example in FIGS. 18–39.

Various database or template models are suitable for use with the present invention, depending on various factors including the particular credit rating agency involved in the transaction. These database models may be implemented by way of various commonly available software platforms, such as Microsoft Office 2000.

Selection of Distressed Commercial Credit Facilities

FIGS. 2A–2D illustrate in greater detail the process of initial selection of distressed commercial credit facilities for securitization of a portfolio having at least 30% distressed commercial credit facilities by selecting the distressed commercial credit facilities in accordance with predetermined criteria as set forth below in accordance with the present invention. More particularly, the process begins with a review of a lender's aggregate portfolio 108 of distressed commercial credit facilities. In particular, initially a tentative portfolio 109 of distressed commercial credit facilities is selected by the lender in accordance with predetermined performance criteria (performing-1, performing-2, and impaired), as discussed below, and preliminary percentage allocations provided by the collateral manager to the lender. As used herein, (i) "performing-1" means a credit facility (A) in which the borrower is currently paying, and is anticipated to continue to pay current interest on amounts owed under the credit facility throughout the term of the credit facility, and (B) which is anticipated to have a par or near par (i.e., at least 85% of face value) recovery of principal and accrued interest at maturity, (ii) "performing-2" means a credit facility (A) in which the borrower is paying current interest on amounts owed under the credit facility, but is anticipated as not likely to continue to pay current interest throughout the term of the credit facility, and (B) which is anticipated to have a less than near par (i.e., in the range of 60–85% of face value) recovery of principal and accrued interest at maturity, and (iii) "impaired" means a credit facility in which the borrower is in default on an obligation to pay current interest.

The preliminary percentages of performing-1, performing-2 and impaired credit facilities are determined by the collateral manager on a case-by-case basis, but, for purposes of illustration only, may be assumed to be in the ranges of 35–40%, 40–45%, and 15–25%, respectively, of the aggregate principal balance of the portfolio. These percentages are adjusted by the collateral manager in accordance with normal business practices (taking into account the timing and amount of estimated borrower payments and recoveries on collateral) to balance the distressed commercial credit facility portfolio in connection with the proposed securitization in order to create a synthetic cash flow stream that emulates the characteristics of a pool of dissimilar size of performing credit facilities (e.g., there may be need for a larger number of distressed credit facilities in the pool than would otherwise be required if the pool consisted of performing credit facilities, in order to mirror the performance characteristics of a performing loan pool). For example, the greater the percentage of performing-i credit facilities in the pool, the greater the corresponding percentage of impaired credit facilities that may be included.

The initial credit facilities selected by the lender are further screened in steps 110–118 in the illustrative example. These steps 110–118 are intended to further refine the selection of the distressed credit facilities included in the initial, tentative portfolio in a manner that ultimately will result in a portfolio that emulates the results of studies by credit rating agencies' such as S&P, Moody's, and Fitch, regarding anticipated cash flow characteristics and recoveries on senior secured commercial debt instruments. More particularly, the methodology of the present invention includes a system to gather data and price loans, and to model cash flows and loan performance in a manner satisfactory to the credit rating agencies and which meets their requirements to quantify risk within the context of various existing default studies (e.g., Carty, Lea V. et al., "Bankrupt Loan Recoveries," A Moody's Special Comment, Moody's, June 1998; Carty, Lea V. and Hamilton, David T., "Debt Recoveries for Corporate Bankruptcies," A Moody's Special Comment, Moody's, June 1999; Van de Castle, Karen and Keisman, David, "Recovering Your Money: Insights Into Losses From Defaults," S&P CreditWeek, Jun. 16, 1999; Hamilton, David T., "The Investment Performance of Bankrupt Corporate Debt Obligations: Moody's Bankrupt Bond Index 2000," A Moody's Special Comment, Moody's, February 2000; Brand, Les and Bahar, Reza, "Recoveries on Defaulted Bonds Tied to Seniority Rankings," A S&P Special Report: Ratings Performance 1999, February 2000; Keisman, David and Yung, Ruth, "Suddenly Structure Mattered: Insights into Recoveries of Defaulted Debt," S&P CreditWeek, May 31, 2000).

The process is applied to each credit facility initially selected by the lender, and is designed to exclude credit facilities which, according to published credit rating agency studies, have poor historical principal recovery profiles and erratic cash flow characteristics, and whose inclusion would negatively affect the rating agencies' assessment of risk for the SPE. The process is based upon some or all of the exemplary criteria in accordance with the present invention, illustrated and described in connection with FIGS. 2A–2D. It should be noted that the criteria may vary as credit rating agencies update their studies or different credit rating agencies are chosen for the transaction.

More specifically, in the illustrative example, credit facilities in the lender's initial, tentative portfolio which, by the terms of their loan documentation, mature too late in the term of the proposed securitization are eliminated in step 110. This step serves to reduce the risk that the collateral manager will be left with insufficient time to recover on credit facilities on which the corresponding borrower defaults on one or more payments before those payments are renewed and needed by the collateral manager to fund and pay the securities issued by the SPE at their stated or credit-rated maturity. Next in step 112 in the illustrative example, unsecured credit facilities and credit facilities secured only by stock or other equity interests in the corresponding borrower's subsidiaries are eliminated. Moreover, in the illustrative example, credit facilities that are denominated in foreign currency and credit facilities extended to non-U.S. borrowers are subsequently eliminated in step 114, and credit facilities extended to borrowers whose debt is supported by no or minimal collateral and/or minimal restrictive covenants (sometimes referred to in lending parlance as "fallen angel borrowers" after their debt has become distressed) are eliminated in step 116. Subsequently in step 118, credit facilities extended to borrowers that are tainted by material accounting irregularities, significant environmental problems, protracted litigation, and the like are eliminated. After eliminating credit facilities from the initial, tentative portfolio 109 in steps 110, 112, 114, 116, and 118, a tentative portfolio 120 containing credit facilities eligible for securitization according to the present invention is assembled.

Figure 2A:
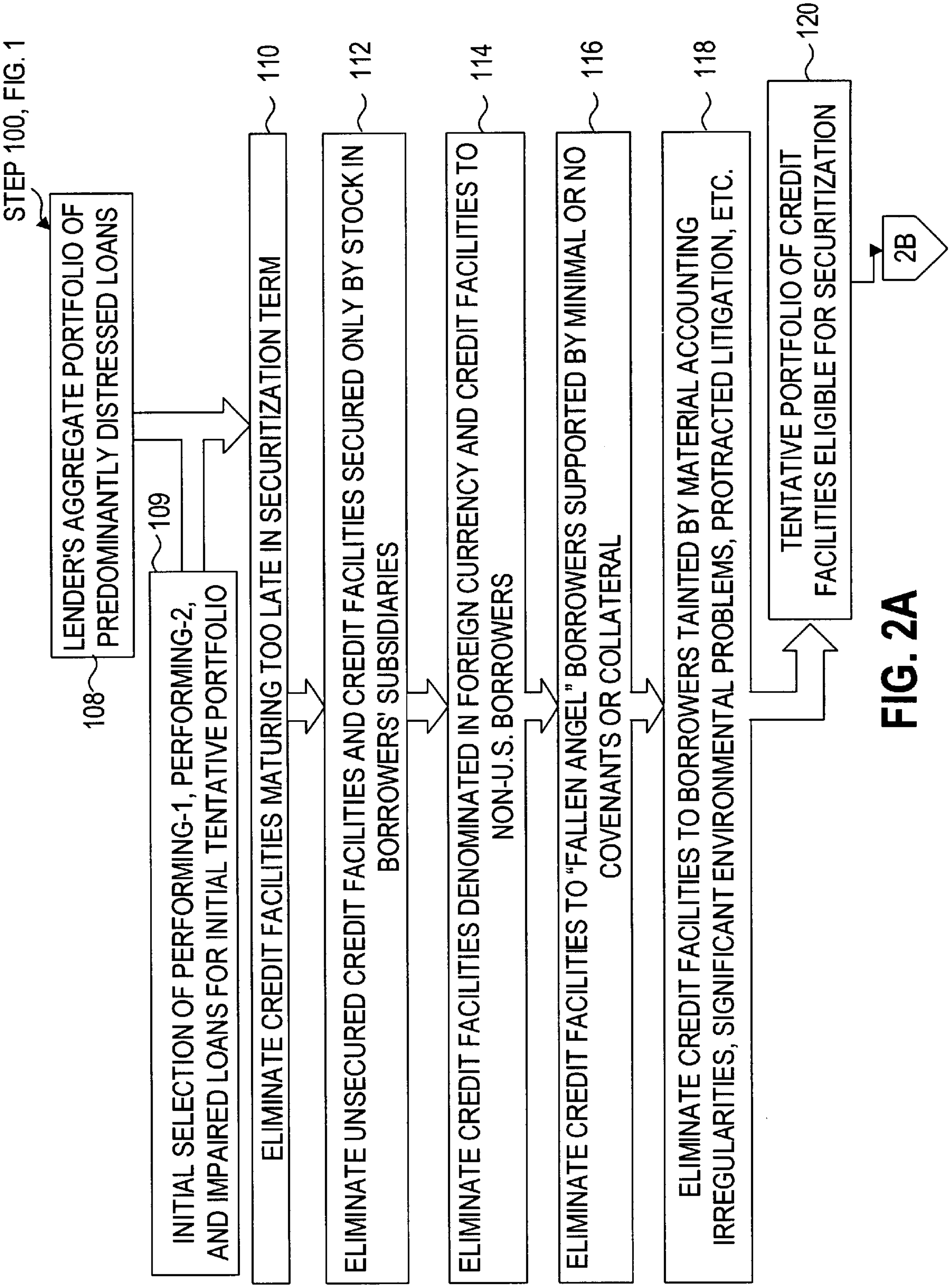
FIG. 2A is a block diagram which illustrates the process of selecting credit facilities from a lender's portfolio to develop a tentative portfolio of credit facilities for securitization in accordance with the present invention.
Figure 2B:
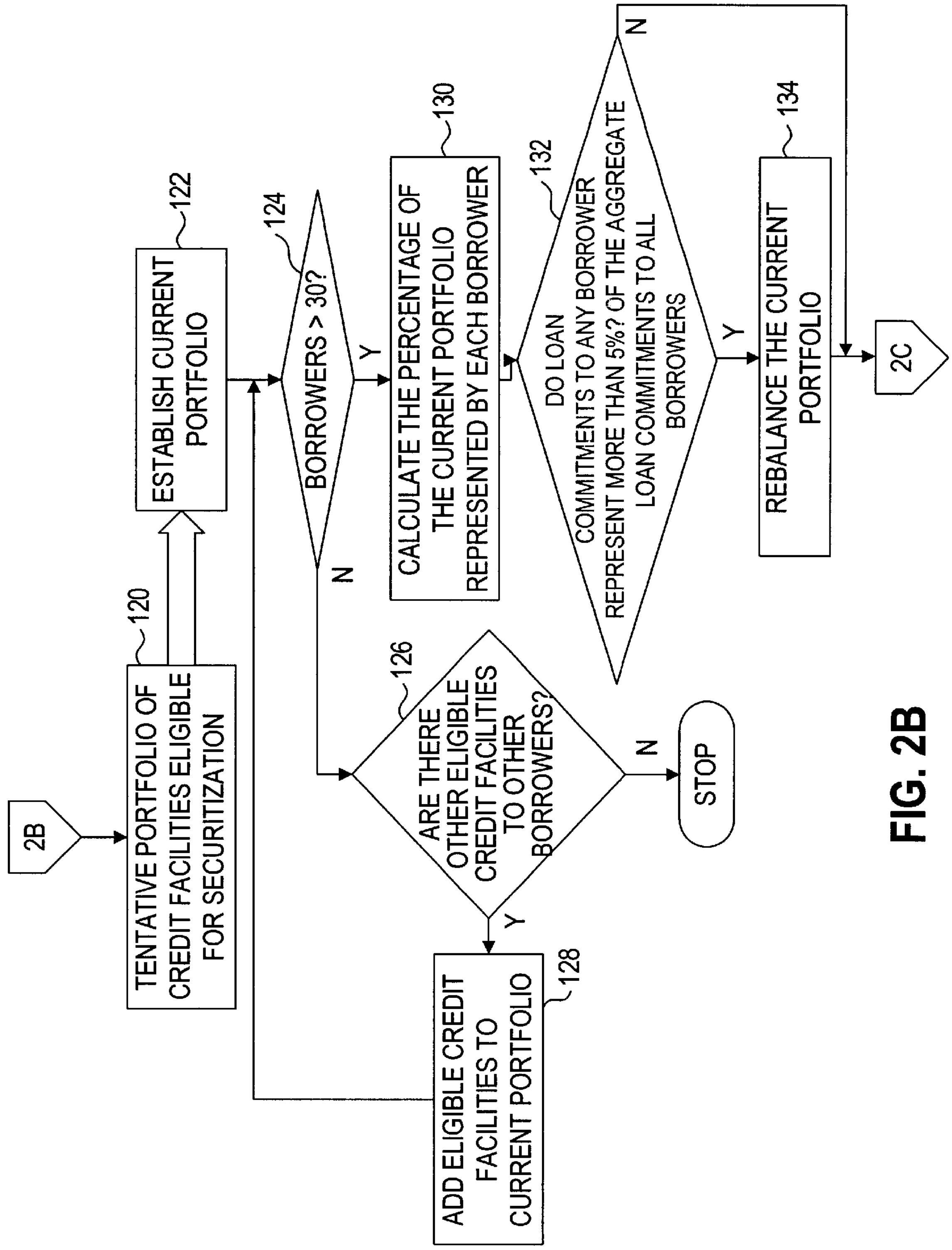
FIG. 2B is a block diagram which illustrates the process of evaluating the credit facilities in the tentative portfolio to determine whether predetermined criteria are met relating to borrower diversity and concentration.

Referring to FIG. 2B in the illustrative example, the tentative portfolio 120 is used as a starting point for the "current" credit facility portfolio, as indicated in step 122, and further analyzed and manipulated as discussed below in connection with the illustrative example in FIGS. 2B–2D to ensure that credit facilities in the tentative portfolio 120 meet various diversification requirements. In particular, these procedures are intended to test if the tentative portfolio 120 meets, for example, S&P industry sector concentration limits and whether the tentative portfolio 120 is likely to have, for example, a Moody's diversity score of at least 25. More particularly, in step 124, a determination is made of the borrower diversity and specifically whether the number of borrowers represented in the current credit facility portfolio 122 is greater than 30. If not, the current portfolio 122 is not likely to meet the criteria for diversity and, consequently, the proposed securitization of the current portfolio 122 is not performed unless the current portfolio 122 can be modified. More particularly, if it is determined that the number of borrowers represented in the current credit facility portfolio is not greater than 30, then a determination is made in step 126 whether the lender has other eligible credit facilities which can be included in the current portfolio 122 to increase the number of borrowers represented therein above 30. If there are other eligible credit facilities, then these other eligible credit facilities are added to the current portfolio in step 128 to meet the borrower diversity requirement.

Once the borrower diversity requirement is met for either the current portfolio 122 or the modified current portfolio, the portfolio is further processed in steps 130–134 in the illustrative example to determine loan commitment concentration for each borrower represented in the portfolio. More particularly, the percentage of the loan commitments to each borrower relative to the aggregate loan commitments to all borrowers under all credit facilities included in the current portfolio 122 or modified current portfolio is determined in step 130. Subsequently, a determination is made in step 132 whether the loan commitments to any borrower represent more than 5% of the aggregate loan commitments to all borrowers under all credit facilities included in the portfolio, with the norm being in the range of, for example, 1.5–3%. If so, the current credit portfolio 122 or modified current portfolio is again rebalanced so that the loan commitments for any borrower represent no more than 5% of the aggregate loan commitments included in the portfolio.

Figure 2C:
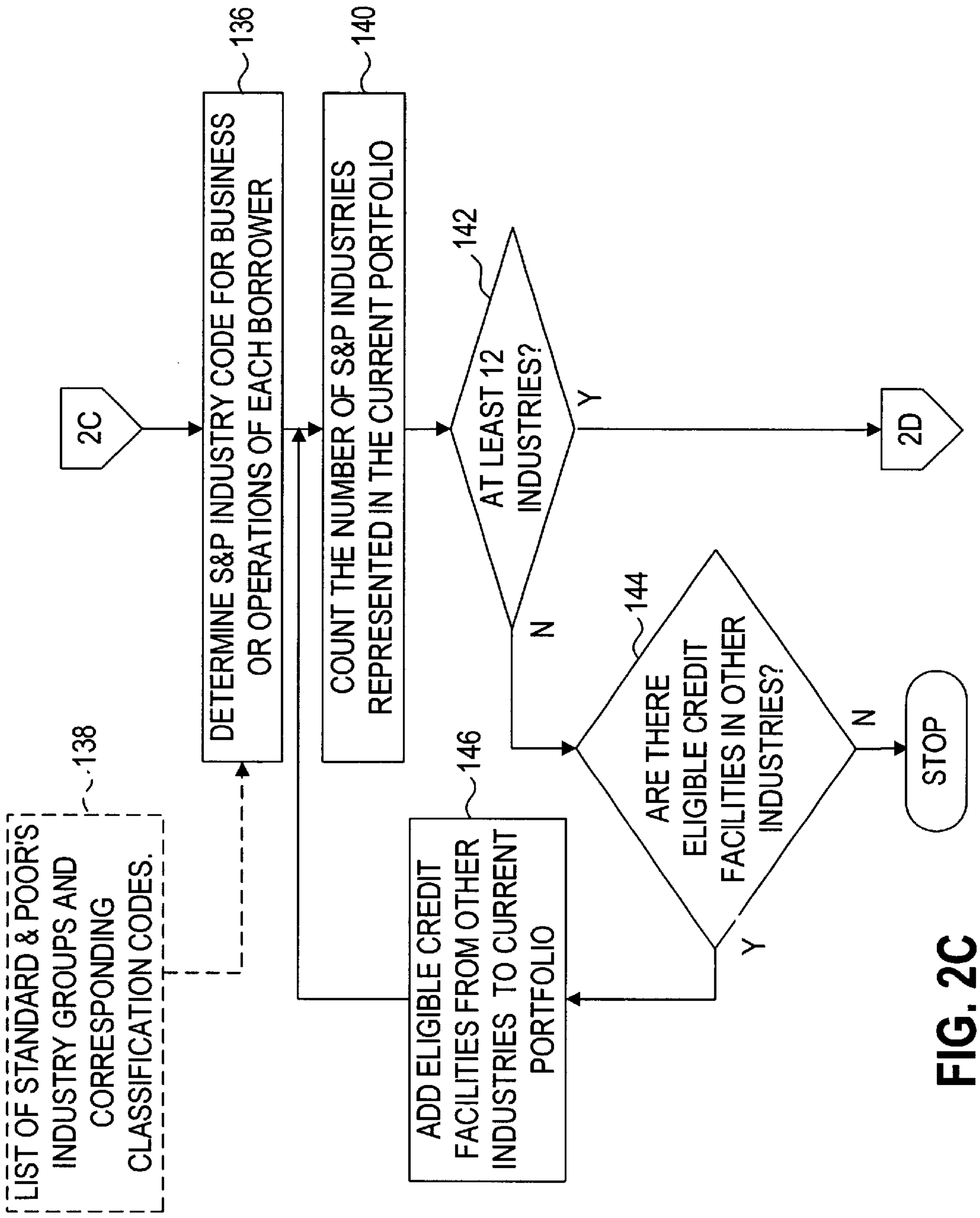
FIG. 2C is a block diagram which illustrates the process of further evaluating the credit facilities in the portfolio to further determine whether predetermined criteria are met relating to industry diversity.

After the loan commitment concentration is determined for each borrower, the industry diversification of the portfolio is determined as illustrated in FIG. 2C. More particularly, an industry code identifying the industry occupied by the business or operations for each borrower is determined in step 136 from a list 138 of industry groups and corresponding classification codes, such as provided by S&P. After the industry codes have been identified for each borrower in the portfolio, the number of industries represented in the current portfolio is counted in step 140 to determine whether at least 12 different industries are represented in the current portfolio. If not, other eligible credit facilities in other industries are added to the portfolio, if possible, to meet the industry diversification criteria, subject to the 5% borrower loan commitment concentration criteria described above. If that is not possible, a determination is made that the portfolio is not likely to meet credit rating agency industry diversification criteria.

Figure 2D:
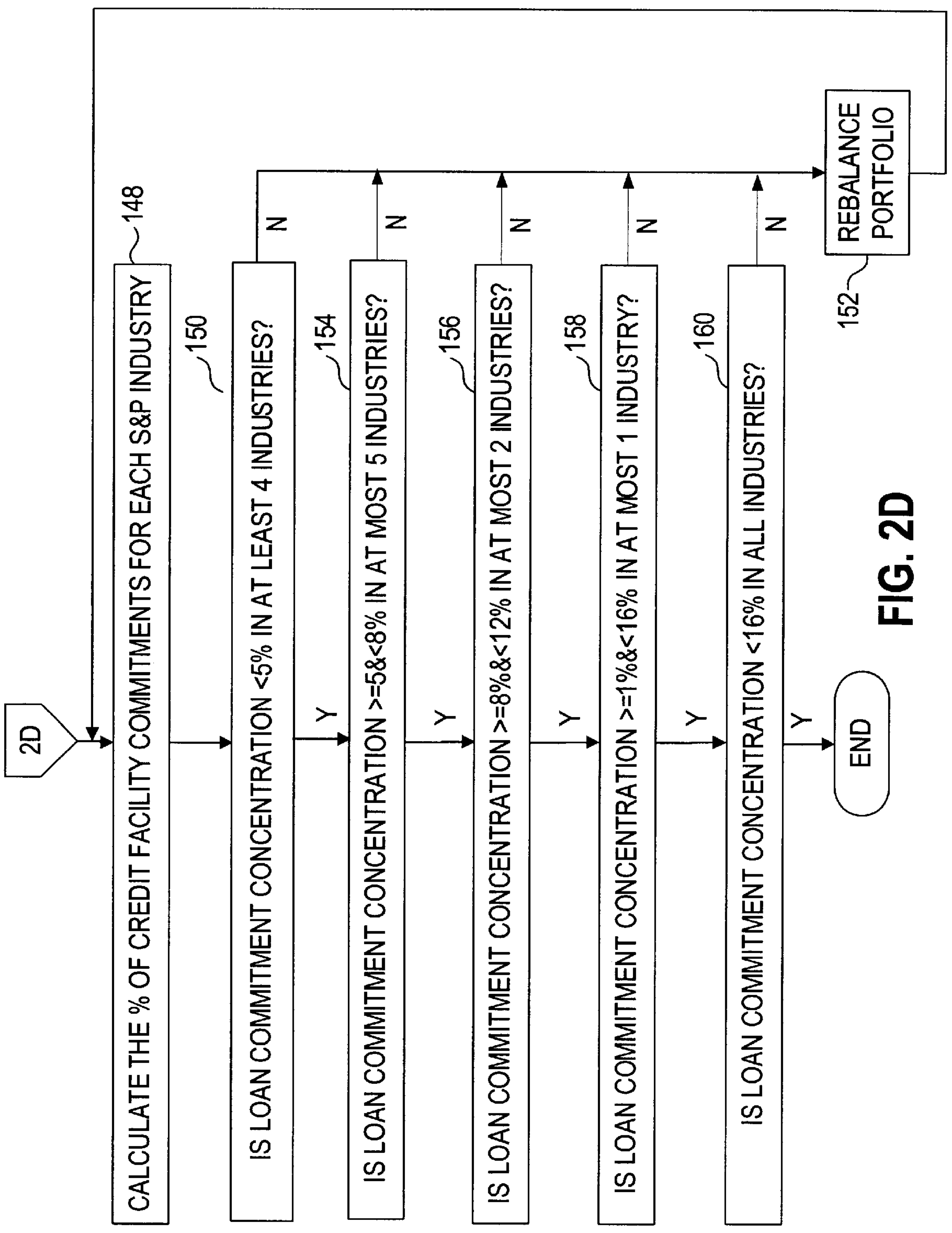
FIG. 2D is a block diagram which illustrates the process of further evaluating the credit facilities in the current portfolio to determine whether the predetermined criteria are met relative to industry concentration.

Once the industry diversification criteria are satisfied, the loan commitment concentration for each industry is determined in step 148 to ascertain whether the current portfolio meets loan commitment concentration criteria as illustrated in FIG. 2D. More particularly, the steps, illustrated in FIG. 2D, test whether the current portfolio meets S&P industry concentration limits. The database model may also be used to test whether the portfolio is likely to have a Moody's diversity score of at least 25 using Moody's published diversity score model which is also dependent on industry diversification. Initially in step 150 in the illustrative example, the current portfolio is evaluated to determine if the loan commitment concentration is less than 5% for at least four industries. If not, the current portfolio is rebalanced in step 152, subject to the criteria discussed above to attempt to satisfy this industry concentration requirement. If so, the portfolio is further evaluated in step 150 to determine whether the loan commitment concentration is at least 5%, but less than 8% in at most five industries. If this criteria is not met, the portfolio is rebalanced in step 152 as discussed above. If the criteria is met, the portfolio is further evaluated to determine whether the loan commitment concentration is at least 8%, but less than 12% in at most two industries in step 156. If not, the current loan portfolio is rebalanced in step 152 as discussed above to meet this criteria. Subsequently in step 158, the loan commitment concentration is evaluated to determine if there are any concentrations of at least 12%, but less than 16% in at most one industry. If this criteria is not met, then the portfolio may be rebalanced as discussed above to attempt to meet the criteria. If the criteria is met, the industry concentration further is evaluated to determine whether the loan commitment concentration is less than 16% for all industries represented in the current portfolio in step 160. Once again, if this criteria is not met, the portfolio is rebalanced in step 152, as discussed above. The borrower and industry concentration and diversity standards discussed above are merely exemplary and may be adjusted to reflect current credit rating agency standards and subsequent modifications.

Due Diligence

The system in accordance with the present invention may include a comprehensive protocol including: conducting on-site due diligence of each credit facility in a lender's distressed credit facility portfolio; performing a discounted cash flow valuation for each credit facility in the distressed credit facility portfolio; maintaining a current database to include the financial and restructuring progress of each borrower in the distressed credit facility portfolio; developing a capital structure for the SPE based on the information discovered during the due diligence and database creation process; determining collateral value estimates for each borrower; developing a workout strategy for handling workout of a borrower's distressed loans; and analyzing the performance of each asset in the SPE's portfolio. Various models may be utilized depending on the particular credit rating agency or agencies involved in the transaction. It is preferable to process financial data using computer programming, due to the many variables involved. This information may be organized by way of various commonly available software platforms, such as Microsoft Office 2000.

As part of the due diligence review, computerized database models or templates, as described below, may be used as a guide to facilitate the quantitative, qualitative and legal evaluation in order to (i) assure the credit rating agencies that full, accurate disclosure has been made, and (ii) efficiently provide the credit rating agencies with concise, but sufficient information regarding each borrower, its financial statements and the borrower's loans to be included in the portfolio (and, perhaps, other debt facilities of the borrower), general pricing parameters for the loans to be included in the portfolio, and other valuation criteria and/or analyses to facilitate the agencies' independent examinations of recovery values (rather than the agencies requiring their own direct examination of the underlying due diligence information and documentation). Each database model may include numerous fields for data, such as borrower financial statement data, principal amounts, interest rates, credit metrics, amortization tables, industry information and cash flow projections.

Overview of Loan Documentation

After the credit facilities are selected for the portfolio and a determination is made that the portfolio meets the borrower and industry diversification and loan commitment concentration criteria as discussed above, the collateral manager processes the documentation as discussed above in connection with step 102 (FIG. 1) and performs a due diligence review of the lender's credit facility documentation 172 (FIG. 3) and assembles the required information, as will be discussed in more detail below, in a database or template to facilitate review, as discussed above. The database model may include borrower data 176, credit facility/debt descriptions 178, financial statement data 180, and general pricing parameters 182 for each credit facility in the portfolio, as described in detail below in connection with the illustrative example in FIGS. 6–10J.

The general pricing parameters 182 may be determined by the collateral manager, based on the collateral manager's preliminary assessment of a qualitative path of restructuring in order to quantify anticipated cash flow streams and anticipated recoveries, e.g., estimate the number of months of anticipated current interest payments, estimate the percentage of principal recovery at the end of that number of months, and discount the result by 25% or another commercially reasonable discount percentage, as described below in connection with the illustrative example in FIGS. 6–11.

As described in more detail below, all of this data is then used to calculate valuation criteria in step 174 for valuing each credit facility in the distressed commercial credit facility portfolio. Of course, any suitable spreadsheet or accounting, financial, or database software (e.g., Microsoft Excel, Microsoft Access, etc.) may be used to facilitate the input of the data and to perform these calculations more simply or even automatically, as will be readily appreciated by those of ordinary skill in the art.

In order to calculate the loan valuation for each credit facility in the portfolio, various decision variables may be determined by the collateral manager. These decision variables are described in more detail below. These decision variables may include collateral value estimates 186 for each borrower, a work-out strategy 188 for handling work-out of the borrower's distressed credit facility and work-out parameters 190. In each case, these decision variables are determined in the judgment of the collateral manager based on parameters, such as (i) a sale of the borrower entity as a whole, (ii) an orderly sale or sales of the borrower's assets, (iii) a liquidation of the borrower's assets, (iv) the loans performing to maturity, and/or (v) refinancing all or a portion of the outstanding loans at a discount. This process is repeated for each credit facility in the portfolio.

A valuation is then calculated for each credit facility in step 192, as described in more detail below in connection with the illustrative example in FIGS. 16A–16C. Thereafter, due diligence reports 194 and any necessary or appropriate ad hoc reports 196 relating to any borrower or any credit facility may be generated for review and analysis by the collateral manager, lender, credit rating agencies and any insurers in connection with the contemplated securitization. In addition, an aggregation is performed in step 198 using the loan valuations, determined in step 192, in order to develop a capital structure 200 for the SPE, and a securitization model 202. As will be discussed in more detail below, a securitization model may be used to ensure that the SPE's capital structure, reserve accounts and cash distribution waterfalls, in conjunction with the selection of the underlying collateral of the distressed credit facilities, are configured to emulate the cash flow and recovery characteristics of a securitization of performing credit facilities in order to attain an investment grade rating or ratings for all of the various tranches of debt instruments included in the capital structure above any equity or equity-like securities.

Exemplary Loan Documentation

Figure 4:
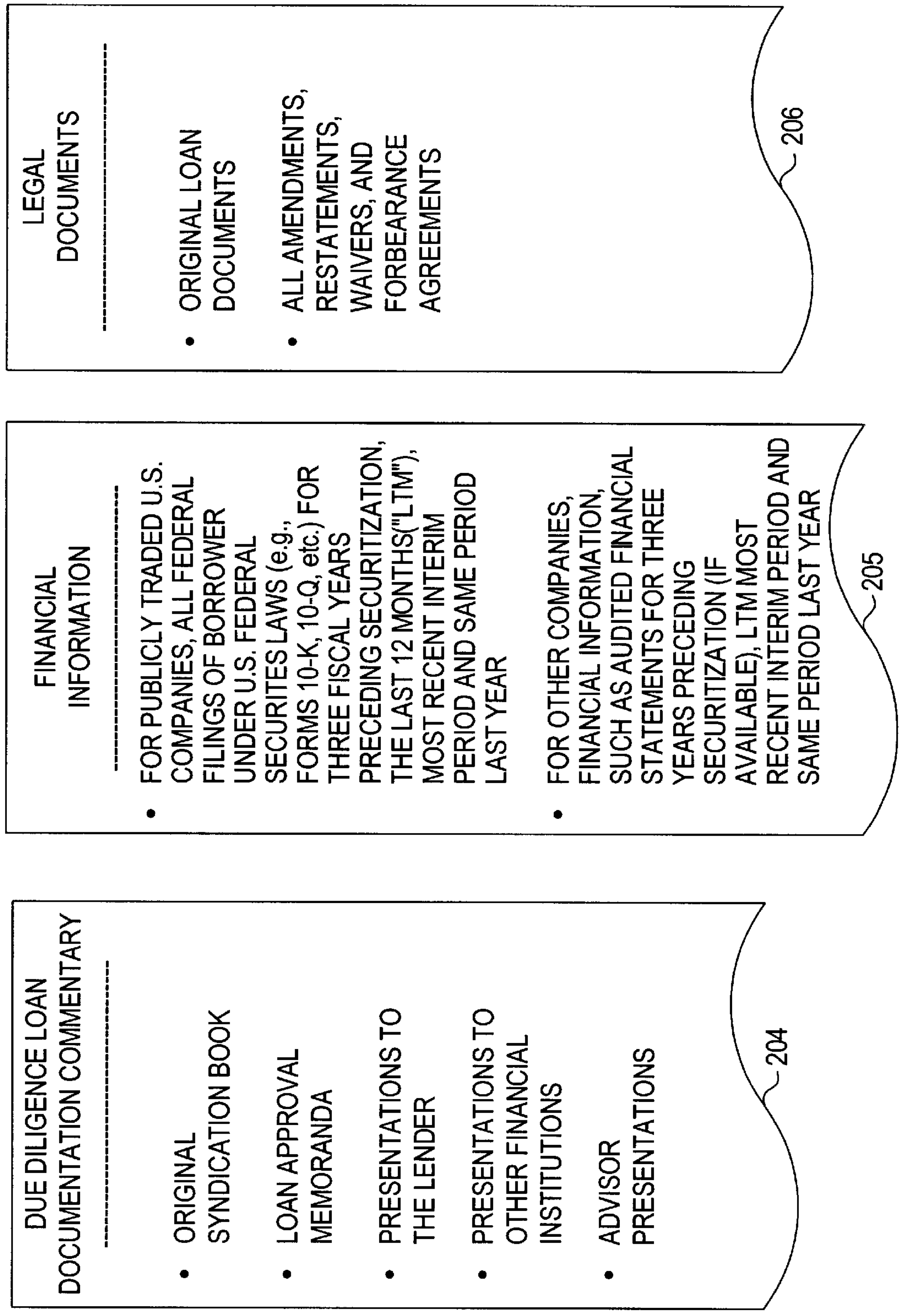
FIGS. 4 and 5 are block diagrams which illustrate exemplary loan documentation to be obtained by the collateral manager in connection with a securitization of at least 30% distressed commercial credit facilities in accordance with the present invention.
Figure 5:
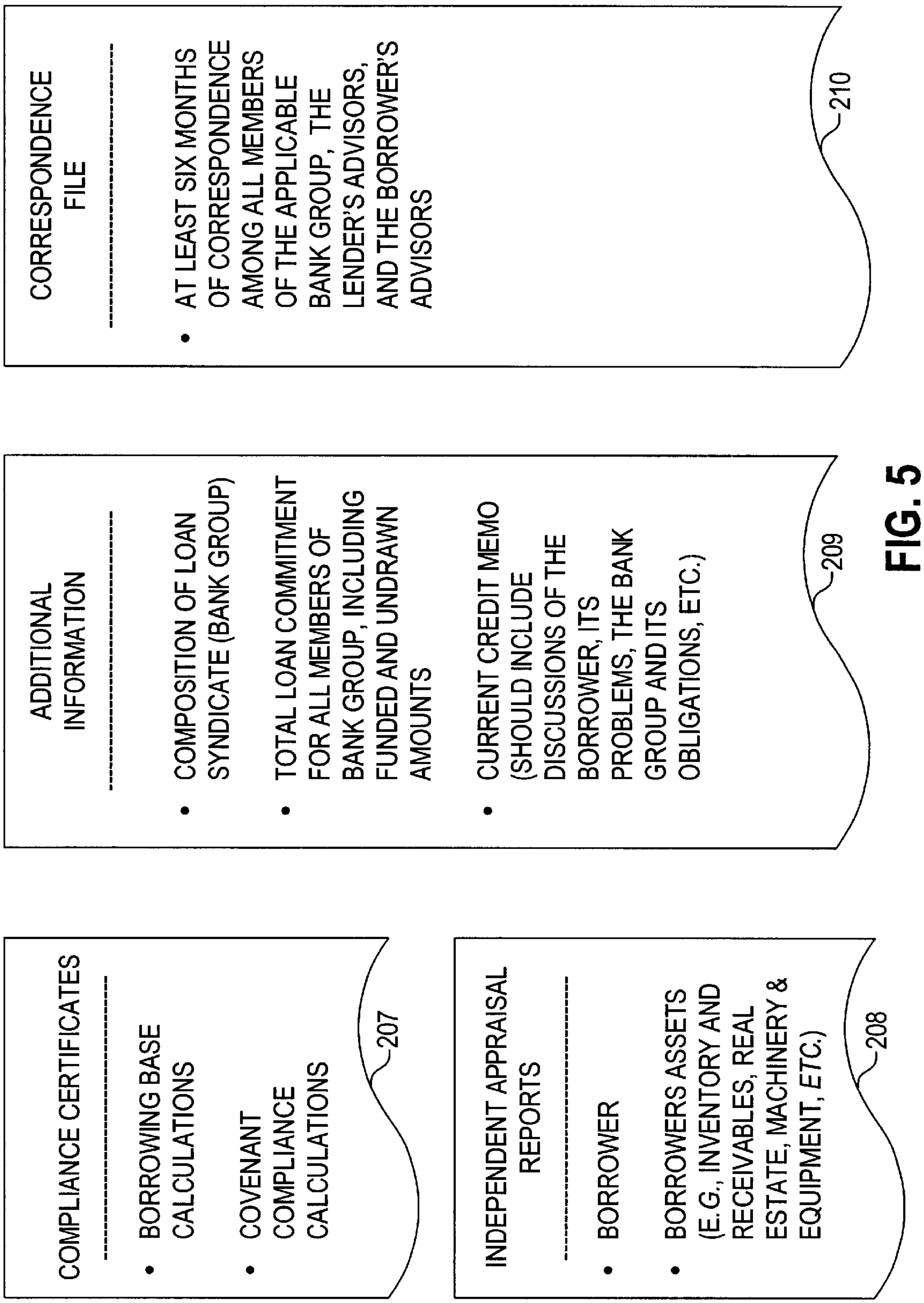

FIGS. 4 and 5 illustrate exemplary due diligence loan documentation materials 204 obtained by the collateral manager from the lender for each credit facility in the portfolio in connection with securitization according to the present invention. By way of example and not limitation, this due diligence loan documentation may include for each loan: (1) descriptive material 204, such as an original syndication book, loan approval memoranda, any relevant presentations to the lender, other financial institutions and/or advisors; (2)(a) for publicly traded borrowers, various financial information 205 including all filings, notices and reports of the borrower under U.S. federal securities laws (e.g., Forms 10-K, 10-Q, 8-K, etc.) during the borrower's three fiscal years (or such shorter period as the borrower has been publicly traded) preceding the proposed securitization, for the immediately preceding (or last) 12 months (the "LTM"), and for the most recent year-to-date interim period; and (b) for borrowers that are not publicly traded, financial information, such as audited financial statements for the three fiscal years preceding the proposed securitization (or such shorter period as the borrower has been in existence), for the LTM, and for the most recent year-to-date interim period; and (3) various legal documents 206, including the original loan documents, and all amendments, restatements, waivers, and forbearance agreements relating to the credit facility.

FIG. 5 illustrates exemplary additional due diligence loan documentation 207–210, which may include, without limitation, compliance certificates 207 (including, without limitation, borrowing base calculations and covenant compliance calculations); independent appraisal reports step 208 regarding the borrower and/or the borrower's assets; various additional information 209 (for example, the composition of the loan syndicate for a particular credit facility (sometimes referred to herein as a "bank group"); the aggregate amount of loan commitments for all members of the applicable bank group including both funded and undrawn amounts (collectively, the "Global Commitment"); current credit memoranda including discussions of the borrower and any problems the borrower may have, as well as the bank group and its related obligations); and a correspondence file 210 including, without limitation, at least six months of correspondence among, for example, the bank group, the lender's advisors, and the borrower's advisors.

The collateral manager uses the above mentioned information to assess the status of any restructuring negotiations, including potential debt forgiveness, anticipated changes in legal documentation of the credit facility, and upcoming asset sales in order to price the credit facility properly. The information discussed above is intended to provide the collateral manager with a snapshot of what transpired historically, and also to enable the collateral manager to anticipate likely future events and the potential effects on cash flow and recovery for a particular borrower.

Database Model—Borrower Data

Figure 3:
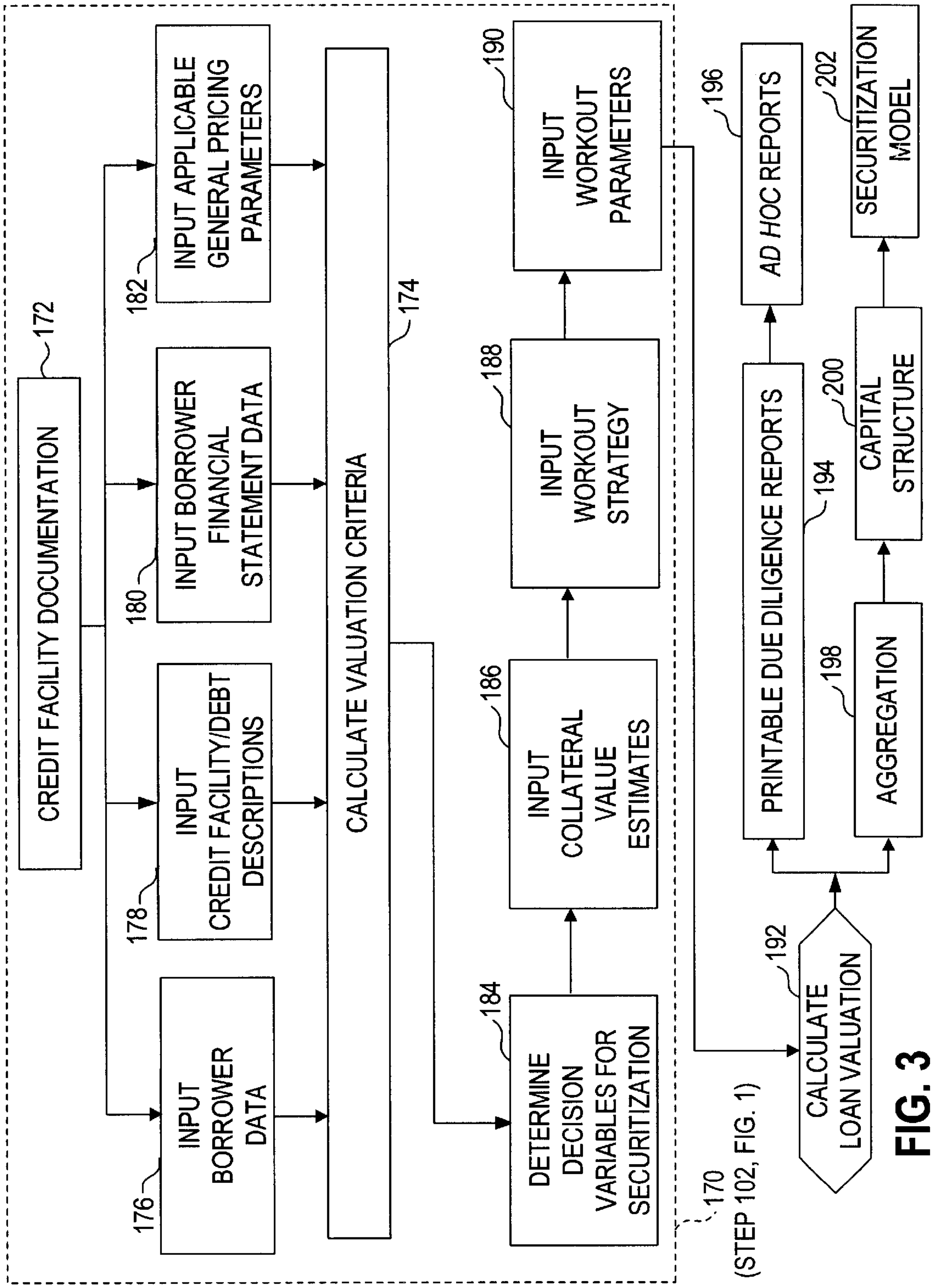
FIG. 3 is a block diagram illustrating the processing of loan documentation and development of a securitization model in accordance with the present invention.
Figure 6:
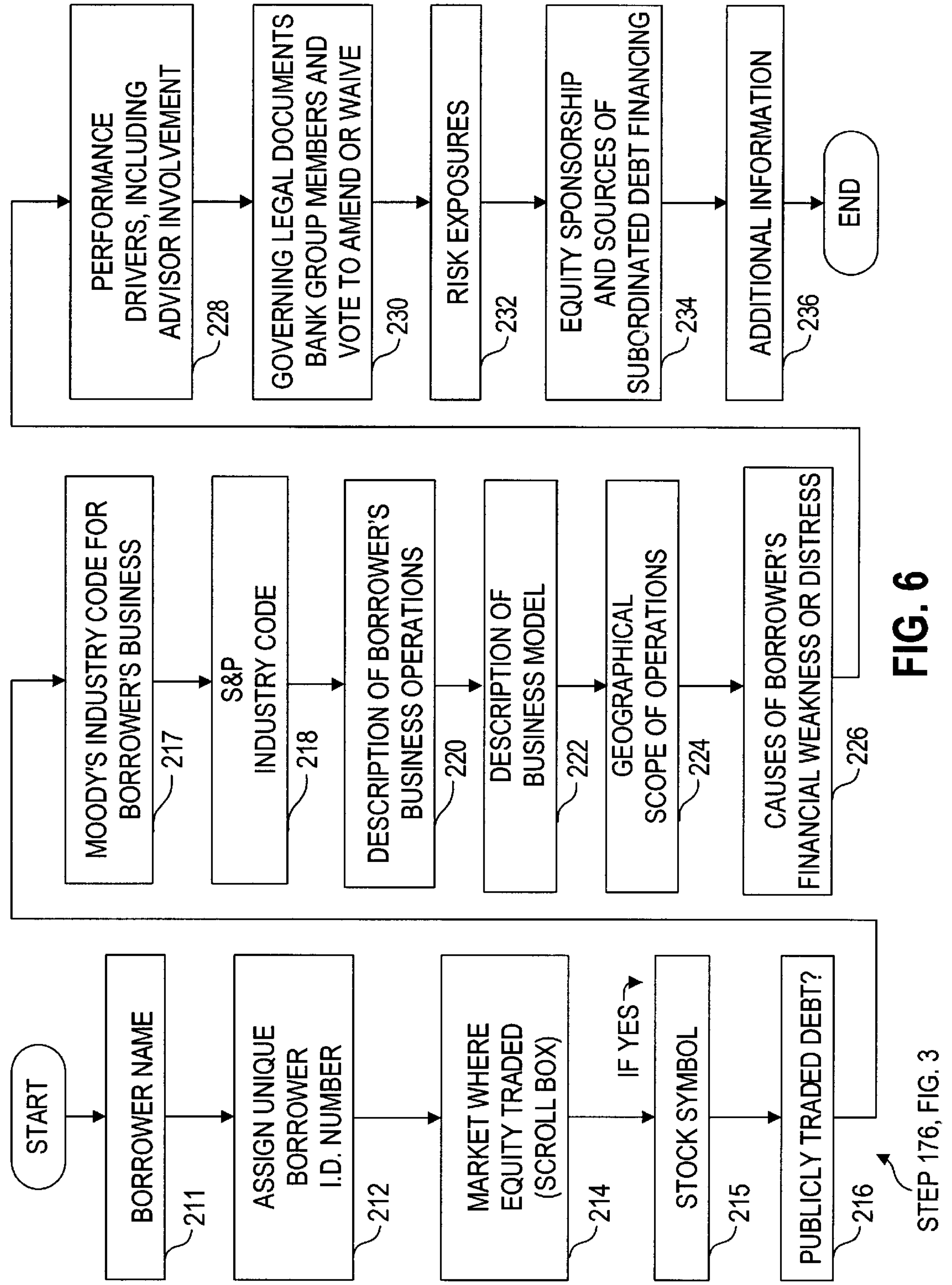
FIG. 6 is an exemplary block diagram illustrating a database model for organizing borrower data for use with the present invention.

FIG. 6 illustrates an exemplary database model for organizing the borrower data 176 (FIG. 3). More particularly, the database model or template may be developed with various fields, as discussed below, to organize the various credit facility documentation 172 (FIG. 3). As noted above, suitable software applications, such as commonly available accounting or financial databases and/or spreadsheets, may be used to set up the various fields in the database. By way of example and not limitation, such a database model for borrower data 176 for a given credit facility may include: a field 211 (FIG. 6) for the name(s) of the borrower; and a field 212 for a unique borrower identification number that may be assigned by the collateral manager simply for reference purposes. Another field 214 may be provided for an identification of the market, if any, where any equity securities of the borrower are publicly traded. This field 214 optionally may be implemented with a conventional Windows scrollbar in a spreadsheet, allowing for user-selection from among a list of available markets. A field 215 may also be provided with the applicable stock symbol or symbols for each borrower that is publicly traded. A field 216 may also be included to provide an indication of whether the borrower has any publicly traded debt securities. The database model may further include a field 217 for the Moody's industry code associated with the borrower's business and a field 218 for the S&P industry code. A field 220 may be provided to include a description of the borrower's business operations and a field 222 for a description of the borrower's business model. The database model may also include a field 224 for a statement of the geographical scope of the borrower's business and a field 226 for a discussion of the causes of the borrower's financial weakness or distress in the view of the collateral manager. A field 228 may also be provided to include a discussion of the factors driving performance of the borrower, including, for example, involvement of a financial advisor. A field 230 may be used for an identification of the loan documents governing the credit facility, an identification of all financial institutions comprising the syndicate or bank group and their corresponding participation percentages, and an indication of the vote(s) required to amend or waive various provisions of the loan documents. A field 232 may also be provided to include an explanation of the risk factors and/or exposures applicable to the borrower or the borrower's industry in the view of the collateral manager. A field 234 may be provided to include an identification of any equity sponsorship of the borrower and sources of subordinated debt financing and, finally, a field 236 representing any additional information may be included in the database model for each credit facility.

Database Model—Loan Information

Figure 7A:
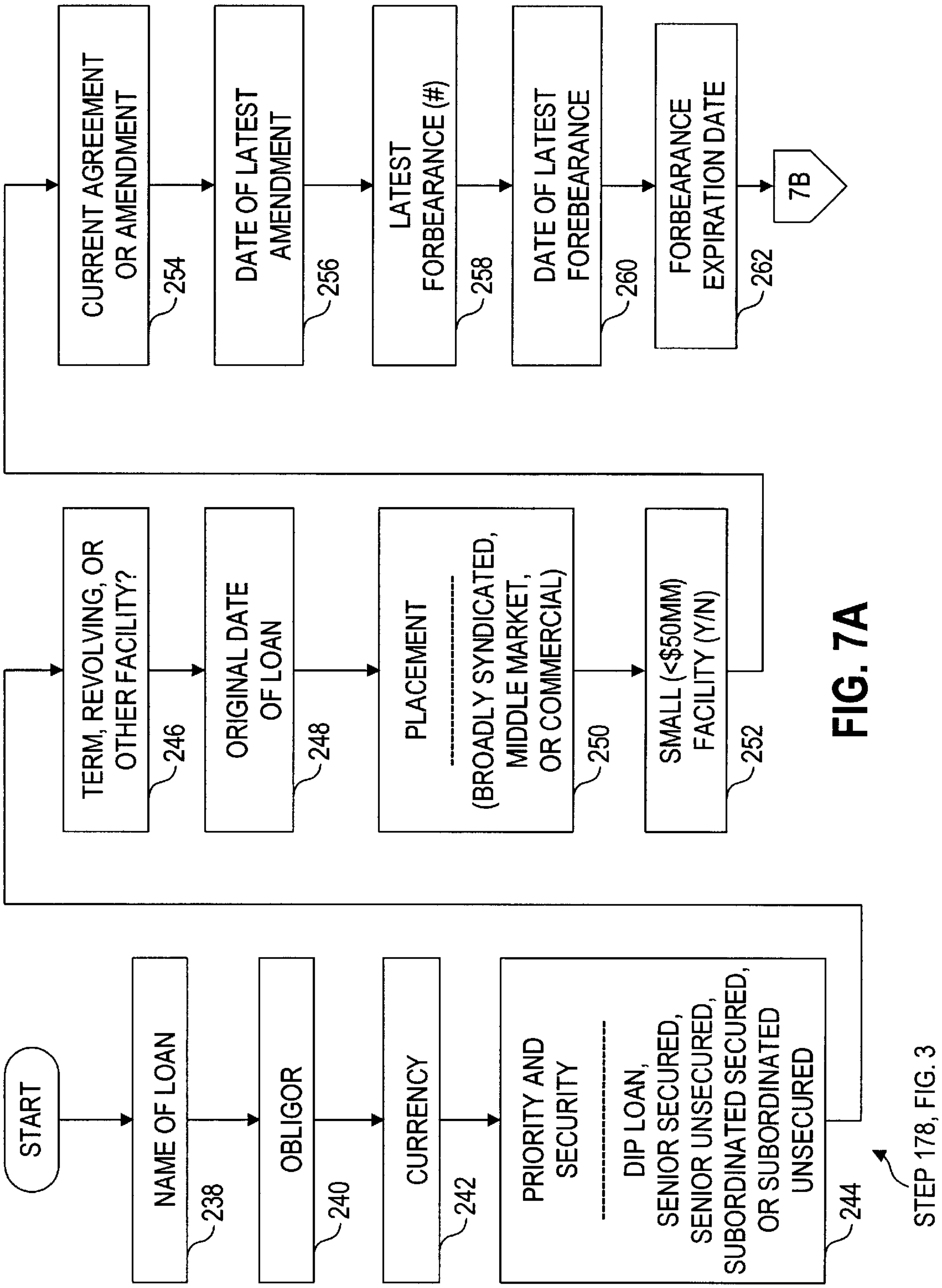
FIGS. 7A–7C, 8 and 9 are exemplary block diagrams illustrating a database model for organizing loan information for use with the present invention.

Each credit facility in the distressed credit facility portfolio may include one or more loans or facilities of various types, including, without limitation, term loans, revolving loans (sometimes referred to as "revolvers"), letter of credit facilities, acquisition financing facilities, and capital expenditure facilities. The borrower may also have other debt facilities not included as part of credit facilities described above, such as public debt financing or a separate receivables facility. Information regarding such credit and debt facilities may be included in a database model along with the borrower information discussed above. More specifically, as shown in FIG. 7A in the illustrative example, the database model for loan information may be configured with various fields to organize the loan information. For example, the loan database model may include for each loan in a credit facility: a field 238 for the name of the loan and an identification number for the loan (assigned by the collateral manager); a field 240 for the name of the obligor(s) on the loan; a field 242 for an indication of the currency (or currencies) in which the loan is denominated (i.e. U.S. dollars); a field 244 for an indication of the priority of the loan to the borrower and for an indication of the secured or unsecured status of the loan (e.g., debtor-in-possession ("DIP") loan, senior secured, senior unsecured, subordinated secured, or subordinated unsecured); a field 246 for an identification of whether the loan is a term loan or a revolver or some other type of facility; a field 248 for the original date of the loan; a field 250 for an indication of the placement of the loan (e.g., broadly syndicated, middle market, or commercial); a field 252 for a Boolean (i.e., yes-or-no) indication of whether the loan facility is small (i.e., defined as less than $50,000,000). The loan database model may further include a field 254 for an identification of the current loan or credit agreement and/or amendment(s) thereto governing the loan (determined in step 230, FIG. 6); a field 256 for the date of the latest amendment affecting the loan; a field 258 for an identification of the number of the latest forbearance made by the lender in connection with the loan; and a field 260 for an indication of the date of that forbearance; and a field 262 for the expiration date of the latest forbearance.

Figure 7B:
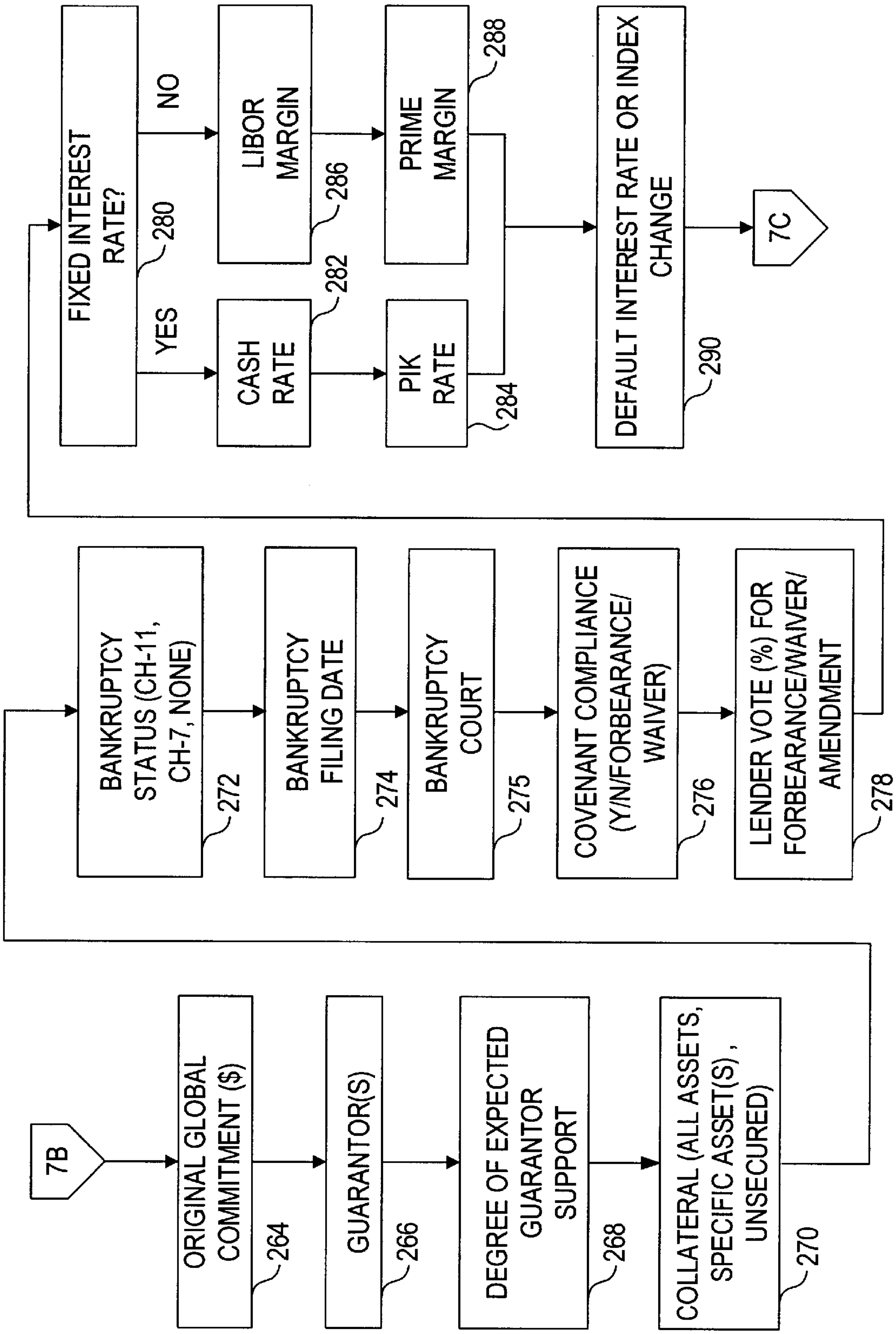

Referring to FIG. 7B in the illustrative example, the loan database model may further include a field 264 for the dollar amount of the original Global Commitment; a field 266 for an identification of any guarantor(s) on the loan; a field 268 for an indication of the degree of support that the borrower may be expected to receive from the guarantor(s) if necessary (e.g., do the guarantors have the ability to pay the loan if the guarantee is called, or are the guarantors entities who themselves have high quality credit ratings); a field 270 for a description of the collateral securing the loan (e.g., all assets, specific asset(s), unsecured); a field 272 for a description of the bankruptcy status of the borrower (e.g., Chapter 11, Chapter 7, none); a field 274 for the bankruptcy filing date, if applicable; and a field 275 for the bankruptcy court with jurisdiction over the bankruptcy proceedings, if applicable.

The loan database model may also include a field 276 for an indication of whether the borrower is in compliance with its loan covenants (e.g., yes; no; there is a forbearance in effect regarding covenant violations; or covenants have been waived); a field 278 for an indication of what percentage of vote is required for approval of a forbearance regarding, or a waiver of, loan covenants for the borrower and for an indication of what percentage of vote is required for approval of an amendment of the loan covenants. The database model may further include a field 280 for an indication of whether a fixed interest rate is applicable to the loan. If so, fields 282 and 284 may be provided for the applicable cash interest rate and the applicable payment-in-kind ("PIK") rate, respectively. In the event that a fixed interest rate is not applicable to the loan, a pair of fields 286 and 288 may be provided in the template for the loan for the margin from the applicable index, such as LIBOR or a prime rate, as the case may be. A field 290 may be provided for the interest rate applicable to the loan if the borrower defaults on any of its covenants during the term of the loan. It also allows the collateral manager to change between indices upon exercise of interest rate options by the borrower or the lender.

Figure 7C:
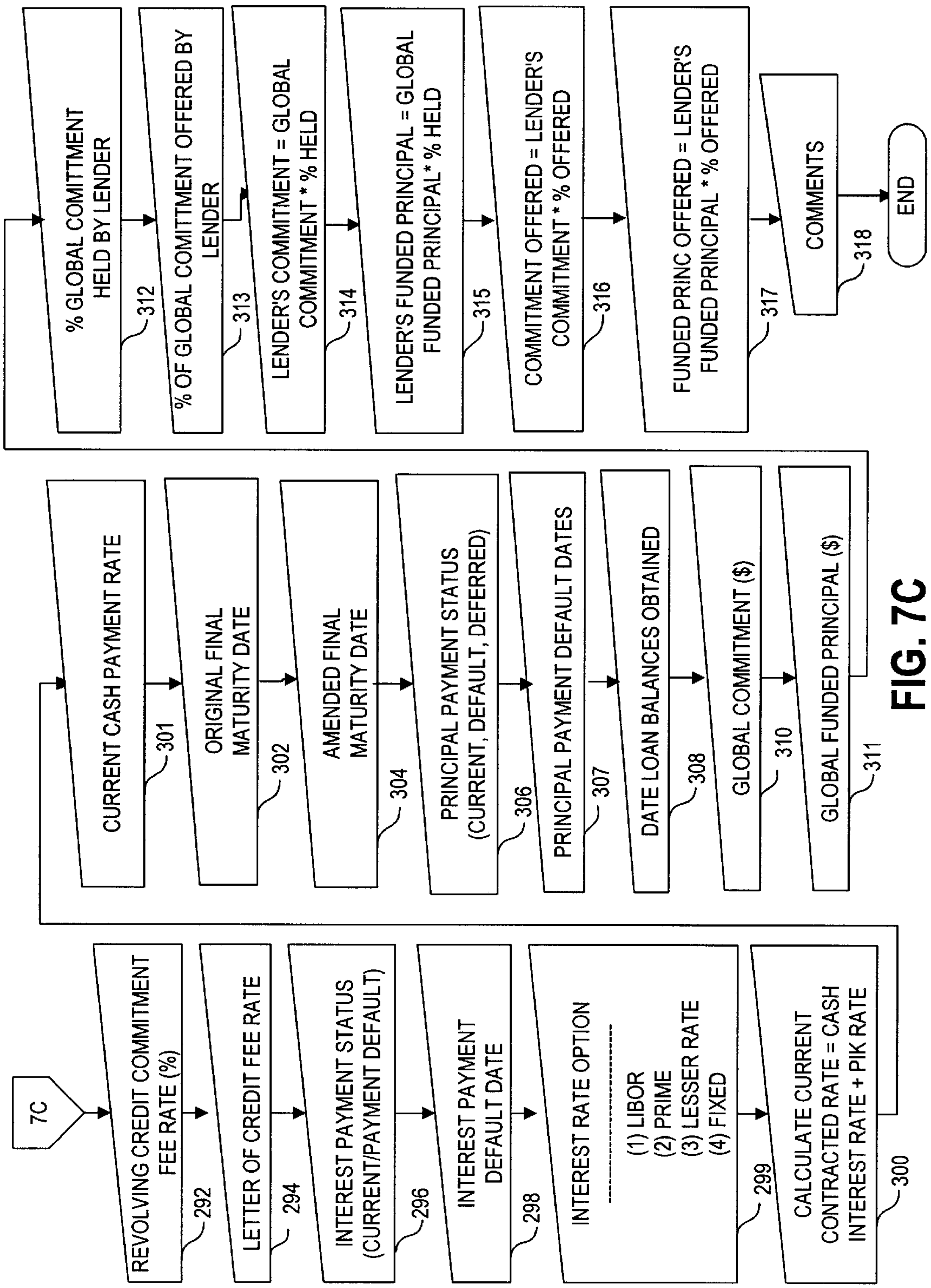

Turning to FIG. 7C in the illustrative example, the loan database model may further include: a field 292 for the fee rate (expressed as a percentage of the unfunded revolver commitment amount) that the lender charges the borrower for any unfunded revolving loan commitment; a field 294 for the fee rate that the lender charges the borrower for a letter of credit; and a field 296 for an indication of the borrower's interest payment status (e.g., current, in payment default, or deferred). In the event that the borrower has defaulted on an interest payment or payments, a field 298 may be provided for specifying the date(s) of the default(s). The loan database model may further include a field 299 for specifying the interest rate option applicable to the loan (e.g., LIBOR-based, prime-based, the lesser of the two, or fixed); a field 300 to calculate the current contractual rate for the loan as the sum of the cash interest rate and PIK rate (if any); and a field 301 for an indication of the current cash payment rate. The loan database model may also include information about the terms of the loan relating to repayment of principal, such as a field 302, for an indication of the original final maturity date of the loan; a field 304 for any amended final maturity date of the loan (without regard to any subsequent default or acceleration); a field 306 for an indication of the borrower's principal payment status (e.g., current, in default, or deferred); and a field 307 for the date or dates of any default(s) on any required principal payments. The loan database model may further include a field 308 for specifying the date on which loan balances were obtained; a field 310 for the dollar amount of the aggregate commitment of all members of a bank group to the borrower (the "Global Commitment"); a field 311 for the dollar amount of aggregate outstanding principal that has been funded by all members of the bank group, including the lender (the "Global Funded Principal"); a field 312 for the percentage of the Global Commitment held by the lender; a field 313 for the percentage of the Global Commitment that the lender has offered to sell in connection with the proposed securitization; a field 314 which calculates the dollar amount of the percentage of the Global Commitment held by the lender as the product of fields 310 and 312 and stores the result as the "Lender's Commitment"; a field 315 which calculates the dollar amount of the percentage of the Global Funded Principal held by the lender as the product of fields 311 and 312 and stores the result as the "Lender's Funded Principal"; a field 316 which calculates the dollar amount of the percentage of the Lender's Commitment offered for sale as the product of fields 314 and 313; and a field 317 which calculates the dollar amount of the percentage of the Lender's Funded Principal offered for sale as the product of fields 315 and 313 and stores the result as the "Funded Principal Offered"; and a field 318 for any comments or other miscellaneous information that the collateral manager considers appropriate to clarify other information included in the loan template.

Figure 8:
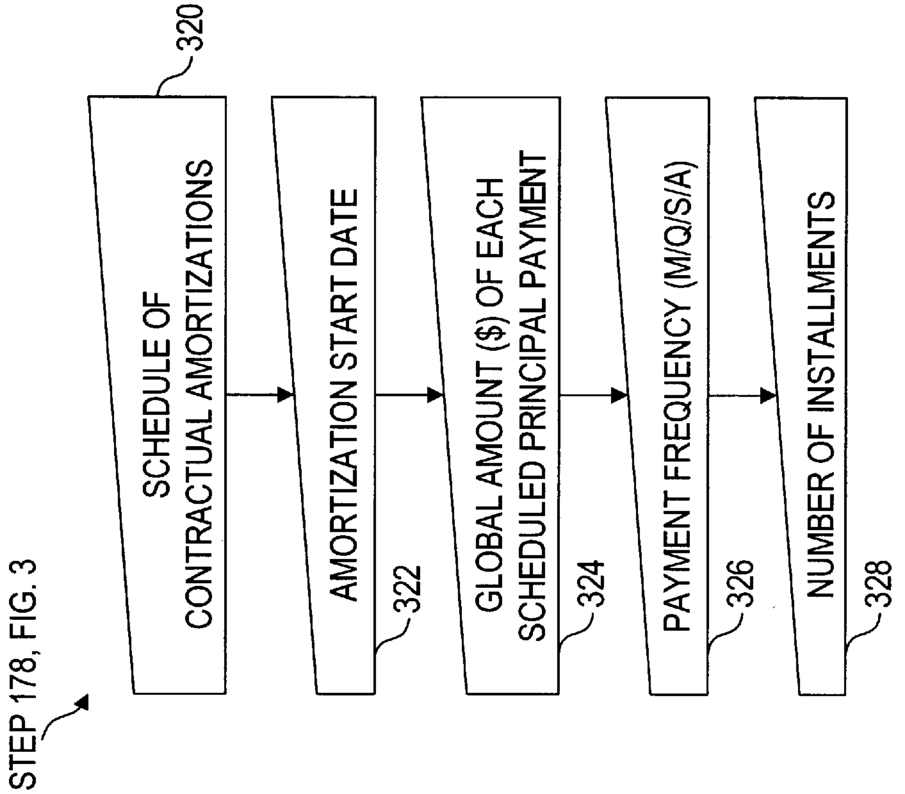

Turning to FIG. 8 in the illustrative example, the loan database model may further include various fields regarding the contractual amortization of each loan. For example, a field 320 may be provided for a schedule of the contractual amortization for each loan. Additional fields 322, 324, 326, and 328 may be provided for various other information regarding the amortization schedule. Specifically, the loan database model may include: a field 322 for the amortization start date; a field 324 for the amount of each global scheduled principal payment in the amortization schedule; a field 326 for an indication of the amortization frequency (e.g., monthly, quarterly, semi-annually, or annually); and a field 328 for the number of installments or payments in the scheduled amortization. The information regarding the loan contractual amortizations is repeated for each loan and entered into the fields 320–328.

Figure 9:
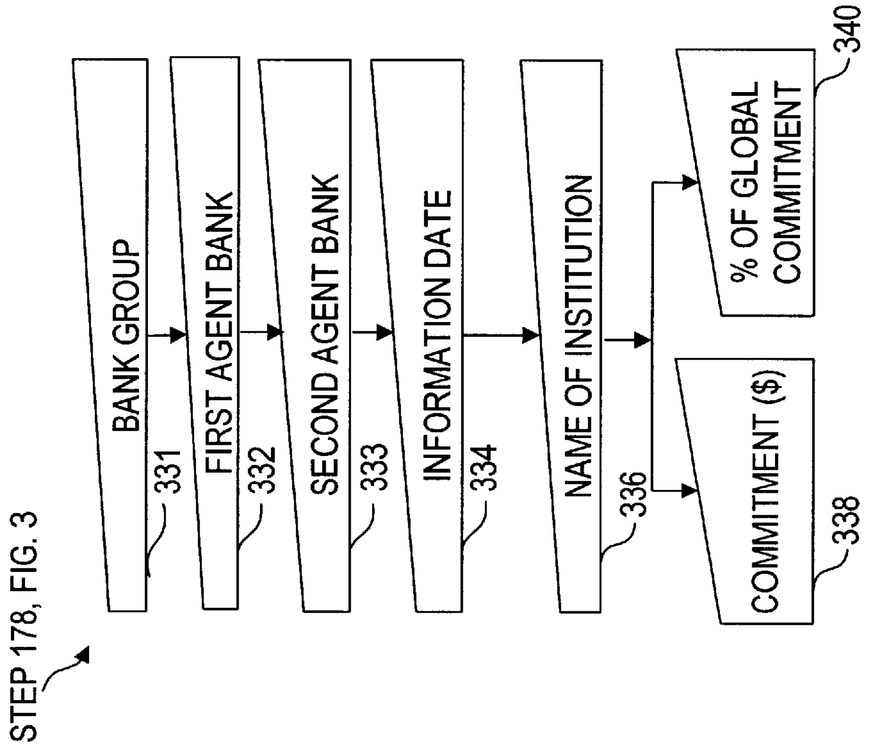

Turning to FIG. 9 in the illustrative example, the loan database model may include various fields regarding the bank group (which could be one or more financial institutions) for each loan. More particularly, for each loan, the loan database model may include a field 331 for a specification of the bank group or list of financial institutions participating in each loan; a field 332 for an indication of the first member of the bank group which serves as first agent or co-agent for the credit facility (the "First Agent Bank"); a field 333 for an indication of another or second member of the bank group which serves as agent or co-agent for the credit facility (the "Second Agent Bank"); and a field 334 for the "as of" date of any due diligence information provided regarding the bank group.

The loan database model may also include fields 336, 338, and 340 for each financial institution in the bank group. In particular, for each financial institution in the bank group the following fields may be provided: a field 336 for the name of that institution; a field 338 for the dollar amount of the commitment made to the borrower by that institution in connection with the loan; and a field 340 for the percentage of the Global Commitment extended by that financial institution. Either or both of the fields 338 and 340 may be used as a measure of the relative contributions of each member of the bank group to the Global Commitment (i.e., each institution's commitment may be expressed as a dollar amount or as a percentage). The financial institution data for each financial institution in a bank group is repeated and entered into fields 332–340.

Database Model—Borrower Financial Information

The financial statement data for each borrower in the credit facility portfolio, represented by the step 180 of FIG. 3, is described in more detail below. The borrower financial data for each credit facility may be obtained from financial statements (e.g., income statement, balance sheet and statement of cash flows) of the corresponding borrower, as well as financial statements for the LTM, the most recent year-to-date interim period, and a corresponding interim period in the immediately preceding fiscal year, sometimes referred to as "same-period-last-year" ("SPLY") and entered into a borrower financial information database model described below. In particular, this database model may include a field 344 for storing a period name for the time period represented by a particular financial statement (e.g., fiscal year 2000, last 12 months, year-to-date). The database model may also include a field 346 for the length of that period (e.g., 12 months, eight months); a field 348 for the beginning date of the financial period covered by the financial statement; and a field 350 for the end date of the financial period.

The database model may also include various fields for organizing income statement information of the borrower for each of the fiscal periods, identified in fields 344, 346, 348 and 350. In this regard, the database model may include a field 352 for the borrower's net sales/revenues for the period; a field 354 for the borrower's cost of goods sold/cost of sales for the period; a field 355 which calculates the gross profit (loss) for the period by subtracting from net sales/revenues (field 352), the cost of goods sold/cost of sales (field 354); a field 356 for other operating income of the borrower for the period; a field 358 for the selling, general and administrative (SG&A) expenses of the borrower for the period; a field 359 for depreciation and amortization expense included in SG&A; a field 360 for management fees incurred by the borrower for the period; a field 361 for restructuring charges incurred by the borrower for the period; and a field 362 for asset impairment charges incurred by the borrower for the period.

The database model may further include a field 363 for storing a calculation of the borrower's total operating expenses for the period as the sum of fields 358, 360, 361 and 362; and a field 364 which stores a calculation of borrower's operating income (sometimes referred to as "earnings before interest and taxes" or "EBIT") for the period by subtracting from the borrower's gross profit (loss) (step 355) the total operating expenses for the period (step 363).

Figure 10A:
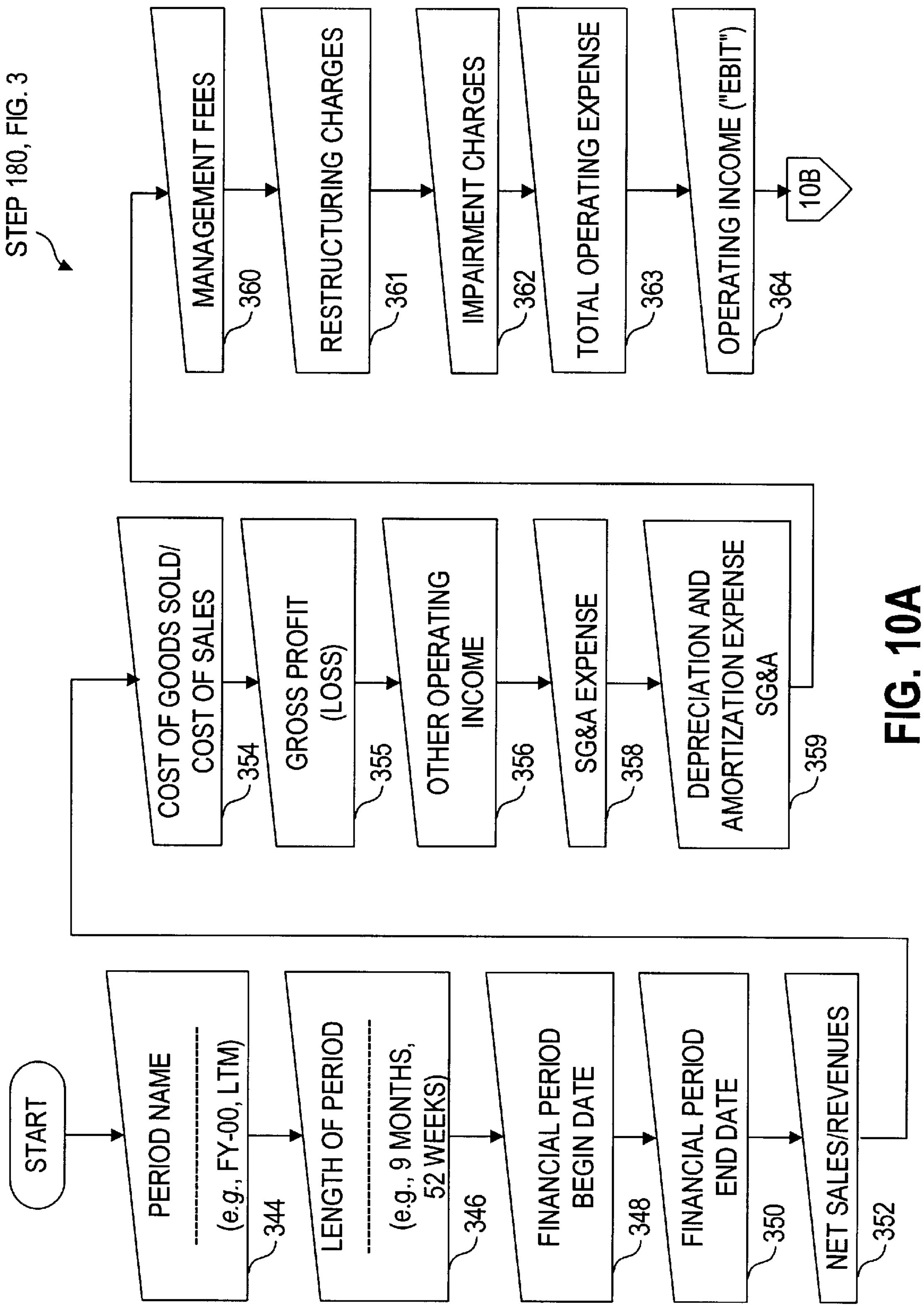
FIGS. 10A–10K are exemplary block diagrams illustrating a database model for organizing borrower financial data for use with the present invention.
Figure 10B:
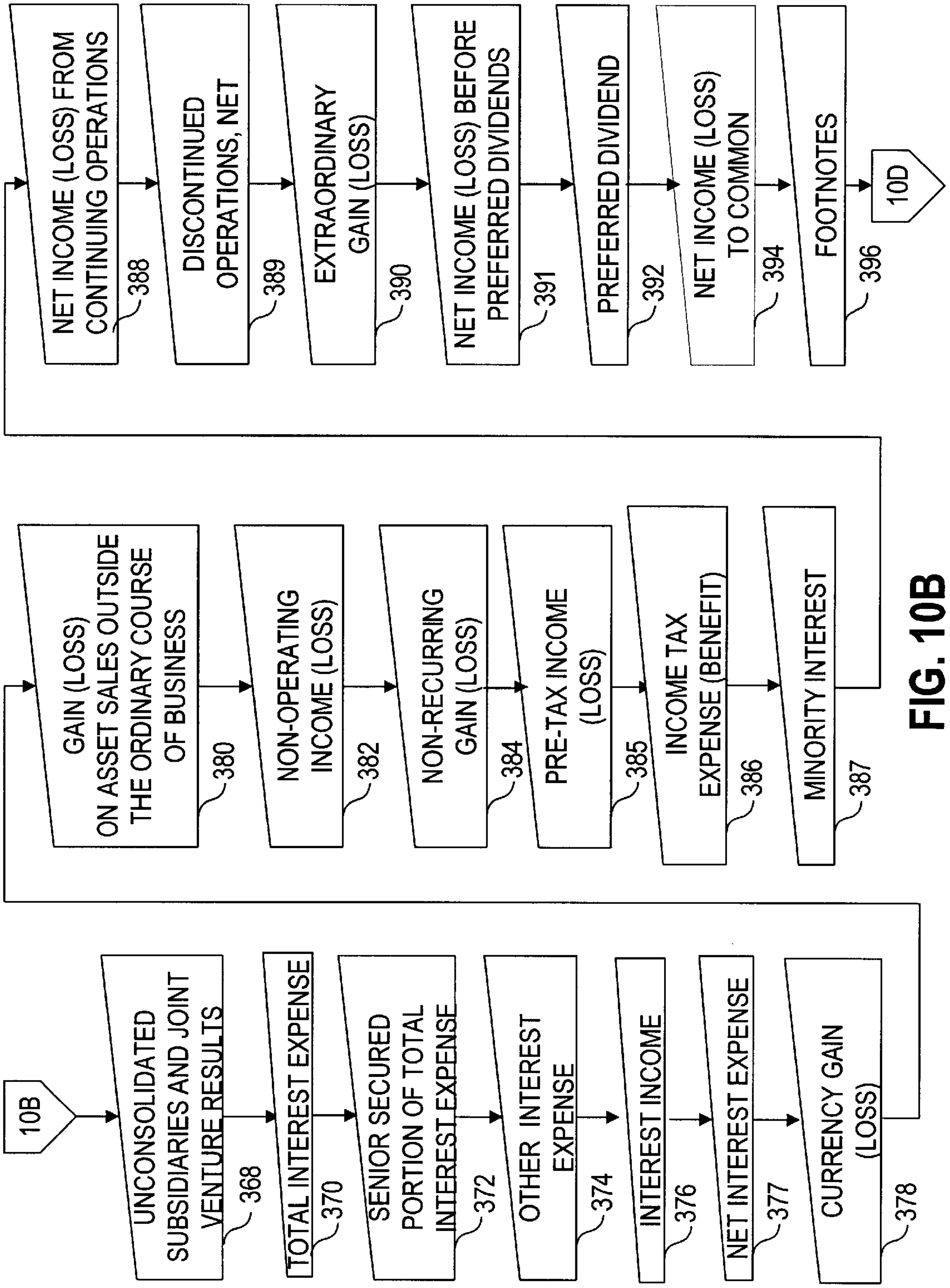
Figure 10C:
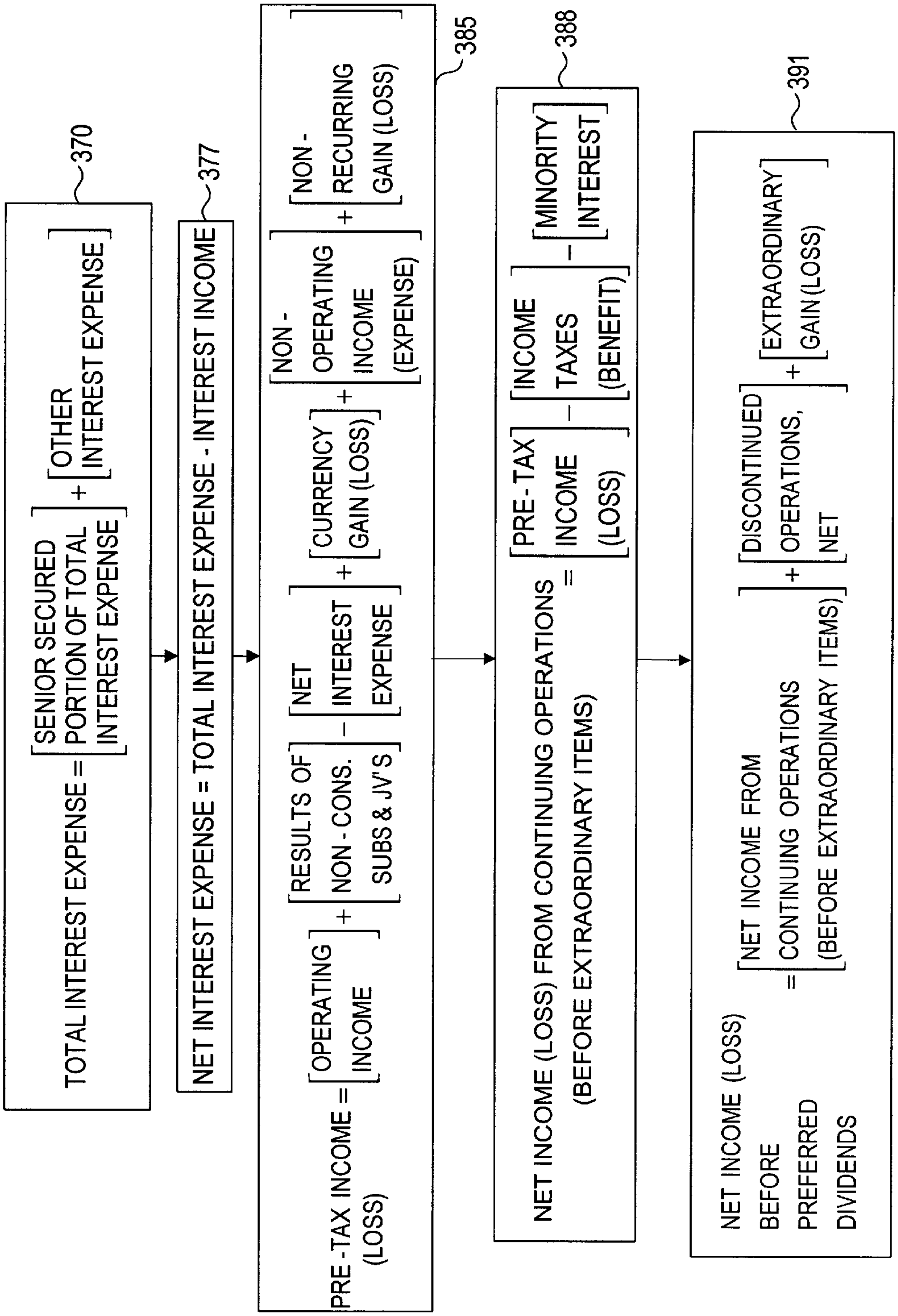

As shown in FIG. 10B in the illustrative example, the database model may further include for the period, a field 368 for specifying the results of unconsolidated subsidiaries and joint ventures of the borrower for the period and a field 370 for total interest expense. As shown in FIG. 10C in the illustrative example, the total interest expense may be determined by adding the senior secured portion of the total interest expense (field 372, FIG. 10B) to the other interest expense (field 374 FIG. 10B). The database model may also include: a field 372 (FIG. 10B) for the senior secured interest expense of the borrower for the period; a field 374 for other interest expense; a field 376 for interest income of the borrower for the period; and a field 377 for net interest expense of the Borrower for the period. As shown in FIG. 10C, the net interest expense may be determined by subtracting interest income (field 376) from total interest expense (field 370). The database model may also include a field 378 for currency gain or (loss) realized by the borrower for the period; a field 380 for any gain or (loss) realized by the borrower on asset sales outside the ordinary course of business during the period; a field 382 for any other non-operating income or (loss) of the borrower for the period; and a field 384 for any non-recurring gain or (loss) of the borrower for the period. The database model may further include a field 385 which calculates the pre-tax income (loss) of the borrower for the period by adding to or subtracting from the borrower's operating income for the period (field 364, FIG. 10A), as appropriate (depending on whether the value is indicative of an item of income or expense, or gain or loss, as the case may be), fields 368, 377, 378, 380, 382 and 384, as shown in FIG. 10C. The database model may also include a field 386 for income tax expense (benefit); and a field 387 for minority interest in earnings (loss). The database model may also include a field 388 which calculates the borrower's net income (loss) from continuing operations before extraordinary items for the period by adding to, or subtracting from the borrower's pre-tax income (loss) for the period (field 385), as appropriate (depending on whether the value is indicative of an item of income or expense, or gain or loss, as the case may be), fields 386 and 387, as shown in FIG. 10C. The database model may further include a field 389 for discontinued operations (net); a field 390 for any extraordinary gain or (loss) (net of tax) of the borrower for the period; and a field 391 which calculates the borrower's net income (loss) before preferred dividends by adding to, or subtracting from, the borrower's net income from continuing operations before extraordinary items for the period (field 388), as appropriate (depending on whether the value is indicative of an item of gain or loss, as the case may be), fields 389 and 390 as shown in FIG. 10C. The database model may further include a field 392 for the amount of any preferred dividends payable by the borrower with respect to such period; and a field 394 which calculates the borrower's net income (loss) to common for the period by subtracting field 392 from the borrower's net income (loss) before preferred dividends for the period (field 391). The database model may also further include for each credit facility a field 396 for information from footnotes to the borrower's financial statements.

Figure 10D:
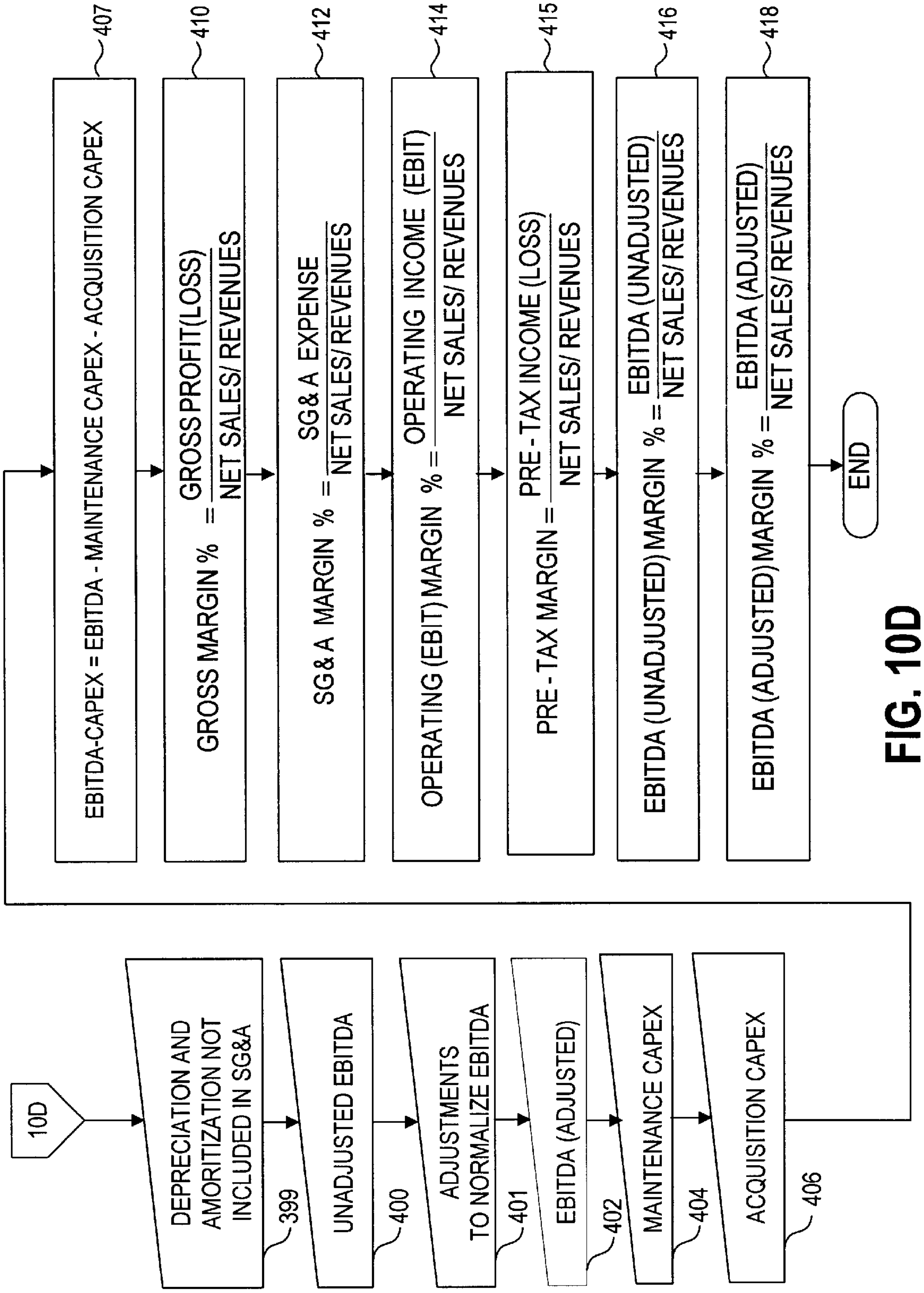
Figure 10E:
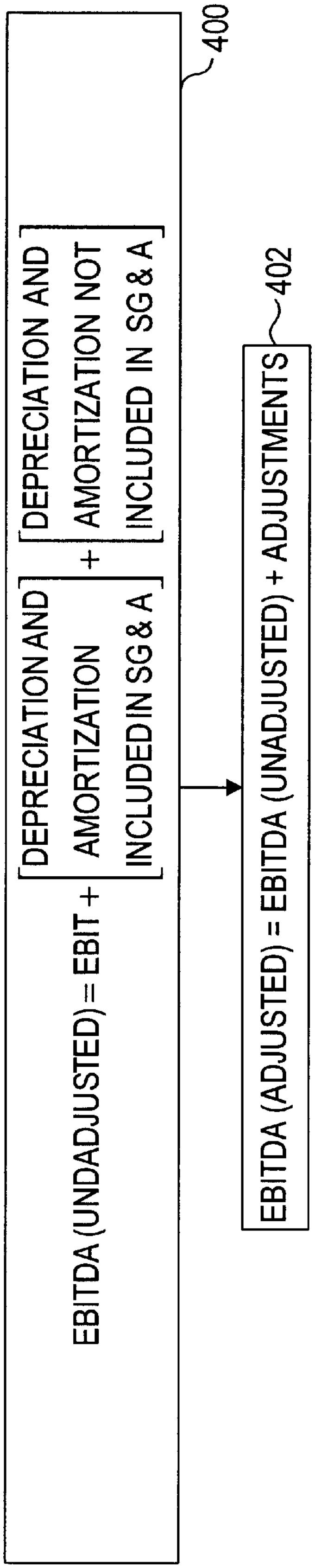

With reference to FIG. 10D in the illustrative example, the database model may also include a field 399 for depreciation and amortization not included in SG&A expense. As shown in FIG. 10E in the illustrative example, a field 400 is used to set EBITDA (the well-known acronym for "earnings before interest, taxes, depreciation, and amortization") (unadjusted) for the borrower equal to the sum of EBIT (field 364), depreciation and amortization included in SG&A (field 359), and depreciation and amortization not included in SG&A (field 399). The database model may also include a field 401 for adjustments to normalize EBITDA (such as restructuring charges, non-recurring or one-time events and noncash charges). A field 402 computes EBITDA (adjusted) as the sum of EBITDA (unadjusted) from field 400 and adjustments (field 401), as shown in FIG. 10E.

The database model may include a field 404 (FIG. 10D) for maintenance capital expenditures ("CAPEX"); a field 406 for acquisition CAPEX; and a field 407 which computes EBITDA-CAPEX (sometimes referred to as "free cash flow") as the difference of EBITDA (adjusted) (field 402) and CAPEX (the sum of fields 404 and 406). A field 410 may be provided to compute the gross margin by dividing gross profit (loss) (field 355, FIG. 10A) by net sales/revenues (field 352). A field 412 may be provided to compute an SG&A margin by dividing SG&A expense (field 358) by net sales/revenues (field 352). A field 414 may be provided to compute an operating (EBIT) margin by dividing operating income (EBIT) (field 364) by net sales/revenues (field 352). A field 415 computes a pre-tax margin by dividing pre-tax income (loss) (field 385) by net sales/revenues (field 352). A field 416 then computes an EBITDA (unadjusted) margin by dividing EBITDA (unadjusted) (field 400) by net sales/revenues (field 352), and a field 418 computes an EBITDA (adjusted) margin by dividing EBITDA (adjusted) (field 402) by net sales/revenues (field 352).

Figure 10F:
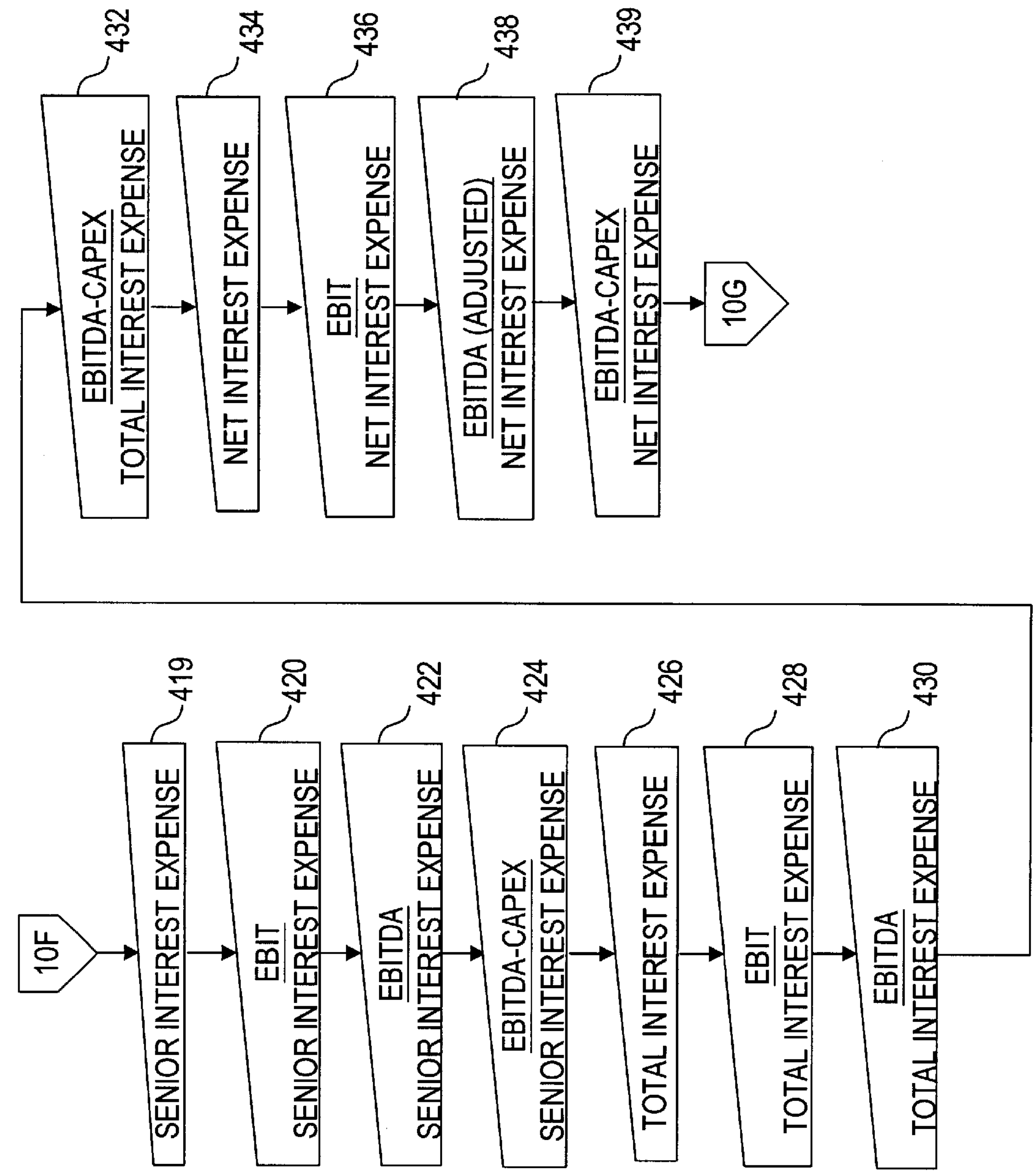

As shown in FIG. 10F in the illustrative example, various interest coverage ratios are then calculated for the borrower. In particular, the senior interest expense is set equal to the value in field 372 (FIG. 10B) and stored in a field 419. The ratio of EBIT to senior interest expense is calculated by dividing EBIT (field 364) by the senior interest expense (field 419) and stored in a field 420. The ratio of EBITDA to senior interest expense is calculated by dividing EBITDA (adjusted) (field 402) by senior interest expense (field 419) and stored in a field 422; and, the ratio of EBITDA-CAPEX to senior interest expense is calculated by dividing EBITDA-CAPEX (field 407) by senior interest expense (field 419) and stored in a field 424. The total interest expense is set equal to the value in field 370 and stored in a field 426. The ratio of EBIT to total interest expense is calculated by dividing EBIT (field 364) by total interest expense (field 426) and stored in a field 428; the ratio of EBITDA to total interest expense is calculated by dividing EBITDA (adjusted) (field 402) by total interest expense (field 426) and stored in a field 430; and, the ratio of EBITDA-CAPEX to total interest expense is calculated by dividing EBITDA-CAPEX (field 407) by total interest expense (field 426) and stored in a field 432. The net interest expense is set equal to the value in field 377 (FIG. 10D) and stored in field 434. The ratio of EBIT to net interest expense is calculated by dividing EBIT (field 364) by net interest expense (field 434) and stored in a field 436; the ratio of EBITDA to net interest expense is calculated by dividing EBITDA (adjusted) (field 402) by net interest expense (field 434) and stored in field 438; and, the ratio of EBITDA-CAPEX to net interest expense is calculated by dividing EBITDA-CAPEX (field 407) by net interest expense (field 434) and stored in field 439.

Figure 10G:
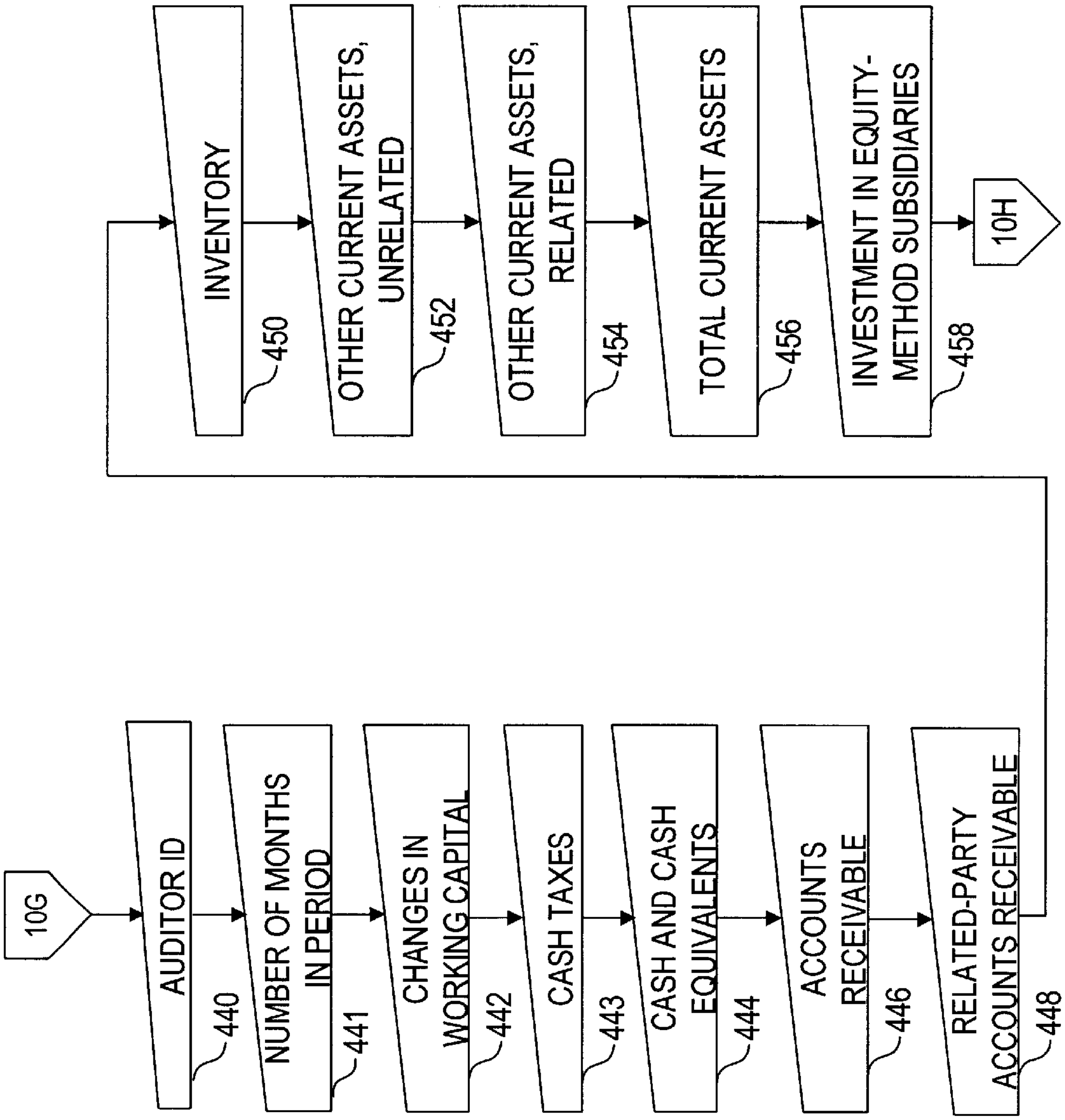

With reference to FIG. 10G in the illustrative example, the database model for the credit facility also may include a field 440 for an identification of the auditor that audited the financial statements of the borrower and a field 441 for specifying the period covered by the financial statements. The database model may also include a field 442 for the borrower's changes in working capital from the prior corresponding period; and a field 443 for cash taxes for the period.

In addition, the database model for each credit facility may include the following balance sheet data for the borrower as of the last day of the applicable fiscal period: a field 444 for cash and cash equivalents; a field 446 for trade accounts receivable; a field 448 for the accounts receivable of any related parties to the borrower (e.g., parent company, joint venture partner); and a field 450 for inventory; a field 452 for other current assets (unrelated); and a field 454 for other current assets (related). A field 456 is used to store a computation of total current assets as the sum of cash and cash equivalents (field 444), accounts receivable and related accounts receivable (fields 446 and 448), inventory (field 450), other current assets and related party current assets (fields 452 and 454), as shown in FIG. 10I in the illustrative example.

The database model may also include the following balance sheet data for the borrower as of the last day of the applicable fiscal period: a field 458 for an indication of any investment by the borrower in subsidiaries which are reported under the equity method of accounting; a field 460 (FIG. 10H) for specifying property, plant, and equipment (PP&E); a field 462 for accumulated depreciation; a field 464 for goodwill; a field 466 for other non-current assets (related); and a field 468 for other non-current assets (unrelated). A field 470 may be used to store a computation of intangibles and other non-current assets ("NCA") as the sum of goodwill (field 464), other non-current assets (related) (field 466) and other non-current assets (unrelated) (field 468), as shown in FIG. 10I. As further shown in FIG. 10I in the illustrative example, the total assets is computed as the sum of total current assets (field 456), investment in equity method subsidiaries (field 458), net PP&E (field 460 minus field 462), and intangibles and other non-current assets (field 470) and stored in a field 472.

Referring back to FIG. 10H, the database model may also include a field 474 for senior secured short-term debt; a field 476 for current maturities of senior secured long-term debt; a field 478 for other short-term debt; a field 480 for other current maturities of long-term debt; a field 482 for accounts payable; and a field 484 for other current liabilities. As shown in FIG. 10I, a field 486 may be used to store the computation of the total current liabilities as the sum of senior secured short-term debt (field 474), current maturities of senior secured long-term debt (field 476), other short-term debt (field 478), other current maturities of long-term debt (field 480), accounts payable (field 482), and other current liabilities (field 484). Referring back to FIG. 10H, the database model also may include a field 488 for senior secured long-term debt; a field 490 for other long-term debt; a field 492 for deferred income taxes; and a field 494 for other non-current liabilities. As shown in FIG. 10J in the illustrative example, a field 496 may be used to store the computed total liabilities as the sum of total current liabilities (field 486), senior secured long-term debt (field 488), other long-term debt (field 490), deferred income taxes (field 492), and other non-current liabilities (field 494). Referring back to FIG. 10H, the database model may also include a field 498 for preferred equity; a field 500 for common equity; and a field 502 for retained earnings (deficit).

Figure 10H:
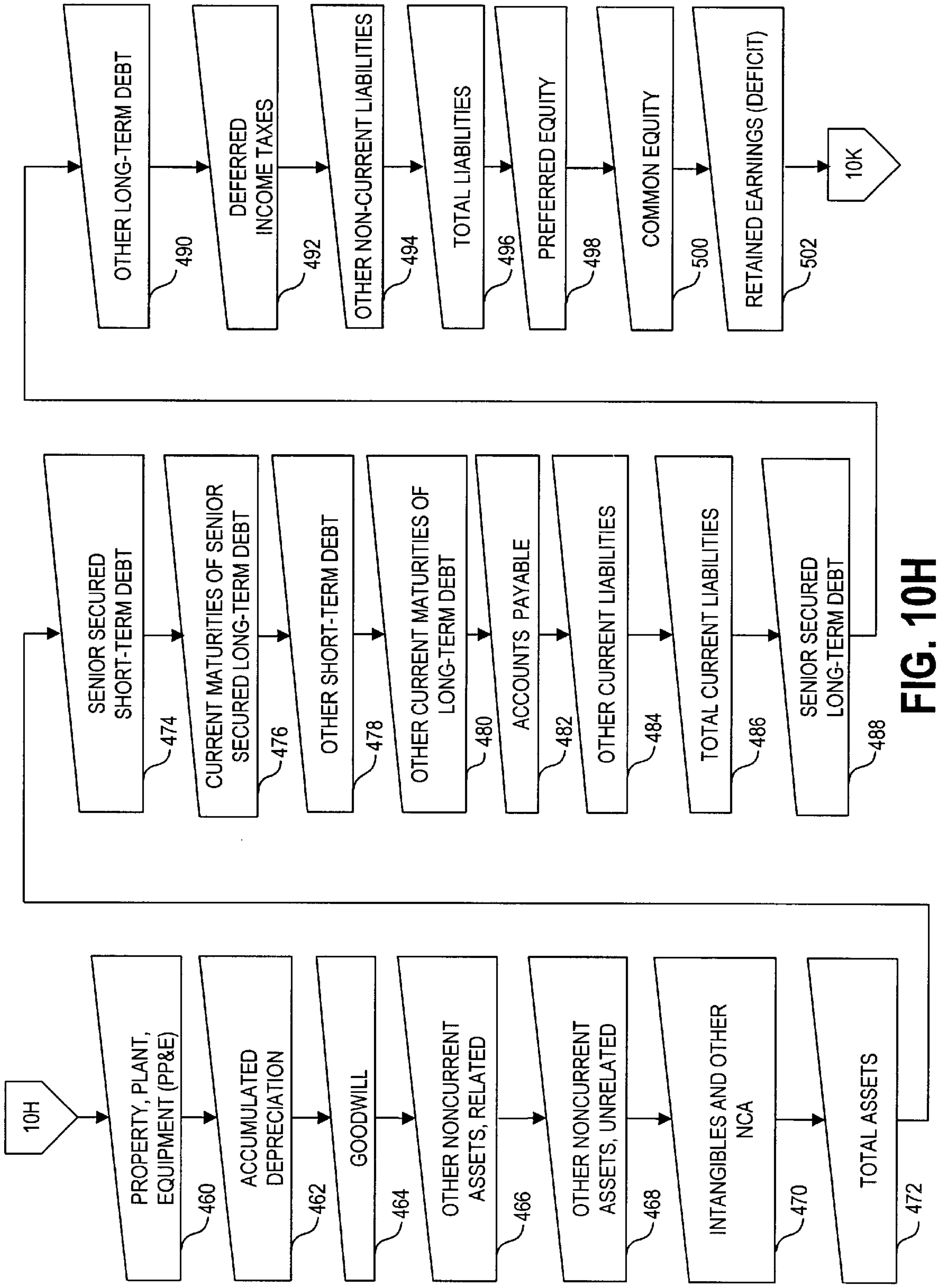
Figure 10I:
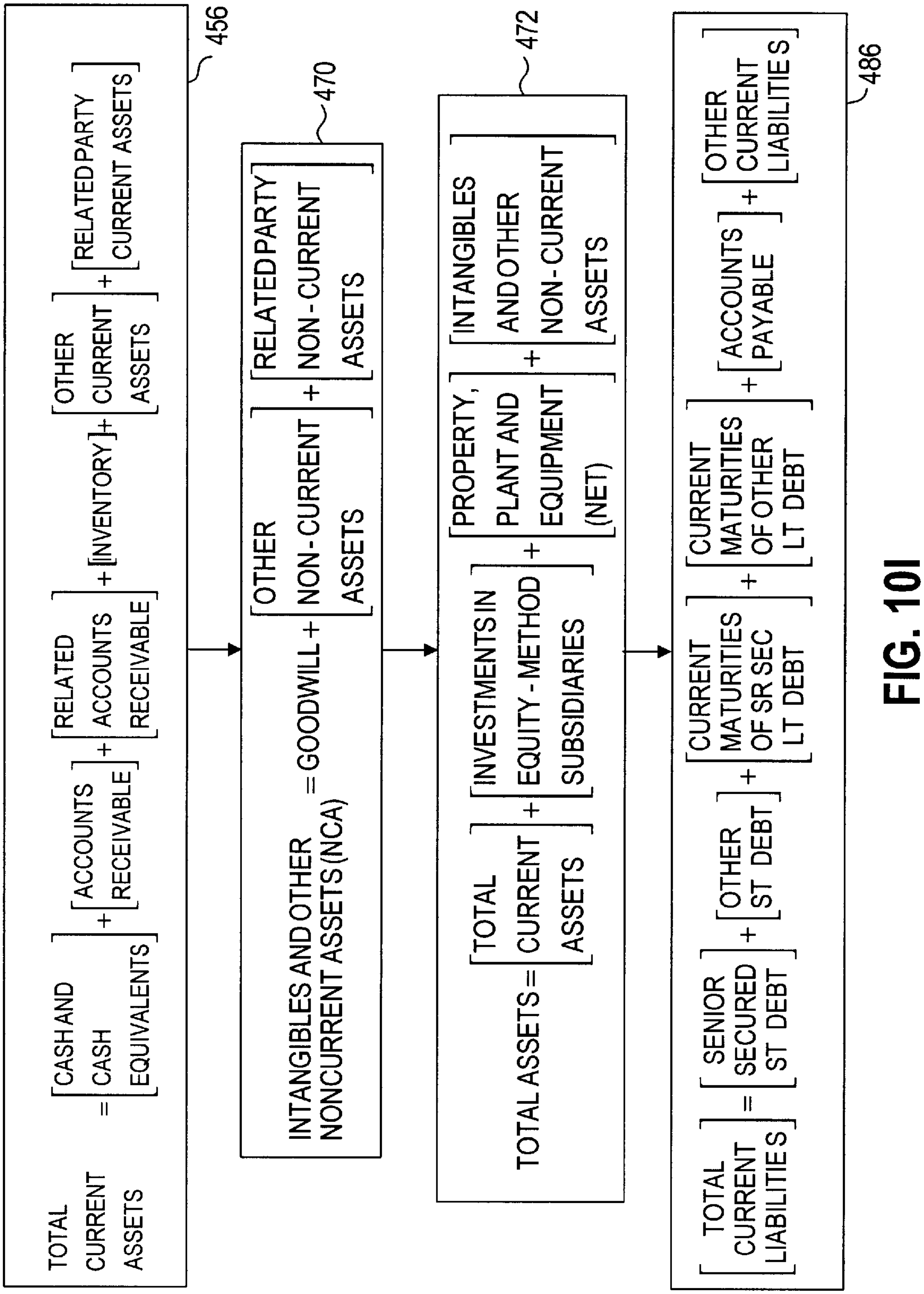
Figure 10J:
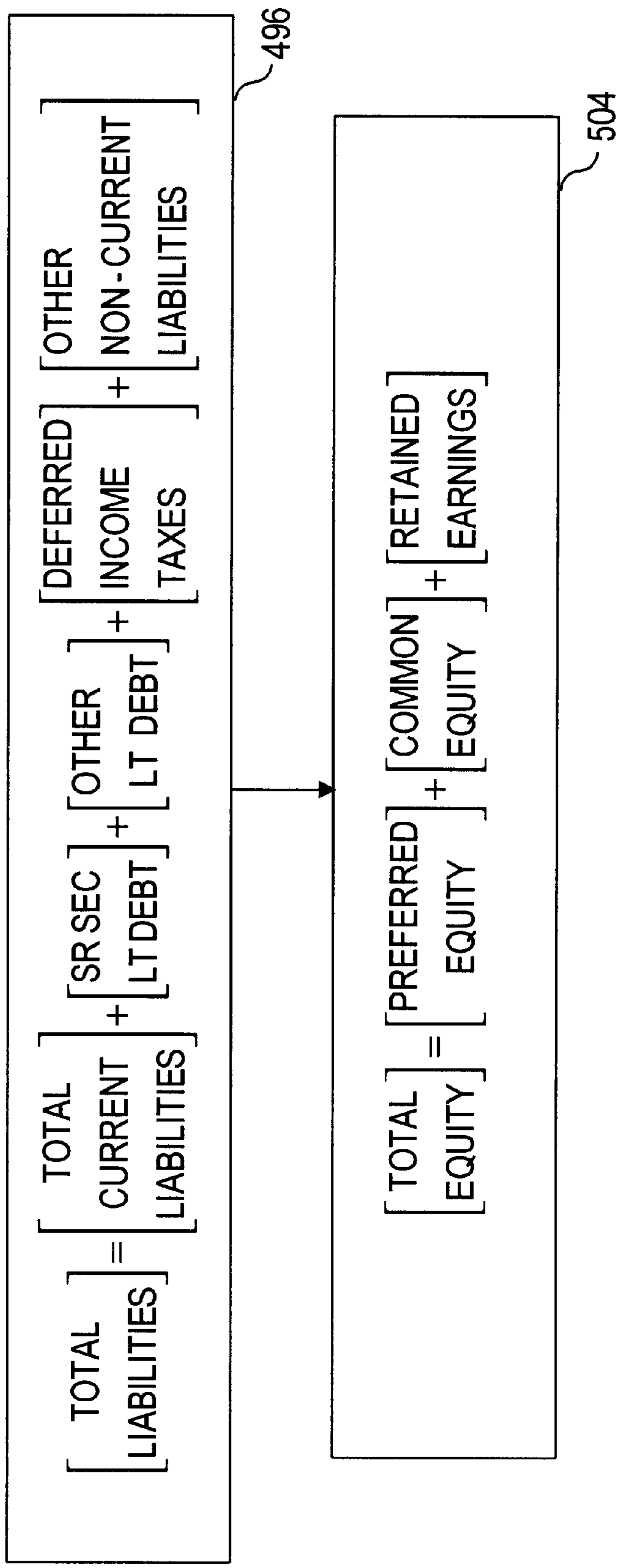
Figure 10K:
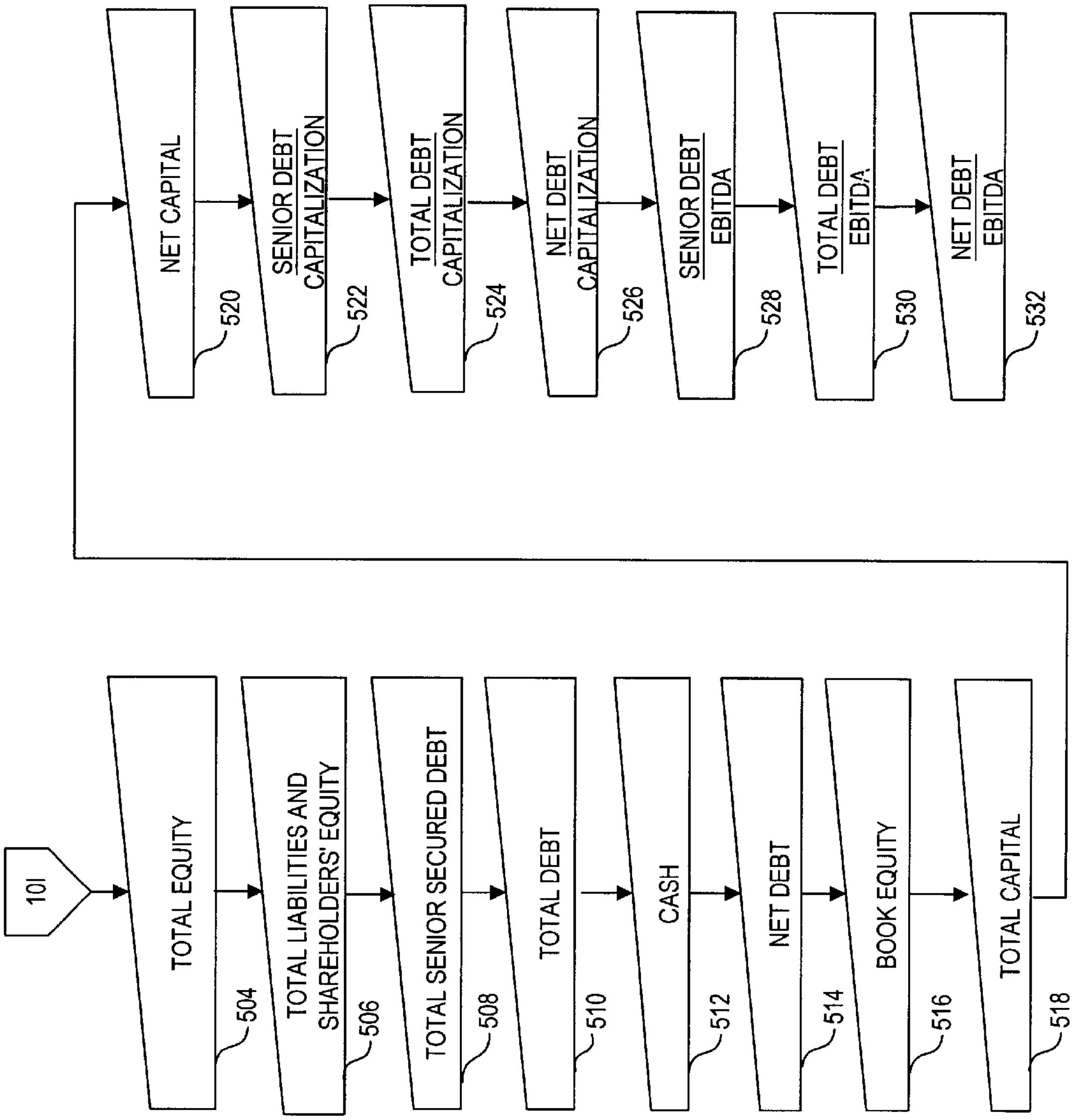

Referring to FIG. 10K in the illustrative example, a field 504 may be used to store the computed total equity as the sum of preferred equity (field 498), common equity (field 500) and retained earnings (field 502), as shown in FIG. 10J. A field 506 may be used to store a computation of total liabilities and shareholders' equity as the sum of total liabilities (field 496) and total equity (field 504). A field 508 may be used to store the computation of the total senior secured debt as the sum of senior secured short-term debt (field 474), senior secured current maturities of long-term debt (field 476), and senior secured long-term debt (field 488). A field 510 may be used to store the computation of the total debt as the sum of total senior secured debt (field 508), other short-term debt (field 478), other current maturities of long-term debt (field 480), and other long-term debt (field 490). A field 512 may be set equal to cash and cash equivalents (field 444). A field 514 may be used to store the calculated net debt determined by subtracting cash (field 512) from total debt (field 510). The book equity may be calculated as the sum of preferred equity (field 498), common equity (field 500) and retained earnings (deficit) (field 502) and stored in a field 516. A field 518 may be used to store the computation of the total capital (or capitalization), determined as the sum of cash (field 512), net debt (field 514) and book equity (field 516). A field 520 may be used to store a computation of net capital (or capitalization) by subtracting cash (field 512) from total capital (field 518). The ratio of senior debt/capitalization may be calculated by dividing total senior debt (field 508) by total capital (field 518) and stored in a field 522. The ratio of total debt/capitalization may be calculated by dividing total debt (field 510) by total capital (field 518) and stored in a field 524. The ratio of net debt/capitalization may be calculated by dividing net debt (field 514) by total capital (field 518) and stored in a field 526. A field 528 may be used to store the ratio of senior debt/EBITDA by dividing senior debt (field 508) by EBITDA (field 402). The ratio of total debt/EBITDA may be calculated by dividing total debt (field 510) by EBITDA (field 402) and stored in field 530. Finally, field 532 may be used to store the calculation of the ratio of net debt/EBITDA by dividing net debt (field 514) by EBITDA (field 402).

Database Model—General Pricing Parameters

Figure 11:
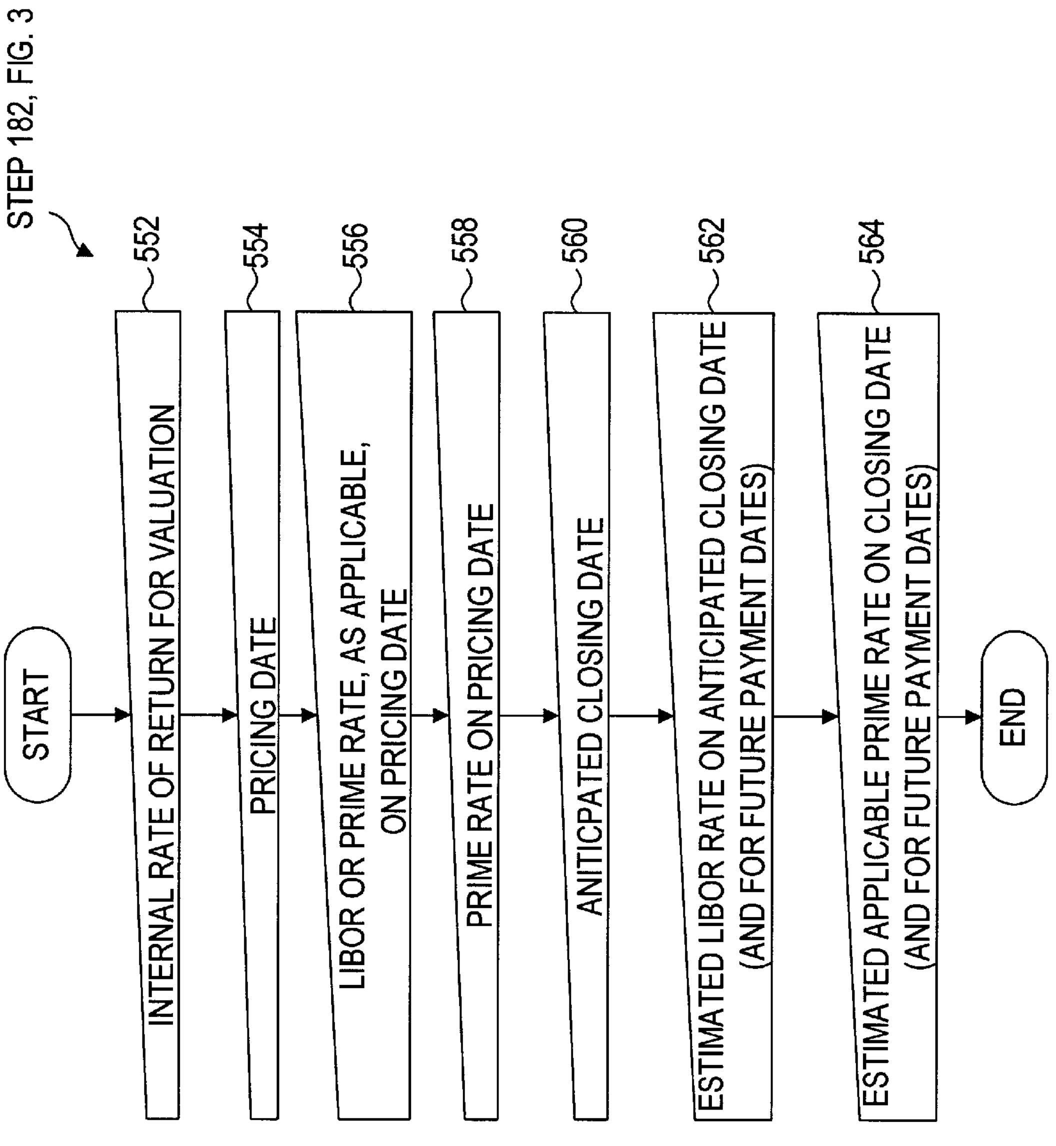
FIG. 11 is an exemplary block diagram illustrating a database model for organizing general pricing parameter data for use with the present invention.

The process for entry of general pricing parameters, mentioned above in connection with the step 182 of FIG. 3 is described in more detail in connection with FIG. 11 in the illustrative example. For the entry of general pricing parameters regarding each credit facility, the database model may include a field 552 for an internal rate of return ("IRR") assigned by the collateral manager (e.g., a minimum of 25%, based upon expected payments and recoveries on collateral or such other rate as the collateral manager may determine based, for example, on prevailing market conditions) to be used for evaluation of the loan; a field 554 for the pricing date on which the corresponding price for the credit facility is set; a field 556 for LIBOR on the pricing date; a field 558 for the applicable prime lending rate on the pricing date; a field 560 for the anticipated closing date of the proposed securitization; a field 562 for the estimated LIBOR rate on the anticipated closing date (and for future payment dates); and a field 564 for the estimated applicable prime lending rate on the anticipated closing date (and for future payment dates) (it should be noted that credit rating agencies are likely to assume increasing interest rates when evaluating the portfolio and the underlying credit facilities).

Determination of Valuation Criteria

The process of determining valuation criteria mentioned above in connection with the step 174 (FIG. 3) is described below in connection with FIGS. 12A–12B in the illustrative example. Initially, it should be noted that this process is described herein as performed for a single credit facility, but that, in connection with a proposed securitization, the process of FIGS. 12A–12B is repeated for each credit facility to be included in the distressed credit facility portfolio to be used as collateral for the proposed securitization.

Figure 12:
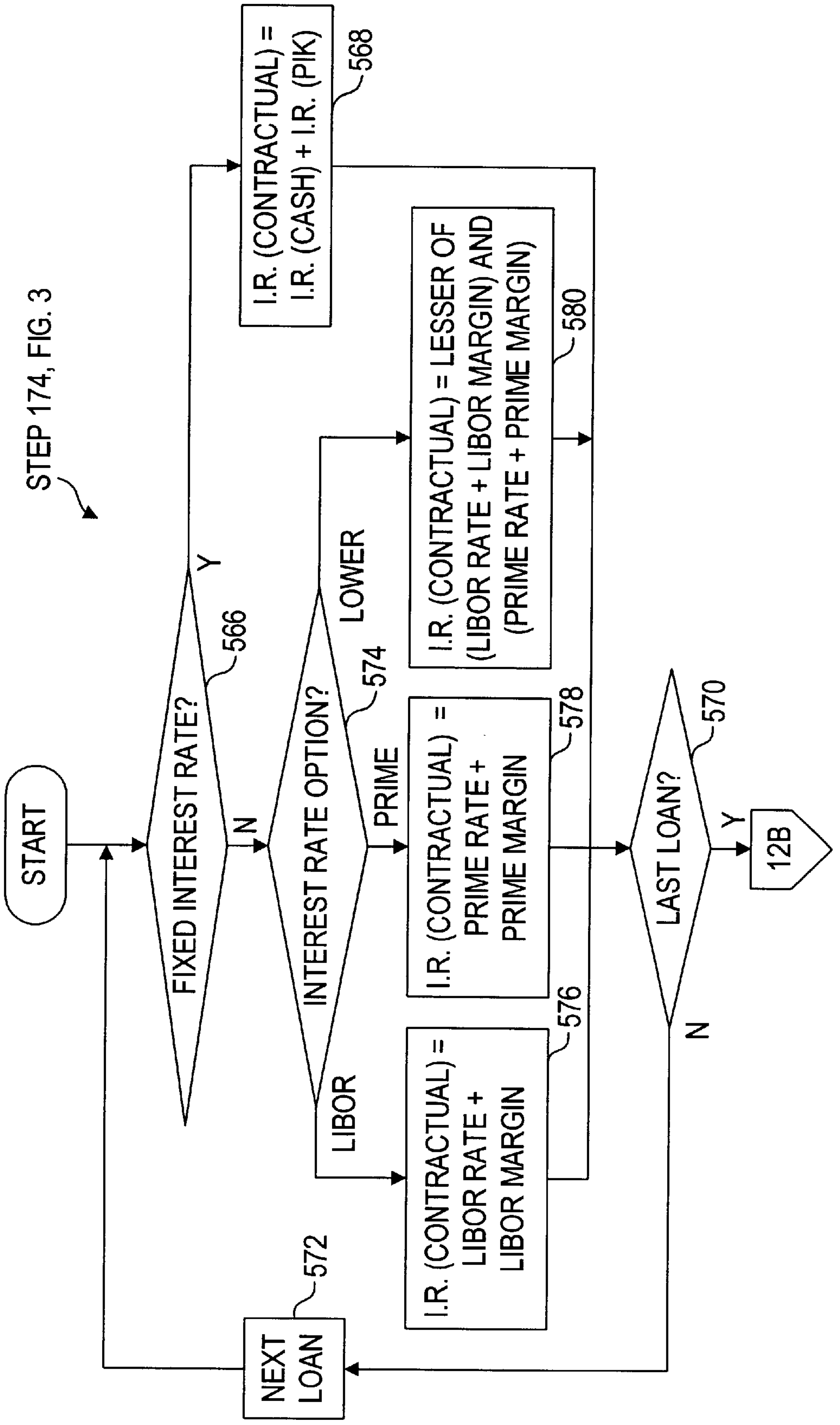
FIGS. 12A and 12B are block diagrams illustrating the process of determining valuation criteria in accordance with the present invention.
Figure 12:
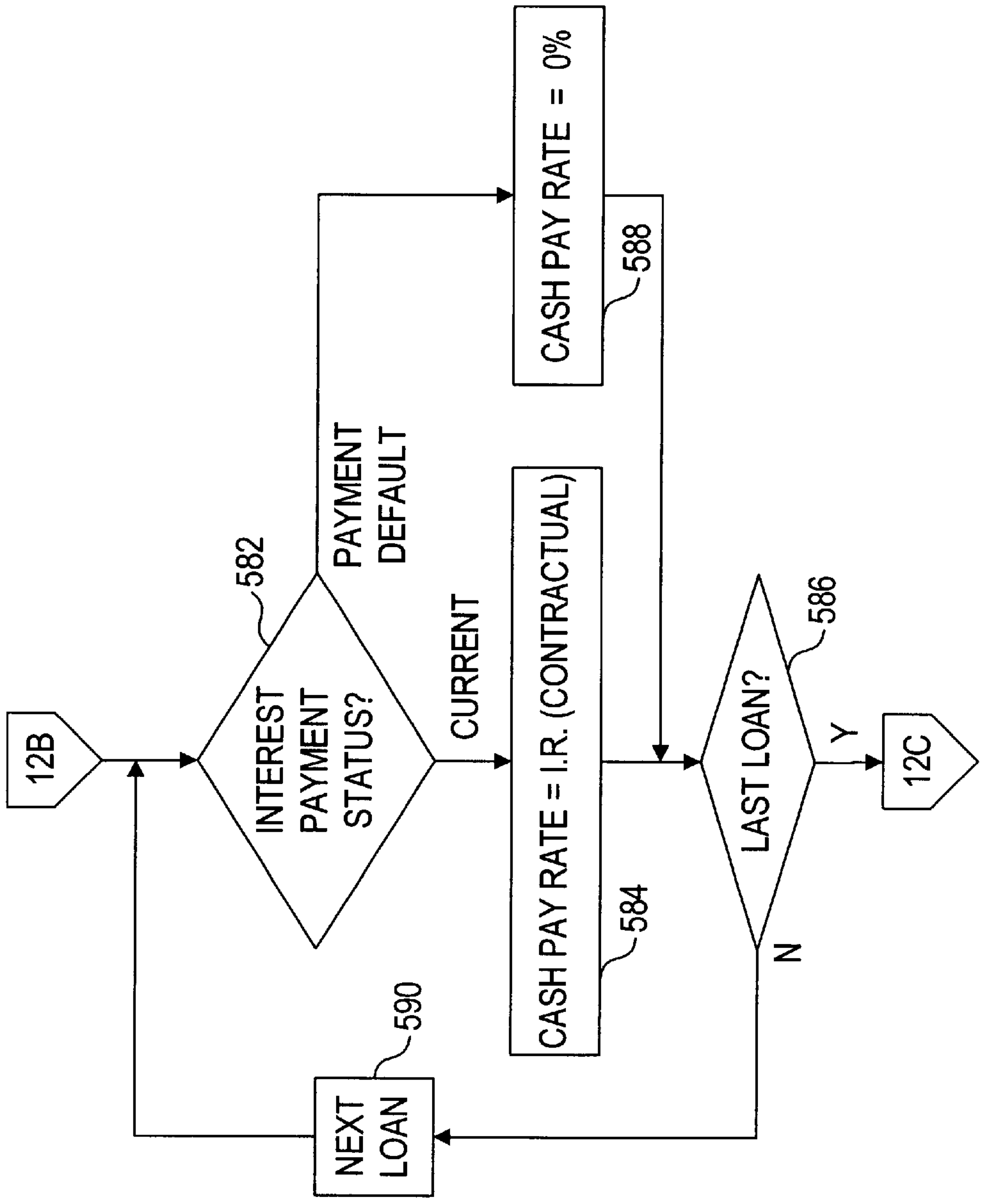

FIG. 12A illustrates the calculation of a current contractual interest rate for each loan included in each credit facility in the selected portfolio of at least 30% or more distressed commercial credit facilities. As shown, a determination is made in step 566 whether the interest rate for a loan is fixed (e.g., based on the content of the field 299, FIG. 7C). If so, the contractual interest rate for the loan is set equal to the sum of the cash interest rate and the PIK interest rate in step 568. If it is determined in step 566 that the interest rate for the loan under consideration is not a fixed rate, then a determination is made in step 574 of the applicable interest rate option for the loan. If the loan is based on LIBOR, the contractual interest rate for the loan is set equal to the sum of LIBOR on the pricing date from the field 556 (FIG. 11) and the applicable LIBOR margin from the field 286 (FIG. 7B) in step 576. If is it determined in step 574 that the loan is based on a prime lending rate, then the contractual interest rate for the loan is set equal to the sum of the applicable prime rate on the pricing date (field 558, FIG. 11) and the applicable prime margin (field 288, FIG. 7B) in step 578. If it is determined in step 574 that the loan is based on the lower of LIBOR and the applicable prime rate, then the rates for steps 576 and 578 are computed and the contractual interest rate for the loan is set equal to the lesser of those two rates. This process is repeated for all loans in the credit facility.

The process illustrated in FIG. 12B is used to calculate the cash pay rate for each loan in each credit facility in the distressed credit facility portfolio. Initially in step 582, a determination is made whether the corresponding borrower is current or in default on interest payments based on the field 296 (FIG. 7C) for the loan and credit facility under consideration. If it is determined in step 582 that the borrower is current on interest payments, then the cash pay rate is set equal to the contractual interest rate for the loan obtained in step 584, and a determination is made in step 586 whether the cash pay rate has been determined for the last loan in the credit facility. If it is determined in step 582 that the borrower is in default on paying interest, then the cash pay rate is set equal to zero in step 588, and a determination is made in step 586 whether the cash pay rate has been determined for the last loan in the credit facility. This process is repeated for all loans in the credit facility.

Database Model—Collateral Coverage

Figure 13A:
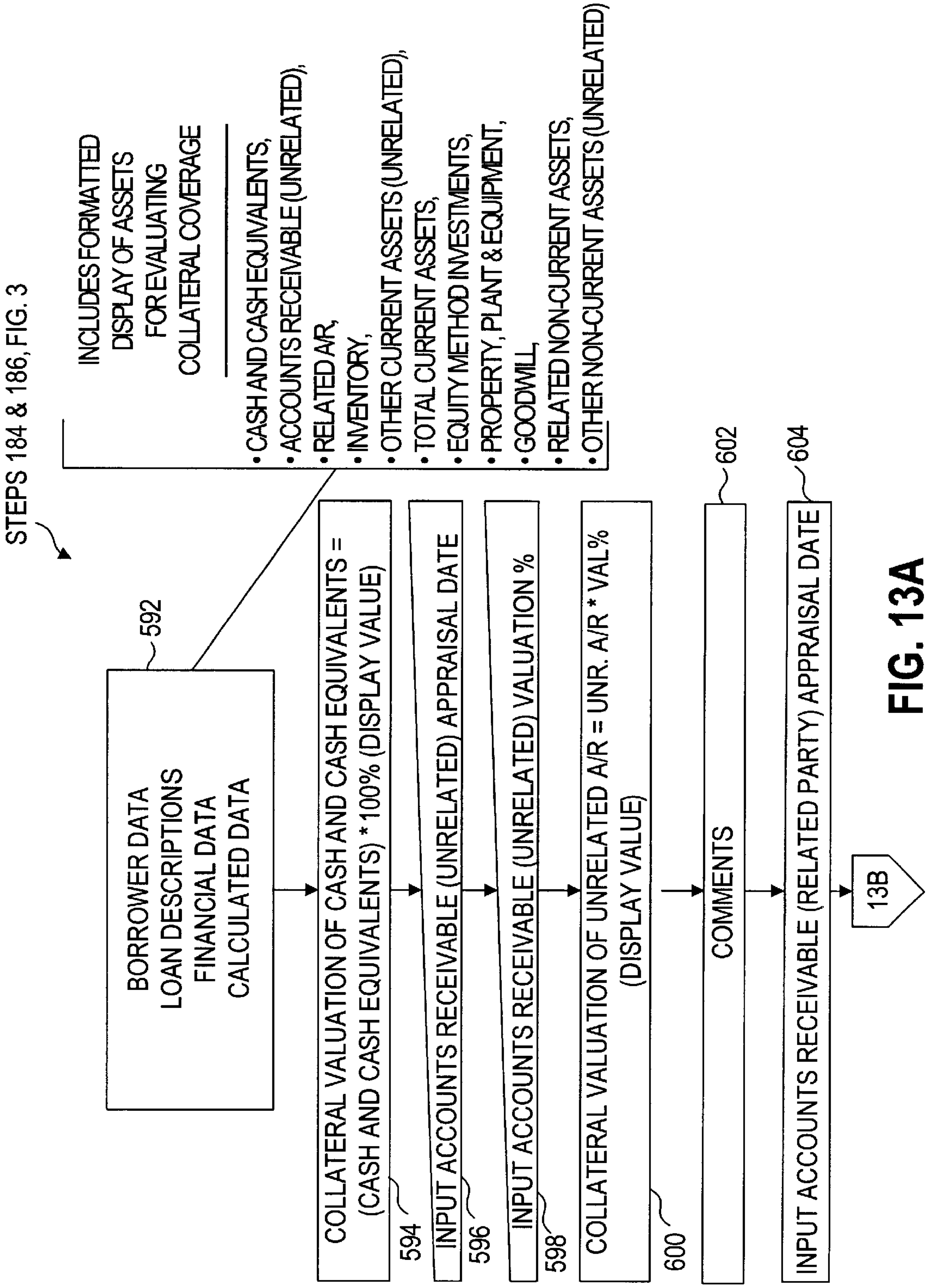
FIGS. 13A–13G are block diagrams illustrating the process of determining the collateral coverage and also illustrate a database model for organizing the collateral coverage data in accordance with the present invention.

Upon completion of all of the foregoing calculations of valuation criteria, particularized information needed by a collateral manager to evaluate collateral coverage of the distressed asset portfolio is evaluated as mentioned above in connection with the step 184 (FIG. 3). Such decision information is shown in more detail in FIG. 13A in the illustrative example. As shown, various decision information is obtained in step 592 from: the borrower data (step 176, FIG. 3), loan descriptions (step 178, FIG. 3), financial data (step 180, FIG. 3). Preferably, this decision information includes information regarding assets needed for evaluating collateral coverage, including cash and cash equivalents, accounts receivable (unrelated), related accounts receivable, inventory, other current assets (unrelated), total current assets, equity method investments, PP&E, goodwill, related non-current assets, and other (unrelated) non-current assets. If applicable, the information may also include the date of any appraisal of any particular asset class included in the due diligence materials received from the lender. Of course, the information displayed to the collateral manager may be tailored to the particular preferences of the collateral manager or as appropriate to facilitate the formulation of collateral value estimates, workout strategy, and workout parameters by the collateral manager in the manner described below. Thereafter, a step 594 sets a collateral valuation percentage of cash equal to 100% of the aggregate amount of cash and cash equivalents displayed in step 444.

The collateral manager may then enter an accounts receivable (unrelated) appraisal date into a field 596 and an accounts receivable (unrelated) valuation percentage (e.g., in the range of 65–85%, as determined by the collateral manager based on such factors as any recent written appraisals included in the loan documentation, or the financial stability and quality of the account debtors (as determined, for example, from services such as Dun & Bradstreet, or based on historical data on collections in the industry)) into a field 598. A field 600 is provided to store a computation of the collateral valuation of accounts receivable (unrelated) determined as the product of the accounts receivable (unrelated) amount from the field 446 (FIG. 10E) and the valuation percentage from the field 598. A field 602 may also be provided for any related comments or remarks of the collateral manager. A field 604 is also provided for entry of an accounts receivable (related party) appraisal date (if available).

Figure 13B:
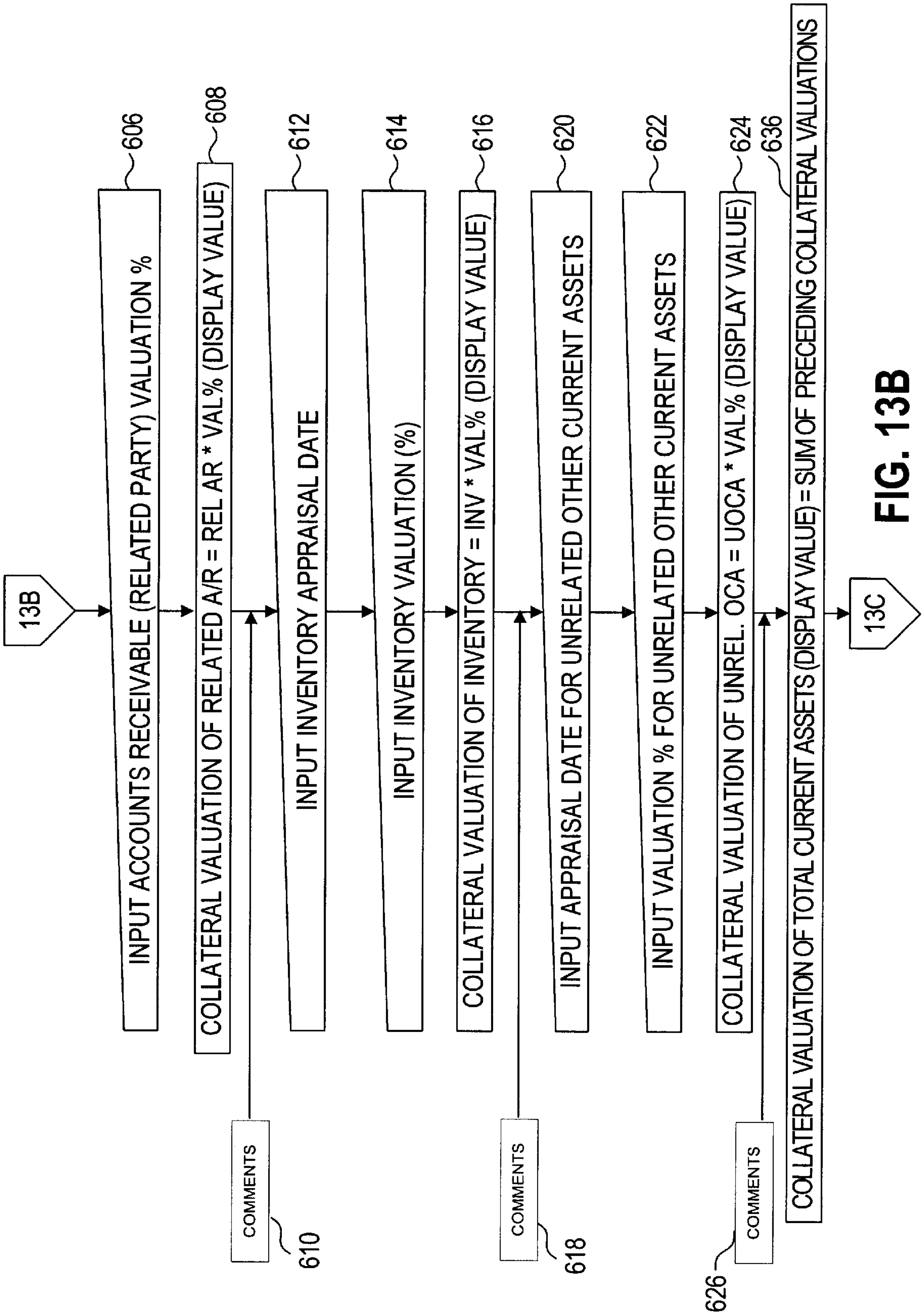

As shown in FIG. 13B in the illustrative example, a field 606 is provided for entry of an accounts receivable (related party) valuation percentage (which often may be in the range of 0–10%, because of the related party nature of the underlying transactions and generally low likelihood of collection), and a field 608 computes a collateral valuation of related party accounts receivable as the product of the related party accounts receivable (field 448, FIG. 10E) and the related party accounts receivable valuation percentage from the field 606. A field 610 may also be provided for any related comments or remarks of the collateral manager.

An inventory appraisal date may be entered in a field 612, an inventory valuation percentage (e.g., in the range of 30–50%, as determined by the collateral manager based on such factors as any recent written appraisals included in the loan documentation or market information available regarding the type of product and ease of sale) may be entered into a field 614, and a field 616 computes a collateral valuation of inventory as the product of inventory (field 450, FIG. 10E) and the inventory valuation percentage of the field 614. A field 618 may also be provided for any related comments or remarks of the collateral manager.

An appraisal date for unrelated other current assets may be entered in a field 620 and a valuation percentage (which often may be 0%, unless the unrelated other current assets are comprised of high quality, liquid investments) for unrelated other current assets may be entered into a field 622. A field 624 computes a collateral valuation of unrelated other current assets as the product of unrelated other current assets (field 452, FIG. 10C) and the valuation percentage of the field 622. A field 626 may also be provided for any related comments or remarks of the collateral manager. A field 636 then computes a collateral valuation of total current assets as the sum of the collateral valuations computed by the fields 594, 600, 608, 616, and 624.

Figure 13C:
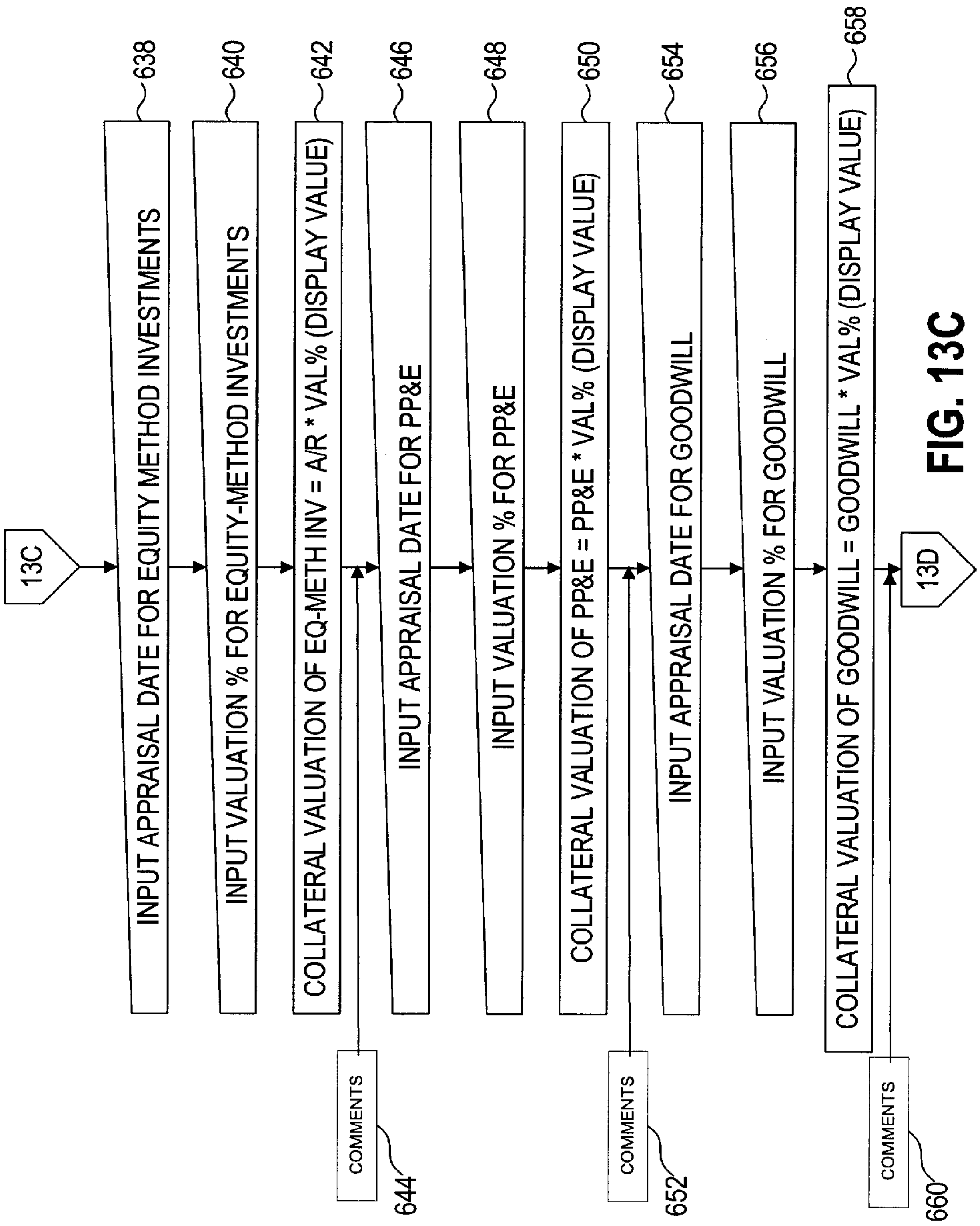

As shown in FIG. 13C in the illustrative example, an appraisal date for equity method investments may be entered into a field 638, and a valuation percentage (which generally will be 0%, unless there is a recent written appraisal supporting another percentage in the loan documentation, or unless there is a currently available stock price from a national U.S. exchange or stock market) for equity method investments may be entered into a field 640. A field 642 is used to store a computation of the collateral valuation of equity method investments, determined as a product of equity method investments (field 458) and the valuation percentage of the field 640. A field 644 may also be provided for any related comments or remarks of the collateral manager. An appraisal date for PP&E may be entered into a field 646, and a valuation percentage (e.g., in the range of 20–25%, unless there are recent written appraisals supporting different percentages in the loan documentation) for PP&E may be entered into a field 648. A field 650 may be used to store a computation of a collateral valuation of PP&E as the product of PP&E (field 460, FIG. 10F) and the valuation percentage of the field 648. A field 652 may also be provided for any related comments or remarks of the collateral manager.

An appraisal date for goodwill may be entered into a field 654 and a valuation percentage for goodwill (which generally will be 0%, unless there is a recent written appraisal supporting another percentage in the loan documentation) may be entered into a field 656. A collateral valuation of goodwill is calculated as the product of goodwill (field 464) and the valuation percentage of the field 656 and stored in a field 658. A field 660 may also be provided for any related comments or remarks of the collateral manager.

Figure 13D:
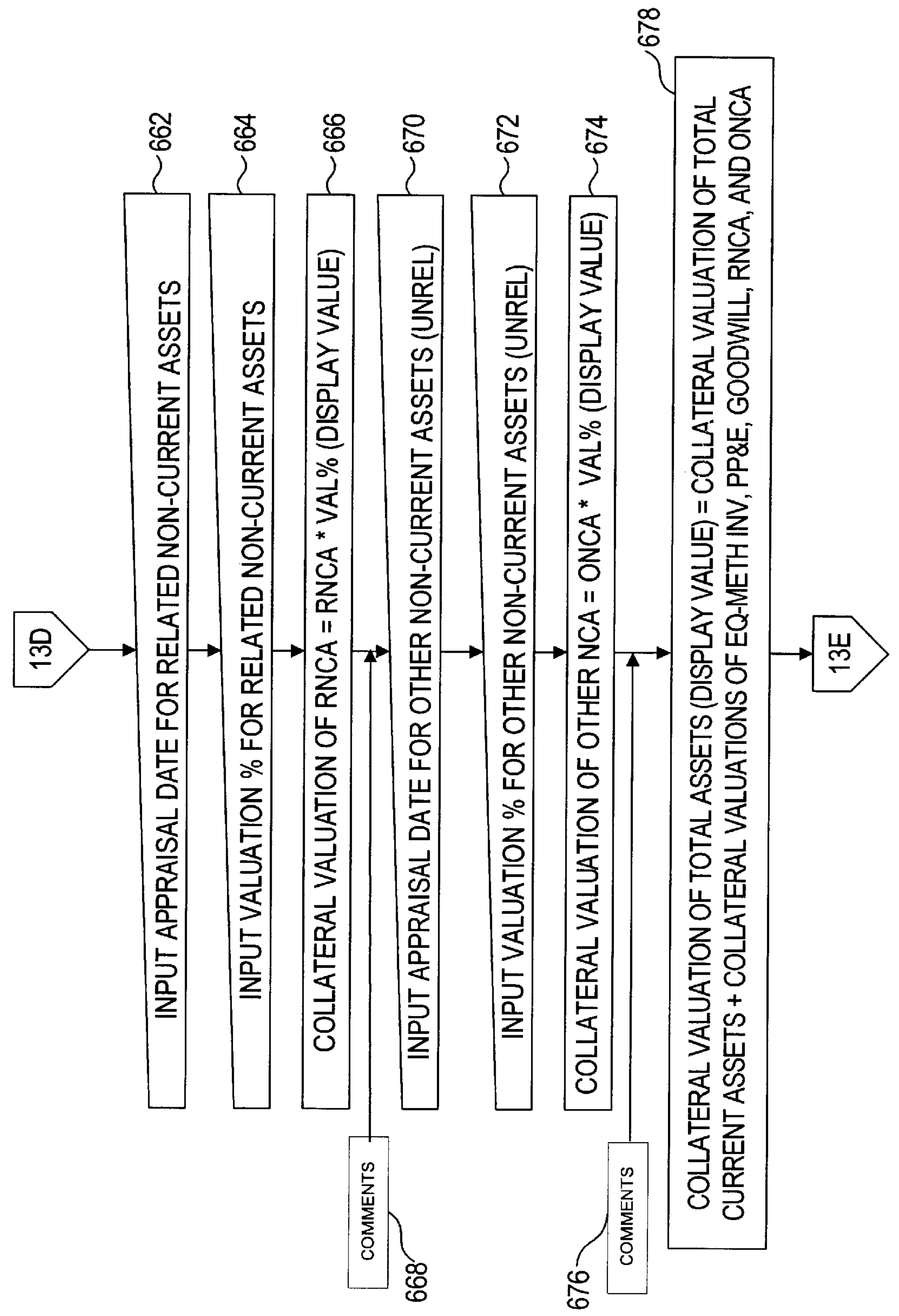

As shown in FIG. 13D in the illustrative example, an appraisal date for related non-current assets may be entered into a field 662, and a valuation percentage (which generally will be 0%, unless there is a recent written appraisal supporting another percentage in the loan documentation) for related non-current assets may be entered into a field 664. A field 666 may be used to store a computation of the collateral valuation of related non-current assets as the product of related non-current assets (field 466) and the valuation percentage of the field 664. A field 668 also may be provided for any related comments or remarks of the collateral manager. An appraisal date for other non-current assets (unrelated) may be entered into a field 670, and a valuation percentage for other non-current assets (unrelated) (which generally will be 0%, unless there is a recent written appraisal supporting another percentage in the loan documentation) may be entered into a field 672. A collateral valuation of other non-current assets (unrelated) may be computed as the product of other non-current assets (unrelated) (field 468, FIG. 10H) and the valuation percentage of the field 672 and stored in field 674. A field 676 also may be provided for any related comments or remarks of the collateral manager. A collateral valuation of total assets ("total collateral value") may be computed as the sum of the collateral valuations of the fields 636, 642, 650, 658, 666, and 674 and stored in a field 678.

Figure 13E:
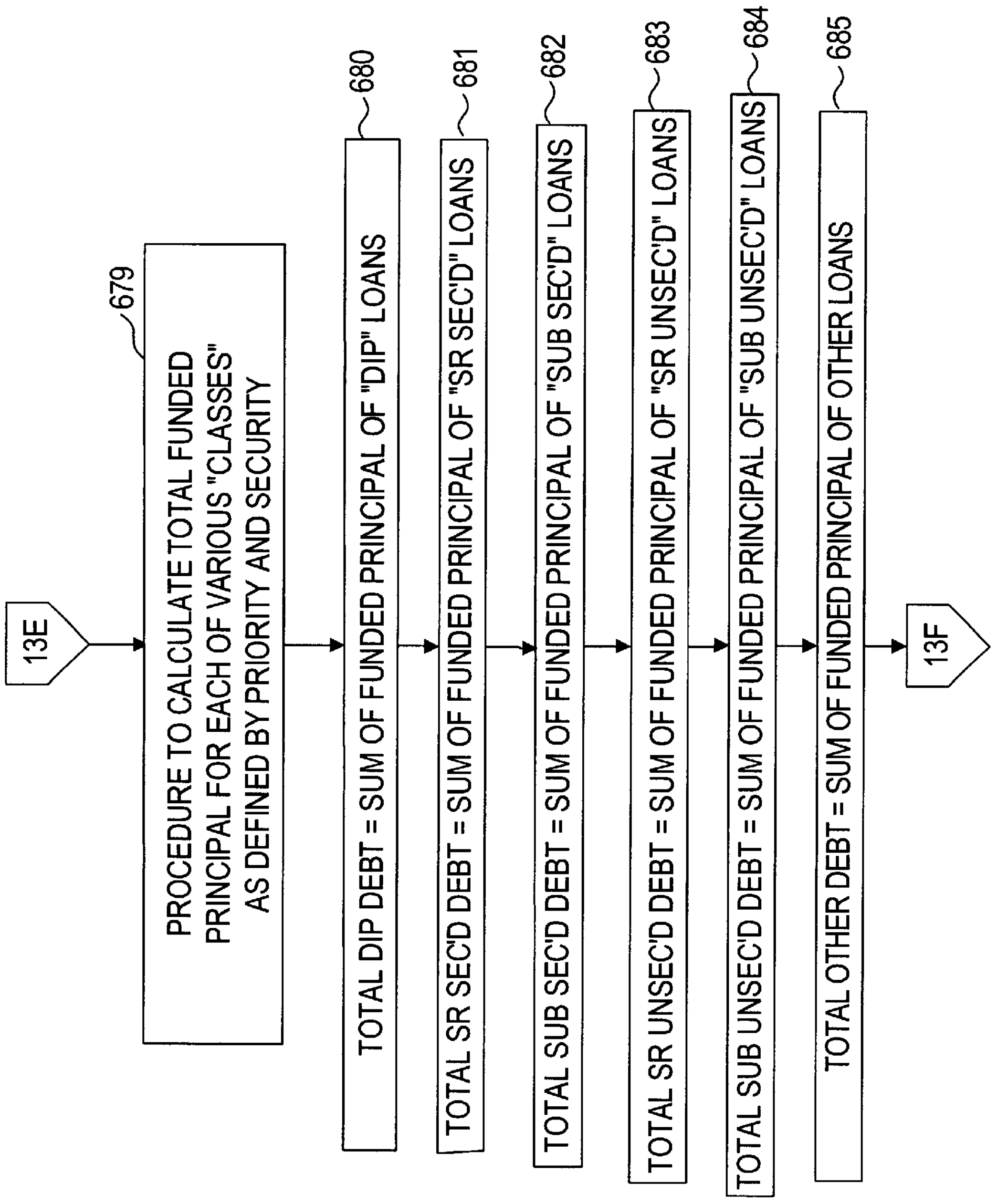

As shown in FIG. 13E in the illustrative example, initially in step 679, the Global Funded Principal may be calculated for each of various "classes" of loans in the distressed credit facility on the basis of priority and security attributes of those loans (e.g. DIP, senior secured, subordinated secured, senior unsecured, subordinated unsecured and other) as previously identified in field 244, FIG. 7A. More particularly, total DIP debt may be computed as a sum of Global Funded Principal (field 311, FIG. 7C) of all DIP loans included in the credit facility as illustrated in step 680; total senior secured debt may be computed as a sum of Global Funded Principal (field 311, FIG. 7C) of all senior secured loans included in the credit facility and displayed as illustrated in step 681; total subordinated secured debt may be computed as a sum of Global Funded Principal (field 311, FIG. 7C) of all subordinated secured loans included in the credit facility as indicated in step 682 total senior unsecured debt may be computed as a sum of Global Funded Principal (field 311, FIG. 7C) of all senior unsecured loans included in the credit facility as indicated in step 683; total subordinated unsecured debt may be computed as a sum of Global Funded Principal (field 311, FIG. 7C) of all subordinated unsecured loans included in the credit facility as indicated in step 684; and total other debt may be computed as a sum of Global Funded Principal (field 311, FIG. 7C) of all other loans included in the credit facility as indicated in step 685. Similar calculations may be made, displayed and stored for all other outstanding credit facilities of a borrower.

Figure 13F:
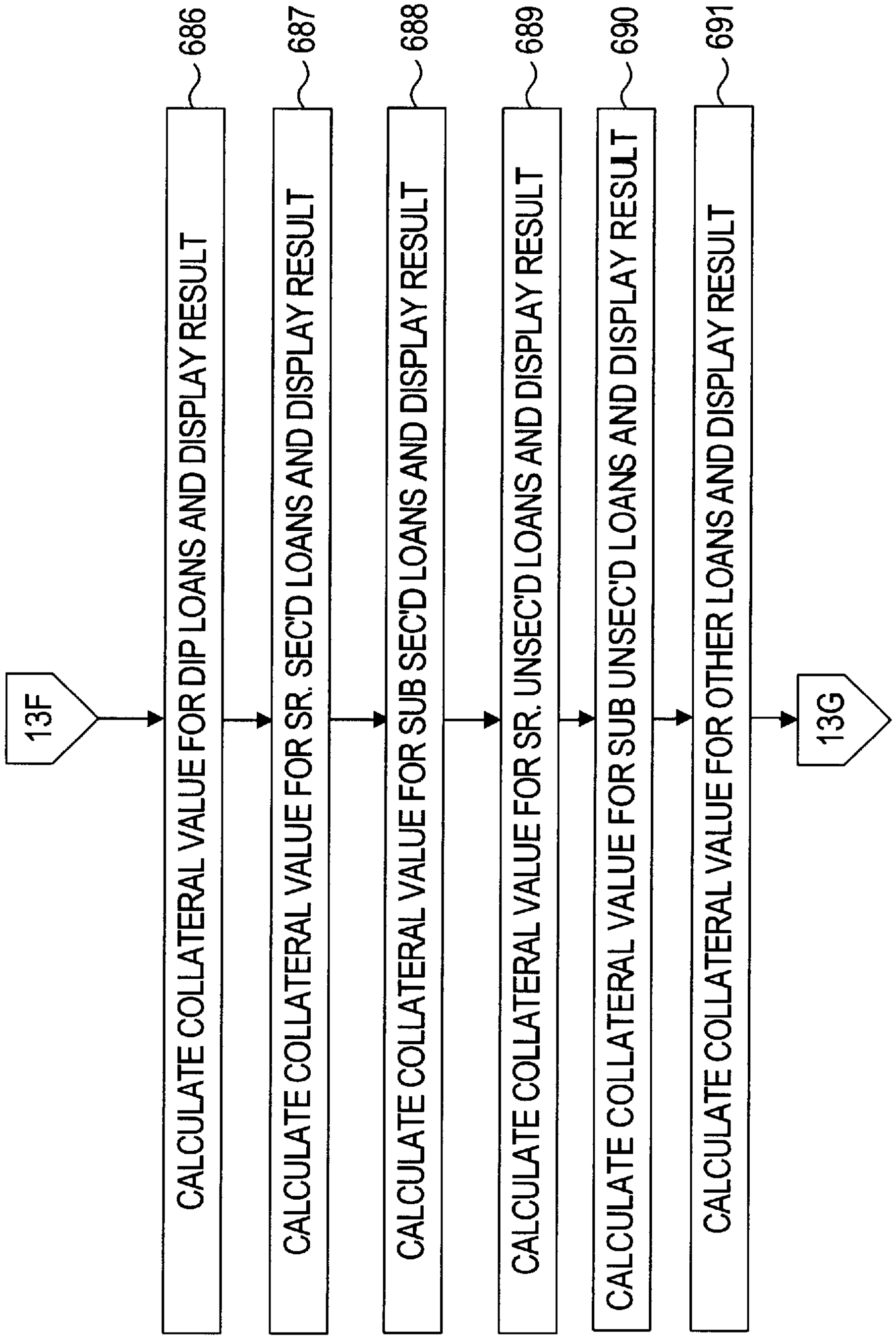
Figure 13G:
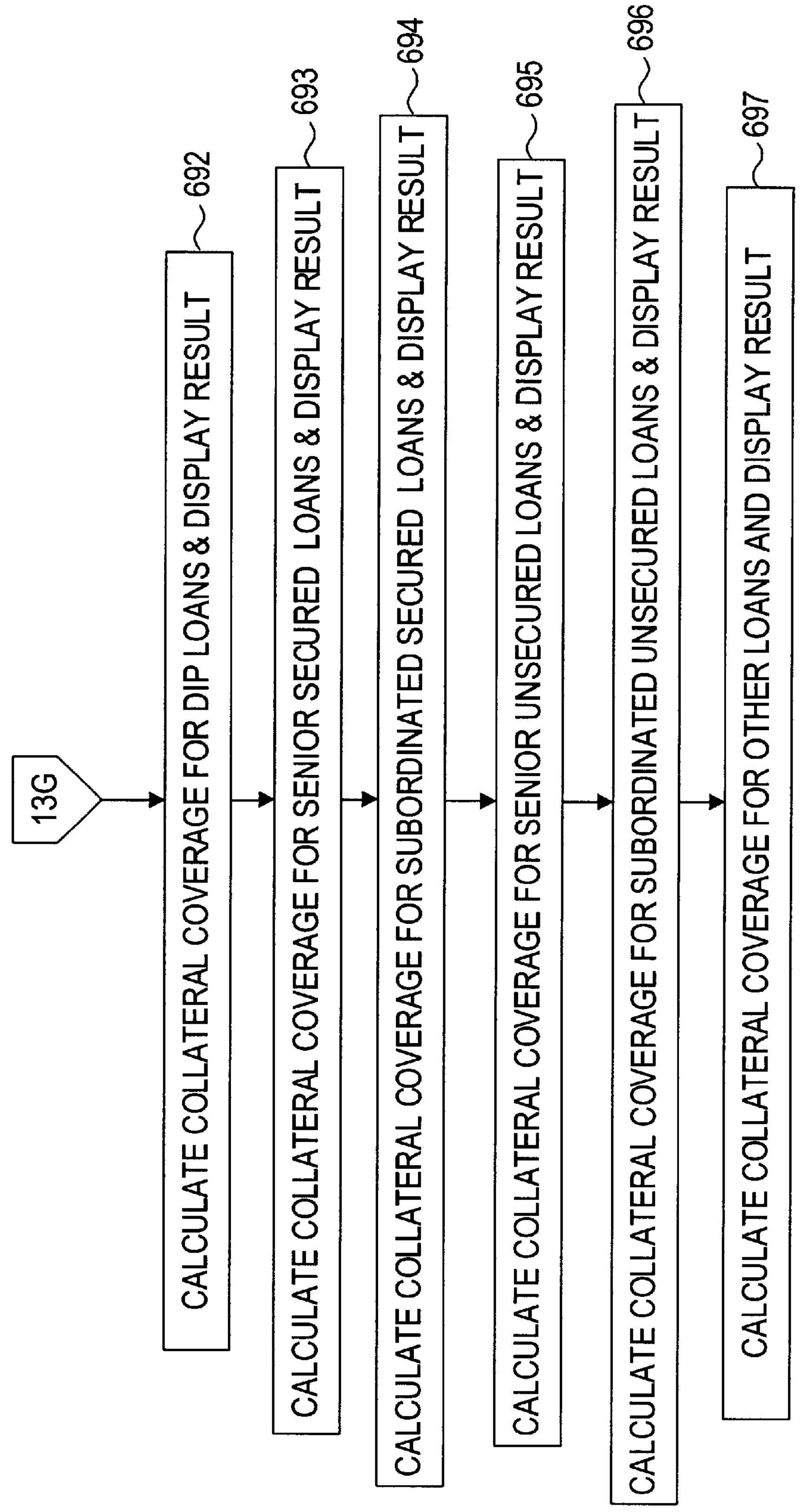

As shown in FIG. 13F in the illustrative example, a determination may be made of the collateral value for each of the various classes of loans in each credit facility in the distressed credit facility portfolio by applying the collateral parameters applicable to that loan type (e.g., all assets, specific assets, unsecured, field 270, FIG. 7B) to the total collateral value (field 678, FIG. 13D), thus determining the collateral value of the assets securing that particular loan class as indicated in: field 686 for DIP loans; field 687 for senior secured loans; field 688 for subordinated secured loans; field 689 for senior unsecured loans; field 690 for subordinated unsecured loans; and field 691 for other loans. As shown in FIG. 13G in the illustrative example, the collateral coverage then may be determined for each loan class in each credit facility by dividing the collateral value of the assets securing that particular loan class (fields 686, 687, 688, 689, 690 or 691) by the Global Funded Principal for that loan class (fields 680, 681, 682, 683, 684 or 685, respectively) as indicated in: step 692 for DIP loans; step 693 for senior secured loans; step 694 for subordinated secured loans; step 695 for senior unsecured loans; step 696 for subordinated unsecured loans; and step 697 for other loans. This process is repeated for each of the various loan classes (e.g. DIP, senior secured, subordinated secured, senior unsecured, subordinated unsecured and other) for each credit facility in the distressed credit facility portfolio.

Database Model

Workout Strategy—Borrower's Debt Capacity

Figure 14A:
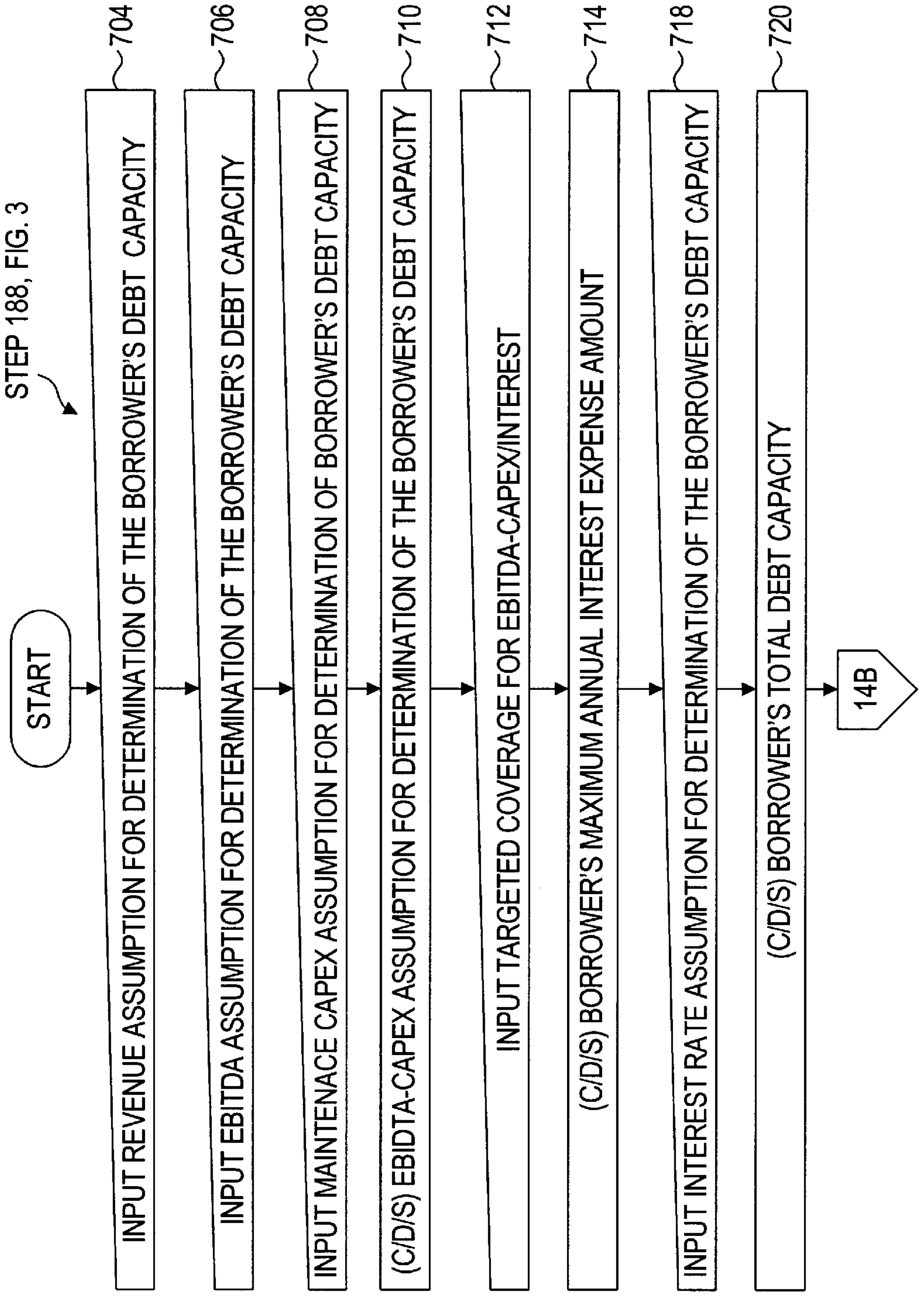
FIGS. 14A–14D are block diagrams illustrating a database model for organizing the borrower's debt capacity data in accordance with the present invention.

The entry of a workout strategy in connection with the loans included in the distressed credit facility described briefly above in connection with the step 188 of FIG. 3 is described in more detail in connection with FIGS. 14A–14D in the illustrative example. As shown in FIG. 14A, the collateral manager may input certain assumptions into the database model for the borrower's debt capacity and perform certain calculations to determine a borrower's total debt capacity, as follows: an annual revenue assumption (for example, LTM revenues (field 352, FIG. 10A) adjusted by any upward or downward trend during the interim (or "stub") period or by the projections of any third party advisors or recent written appraisals included in the loan documentation) may be entered in a field 704; an EBITDA assumption (determined by the collateral manager based on, for example, LTM EBITDA (field 402, FIG. 10D) adjusted by any upward or downward trend during the stub period or by the projections of third party advisors or recent written appraisals included in the loan documentation) may be entered into a field 706; a maintenance CAPEX assumption (determined by the collateral manager based on LTM CAPEX (field 404, FIG. 10D) adjusted by any upward or downward trend during the stub period or by the projections of third party advisors or recent written appraisals included in the loan documentation) may be entered into a field 708; the EBITDA-CAPEX (sometimes referred to as "free cash flow") assumption may be computed by subtracting the CAPEX assumption in field 708 from the EBITDA assumption in field 706 and stored in a field 710; a targeted coverage for (EBITDA-CAPEX)/interest may be set (for example, at 2.0 times or another multiple determined appropriate by the collateral manager) and entered in field 712; the maximum annual interest expense the borrower is likely able to pay may be calculated by dividing free cash flow (EBITDA-CAPEX, field 710) by the targeted (EBITDA-CAPEX)/interest coverage (field 712) and stored in a field 714; an interest rate assumption (determined by the collateral manager based on, for example, recent prevailing interest rates and trends) may be entered into a field 718; and the borrower's total debt capacity may be calculated by dividing maximum annual interest expense (field 714) by the assumed interest rate (field 718) and stored in a field 720.

Database Model

Workout Strategy—Liquidation Analysis

Figure 14B:
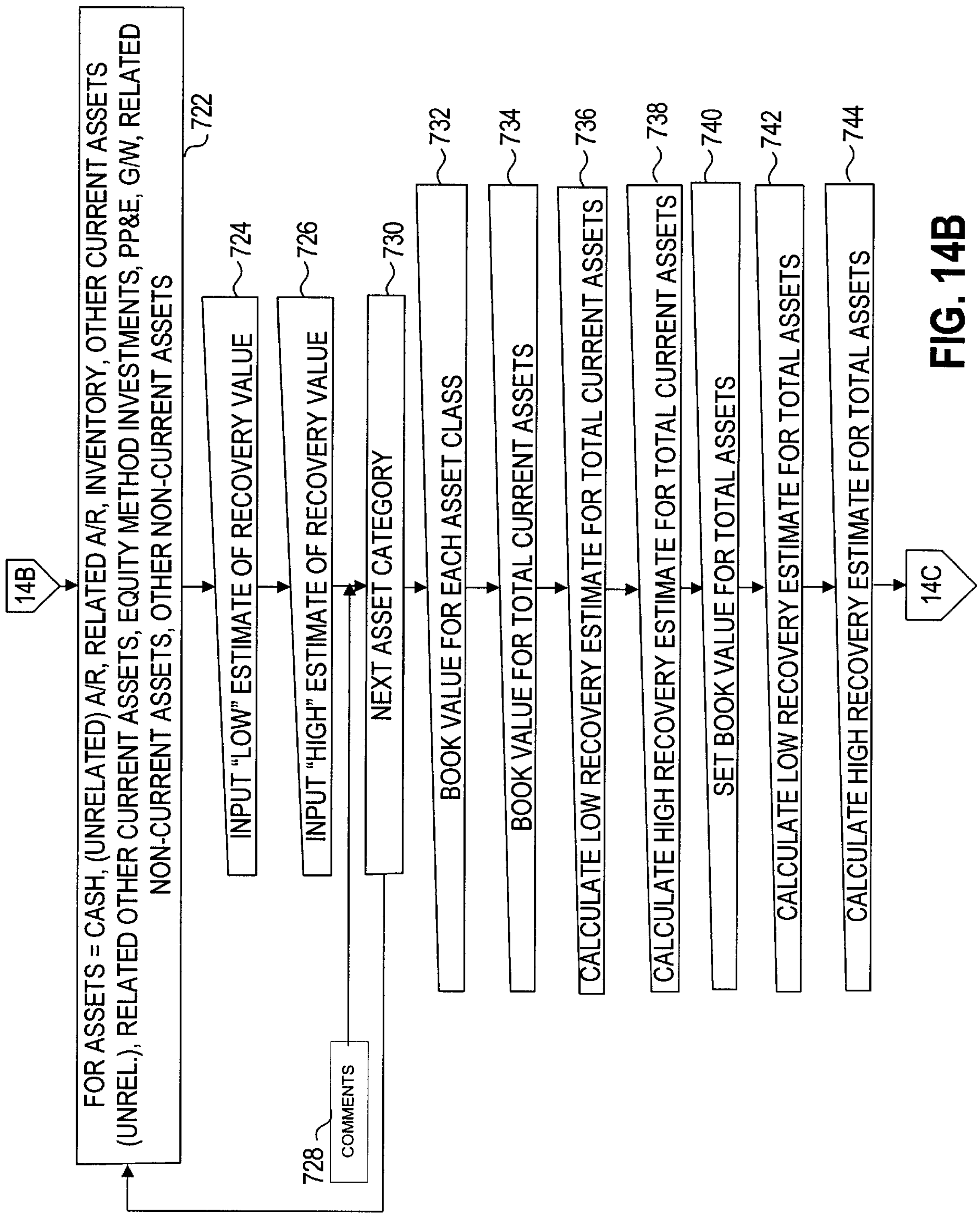

As shown in FIG. 14B in the illustrative example, a liquidation analysis may be performed for various asset classes of the borrower by inputting low and high estimates of recovery value for each asset category included in field 722 (fields 444, 446, 448, 450, 452, 454, 458, 460, 464, 466 and 468 of FIGS. 10G and 10H). These estimates are often based on historical studies of liquidation recoveries for particular asset classes by industry, written appraisals or other documentation included in the loan documentation, estimates obtained from professional liquidators or other experts, and the experience of the collateral manager. For example, low recovery estimates for industrial inventories may be in the range of 10–30% of book value, with high recovery estimates being in the range of 30–50% of book value. As another example, equity method investments, related party items and goodwill are often given a 0% recovery estimate. As a further example, PP&E is often given a low recovery estimate in the range of 10–20% of book value, and a high recovery estimate in the range of 20–40% of book value. The estimates may be entered into an array of respective fields 724 (for "low" estimates) and 726 (for "high" estimates), together with any related notes or comments of the collateral manager (field 728). A loop may be provided between a step 722 and a step 730 for enumerating each of the asset categories of the borrower, such that low and high estimates and related notes or comments can be put into the respective fields 724, 726 and 728 for each asset category.

A field 732 may be provided for the book value for each asset class to be displayed next to the corresponding low liquidation recovery estimate and high liquidation recovery estimate for the asset class. The book value for total current assets may be set as the value in field 456 (FIG. 10E) and stored in field 734. The low recovery estimate for total current assets may be calculated as the sum of the respective fields 724 for each of the current asset categories (fields 444, 446, 448, 450, 452 and 454 of FIG. 10E) and stored in a field 736. The high recovery estimate for total current assets may be calculated as the sum of the respective fields 726 for each of the current asset categories (fields 444, 446, 448, 450, 452 and 454 of FIG. 10E) and stored in a field 738. The book value for total assets may be set as the value in field 472 (FIG. 10H) and stored in a field 740. The low recovery estimate for total assets may be calculated as the sum of the respective fields 724 for each of the asset categories (fields 444, 446, 448, 450, 452, 454, 458, 460, 464, 466 and 468 of FIGS. 10G AND 10H) and stored in a field 742. The high recovery estimate for total assets may be calculated as the sum of the respective fields 726 for each of the asset categories (fields 444, 446, 448, 450, 452, 454, 458, 460, 464, 466 and 468 of FIGS. 10G AND 10H) and stored in a field 744.

Figure 14C:
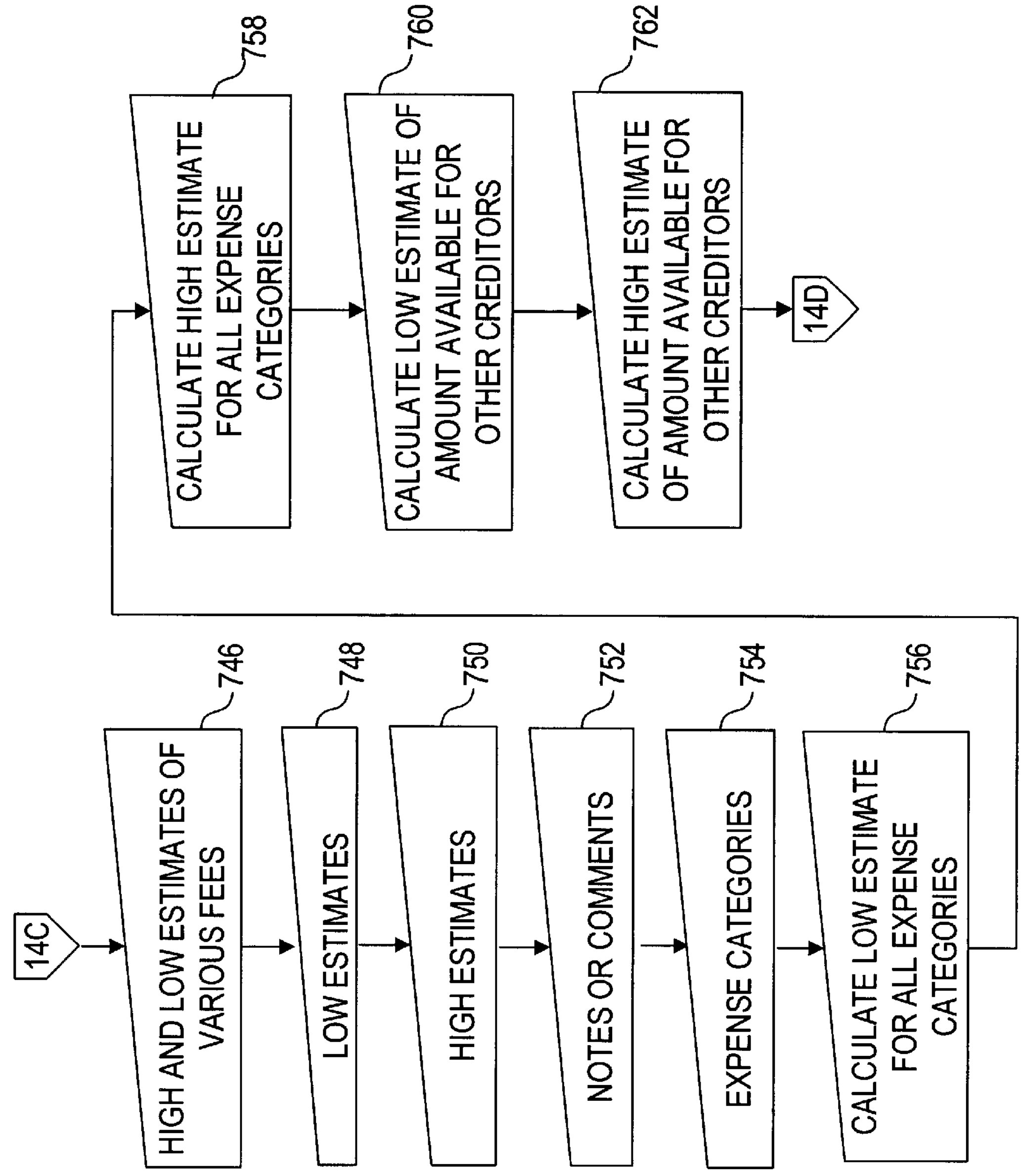

Referring to FIG. 14C in the illustrative example, for each class of loan in each credit facility in the distressed credit facility portfolio, a field 746 may be provided for the entry of low and high estimates of various fees and expenses which may be incurred in connection with a liquidation of the borrower, such as wind-down expenses, trustee fees, professional fees (attorneys, accountants and others) and administration expenses (other than DIP financing expenses). These estimates may be entered into an array of respective fields 748 (FIG. 14C) (for "low" estimates) and 750 (for "high" estimates), together with any related notes or comments of the collateral manager (field 752). The low and high estimates and related notes or comments may be stored in the respective fields 748, 750 and 752 for each expense category. The low estimate for all the listed expense categories may be calculated as the sum of the respective fields 748 for each of the expense categories and stored in a field 756. The high estimate for all the listed expense categories may be calculated as the sum of the respective fields 750 for each of the expense categories and stored in a field 758. A low estimate of amount available to other creditors (after payment of liquidation expenses) may be calculated by subtracting from the low recovery estimate for total assets (field 742) the high estimate of liquidation expenses (field 758) and stored in a field 760. A high estimate of amount available to other creditors (after payment of liquidation expenses) may be calculated by subtracting from the high recovery estimate for total assets (field 744) the low estimate of liquidation expenses (field 756) and stored in a field 762. This process is repeated for each class of loan in each credit facility in the distressed credit facility portfolio.

Figure 14D:
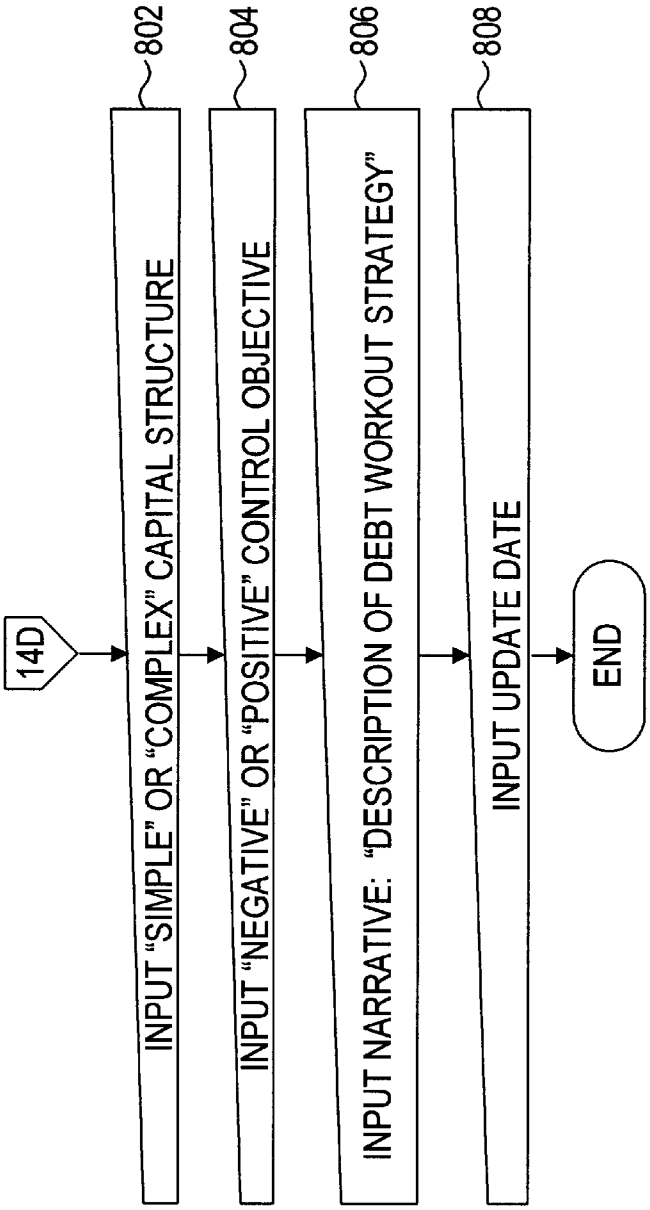

Turning to FIG. 14D in the illustrative example, a field 802 may be provided for entry of whether the borrower has a "simple" (e.g., only bank debt) or "complex" (e.g., includes bonds, debentures, subordinated debt, separate receivables facility, and/or other facility) capital structure. For each loan in each credit facility in the distressed credit facility portfolio, field 804 may be provided for entry of a "positive" (e.g., lender has an agent or other lead position, such as a majority of the debt class, or the collateral manager has an interest in following the lead position held by another lender in the bank group) or "negative" (e.g., lender has a blocking position with respect to forbearances, waivers and/or amendments, or the collateral manager has an interest in following such a position held by another lender in the bank group) control objective. A field 806 may be provided for entry of a narrative explanation of the debt workout strategy formulated by the collateral manager for a particular loan or a particular credit facility. This narrative may address matters such as industry cyclicality, a qualitative description of company circumstances particular to the borrower and/or industry and economic circumstances affecting other companies in the industry, whether or not management is likely to be replaced, whether or not a financial advisor has been or should be retained, the likeliness of any forgiveness of debt (commonly referred to as a "haircut"), whether payments to subordinated debt holders can or should be blocked, the likelihood of a sale of the borrower, or a sale or sales of its assets, or its bankruptcy. A field 808 may also provided for entry of an update date (e.g., most recent pricing date or most recent collateral valuation date).

Process for Determining Workout Parameters

An exemplary process for entry of workout parameters, mentioned above in connection with the step 190 of FIG. 3, is described in more detail in connection with FIGS. 15A–15I and 16A–C in the illustrative example, which provide an interactive quantitative input/output pricing interface and engine. This process may be organized by way of a database model as discussed below.

Figure 15A:
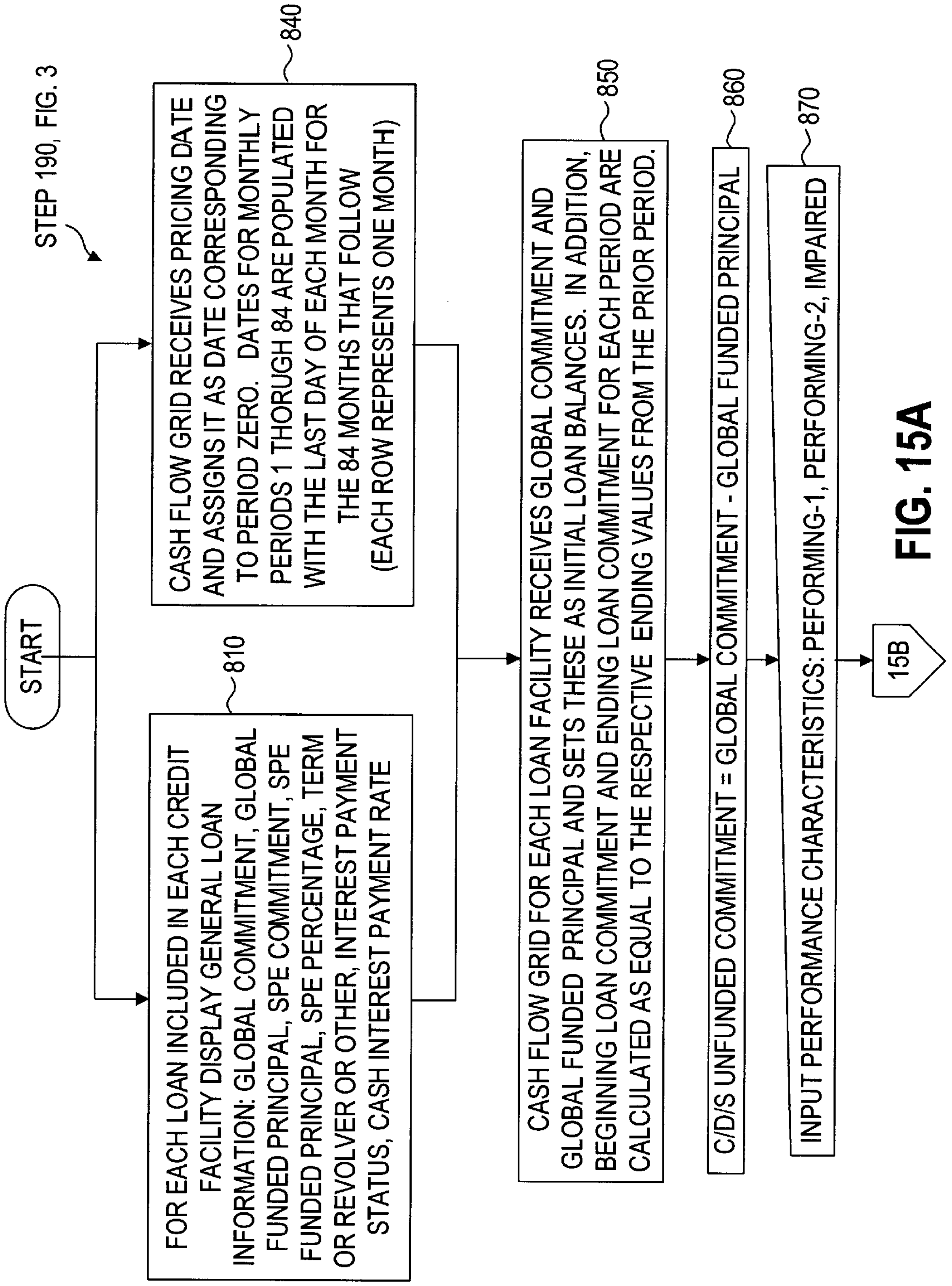
FIGS. 15A–15I, 16A–16C are block diagrams illustrating an exemplary process for determining work out parameters in accordance with the present invention.

Initially, as shown in FIG. 15A in the illustrative example, for each loan included in each credit facility, general loan information may be entered in step 810, such as: Global Commitment (field 310, FIG. 7C); Global Funded Principal (field 311, FIG. 7C); anticipated or actual SPE commitment as determined by the collateral manager (often equal to Commitment Offered (field 316, FIG. 7C); anticipated or actual SPE funded principal, as determined by the collateral manager (often equal to Funded Principal Offered (field 317, FIG. 7C); SPE percentage, which may be calculated as the ratio (expressed as a percentage) of anticipated or actual SPE commitment divided by Global Commitment (field 310, FIG. 7C); term/revolver/other loan type (from field 246, FIG. 7A); interest payment status (from field 296, FIG. 7C) and cash interest payment rate (from field 282, FIG. 7B). At the same time, a cash flow grid, for example, a spreadsheet, database, or other suitable construct, for example, may be constructed in step 840 with dates for monthly periods beginning with the anticipated pricing date of the proposed distressed credit facility portfolio purchase assigned as the date corresponding to period zero and with each succeeding period or row in the cash flow grid being populated with the date corresponding to the last day of each succeeding month following the pricing date over a period of 84 months or such other period as the collateral manager may determine. Thereafter, initial loan balances in the cash flow grid for each loan included in each credit facility are set equal to the Global Commitment and Global Funded Principal for the loan (fields 310 and 311, respectively, of FIG. 7C) in step 850. A beginning Global Commitment and an ending Global Commitment for each monthly period, based on the respective ending value of the immediately prior month is also calculated in step 850. Next in step 860, the amount of unfunded commitment for the loan (the "Unfunded Commitment") for each period in the cash flow grid is calculated as the difference between the Global Commitment and Global Funded Principal and stored, for example, in a database model. The loan's performance characteristics as performing-1, performing-2, or impaired based on the collateral manager's review of the due diligence materials provided by the lender (field 102, FIG. 1) is input in step 870. Additional data, information and values which may be included in the cash flow grid are described below.

Figure 15B:
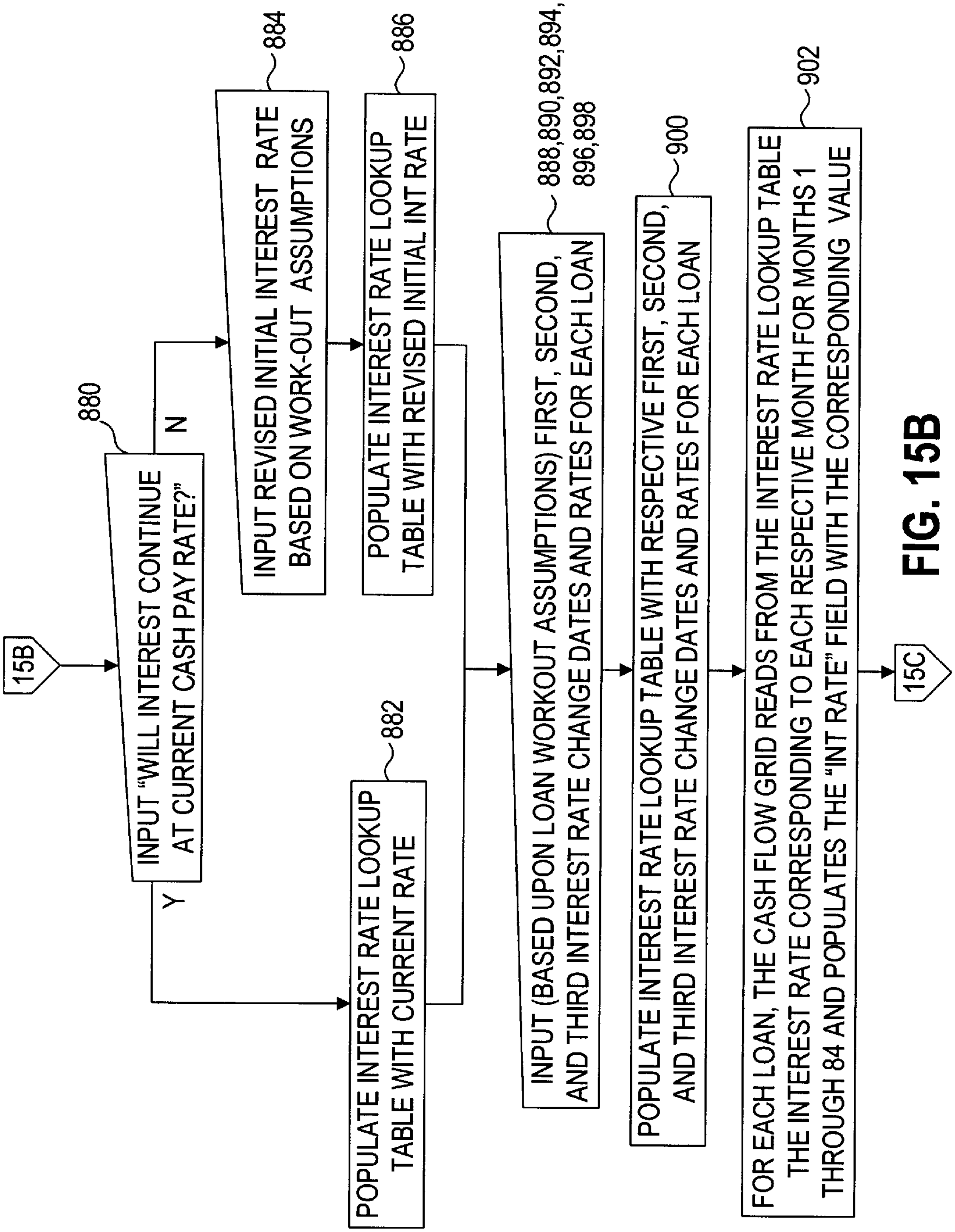

As shown in FIG. 15B in the illustrative example, a field 880 may be provided in the database model for entry of a prediction by the collateral manager as to whether interest will continue to be paid at the current cash pay rate. Thereafter, an interest rate look-up table, for example, a spreadsheet or database or any other suitable program may be populated, based on the prediction entered into the field 880. More particularly, if the prediction is that interest will continue to be paid at the current cash pay rate, then in step 882, an interest rate look-up table may be populated with the current rate. Otherwise, a field 884 may be provided for entry of a revised initial interest rate, based on workout assumptions entered in step 806 (e.g., likely a higher rate; in light of the poor credit quality, perhaps as high as the default rate (field 290, FIG. 7B)); and the interest rate look-up table with the revised initial interest rate entered in the field 884 is populated in step 886.

In either case, based upon loan workout assumptions, first, second, and third interest rate change dates and corresponding rates may be entered for each loan into fields 888, 890, 892, 894, 896 and 898, respectively. The interest rate look-up table with respective first, second, and third interest rate change dates and rates for each loan is populated in step 900. The cash flow grid may include an "INT RATE" field. In step 902, the "INT RATE" field of the cash flow grid for each loan is populated with the corresponding value from the interest rate look-up table for each month represented in the cash flow grid (e.g., months 1 through 84 in the illustrated example).

Figure 15C:
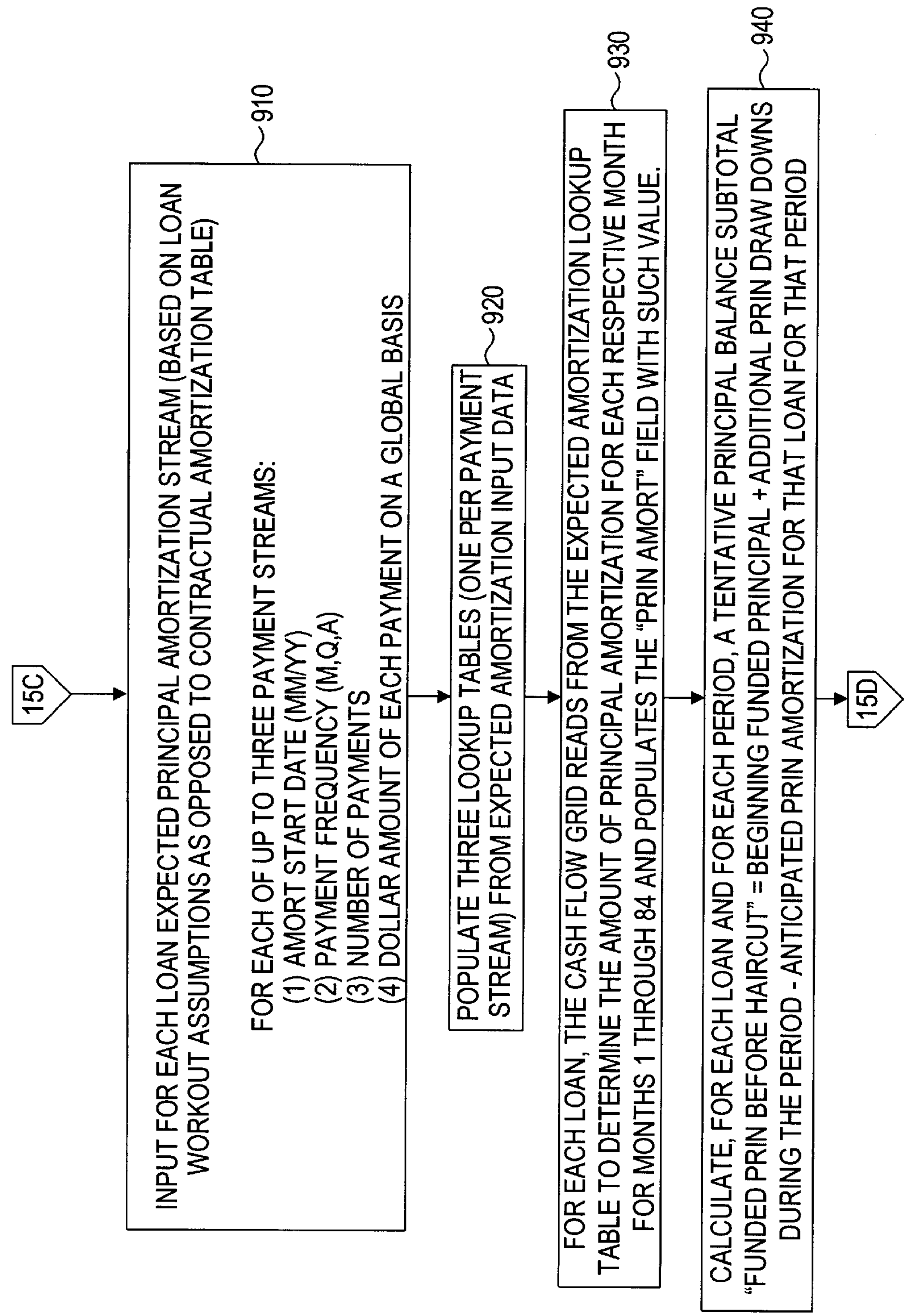

As shown in FIG. 15C in the illustrative example, a field 910 may be provided for entry of an anticipated principal amortization stream for each loan in each credit facility that is based, not on the contractual amortization table, but rather on the collateral manager's loan workout assumptions entered in field 806, FIG. 14C. More particularly, for each of up to three payment streams (although the field 910 could easily be expanded to include additional payment streams), the field 910 may be populated with an amortization start date, a payment frequency (e.g., monthly, quarterly, annually), a number of payments, and a dollar amount of each payment on a global basis. In step 920, three look-up tables (one per payment stream) are populated from the anticipated amortization input data entered in the field 910. The cash flow grid may include a "PRIN AMORT" field that may be used for the amount of anticipated principal amortization for each respective month in the cash flow grid, such values being obtained from the anticipated amortization look-up table for each loan in step 930. The cash flow grid may also contain a "FUNDED PRIN BEFORE HAIRCUT" field 940. For each loan and each period in the cash flow grid, field 940 may calculate a tentative principal balance subtotal ("funded principal before haircut") equal to the beginning funded principal (step 850, FIG. 15A), plus additional principal draw downs made by the borrower during the period (which may be input by the collateral manager based on due diligence information provided by the lender, the First Agent, the Second Agent and/or as otherwise may be determined by the collateral manager), less anticipated principal amortization for that loan period. For purposes of this discussion, "haircut" has its common meaning in lending parlance, namely a forgiveness, discount or other reduction in the outstanding principal amount resulting other than from a payment made by or on behalf of a borrower.

Figure 15D:
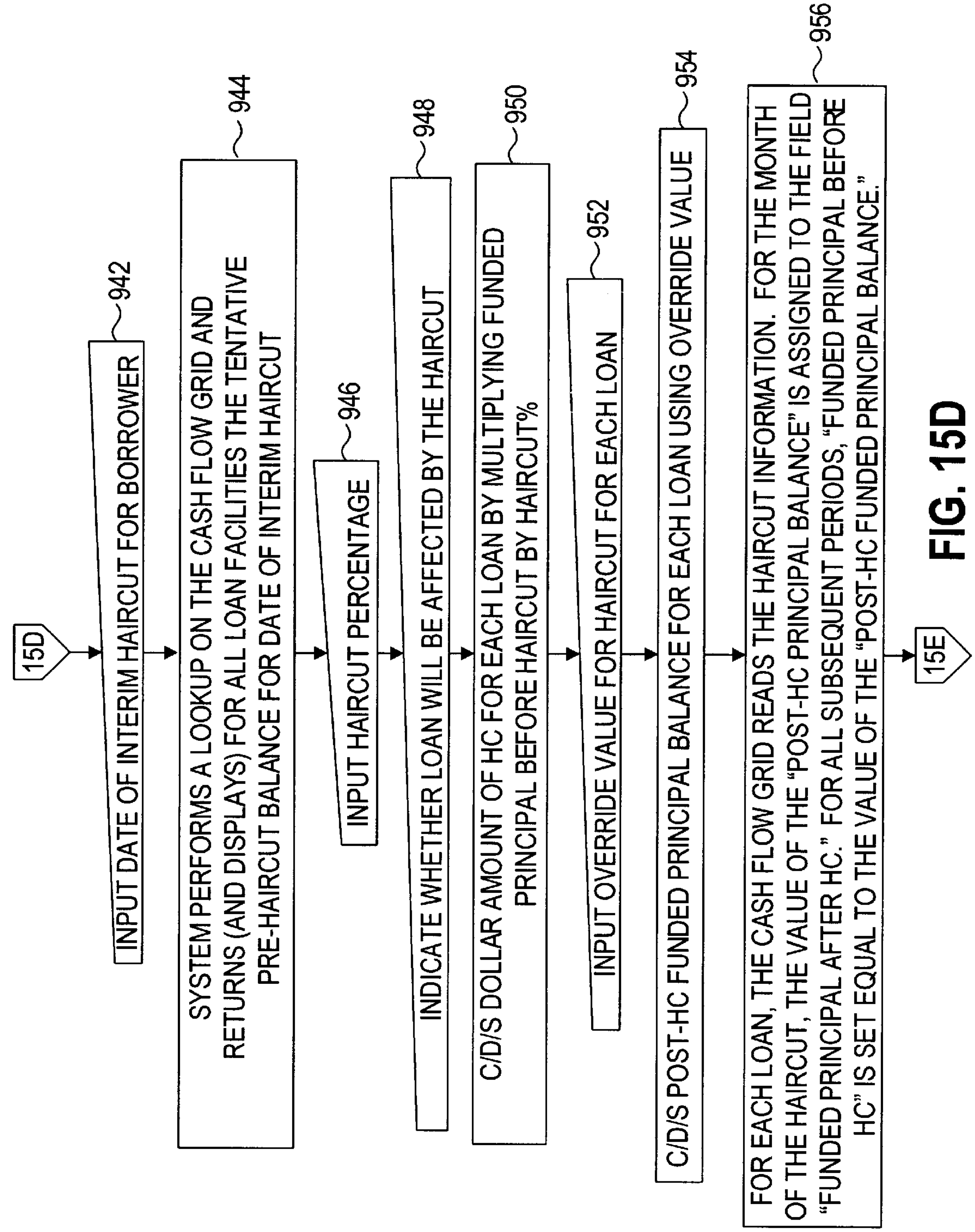

As shown in the illustrative example in FIG. 15D, a "date of interim haircut" (if any) for the borrower may be determined by the collateral manager based on the loan workout assumptions (field 806, FIG. 14B) and entered into a field 942. Thereafter, a look-up may be performed on the cash flow grid to obtain for all loan facilities of the borrower the funded principal before haircut for the date of interim haircut (step 944). A haircut percentage may determined by the collateral manager based on the loan workout assumptions (field 806, FIG. 14B) and entered into a field 946 and an indication may be entered into a field 948 for each loan included in each credit facility to indicate whether that loan will be affected by the haircut. A dollar amount of haircut for each loan is calculated in step 950 by multiplying the funded principal before haircut by the haircut percentage of field 946. An override value for haircut for each loan may be entered into a field 952 and a post-haircut funded principal balance for each loan may be calculated in step 954. In the illustrative example, the field "FUNDED PRIN AFTER HC" is assigned the value of the "post-haircut funded principal balance" for the month of the date of interim haircut, as read from the cash flow grid for each loan. In addition, in the illustrative example, for all subsequent periods the "FUNDED PRIN BEFORE HAIRCUT" amount is set equal to the post-haircut funded principal balance in step 956.

Figure 15E:
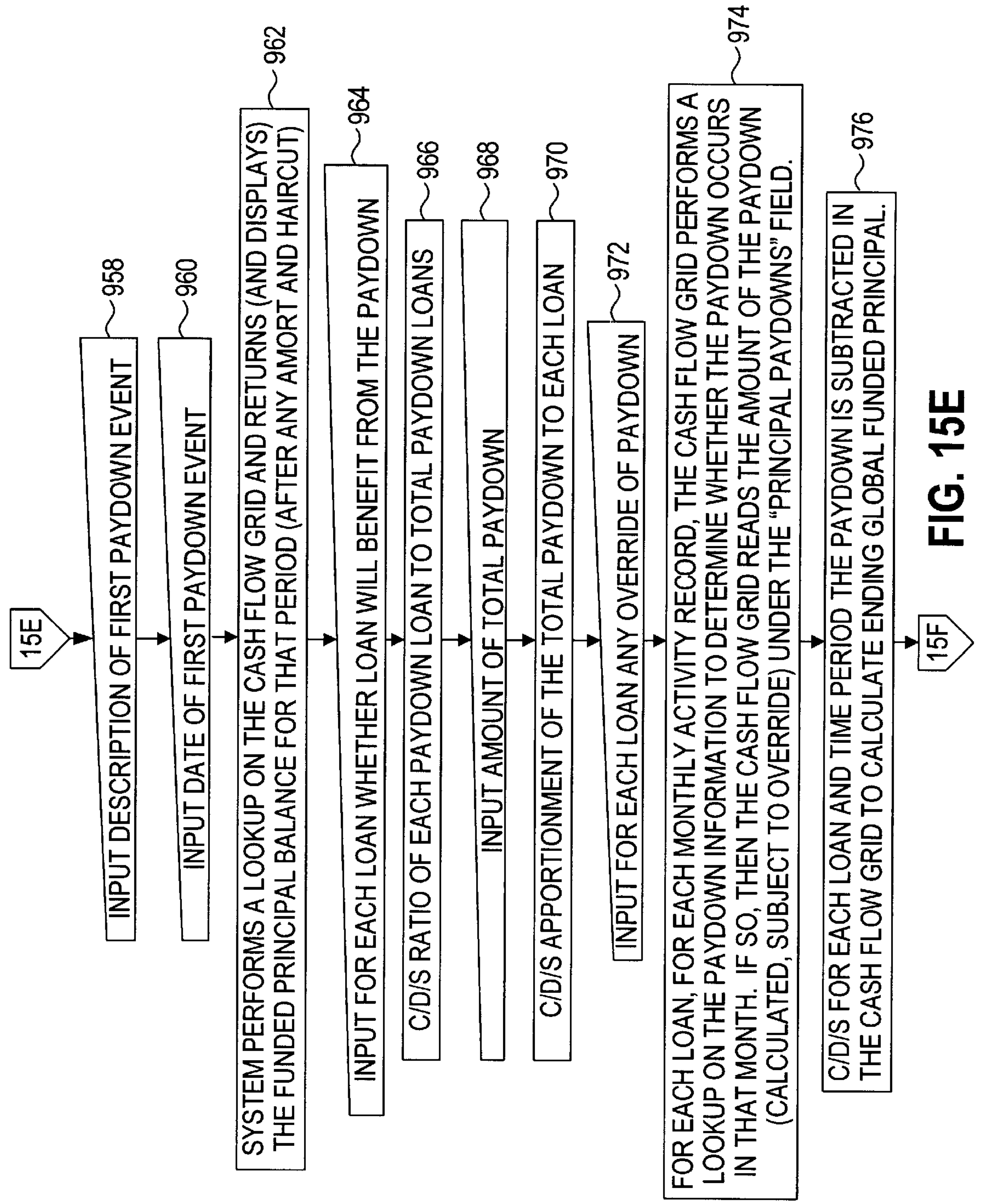

As shown in the illustrative example in FIG. 15E, a field 958 may be provided for entry of a description of a first paydown (i.e., mandatory prepayment required by the loan documents) event (e.g., a mandatory prepayment of principal resulting from a sale of a borrower's assets) and a field 960 for entry of a date of the first paydown event. The funded principal balance is obtained in step 962 from the cash flow grid for the period including the date of the first paydown event (after any amortization and haircut). A field 964 may be provided for entry of an indication of whether, in the view of the collateral manager, the loan will benefit from the paydown event ("Exclude loan from apportionment?" "No"—if the loan will benefit; "Yes"—if the loan will not benefit.) A ratio (based on outstanding Global Funded Principal) of each loan that will benefit from the paydown event (a "paydown loan") to total paydown loans (i.e., all loans that will benefit from the paydown event) may be determined in step 966. A field 968 may be provided for entry of an amount of global paydown (i.e., payment of outstanding Global Funded Principal) anticipated as a result of the paydown event; and an apportionment of the global paydown to a particular loan in the credit facility may be determined and stored in a field 970. Any override of paydown for each loan may be entered into a field 972 of the cash flow grid and then in step 974 a determination may be made for each loan and each periodic (e.g., monthly, etc.) activity record whether the paydown occurs in that period, based on the paydown information in the cash flow grid. Further, the cash flow grid may include a "PRINCIPAL PAYDOWNS" field, and in situations where a paydown does occur in a given period, the "PRINCIPAL PAYDOWNS" field of the cash flow grid may acquire the amount of the paydown (calculated but subject to override) in step 974. The ending Global Funded Principal may be calculated in step 976 for the loan for each corresponding time period by subtracting the applicable paydown from the Global Funded Principal (as determined prior to paydowns). This process is repeated for every loan in every credit facility in the portfolio.

Figure 15F:
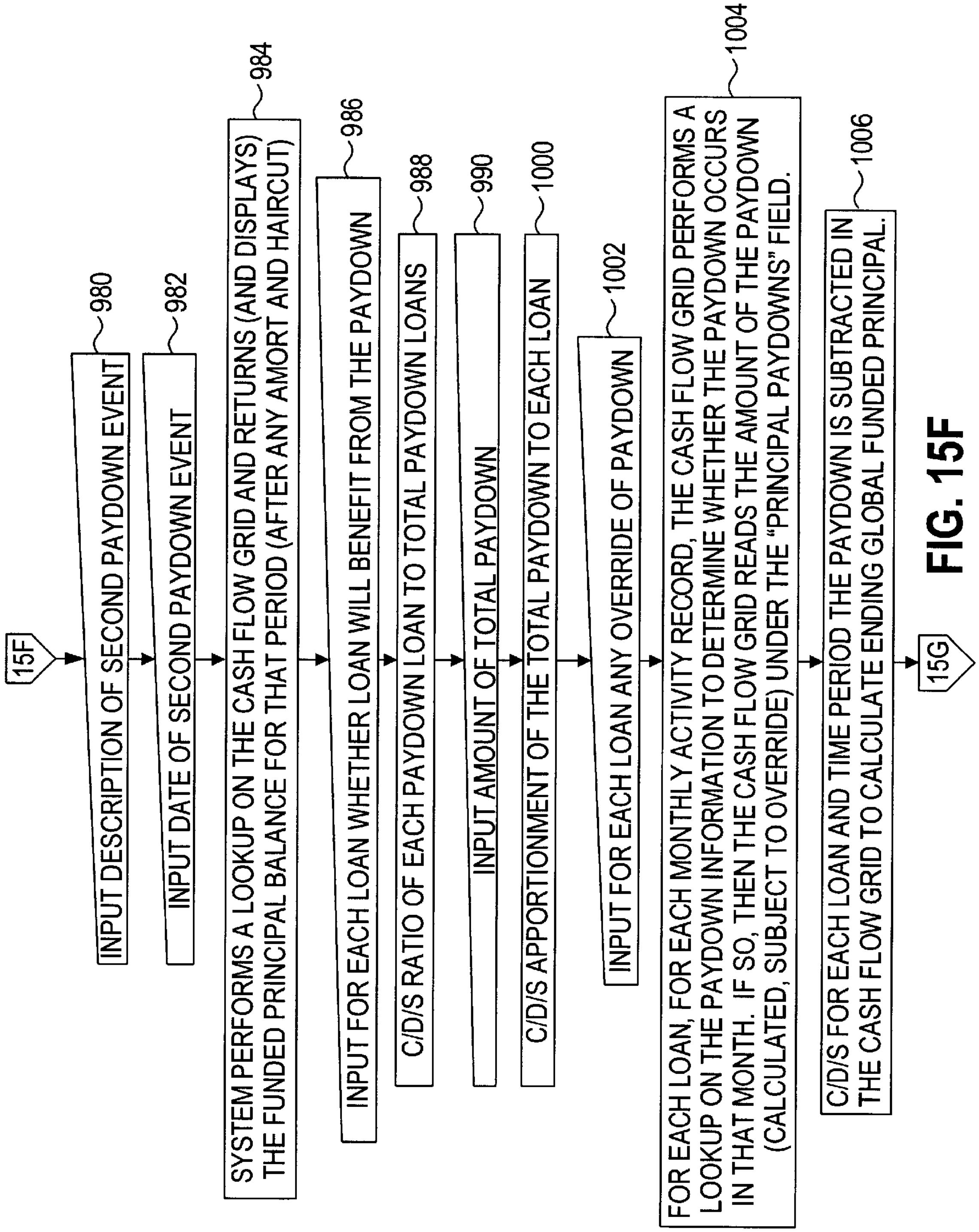
Figure 15G:
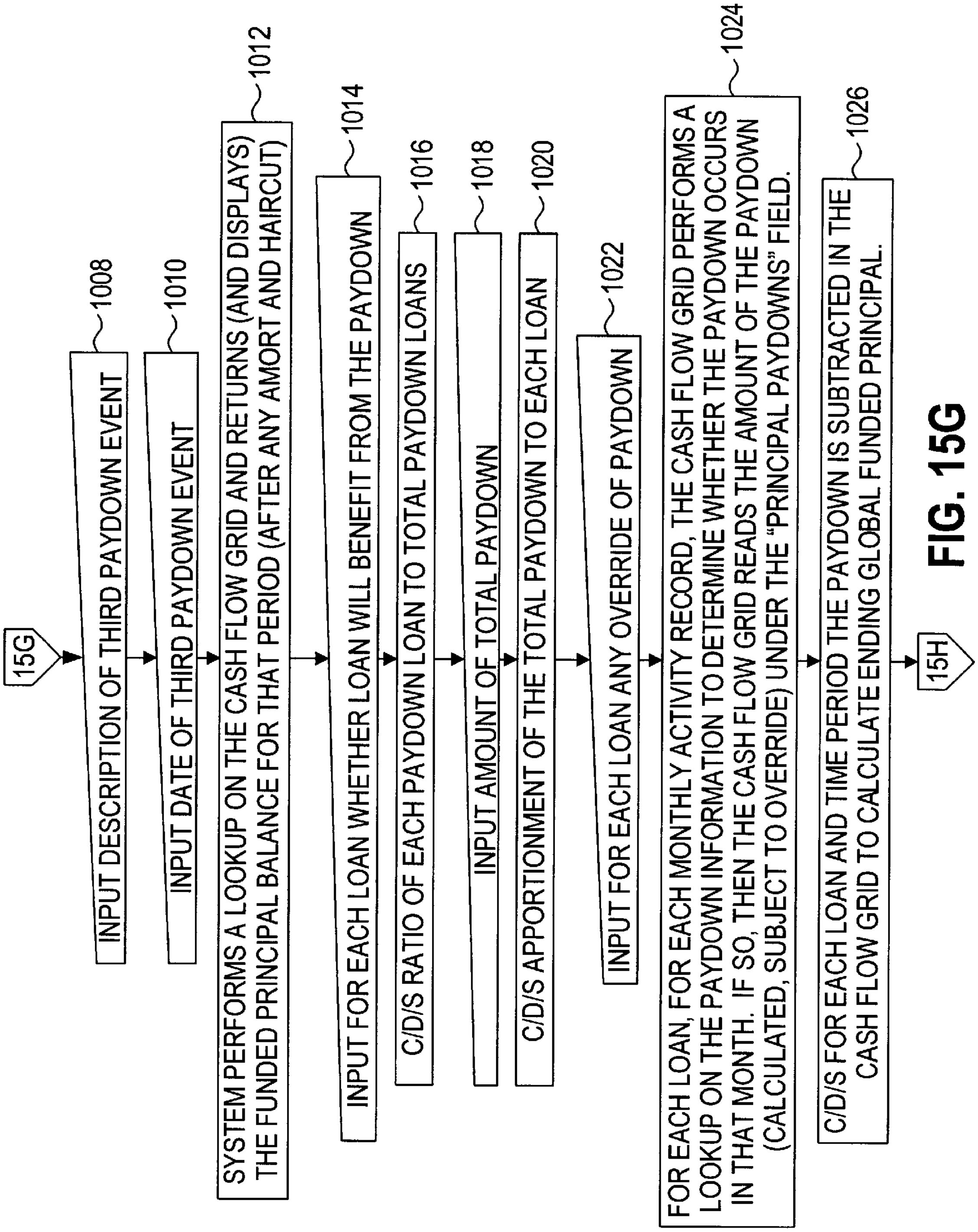

FIG. 15F (which includes fields 980, 982, 984, 986, 988, 990, 1000, 1002, 1004 and 1006) and 15G (fields 1008, 1010, 1012, 1014, 1016, 1018, 1020, 1022, 1024 and 1026) are identical to corresponding fields/steps of FIG. 15E, except that FIG. 15F pertains to a "second paydown event," and FIG. 15G pertains to a "third paydown event." Accordingly, reference may be made to the foregoing description of FIG. 15E for an explanation of the processing performed by the flowcharts of FIGS. 15F and 15G.

Figure 15H:
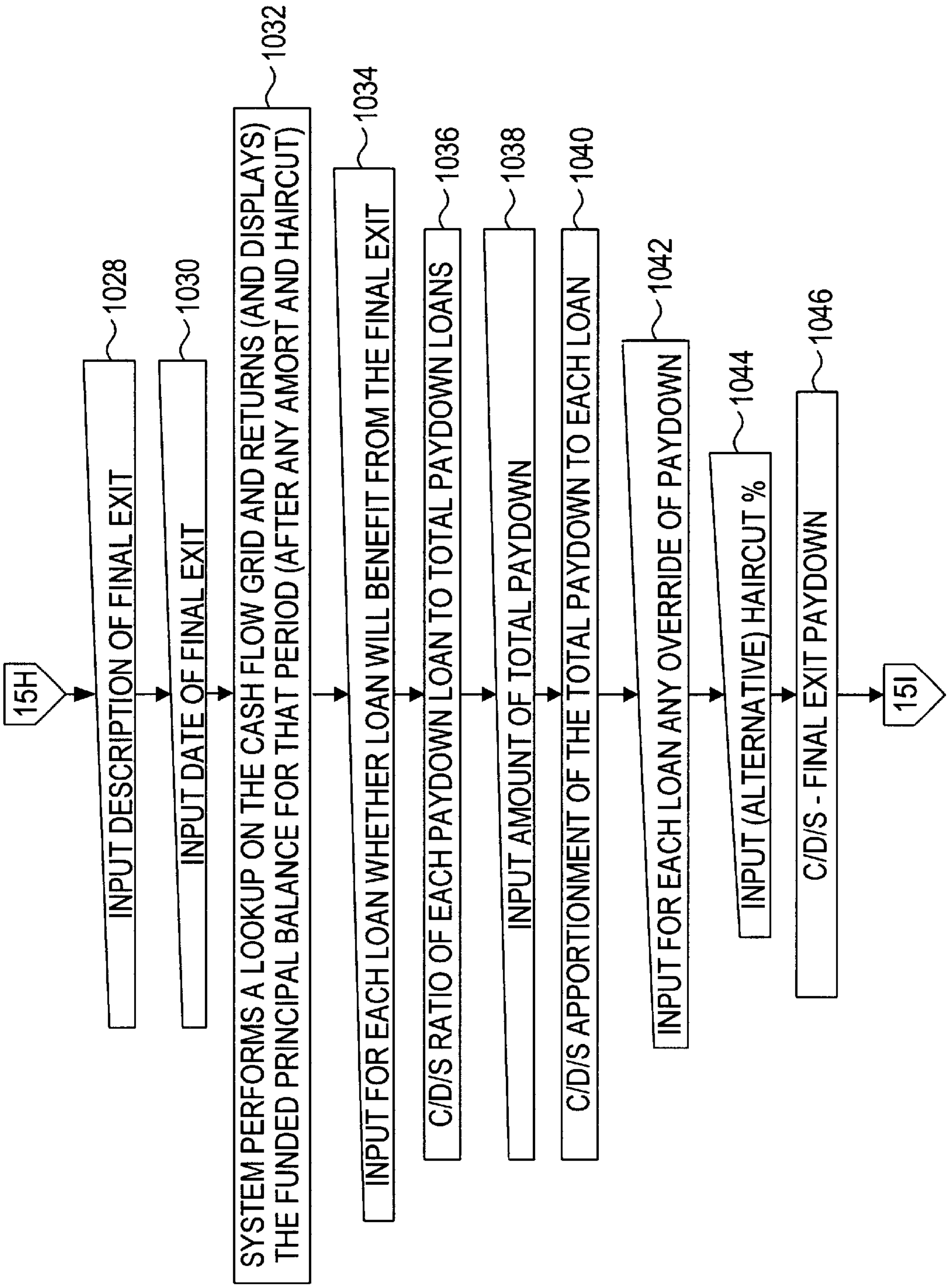

As shown in the illustrative example in FIG. 15H, a description of final exit may be entered into a field 1028, and a date of final exit may be entered into a field 1030. The Global Funded Principal balance outstanding as of the date of the final exit (after any amortization and haircut) may be obtained in step 1032 from the cash flow grid. The database model for each loan in the credit facility also may include a field 1034 for an indication of whether, in the view of the collateral manager, the loan will benefit from the final exit ("Exclude loan from apportionment?" "No"—if the loan will benefit; "Yes"—if the loan will not benefit.). In step 1036 the ratio (based on outstanding Global Funded Principal) of each paydown loan to the total of paydown loans (i.e., a loan that will benefit from the final exit) may be calculated. A field 1038 may store an amount of global paydown resulting from the final exit for the entire credit facility, and the apportionment of the total paydown to each loan in the credit facility may be determined in step 1040. Any override of paydown for each loan may be stored in a field 1042 in the database model for that loan, and an alternative final haircut percentage may be stored in a field 1044. The final-exit paydown amount may be determined in step 1046.

Figure 15I:
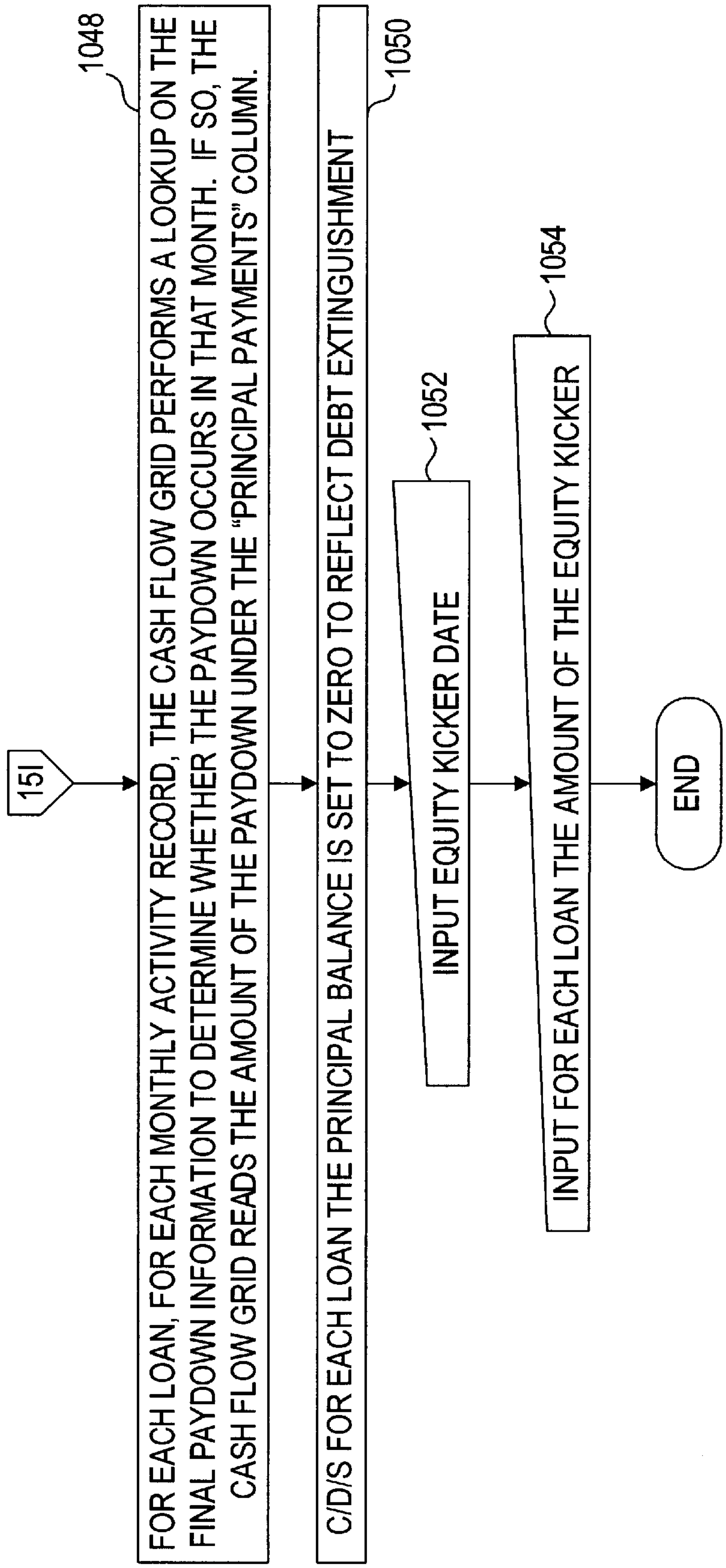

As shown in the illustrative example in FIG. 15I, a determination may be made in step 1048 from the final paydown information for each loan and each monthly (or other periodic) activity record whether the paydown occurs in that month, and, if so, the amount of the paydown may be determined from the "PRINCIPAL PAYDOWNS" field the cash flow grid. The principal balance of each loan may be set to zero to reflect debt extinguishment in step 1050. A field 1052 may be provided for the anticipated or actual equity kicker date (if any) for each loan (e.g., the date the borrower is sold to a third party, or is recapitalized or the borrower has its debt restructured), and a field 1054 may be provided for the anticipated or actual value (if any) of the equity kicker for each loan. As used herein, "equity kicker" has its common meaning in lending parlance, namely an interest in the equity of the borrower (e.g., capital stock, membership or partnership interests, or warrants, options or other rights to acquire an equity interest, which are obtained in connection with a restructuring or refinancing of existing debt or the issuance of new debt, or in connection with the granting of a forbearance, waiver, forgiveness of debt or other accommodation, or an interest calculated with reference to the borrower's profits or the performance of its equity). The value of an equity kicker is based on the anticipated or actual value of the borrower's total equity on the final payment date, the portion of the equity held by the holder of the equity kicker, subject to any applicable preferences and/or discounts.

Calculation of Loan Valuation

As described above in connection with steps 186, 188, 190, and 192 of FIG. 3, after the collateral manager enters collateral value estimates, a workout strategy, and workout parameters for each of the loans in each credit facility in the distressed credit facility portfolio, a loan valuation is calculated for each loan. The loan value calculations identified as step 192 of FIG. 3 are now described in detail in connection with the illustrative example in FIGS. 16A–16C.

Figure 16A:
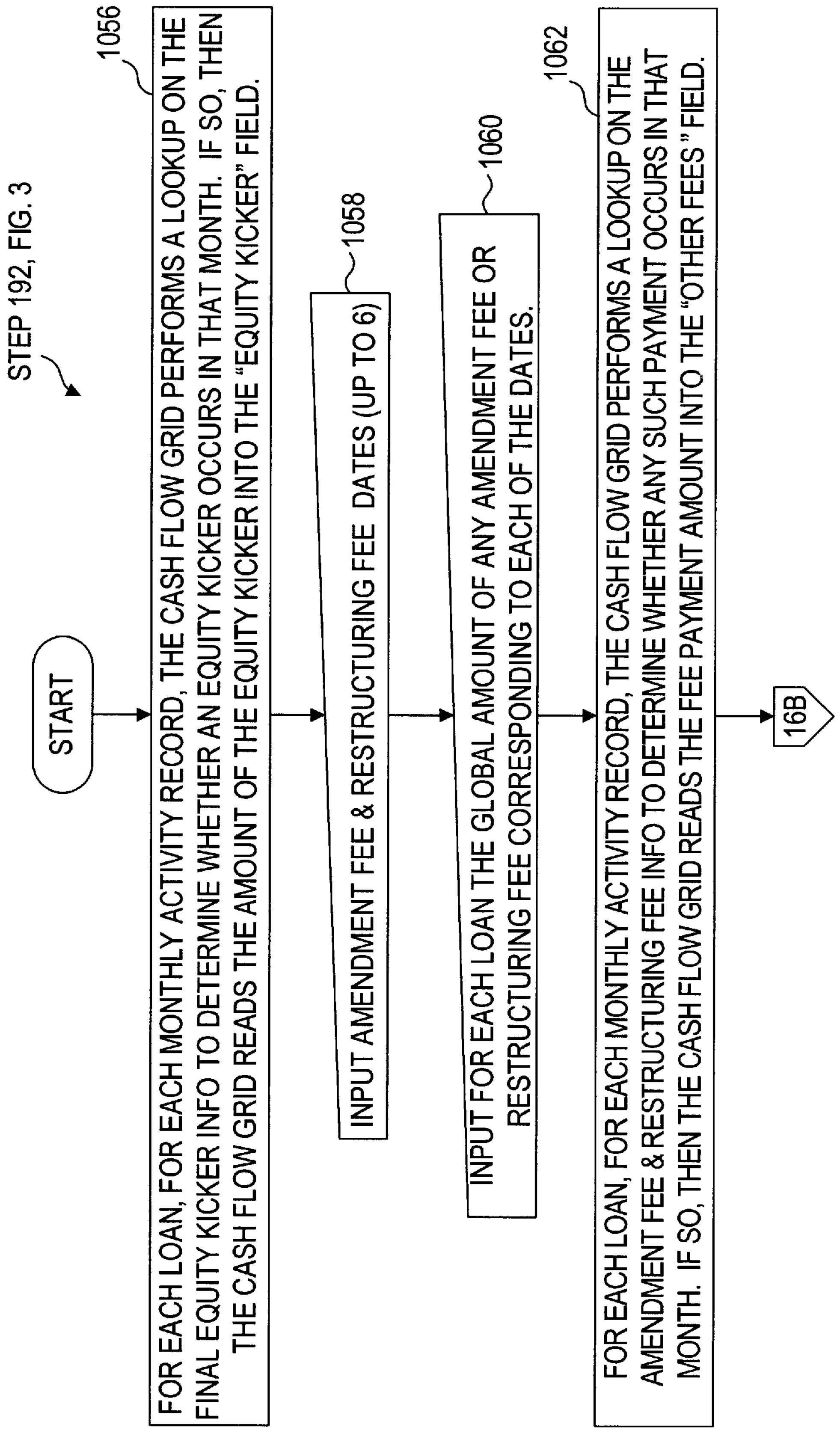

As shown in the illustrative example in FIG. 16A, a determination may be made in step 1056 from the final equity kicker information in the cash flow grid for each loan and for each monthly activity record whether an equity kicker occurs in that month, and, if so, then the value of the equity kicker may be placed in the "EQUITY KICKER" field of the cash flow grid. A field 1058 may be provided for dates of up to six amendment fees and restructuring fees, and a field 1060 may be provided for the global amount for each loan of any amendment fee or restructuring fee corresponding to each of the dates entered via the field 1058. The amendment fee and restructuring fee information in the cash flow grid for each loan and each monthly activity record may be evaluated in step 1062 to determine whether any such payment occurs in that month for the loan. If so, the fee payment amount is placed in the "OTHER FEES" field of the cash flow grid for that loan.

Figure 16B:
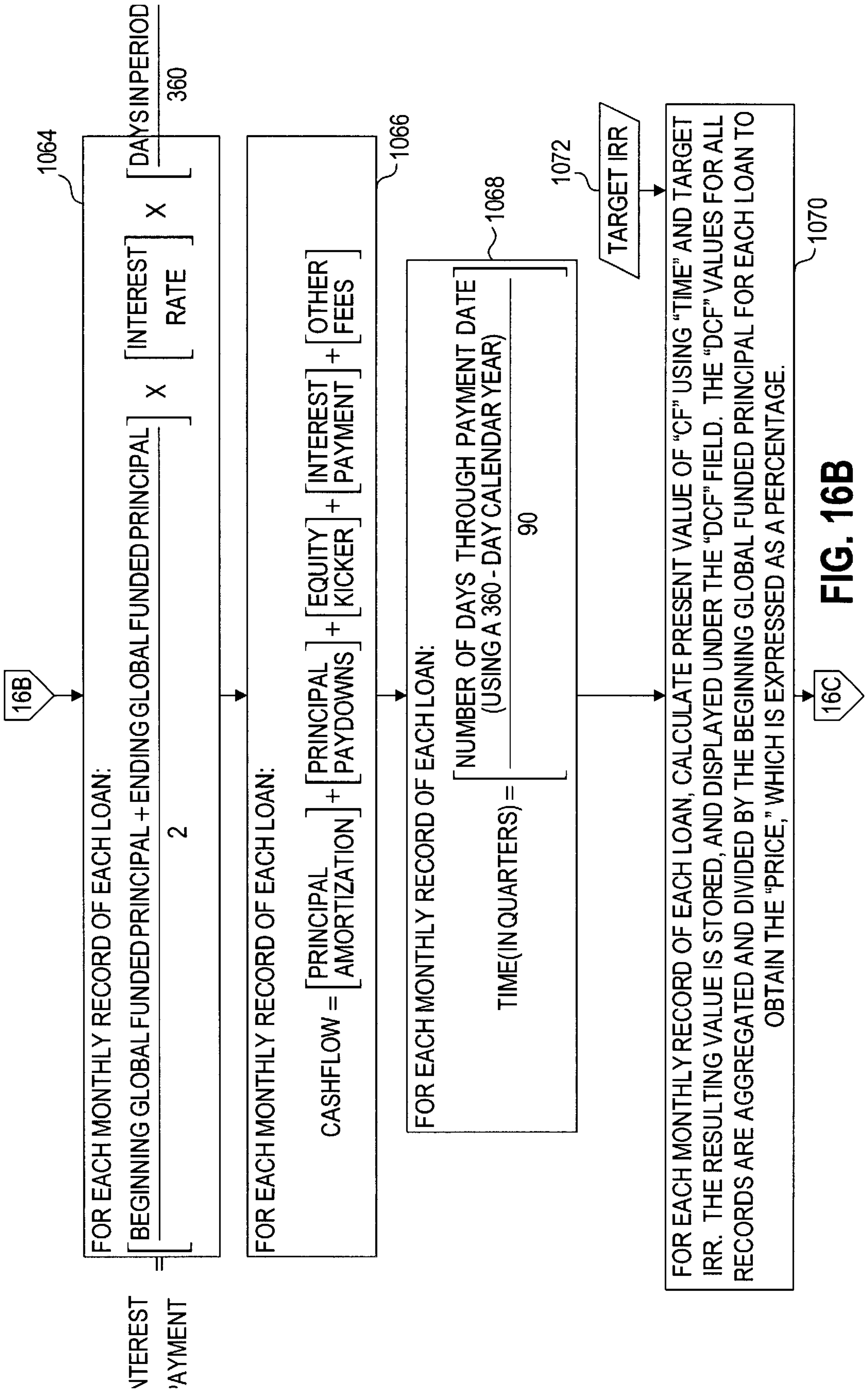

As shown in the illustrative example in FIG. 16B, in step 1064, the interest payment may be computed for each monthly (or other periodic) record of each loan as a product of the average of the beginning and ending Global Funded Principal for the month (or period), the applicable interest rate, and the number of days in the month or other period divided by 360 (assuming a 360-day calendar year). The cash flow may be calculated in step 1066 for each monthly (or other periodic) record for each loan as the sum of principal amortization, principal paydowns, equity kicker, interest payment, commitment fees and other fees for that loan for that monthly period. The total number of elapsed quarters in the loan period may be determined in step 1068 by dividing the number of days through the payment date (using a 360-day calendar year) by 90. The cash flow for each monthly (or other periodic) record of each loan may be recalculated in step 1070 using the time calculated by the step 1068 and target internal rate of return ("target IRR") (step 1072, as previously set by the collateral manager in step 552, FIG. 11). The resulting cash flow value is stored in the "DISCOUNTED CASH FLOWS" field of the cash flow grid, and the "DISCOUNTED CASH FLOWS" values for all records are aggregated and divided by the beginning Global Funded Principal for each loan to obtain the "price" expressed as a percentage of Global Funded Principal.

Figure 16C:
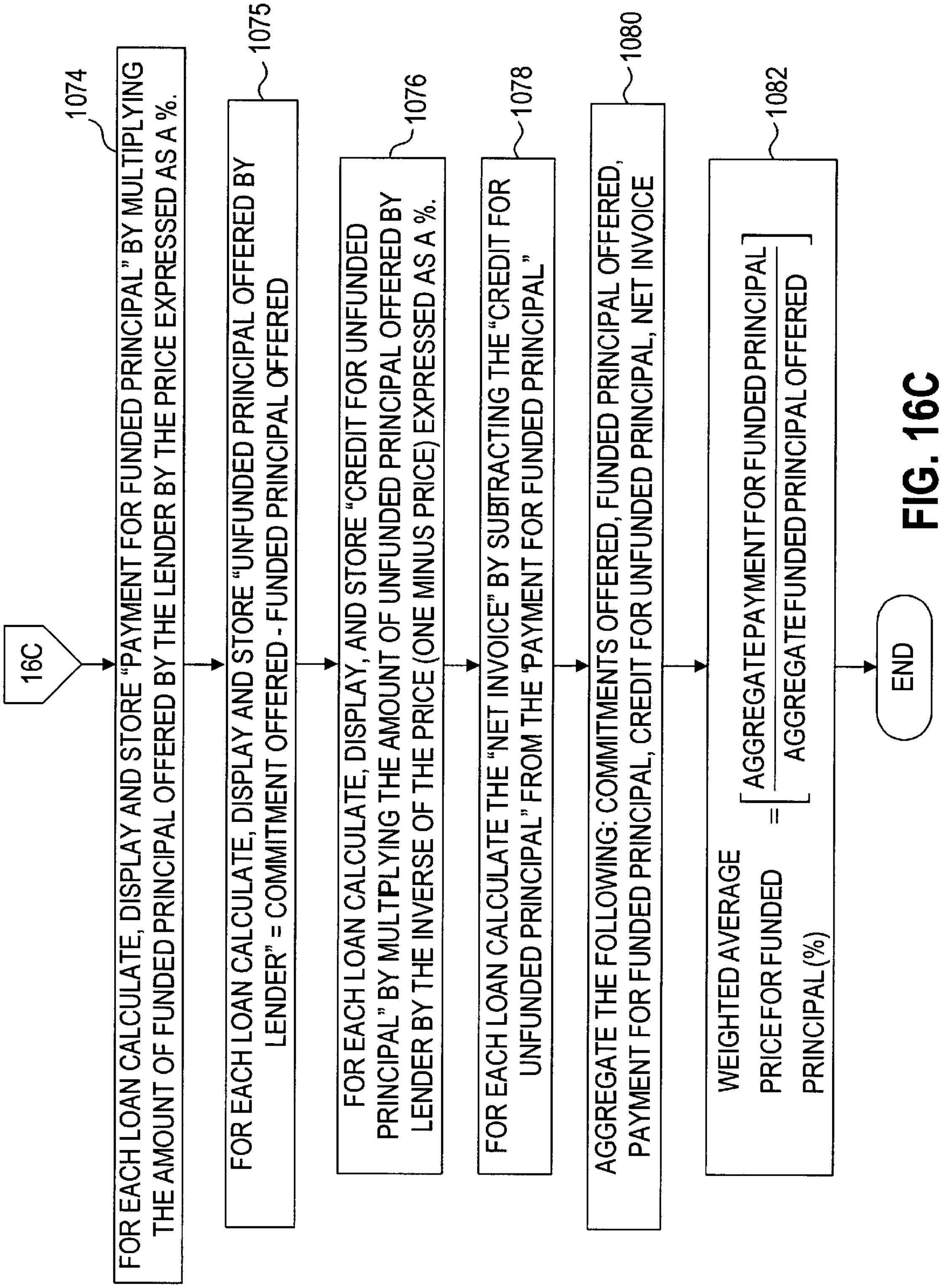

Calculation of "Invoice" and Values to be Displayed in the Loan Pricing Summary As shown in the illustrative example in FIG. 16C, for each loan a "payment for funded principal" may be calculated in step 1074 as a product of the Funded Principal Offered (field 317, FIG. 7C) and the "price" determined as a percentage in step 1070, FIG. 16B. For each loan the amount of "unfunded principal offered by lender" may be calculated in step 1075 as the difference of the Commitment Offered (field 316, FIG. 7C) minus the Funded Principal Offered (field 317, FIG. 7C). The "credit for unfunded principal" for each loan may be calculated in step 1076 as a product of the amount of unfunded principal offered by lender and the inverse of the price (i.e., one minus the price) expressed as a percentage. The "net invoice" for each loan may be calculated in step 1078 by subtracting the credit for unfunded principal determined in step 1076 from the payment for funded principal determined in step 1074. For each loan in a credit facility the following data may be aggregated in step 1080: Commitment Offered (field 316, FIG. 7C); Funded Principal Offered (field 317, FIG. 7C); payment for funded principal (step 1074); credit for unfunded principal (step 1076); and net invoice (step 1078). The weighted average price for funded principal (as a percentage) is determined in step 1082 by dividing the aggregate payment for funded principal determined from step 1080 by the aggregate Funded Principal Offered.

Due Diligence Reports

After the loan valuation for each loan is calculated (step 192 FIG. 3), such as in the foregoing manner, due diligence reports 194 and any necessary or desirable ad hoc reports 196 may be generated as desired. These reports may be used, for example, by credit rating agencies for "shadow rating" the individual loans in the distressed credit facility portfolio and/or determining a recovery rate for each loan in the distressed credit facility portfolio. FIGS. 17A–17E illustrate the content of exemplary due diligence reports. In addition to those due diligence reports 194, ad hoc reports 196 (FIG. 3) may be developed including any appropriate subsets of the information contained in the due diligence reports 194, formatted as appropriate to suit the needs of the collateral manager, the credit rating agencies, the lenders, a monoline or other insurer, or others.

Overview of the Rating Agency Model

Figure 18:
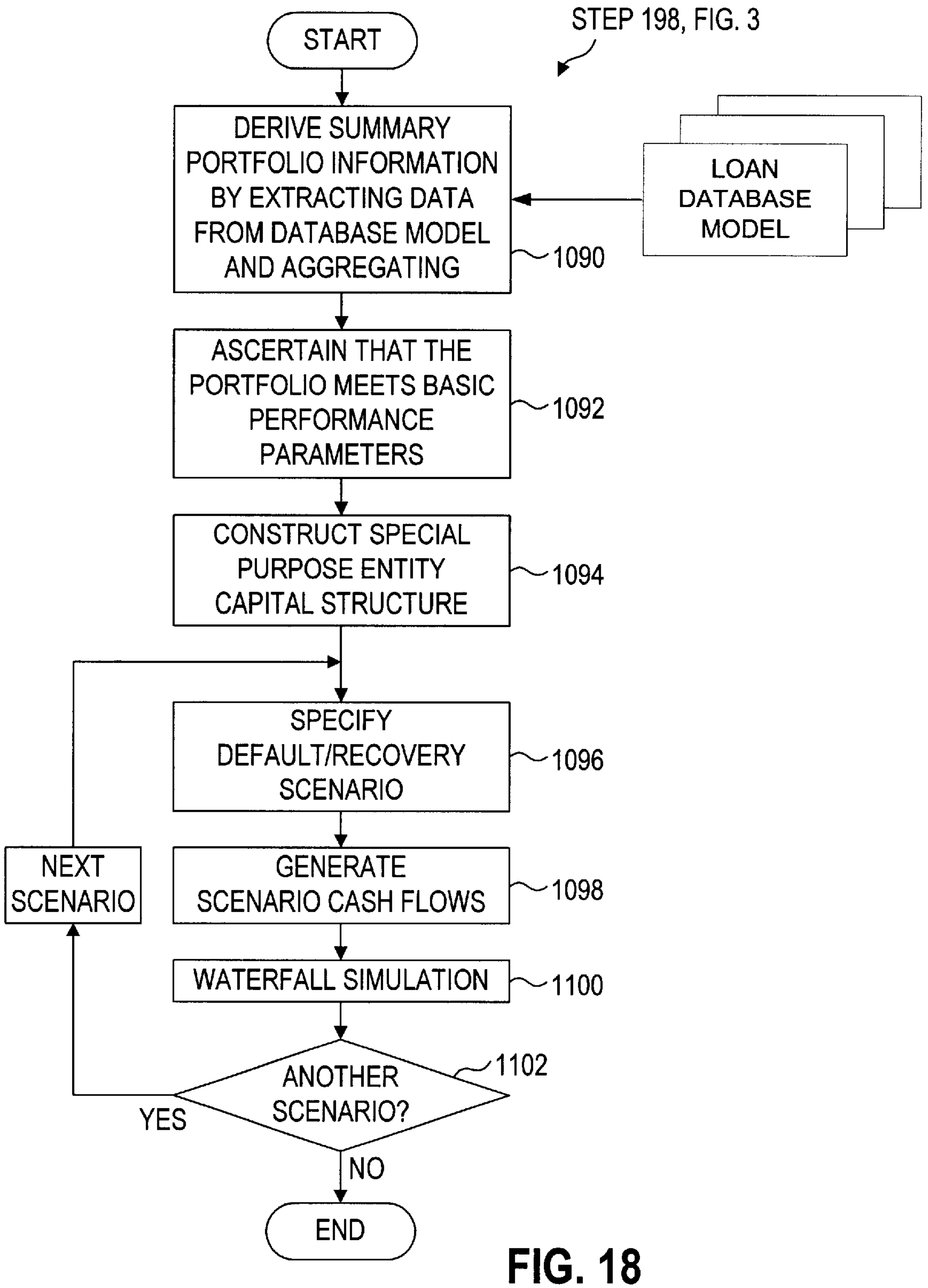
FIG. 18 is a block diagrams illustrating the process of constructing a rating model in accordance with the present invention.

FIG. 18 illustrates a high-level summary of a rating agency model in accordance with the present invention. Initially, using the loan database models as described above, summary portfolio information is derived in step 1090 by extracting data from the loan database model and aggregating that data. The results of this aggregation are then analyzed in step 1092 to confirm that the distressed credit facility portfolio as a whole meets basic performance parameters as described in more detail below. A capital structure is constructed in step 1094 for implementation by an SPE used to hold and securitize the distressed credit facility portfolio. Thereafter, the constructed capital structure may be tested and evaluated by the collateral manager in step 1096 by specifying multiple default/recovery scenarios; generating cash flows corresponding to those scenarios in step 1098, and simulating cash flow waterfalls associated with the default/recovery scenarios in step 1100. This process is repeated for each scenario.

Preparation of Summary Portfolio Information

Figure 19:
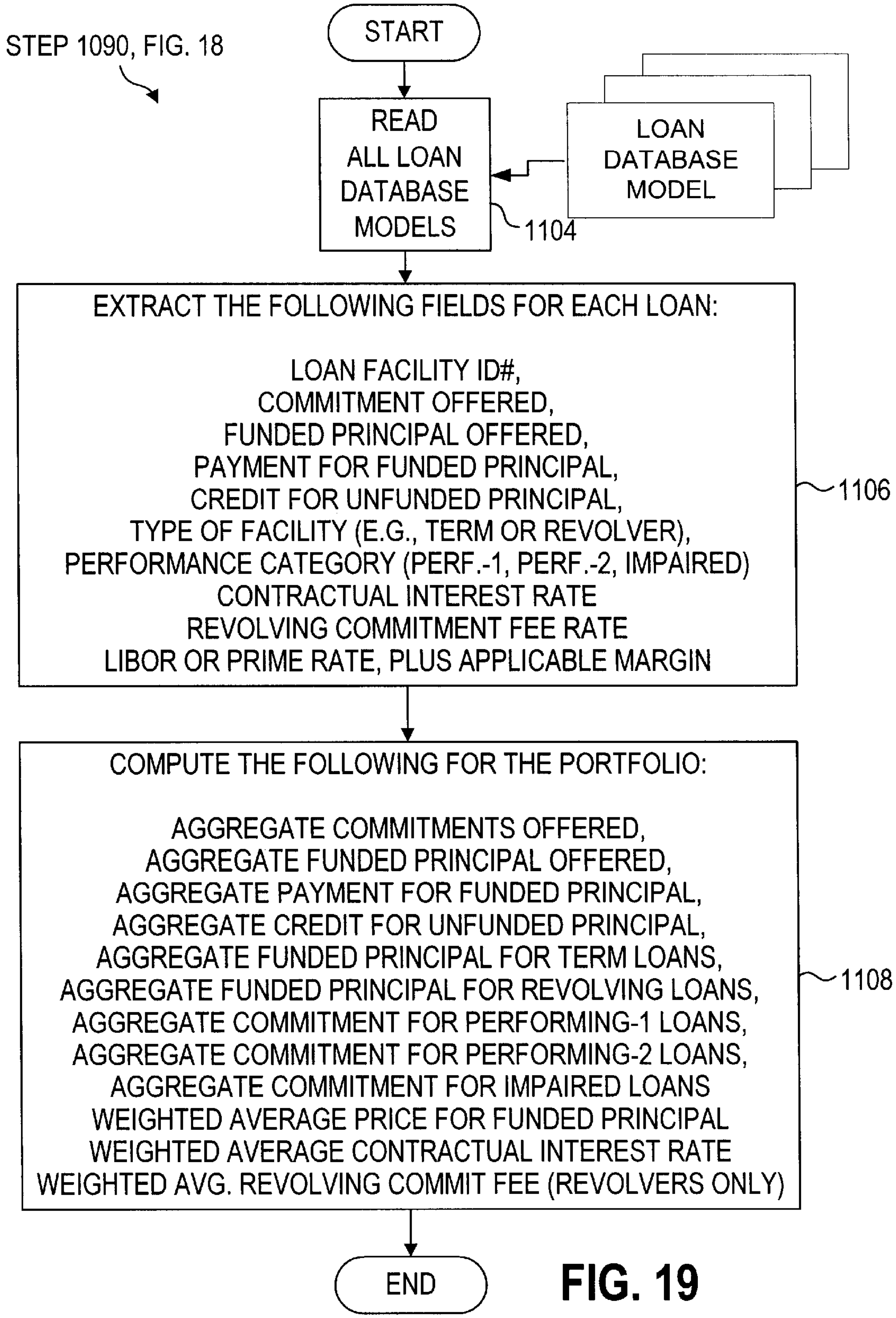
FIG. 19 is a block diagram illustrating the process of preparing summary loan information in accordance with the present invention.

Referring to FIG. 19, the process described above in connection with FIG. 18 is illustrated and described in more detail in connection with the illustrative example in FIG. 19. More particularly, the loan database model may be read in step 1104, and certain information may be extracted from the loan database model in step 1106. More specifically, for each loan described in the loan database model, the following information may be extracted: a loan I.D. number (field 238, FIG. 7A), the Commitment Offered (field 316, FIG. 7C), the Funded Principal Offered (field 317, FIG. 7C), the payment for funded principal (field 1074, FIG. 16C), the credit for unfunded principal (field 1076, FIG. 16C), the type of facility (e.g., term or revolver) (field 246, FIG. 7A), the performance category of the facility (e.g., performing-1, performing-2, or impaired) (field 870, FIG. 15A), the contractual interest rate (step 568, 576, 578 or 580, FIG. 12A) and revolving commitment fee rate (field 292, FIG. 7C), if any, and the LIBOR rate or prime rate, as applicable, as of the pricing date (field 556, FIG. 11).

In step 1108, computations may be performed to calculate the following amounts for the distressed credit facility portfolio: aggregate Commitments Offered (as the sum of the Commitment Offered for all loans in the distressed credit facility portfolio); aggregate Funded Principal Offered (as the sum of the Funded Principal Offered for all loans in the distressed credit facility portfolio); aggregate payment for funded principal (as the sum of the payment for funded principal for all loans in the distressed credit facility portfolio); aggregate credit for unfunded principal (as the sum of the credit for unfunded principal for all loans in the distressed credit facility portfolio); aggregate funded principal for term loans (as the sum of funded principal for all term loans in the distressed credit facility portfolio); aggregate funded principal for revolving loans (as the sum of the funded principal for all revolving loans in the distressed credit facility portfolio); aggregate commitment for performing-1 loans (as the sum of Commitment Offered for all performing-1 loans in the distressed credit facility portfolio); aggregate commitment for performing-2 loans (as the sum of Commitment Offered for all performing-2 loans in the distressed credit facility portfolio); aggregate commitment for impaired loans (as the sum of Commitment Offered for all impaired loans in the distressed credit facility portfolio); weighted average price for funded principal (as the average determined by dividing the sum of the payment for funded principal for all loans in the distressed credit facility portfolio by the aggregate Funded Principal Offered of all loans in the distressed credit facility portfolio); weighted average contractual interest rate (as the average determined by dividing (i) the sum of the product of the contractual interest rate on each loan times the funded principal amount of that loan for all loans in the portfolio, by (ii) total funded principal amounts for all loans in the distressed credit facility portfolio); and weighted average revolving commitment fee (as the average determined by dividing the sum of the revolving commitment fee for all revolving loans by total unfunded revolving commitment).

Assurance that the Portfolio Meets Basic Performance Parameters

Figure 20:
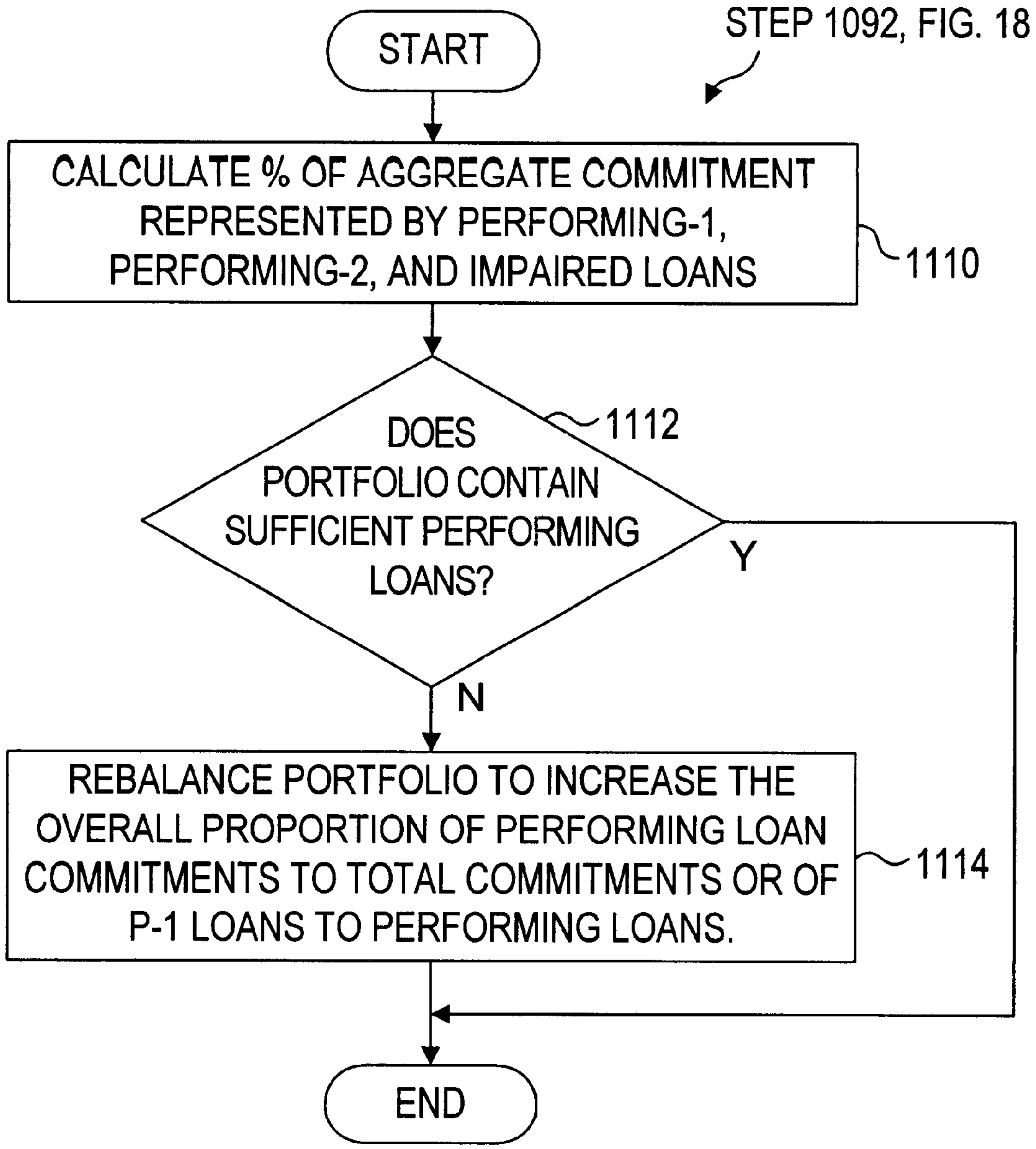
FIG. 20 is a block diagrams illustrating illustrating the process of evaluating whether the distressed credit facility meets basic performance criteria in accordance with the present invention.

Step 1092 (FIG. 18) for confirming that the distressed credit facility portfolio meets basic performance parameters is now described in more detail in connection with the illustrative example in FIG. 20. As shown, a percentage may be calculated in step 1110 of aggregate commitments included in the distressed credit facility portfolio represented by loans in each of the categories performing-1, performing-2, and impaired. In step 1112, a determination is made whether the portfolio contains sufficient performing loans (i.e., loans in the performing-1 and performing-2 categories). There is no definitive rule governing the sufficiency of performing loans in a portfolio, but, in general, (i) impaired loans should not exceed 25% of the aggregate loan commitments, and (ii) loans expected to continue to pay interest (i.e., performing-1 loans) should comprise no less than 45% of all performing loan commitments (i.e., performing-1 and performing-2 loans combined). If it is determined in step 1112 that the distressed credit facility portfolio does not contain sufficient performing loans, then the portfolio is rebalanced in step 1114 to increase the overall proportion of performing loan commitments to total commitments or the proportion of performing-1 loans to total performing loans. This re-balancing of the portfolio can be achieved either by increasing the number of performing-1 loans and/or performing-2 loans, as necessary by introducing additional credit facilities of performing borrowers (which generally will include the reiteration of prior process including the preparation of loan database information for any additional borrowers and loans), or by reducing the number of performing-2 loans and/or impaired loans included in the distressed credit facility portfolio. In general, criteria are chosen to determine the number and character of performing loans needed in the portfolio to provide a desired degree of assurance that the SPE will be able to cover all of the underlying expenses (e.g., franchise fees and administrative costs, including collateral management fees, collateral liquidation costs, professional fees, etc.), pay interest as due and payable, repay the credit-rated debt in full and provide the target return on equity in full using principal and interest cash inflows from the underlying portfolio of credit facilities. This process is repeated until the portfolio contains sufficient performing loans.

Construction of an SPE Capital Structure—Assets

Step 1094 (FIG. 18) for constructing an SPE capital structure for securitizing the distressed credit facility portfolio in accordance with the principles of the present invention is now described in more detail in connection with the illustrative example in FIGS. 21A–21D. More particularly, in step 1116, the following data may be retrieved: the aggregate loan commitments; aggregate funded principal, aggregate revolving loan commitments (total and funded), and aggregate term loan commitments, as well as the aggregate funded price, weighted average funded price, and aggregate credit for unfunded commitments for the distressed credit facility portfolio (computed as described above in connection with the step 1108 of FIG. 19). An additional purchase price amount as a percentage of funded principal is calculated in step 1118 in the illustrative example. This percentage, which may be in the range of 10–15% of the funded principal amount and may comprise as much as 25% of the total purchase price paid to the lender, will be determined as a result of negotiations with the lender, and reflects the additional value paid to the lender over what the lender would otherwise have received in a bulk sale of the distressed credit facility portfolio for an all cash price. As an example, the additional purchase price may be 10% if it may be paid in the form of a "cash pay note," or may be 15% if it may be paid as a "five-year discount note." It should be noted that the dollar amounts and percentages shown in the accompanying drawing figures and/or described herein are simply examples, and no limitation is intended thereby. The dollar amounts and/or percentages may vary based on credit rating agency stress requirements applicable at the time of the proposed securitization. The method of the present invention may be employed to securitize a distressed credit facility portfolio of any suitable size, and appropriate numbers or percentages may be substituted for those described herein, as will be readily appreciated by those of ordinary skill in the art.

In the illustrated example, the aggregate funded principal is $850 million, such that the additional purchase price is $85 million ($850 million×10%). The net purchase price for the distressed credit facility portfolio is calculated in step 1120 as the sum of aggregate funded price (step 1116) and the additional purchase price computed in step 1118, less any credit for aggregate unfunded commitments from step 1116. In the illustrated example, the net purchase price is computed to be $485 million, as shown in step 1120, FIG. 21A. In step 1122 in the illustrated example, an initial balance of $101 million is established for a Senior Interest Reserve Account, computed as 10.1% of aggregate commitments ($1 billion×10.1%). In step 1124 in the illustrated example, an initial balance of $11.5 million is established for a Subordinated Interest Reserve Account, computed as 1.15% of aggregate commitments ($1 billion×1.15%). An initial balance is also established in step 1126 for an Unfunded Revolver Discount Account ("URDA"), equal to the credit for unfunded principal ($67.5 million).

Figure 21A:
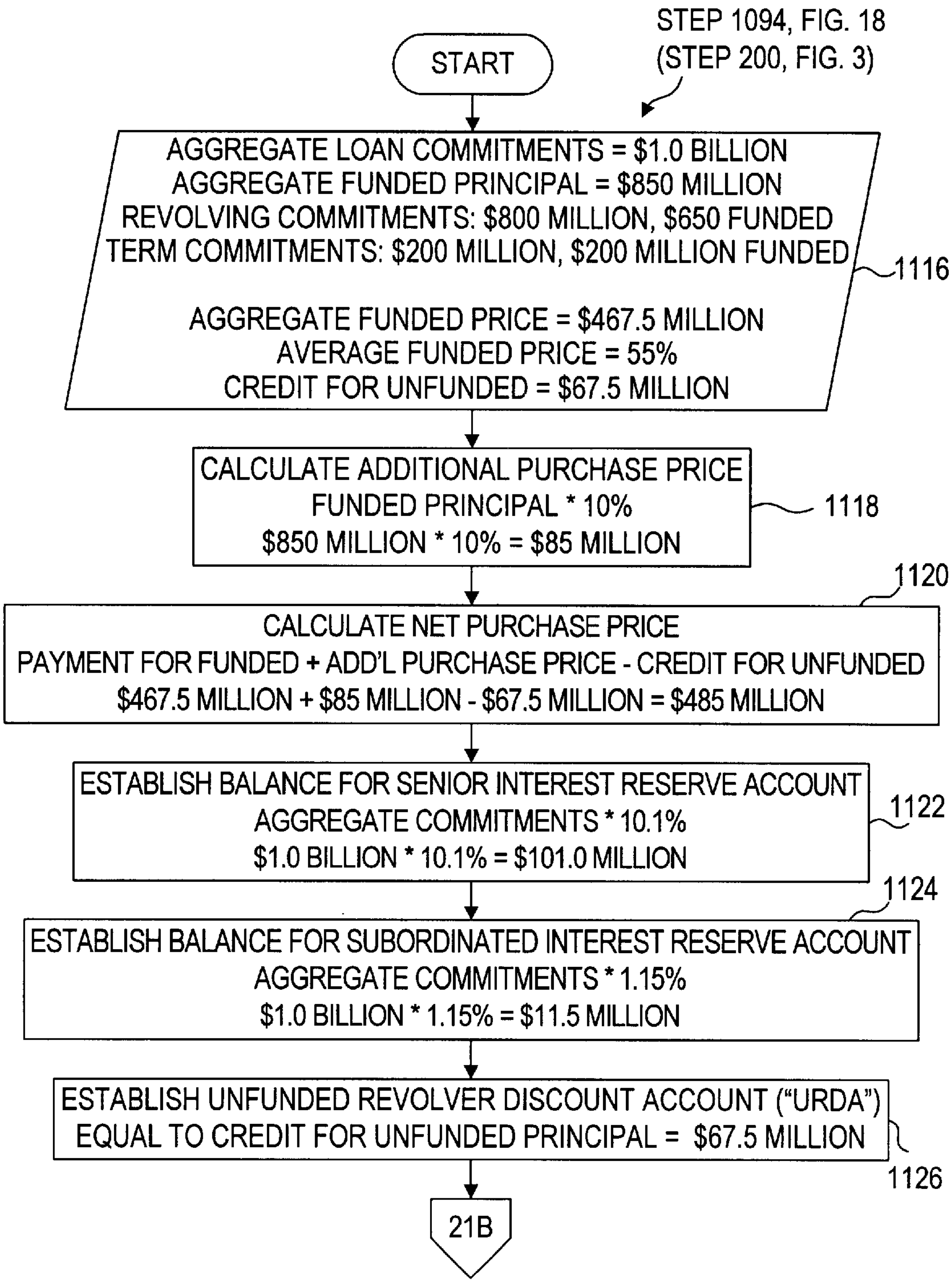
FIGS. 21A–21D are block diagrams illustrating the process of constructing an SPE capital structure in accordance with the present invention.
Figure 21B:
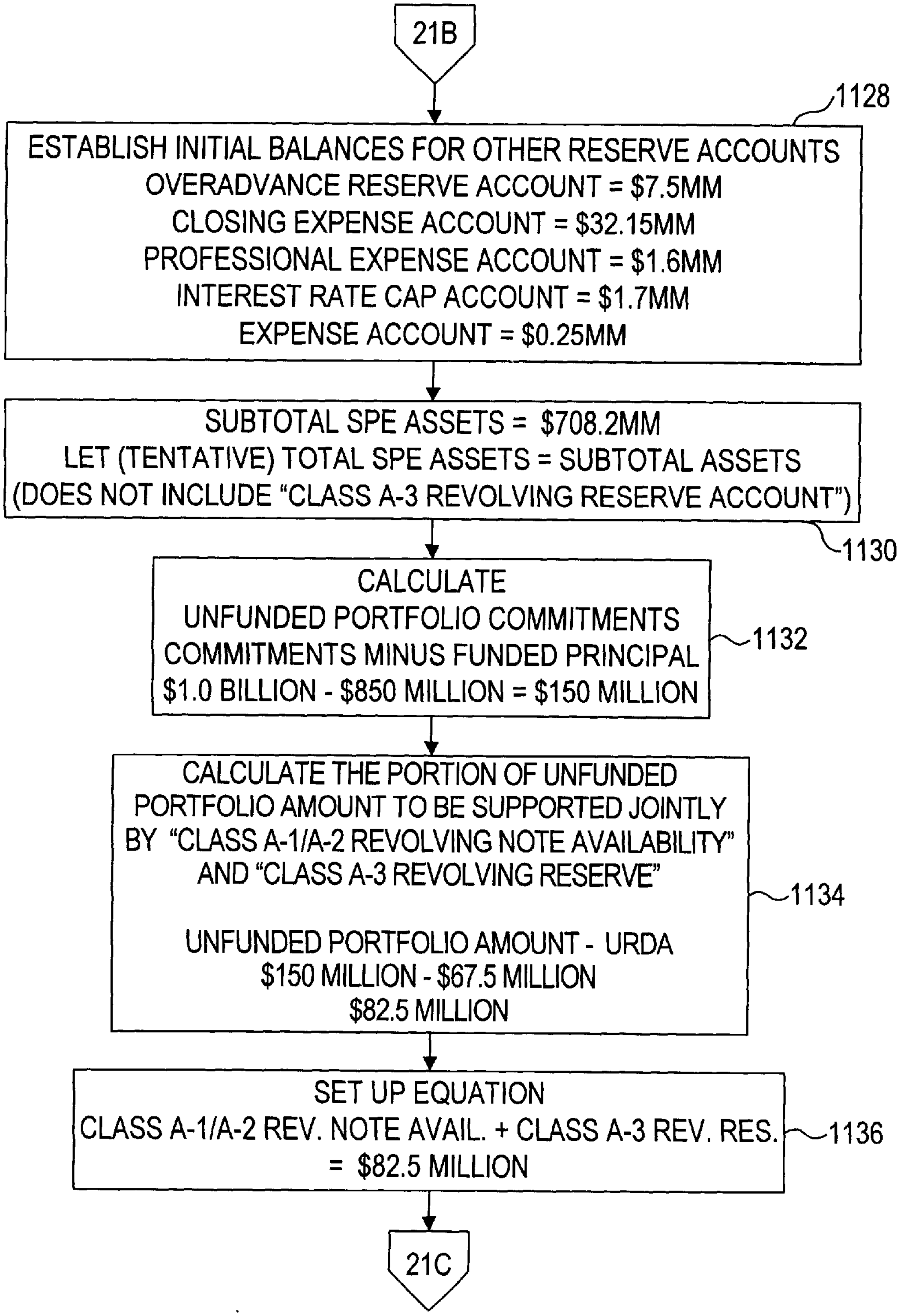

As shown in the illustrative example in FIG. 21B, in step 1128, the initial balances are established for other reserve accounts, such as, for example, an Overadvance Reserve Account (for making subsequent DIP loans, last-in-first-out ("LIFO") loans, or over advances to salvage or enhance the value of loans in the SPE), a Closing Expense Account (for closing expenses, syndication fees, structuring fees, legal, accounting and other professional fees incurred in connection with the closing, and other transaction-related fees and expenses, a Professional Fees Account (for legal, accounting and other professional fees and expenses in connection with ongoing administration or workout of the loans in the SPE), an Interest Rate Cap Account (for funds to acquire an interest rate cap to enhance interest reserves if LIBOR rises or increases), and an Expense Account (for ongoing accounting, reporting and other administrative fees and expenses of the SPE). The initial amounts placed in these various reserve accounts are determined by the collateral manager (for example, based on the historical needs of the borrowers as determined from the loan documentation and/or based on the workout strategy and/or the relative composition of the performance baskets (performing-1, performing-2 and impaired)). The accounts are funded at the closing of the securitization from the proceeds of the issuance and sale of the SPE's securities.

A subtotal of assets in the SPE is computed in step 1130 in the illustrative example as the sum of the net purchase price (step 1120), the Senior Interest Reserve Account (step 1122), the Subordinated Interest Reserve Account (step 1124), the URDA (step 1126), and the other reserve accounts (step 1128), such as the Overadvance Reserve Account, the Closing Expense Account, the Professional Fees Account, the Interest Rate Cap Account, and the Expense Account and that subtotal is assigned to a tentative total of SPE assets. This subtotal does not include any amount in the "Class A-3 Revolving Reserve Account," described below.

In the illustrative example, "A-3 Notes" are term notes, in contrast to "A-1 Notes" and "A-2 Notes" which are revolving notes. The A-1 Notes and A-2 Notes are sometimes referred to herein as "Class A Revolving Notes" or "Class A-1/A-2 Revolving Notes." The A-3 Notes are sometimes referred to herein as "A-3 (term) Notes" or "Class A Term Notes." The A-1 Notes, A-2 Notes and A-3 Notes are sometimes referred to herein collectively as the "Class A Notes." In the illustrative example, all the "A-1 Notes," "A-2 Notes" and "A-3 Notes" are underlying "AA/Aa1" notes, which are enhanced to a "AAA/Aaa" rating (i.e., the highest investment grade rating) from one or more selected credit rating agencies as a result of a financial guaranty insurance policy (i.e., a "wrap policy") from a monoline or other insurer (such an enhancement sometimes being referred to herein as a "credit enhancement" and any monoline or other insurer, surety or similar entity providing such a wrap policy or credit enhancement sometimes being referred to herein as a "Class A credit enhancer"). As used herein, "wrap policy" has its common meaning in securitization parlance, namely a financial guaranty insurance policy, surety bond or similar protection that insures the payment in full of the principal and interest on notes or other securities. In a securitization, as in the illustrative example, which includes a credit enhancement for the Class A Notes, if at any time the SPE waterfalls (as described below) are insufficient to pay principal and interest on the Class A Notes, or senior expenses (as described below) of the SPE, then such amounts will be paid by the Class A credit enhancer (either directly, or by paying an equivalent amount to the SPE) and are treated by the SPE as Class A Notes credit enhancement liabilities subject to future repayment by the SPE, and appropriate accounting entries are made to reflect this treatment.

The Class A-3 Revolving Reserve Account is a pre-funded reserve funded on the closing date of the securitization from a portion of the proceeds of the sale of the A-3 Notes, and is intended to emulate the additional, unfunded commitment of the Class A Revolving Notes (i.e., the A-1 Notes and the A-2 Notes), so that each $1 million of Class A Notes effectively "owns" the same percentage of each credit facility (in contrast to just "owning" underlying term loans or underlying revolving loans). In other words, unfunded commitments (both term and revolving) will be funded by both term and revolving Class A Notes to keep balances correct, so that each $1 million of asset backed Class A Notes is supported by the same loans and in the same percentages. The operation of this relationship is described in more detail below in connection with FIG. 21D and FIG. 22.

In step 1132, a calculation may be made of the amount of unfunded commitments in the distressed credit facility portfolio by subtracting the aggregate funded principal (step 1116, FIG. 21A) from the aggregate loan commitments (step 11116, FIG. 21A). In step 1134, another calculation is made to determine the portion of the unfunded commitments that is to be supported jointly by "Class A-1/A-2 Revolving Note availability" and "Class A-3 Revolving Reserve Account." That portion is calculated by subtracting the URDA balance (step 1126, FIG. 21A) from the unfunded portfolio commitments, calculated in step 1132. A relationship then may be established in step 1136 between the combined Class A-1/A-2 Revolving Note availability and Class A-3 Revolving Reserve Account and the calculated unfunded portfolio commitments to be supported by those accounts.

Calculation of SPE Capital Structure-Capitalization

Figure 21C:
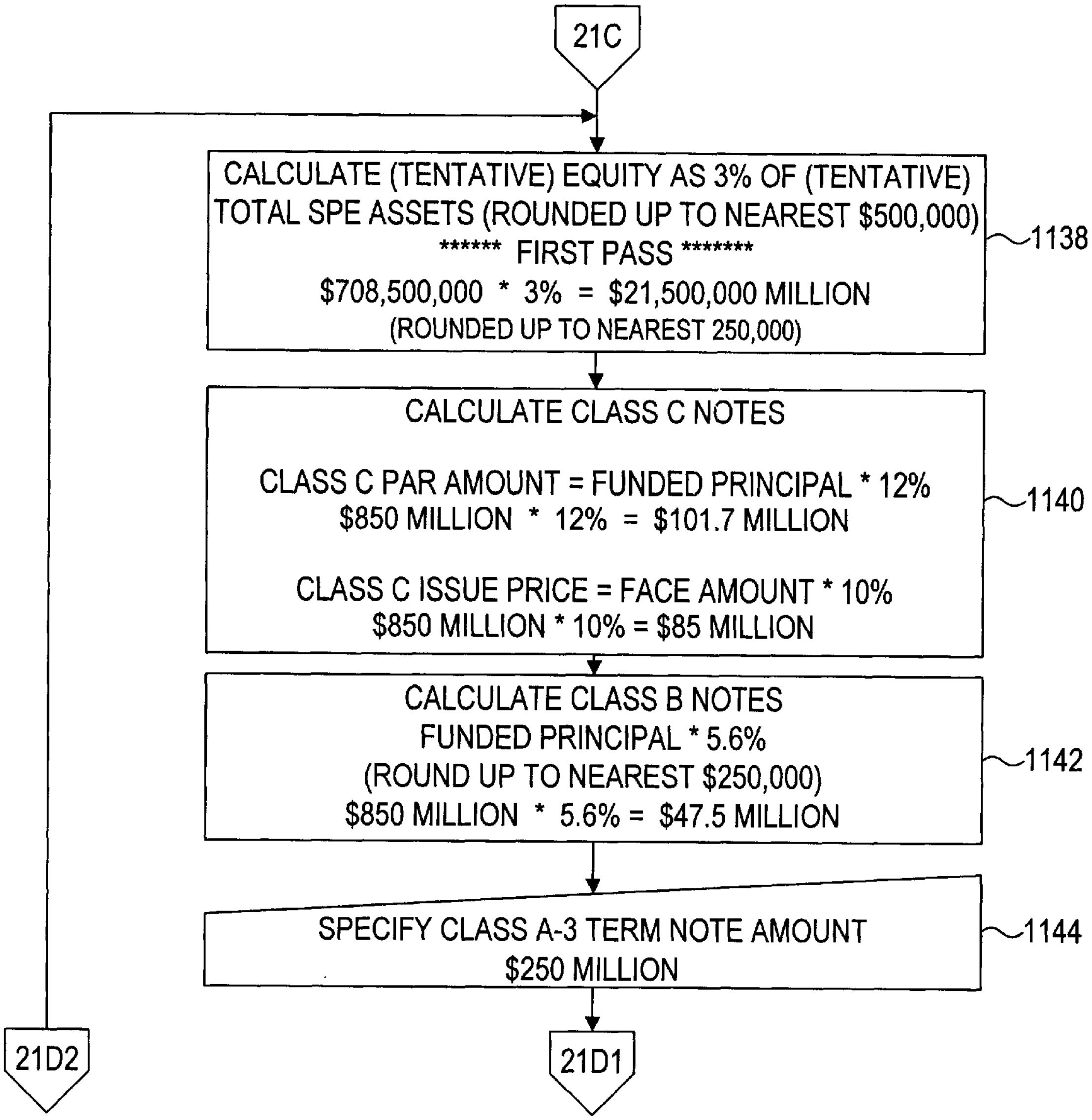

As shown in the illustrative example in FIG. 21C, a calculation is made in step 1138 to determine the tentative equity for the SPE capital structure as 3% of tentative total SPE securities (rounded up to, for example, the nearest $500,000). It should be noted that, based on U.S. generally accepted accounting principles in effect at the date of this application, the equity sold to third parties (independent of the lender) must comprise at least 3% of the total securities (by principal amount or cost) of the SPE in order for a lender to remove the distressed credit facility portfolio from its financial statements. In the illustrated example, this tentative equity value is 3% of $708,500,000, or $21.5 million (rounded up to the nearest $250,000). This tentative equity amount is iteratively updated by the process illustrated in steps FIGS. 21C–21D and upon its final iteration must equal the equity percentage (greater than or equal to 3%) times SPE total securities (by principal amount or cost), or $22.5 million in the illustrated example. More particularly, in the illustrated example, a calculation is made in step 1140 (FIG. 21C) to determine a par amount of Class C Notes equal to 12% of aggregate funded principal (e.g., $101.7 million) and a Class C Notes issue price equal to 10% of the face amount (e.g., $85 million). In step 1142 in the illustrated example, a calculation is made so that an amount of Class B Notes is equal to 5.6% of the aggregate funded principal, rounded up to the nearest $250,000 (e.g., $47,750,000). In step 1144 in the illustrated example, the collateral manager specifies an A-3 (term) Note amount (e.g., $250 million, based on the amount the collateral manager anticipates can be sold in the market).

Figure 21D:
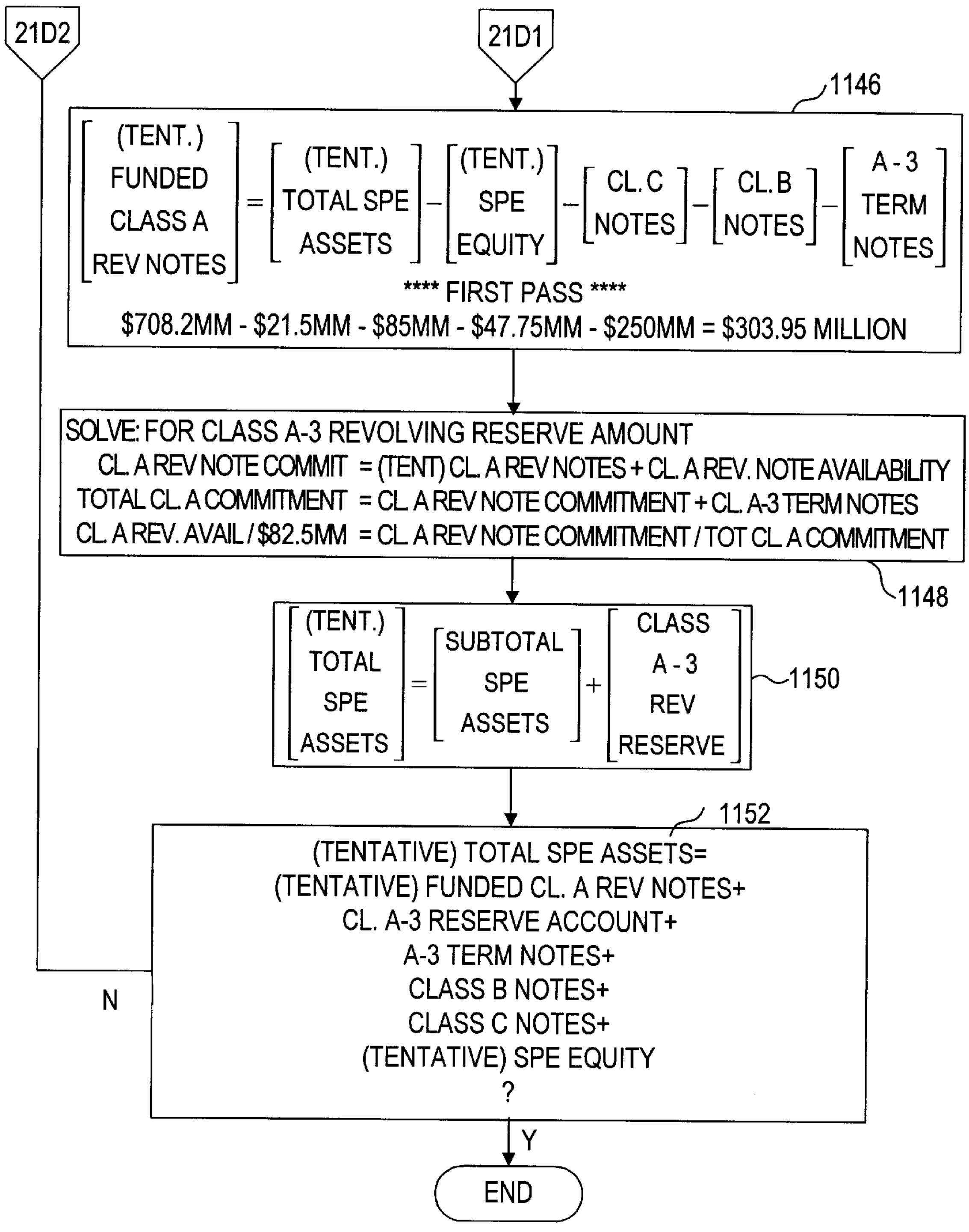

As shown in the illustrative example in FIG. 21D, a computation is made in step 1146 to determine an amount of tentative funded Class A Revolving Notes by subtracting from the tentative total of SPE assets, the tentative SPE equity, the Class C Notes (field 1140), the Class B Notes (field 1142), and the A-3 (term) Notes (field 1144). A system of simultaneous equations is solved in step 1148 in the illustrative example to determine the initial Class A-3 Revolving Reserve Account amount. The simultaneous equations are as follows: (i) Class A Revolving Notes commitment is calculated as the sum of the tentative amount of funded Class A Revolving Notes and Class A Revolving Notes availability; (ii) total Class A commitment is calculated as the sum of the Class A Revolving Notes commitment and the A-3 (term) Notes; and (iii) the fraction whose numerator is Class A Revolving Notes Availability and whose denominator is the value calculated in field 1134 (i.e., the difference obtained by subtracting the URDA from the unfunded portfolio amount, or $82.5 million in the illustrative example) is set equal to the fraction whose numerator is Class A Revolving Notes commitment and whose denominator is total Class A Notes commitment. In step 1150 in the illustrated example, a determination is made of the tentative total SPE assets as the sum of the SPE asset subtotal and the Class A-3 Revolving Reserve Account amount. In step 1152, a determination is made whether the tentative total amount of SPE assets is equal to the sum of the tentative funded Class A Revolving Notes, the A-3 Notes, the Class A-3 Revolving Reserve Account, the Class B Notes, the Class C Notes, and the tentative SPE equity. If not, the process described above is repeated and another iteration of the calculations is performed.

FIG. 22 depicts an exemplary spreadsheet representation of an SPE capital structure developed by the process illustrated in FIGS. 21A–21D. The capital structure includes "SOURCES OF FUNDS" shown on the right hand side of FIG. 22, "USES OF FUNDS" shown on the left hand side of FIG. 22, and other information regarding the SPE capital structure developed in accordance with the principals of the present invention. As shown, the SPE capital structure may include among the sources of funds, a plurality of tranches of debt instruments (e.g., Class A-1/A-2 Revolving Notes, A-3 (term) Notes, Class B Notes, and Class C (discount) Notes), as well as an equity account. When a securitization in accordance with the principles of the present invention is closed, these debt instruments are issued to investors in exchange for funded capital as shown in column F on FIG. 22 (and to the lender as part of the purchase price for the portfolio of distressed credit facilities), and, in the case of the Class A-1/A-2 Revolving Notes, unfunded commitments to contribute future capital, as shown in column G. Aggregate unfunded principal appears in cell B21 (i.e., column B, row 21) and is computed as the difference between aggregate loan commitments (cell B2) and aggregate funded principal (cell B3). This aggregate unfunded principal ($150 million in the illustrated example) is to be funded from the Unfunded Revolver Discount Account (URDA) and also jointly from the Class A Revolving Notes availability and Class A Revolving Reserve Account, as shown in cells B22 and B24 of FIG. 22.

The simultaneous equations which generate the Class A Revolving Reserve Account amount, referred to above in connection with step 1148 of FIG. 21D, represent constraints imposed on the capital structure illustrated in the spreadsheet of FIG. 22. More particularly, the capital structure must be established such that the value in cell 122 is zero (subject to small rounding discrepancies, for example, 0.03% is the value in cell 122 in the illustrative example). This condition, in turn, requires that the values in cells 14 (the percentage of the total Class A Notes represented by Class A-1/A-2 Revolving Notes) and 118 (the percentage of the total Class A Notes commitment represented by Class A-1/A-2 Revolving Notes availability) are equal (subject to small rounding discrepancies, for example, a difference of 0.03% in the illustrative example) in order to keep Class A Revolving Notes and Class A Term Notes balanced in the face of future funding requirements.

Default/Recovery Scenarios

Figure 23A:
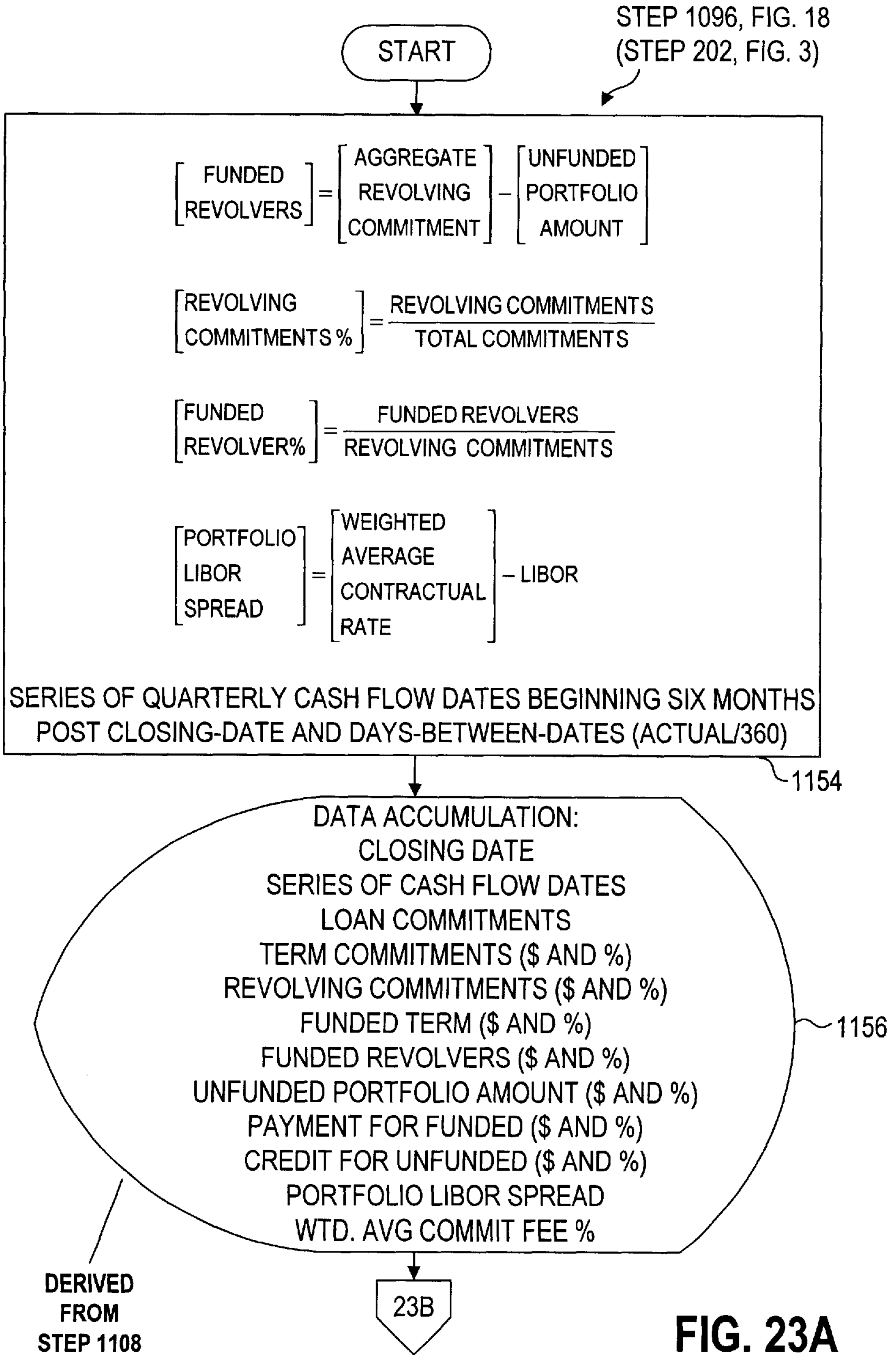
FIGS. 23A and 23B are block diagrams illustrating a process for specifying default/recovery scenarios in accordance with the present invention.

The process 1096 (FIG. 18) for specifying default/recovery scenarios is now described in connection with the illustrative example in FIGS. 23A–23B. As shown in the illustrative example in FIG. 23A, calculations are made in step 1154 to determine: the amount of funded revolving loans; the proportion of the total loan commitments in the distressed credit facility portfolio represented by revolving loan commitments; the proportion of the revolving loan commitments in the distressed credit facility portfolio represented by funded revolvers; and the portfolio LIBOR interest spread. The amount of funded revolving loans is calculated as the difference between the aggregate revolving loan commitments and the aggregate unfunded revolving commitment amount. The revolving loan commitment percentage is calculated as the ratio of the revolving loan commitments to the total commitments expressed as a percentage; and the funded revolver (i.e. revolving loan) percentage is computed as the ratio of the funded revolvers to the revolving loan commitments, again expressed as a percentage. The portfolio LIBOR spread is calculated simply as the difference between the weighted average contractual interest rate and the LIBOR rate. A series of quarterly cash flow dates beginning six months after the closing date of the SPE securitization and "days-between-dates (actual/360)" is established in step 1154 in the illustrated example.

Various information about the distressed credit facility portfolio and the SPE securitization is accumulated in the illustrative example in step 1156, including: the closing date, the series of cash flow dates, the aggregate loan commitments; aggregate term commitments; aggregate revolving loan commitments; aggregate funded term commitments; aggregate funded revolvers; aggregate unfunded portfolio amount, aggregate funded price; aggregate credit for unfunded commitments; portfolio LIBOR spread; and the weighted average commitment fee percentage. These amounts may be expressed in dollars or as percentages, as desired by the SPE collateral manager.

Figure 23B:
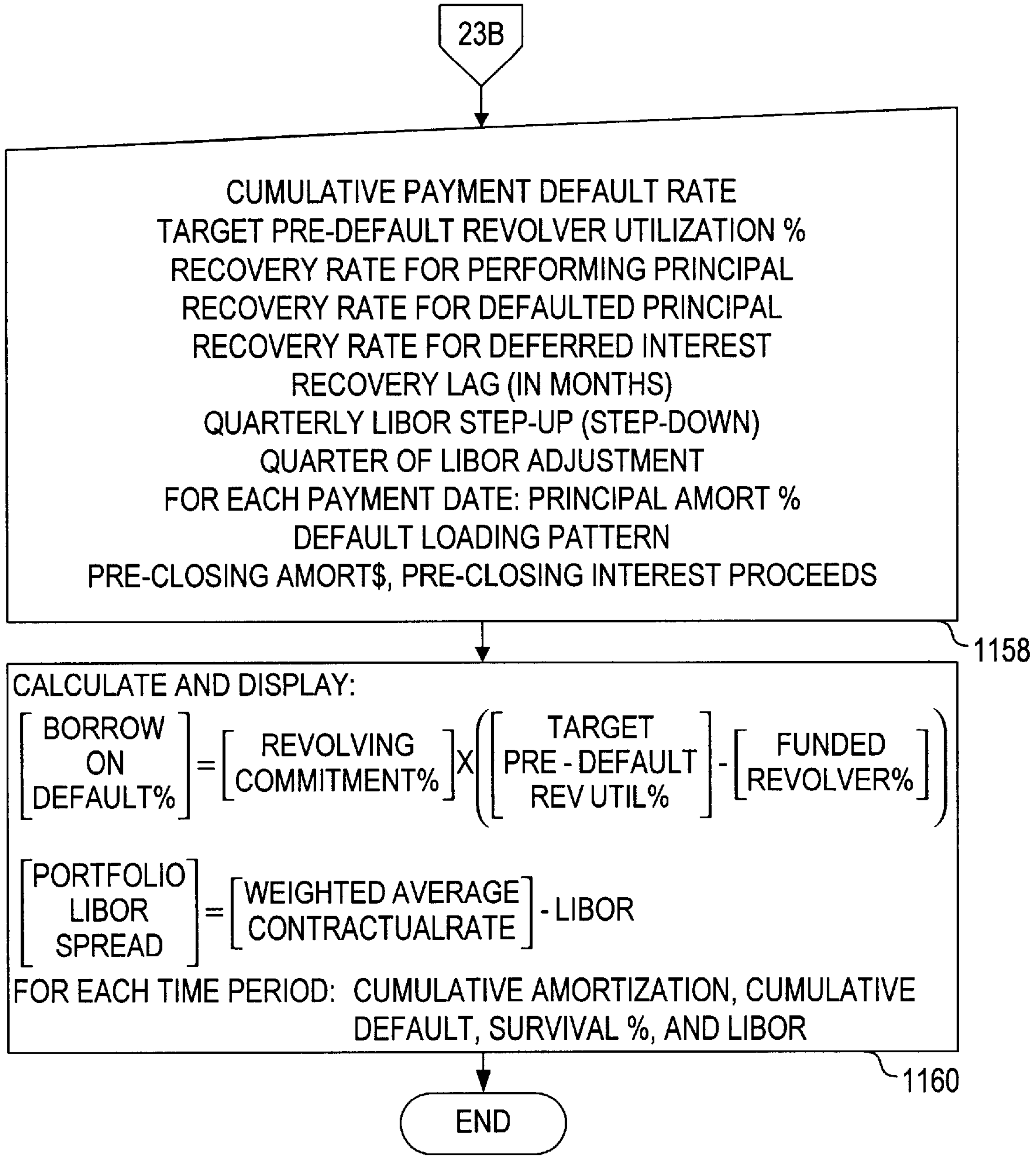

As shown in the illustrated example in FIG. 23B, the collateral manager may enter into field 1158 in the database model, information specifying the default/recovery scenario responsive to credit rating agency stresses, such as: a cumulative payment default rate; a target pre-default revolver utilization percentage; a recovery rate for performing principal; a recovery rate for defaulted principal; a recovery rate for deferred interest; a recovery lag (in months); a quarterly LIBOR step-up (or step-down); an indication of the quarter of LIBOR adjustment; a principal amortization percentage for each payment date; a default loading pattern; and proceeds from pre-closing principal amortization and pre-closing interest payments. These terms are commonly used and known to those of ordinary skill in the art. The values may be determined by the collateral manager based on historical experience, reference to published credit rating agency studies and criteria, or based on the criteria provided by credit rating agencies in connection with the proposed securitization. A computation is made in step 1160 of the illustrated example to determine the "borrow-on-default" percentage as the product of the revolving loan commitment percentage and the difference between the target pre-default revolver utilization percentage and the funded revolver percentage. The computation in step 1160 is also made to determine the portfolio LIBOR spread as the difference between the weighted average contractual interest rate on current pay loans and the LIBOR interest rate. For each time period, calculations are also made to determine a cumulative amortization; a cumulative default; a survival percentage (terms commonly used by and known to those of ordinary skill in the art), and LIBOR.

Default/Recovery Scenario Cash Flow Model

Figure 24A:
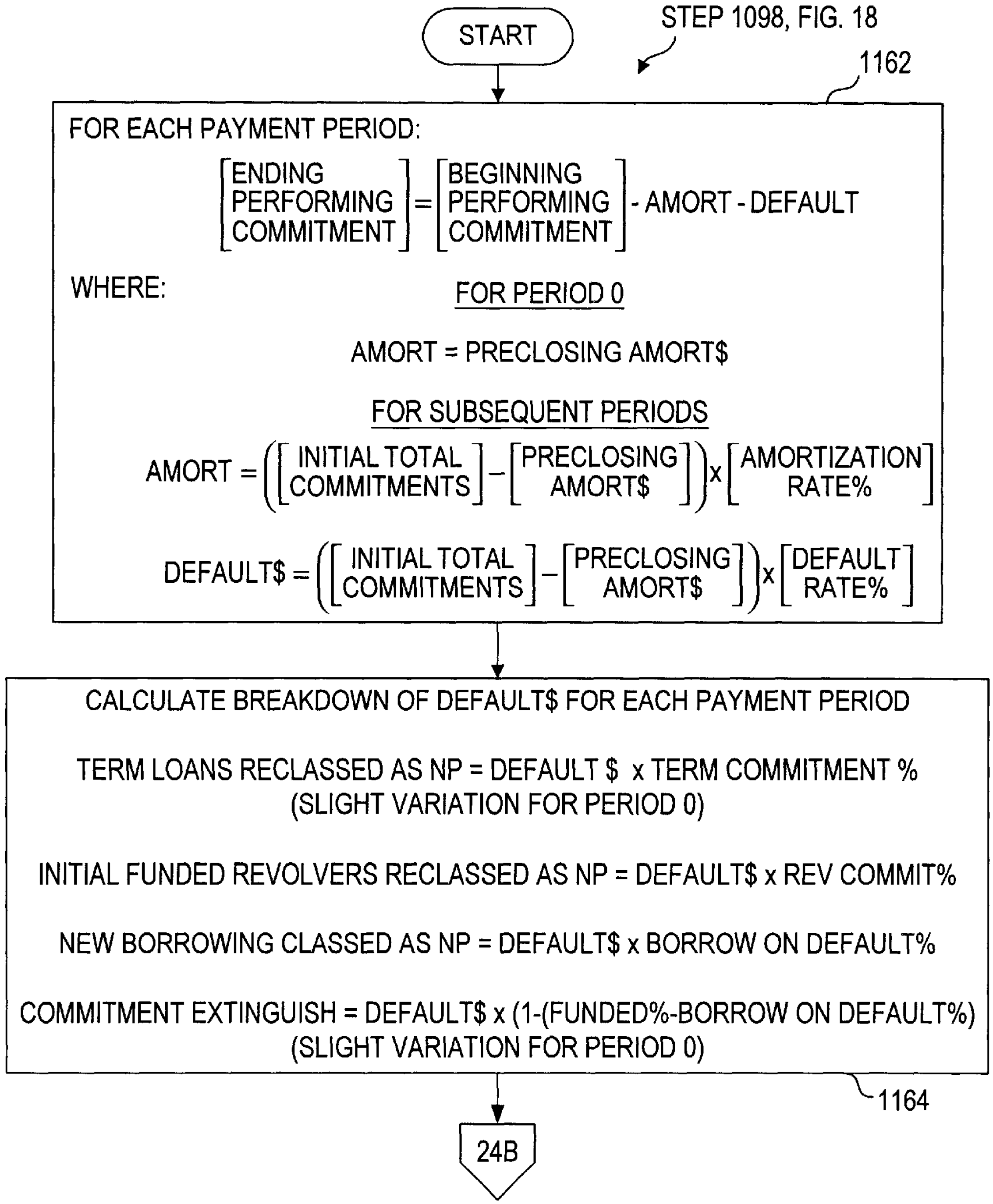
FIGS. 24A–24D are block diagrams illustrating a process for generating cash flows for the default/recovery scenario specified by the collateral manager in accordance with the present invention.

The process 1098 (FIG. 18) for generating a cash flow model for the default/recovery scenario specified by the collateral manager via the process 1096 is described in more detail in connection with FIGS. 24A–24D in the illustrative example. More particularly, as shown in FIG. 24A, a computation is made in step 1162 to determine: an ending amount of performing commitment for each payment period by subtracting from the beginning performing commitment for that period (which in the initial period is the difference between the initial total commitments and pre-closing amortization), the value of a variable AMORT and the value of a variable DEFAULT, where, in the initial period, AMORT equals the pre-closing amortization, and in subsequent periods, AMORT is calculated as the product of the amortization rate percentage and the difference between the initial total commitments and the pre-closing amortization, and where DEFAULT is equal to the product of the default-rate percentage and the difference between the initial total commitments and the pre-closing amortization. In step 1164 of the illustrated example, a breakdown of DEFAULT for each payment period is calculated. In particular, term loans re-classed as non-performing are calculated as the product of DEFAULT and the term commitment percentage. In the initial period, a slight variation is made in this calculation to take into account that the first payment period may be between four to six months after pricing to account for quarterly pay loans; thereafter, payment periods would be three months. In step 1164, a computation is also made to determine the initial funded revolvers re-classed as non-performing as the product of the revolving loan commitment percentage and the DEFAULT amount calculated by step 1162. Calculations are also made in step 1164 to determine the amount of new borrowing classed as non-performing as the product of the borrow-on-default percentage and the DEFAULT amount. Lastly, the commitment extinguishment is also calculated in step 1164 as the product of the DEFAULT amount multiplied by the difference of (i) 1 minus (ii) the difference of the funded percentage minus the borrow-on-default percentage (i.e., 1–(funded percentage–borrow-on-default percentage)). There may be a slight variation in this calculation for the initial period of the securitization to take into account lags in the first payment period.

Figure 24B:
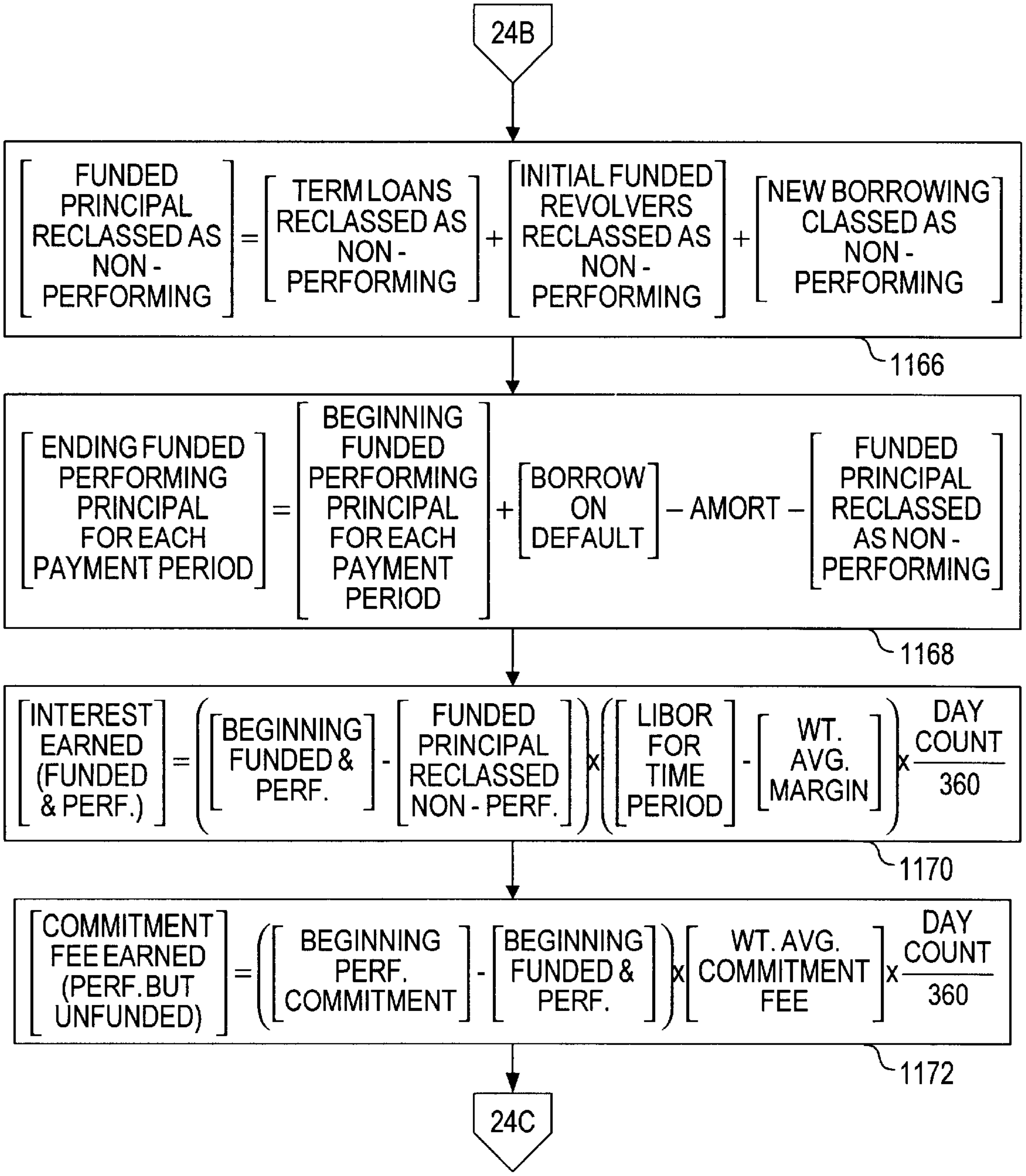

As shown in the illustrative example in FIG. 24B, a calculation is made in step 1166 to determine the amount of funded principal re-classed as non-performing as the sum of term loans re-classed as non-performing, initial funded revolvers re-classed as non-performing, and new borrowing classed as non-performing (i.e., the borrow-on-default amount). The ending funded performing principal for each payment period is calculated in step 1168 in the illustrative example as the sum of the beginning funded performing principal for each payment period and the borrow-on-default amount, less AMORT, less funded principal re-classed as non-performing. A calculation is made in step 1170 in the illustrative example to determine the amount of interest earned on funded and performing commitments as the product of (i) the difference between the beginning funded and performing principal for each payment period and the funded principal re-classed as non-performing, (ii) the sum of LIBOR for the time period and the weighted average margin for the time period, and (iii) the actual day count divided by 360. The amount of commitment fee earned on performing, but unfunded commitments is calculated in step 1172 in the illustrative example as the product of (i) the difference between the beginning performing commitments for each period and the beginning funded and performing principal, (ii) the weighted average commitment fee, and (iii) the actual day count divided by 360.

Figure 24C:
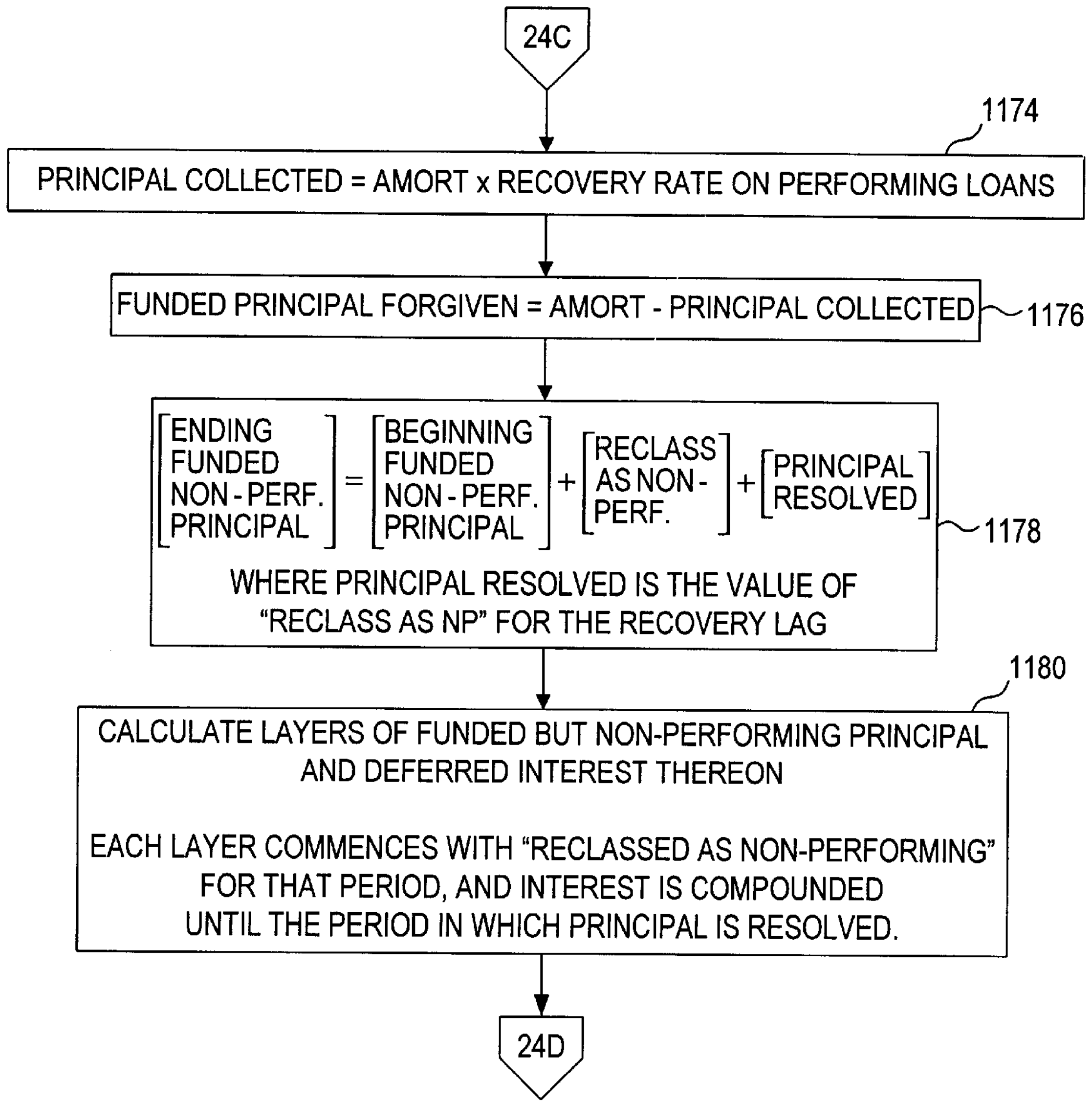

As shown in the illustrative example in FIG. 24C, the collected principal is calculated in step 1174 as the product of AMORT and the recovery rate on performing principal. A calculation is then made in step 1176 of the illustrative example to determine the amount of funded principal forgiven as the difference between AMORT and the amount of collected principal calculated in step 1174. A calculation is made in step 1178 of the illustrative example to determine the amount of ending funded non-performing principal as the amount of beginning funded non-performing principal, plus the amount of funded principal re-classed as non-performing, minus the amount of principal resolved, where the amount of principal resolved is the value of the principal re-classed as non-performing for the recovery lag. For example, upon default a loan is assumed not to pay interest for a period (a "recovery lag") prior to monetization. Credit rating agency stress may assume this period to be in the range of 24 to 36 months. The layers of funded, but non-performing principal and deferred interest thereon are determined in step 1180 in the illustrative example. Each such layer commences with "re-classed as non-performing" for that period, and interest on such amount is compounded until the period in which the principal is resolved.

Figure 24D:
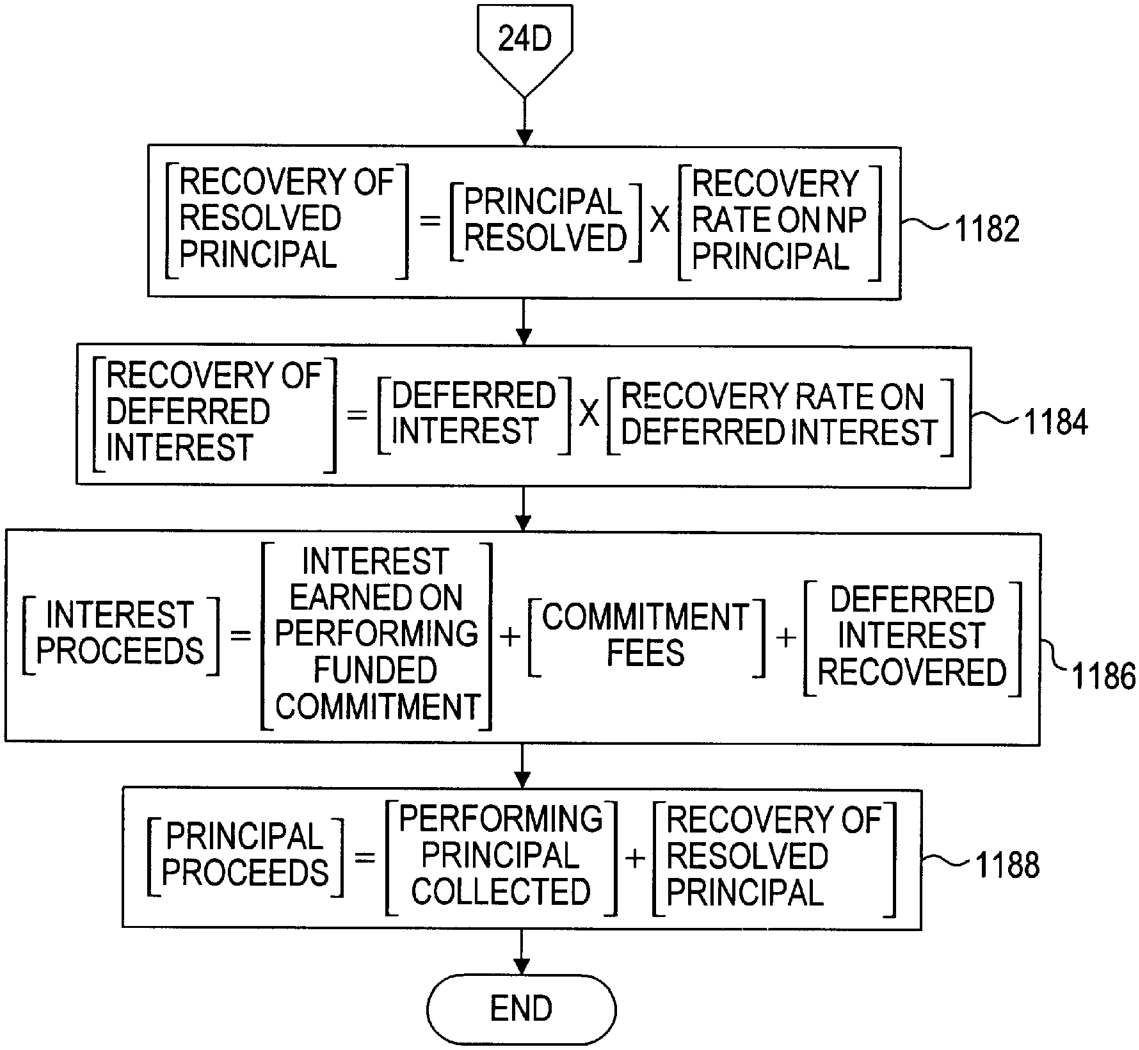
Figure 25:
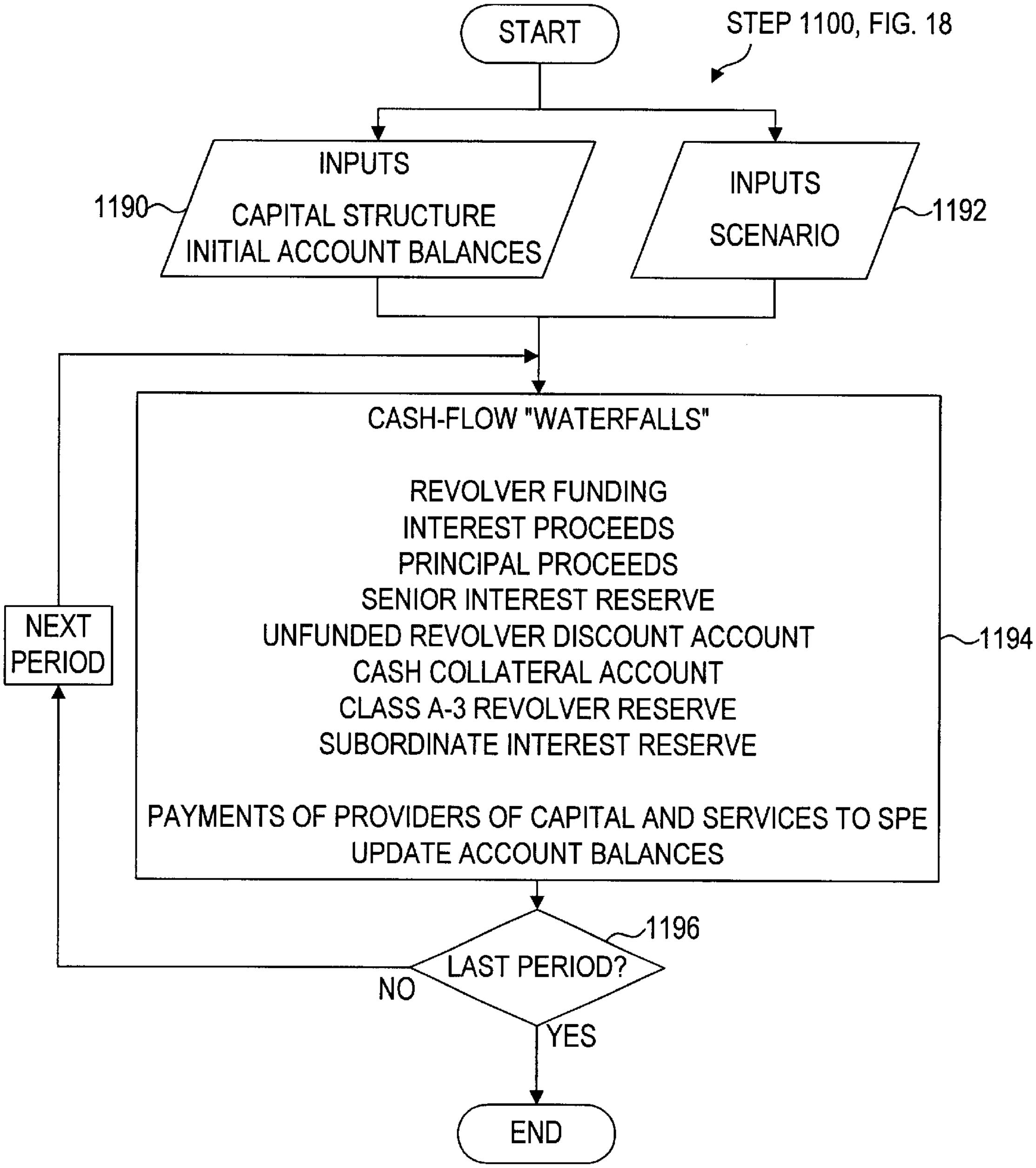
FIGS. 25–39 are block diagrams illustrating the process of providing cash flow waterfalls for the securitization of a portfolio of at least 30% distressed commercial credit facilities in accordance with the present invention.

As shown in the illustrative example in FIG. 24D, a calculation is made in step 1182 to determine the amount of recovery of resolved principal as the product of the amount of principal resolved and the recovery rate on non-performing principal. Next, a calculation is made in step 1184 in the illustrative example to determine recovery of deferred interest as the product of the amount of deferred interest and the recovery rate on deferred interest. The interest proceeds are calculated in step 1186 as the sum of the amount of interest earned on performing funded commitment, the amount of commitment fees received by the SPE, and the amount of deferred interest recovered by the SPE. A calculation is made in step 1188 in the illustrative example to determine the amount of principal proceeds received by the SPE as the sum of performing principal collected and the amount of recovery of resolved principal.

Overview of Waterfalls

The process 1100 (FIG. 18B) for simulating cash flow waterfalls in connection with the default/recovery scenarios specified by the process 1096, which also corresponds to the field 202 of FIG. 3, is now described in more detail in connection with FIGS. 25–39 in the illustrated example. More particularly, FIG. 25 in the illustrative example depicts an overview of the process of providing cash flow waterfalls or payment sequences that carry out the securitization of the distressed credit facility portfolio in accordance with the principles of the present invention. More specifically, the collateral manager evaluates inputs for the capital structure and initial account balances in step 1190 as described in more detail below in connection with FIG. 26 and default/recovery scenario inputs in step 1192, as described in more detail below in connection with FIG. 27. Thereafter, the cash flow waterfalls or payment sequences are simulated by steps 1194 and 1196. More particularly, for each payment period, funds are allocated in step 1194 in the illustrative example from various accounts in the SPE to various uses, including payments to providers of capital and services to the SPE. Account balances are updated in step 1194 in accordance with implementation of the cash flow waterfalls. This process is repeated for the cash flow waterfalls for each period in the securitization.

Waterfalls—Inputs

Figure 26:
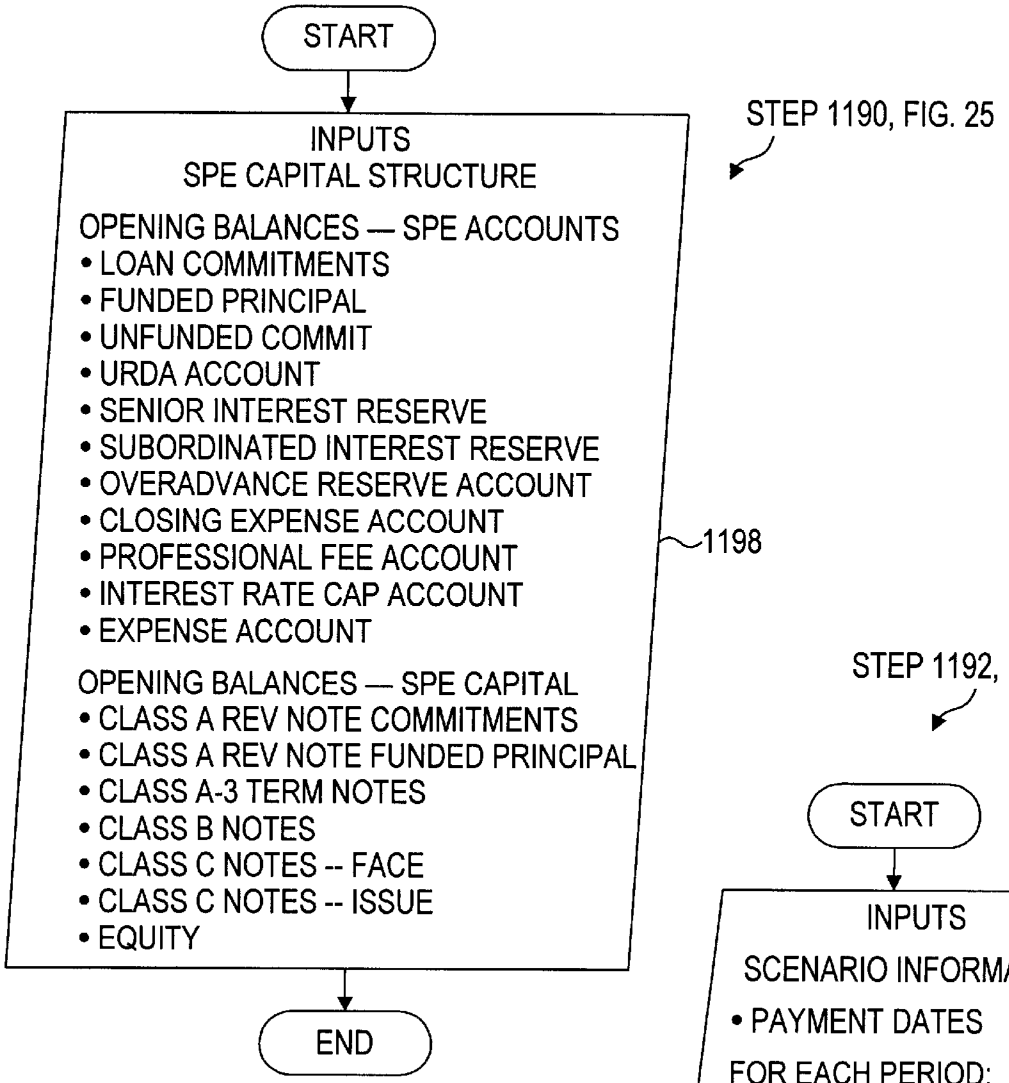

Exemplary inputs for an exemplary SPE capital structure (step 1190 of FIG. 25) which may be used in implementation of the present invention are illustrated in greater detail in FIG. 26 of the illustrative example. As shown, these inputs include: opening balances for various accounts of the SPE, such as loan commitments, funded principal, unfunded commitment, the Unfunded Revolver Discount Account (URDA) (step 1126), the Senior Interest Reserve Account (step 1122), the Subordinated Interest Reserve Account (step 1124), the Overadvance Reserve Account (step 1128), the Closing Expense Account (step 1128), the Professional Fees Account (step 1128), the Interest Rate Cap Account (step 1128), the Expense Account (step 1128) and a Cash Collateral Account which is described below. These inputs also include opening balances for sources of capitalization of the SPE, such as Class A Revolving Notes commitments, Class A Revolving Notes funded principal, Class A Term Notes, Class B Notes, Class C Notes (face value and issue price), and equity of the SPE (step 1198).

Figure 27:
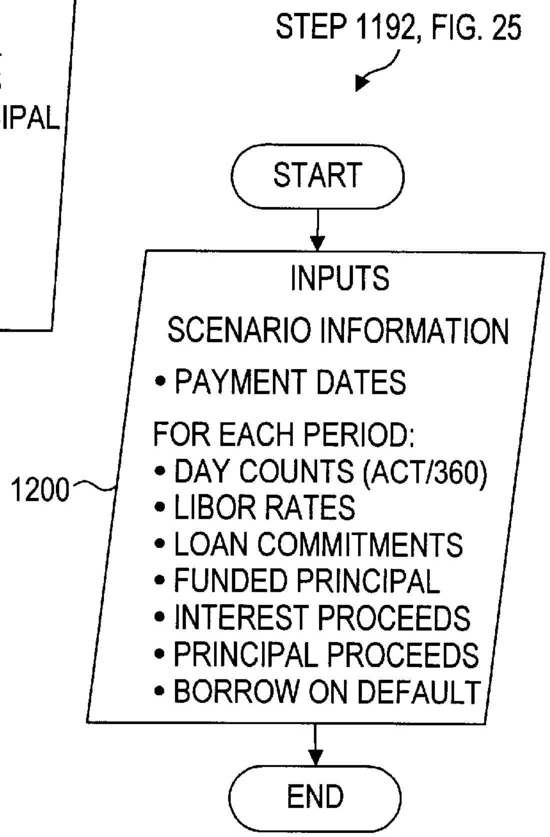
Figure 28:
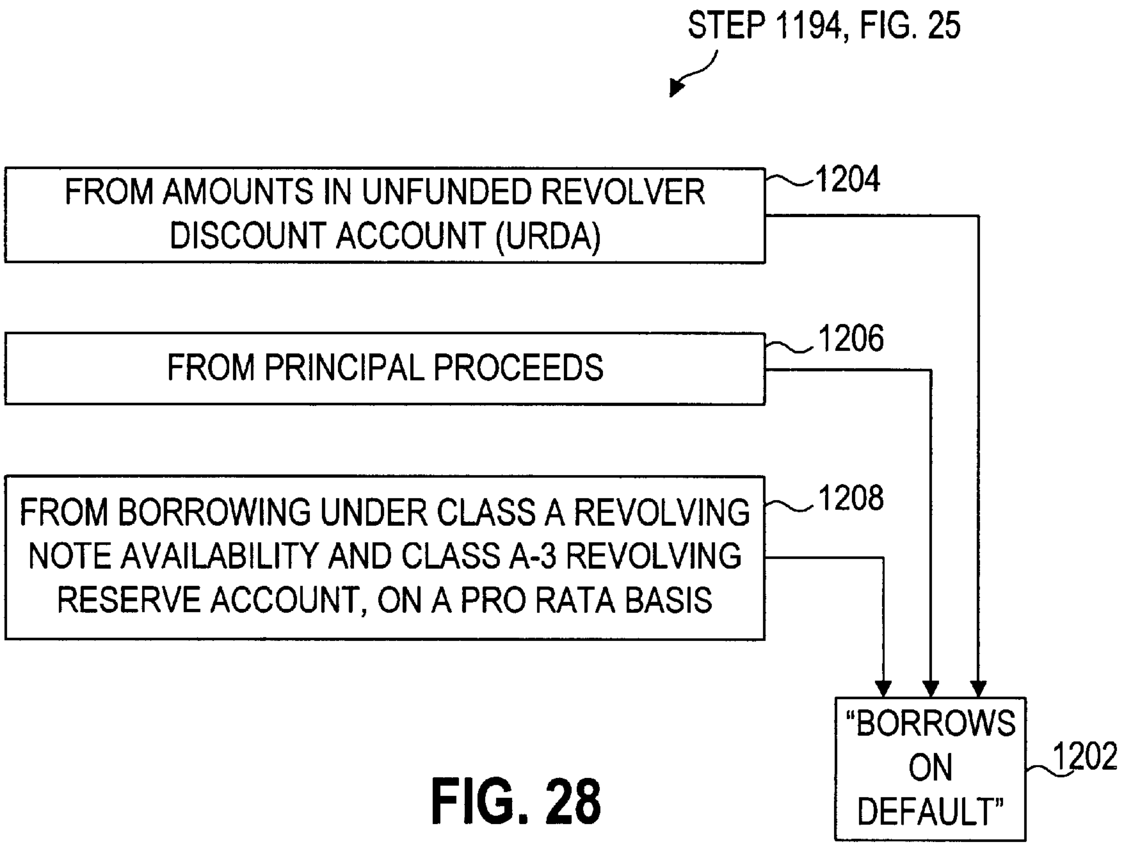

The scenario input entry process of step 1192 (FIG. 25) is illustrated in greater detail in FIG. 27 in the illustrative example. As shown, the collateral manager may evaluate scenario information including payment dates for the various payment periods, and, for each period, day counts (actual/360), LIBOR rates, loan commitments, funded principal amounts, interest proceeds, principal proceeds, and borrow-on-default amounts. This data may be put into a database model for an SPE capital structure as indicated in step 1200 (FIG. 27).

Waterfalls—Revolver Funding Mechanism

Credit rating agencies' stress includes a theory that immediately prior to a default a borrower will draw down on its unfunded revolver. "Borrows-on-default" is the portion of the unfunded revolver anticipated to be drawn down in connection with a default. As shown in the illustrative example in FIG. 28, "borrows-on-default," represented by a step 1202, are funded from three sources. They are first funded from amounts in the Unfunded Revolver Discount Account (URDA) (step 1204), and then, to the extent unfunded, from principal proceeds (step 1206), and then, to the extent still unfunded, on a pro rata basis from borrowing under Class A Revolving Notes availability and the Class A-3 Revolving Reserve Account (step 1208).

Waterfalls—Operating Accounts

Figure 29B:
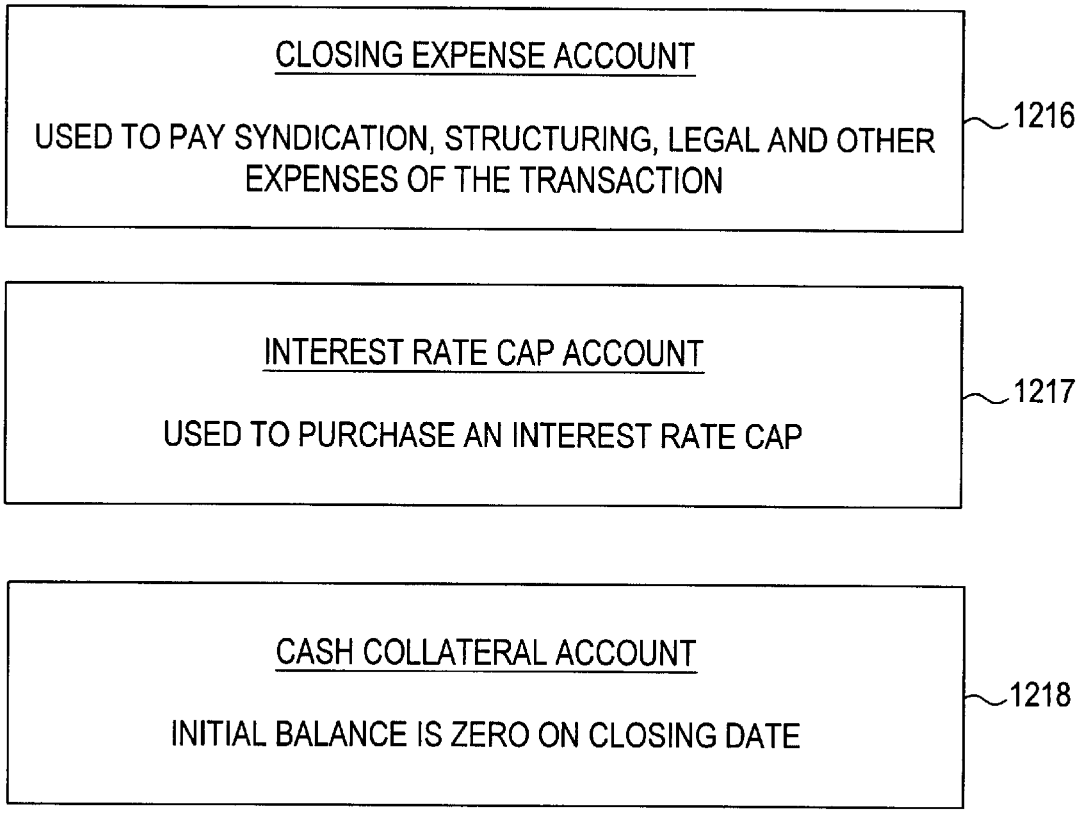

FIGS. 29A–29B illustrate exemplary accounts that may be used in connection with the securitization described herein. These accounts may include, as shown in the illustrative example in FIG. 29A, an Interest Collection Account 1210, a Principal Collection Account 1212, the Professional Fees Account 1214 (which was established and initially funded in step 1128), and the Expense Account 1215 (which was established and initially funded in step 1128). These accounts may also include, as shown in the illustrative example in FIG. 29B, the Closing Expense Account 1216 (which was established and initially funded in step 1128), the Interest Rate Cap Account 1217 (which was established and initially funded in step 1128) and a Cash Collateral Account 1218. The Interest Collection Account 1210 (FIG. 29A) has an initial zero balance in the illustrative example, receives interest proceeds from loans and also includes interest earned on cash held in numerous accounts, including the Interest Collection Account 1210 itself, the Principal Collection Account 1212, the Cash Collateral Account 1218 (FIG. 29B), the Senior Interest Reserve Account 1122 (FIG. 21A), the Subordinated Interest Reserve Account 1124 (FIG. 21A), the Unfunded Revolver Discount Account 1126 (FIG. 21A), the Overadvance Reserve Account 1128 (FIG. 21B), the Closing Expense Account 1216 (FIG. 29B), the Professional Fees Account 1214 (FIG. 29A), the Expense Account 1215 (FIG. 29A), and the Class A-3 Revolving Reserve Account (step 1148, FIG. 21D). The Principal Collection Account 1212 (FIG. 29A) has an initial zero balance in the illustrative example, and receives principal proceeds from loans less the amount used to fund revolving loans or other unfunded commitments. The Professional Fees Account 1214 (FIG. 29A) is used to pay fees and expenses of professionals (e.g., attorneys and advisors, etc.) hired by the collateral manager in connection with management of the distressed loan portfolio for the SPE. Because of its ongoing usage, in the illustrative example (step 1126, FIG. 30A), the Professional Fees Account 1214 is “topped off” (i.e., replenished or restored) to its initial balance ($1.6 million in the illustrative example) quarterly by adding to it from the interest proceeds waterfall, the principal proceeds waterfall and certain other accounts on quarterly payment dates, subject to the limitation that no more than 25% of the initial balance ($400,000 in the illustrative example) can be added to the account on any payment date and the ending balance in the account after “top-off” cannot exceed the initial balance funded on the closing date of the securitization. The Expense Account 1215 (FIG. 29A) is used to pay other fees and expenses (e.g., accounting and audit expenses) incurred by the SPE. Because of its ongoing usage, in the illustrative example (step 1124, FIG. 30A), the Expense Account 1215 is “topped off” to its initial balance ($250,000 in the illustrative example) quarterly by adding to it from the interest proceeds waterfall, the principal proceeds waterfall and certain other accounts on quarterly payment dates, subject to the limitation that no more than 25% of the initial balance ($62,500 in the illustrative example) can be added to the account on any payment date and the ending balance in the account after “top-off” cannot exceed the initial balance funded on the closing date of the securitization. The Interest Cap Account 1217 (FIG. 29B) is used to purchase an interest rate cap on the Senior Interest Reserve Account 1122 (FIG. 21A). The interest rate cap is a contract with a financial institution (the “counterparty”) that provides protection against increases in prevailing market interest rates above a preset rate (such excess, the “spread”). Under the interest rate cap in the illustrative example, the counterparty pays the SPE an amount equal to the spread multiplied by a notional amount, with such payments being made quarterly on preset dates. In the illustrative example, the notional amount is the Senior Interest Reserve Account balance. The payments are deposited into the Senior Interest Reserve Account to augment the size of the reserves to be sufficient to pay the interest on the Class A Notes, the Class B Notes and the Class C Notes for the allocated period (based on the anticipated default rates predetermined by the applicable credit rating agencies) because the increased interest rates create a need for larger than anticipated reserves.

Interest Proceeds Waterfall

Cash flow waterfalls or payment sequences for the Interest Collection Account 1210, the Principal Collection Account 1212, the Senior Interest Reserve Account (waterfall initiation), the Unfunded Revolver Discount Account, the Cash Collateral Account, the Class A-3 Revolving Reserve Account, the Senior Interest Reserve Account (waterfall completion), the Subordinated Interest Reserve Account, the Overadvance Reserve Account, and the Closing Expense Account are now described in more detail in connection with the illustrative example in FIGS. 30–39, respectively. It should be noted that the dollar amounts and percentages shown in the accompanying drawing figures and/or described herein are simply examples, and no limitation is intended thereby.

Figure 30A:
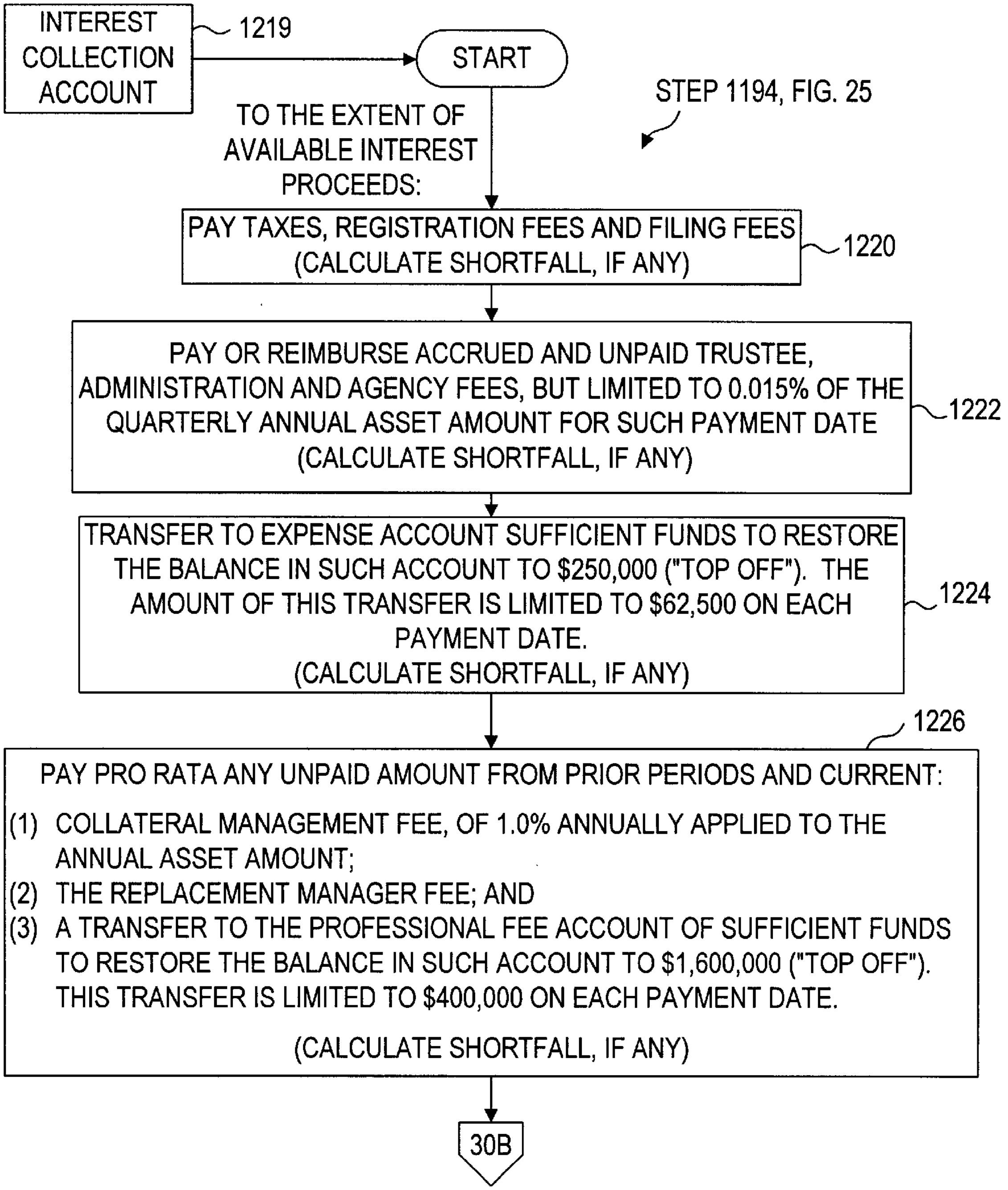

As shown in the illustrative example in FIG. 30A, the Interest Collection Account 1219 (i.e., the Interest Collection Account 1210 shown in FIG. 29A) is used to the extent of available interest proceeds to pay taxes, registration fees and filing fees of the SPE (step 1220). If the initial balance in the Interest Collection Account 1219 does not cover these fees and taxes, then any shortfall is calculated in step 1220. If any funds remain in the Interest Collection Account 1219 following the payment of step 1220, then those funds are used to pay or reimburse accrued, but unpaid trustee, administration, and agency fees for the payment date, subject to a limit of 0.015% per annum (in the illustrative example) of the quarterly asset amount for that payment date (step 1222). Again, the step 1222 also entails calculating any shortfall in the available Interest Collection Account proceeds for covering these fees. If any funds remain in the Interest Collection Account 1219, up to $62,500 (in the illustrative example) of those funds is transferred to the Expense Account 1215 (FIG. 29A) to restore the balance in that account to $250,000 (in the illustrative example). In step 1224 a calculation is made to determine any shortfall from this transfer. To the extent any proceeds remain in the Interest Collection Account 1219 following the step 1224, those funds are used to pay, on a pro rata basis, any unpaid amount from prior periods and/or the current period of the collateral management fee (which may be calculated, for example, as 1.0% annually of the annual asset amount in the SPE), the replacement manager fee, and a transfer to the Professional Fees Account 1214 (FIG. 29A) of sufficient funds to restore the balance in that account to $1,600,000 (in the illustrative example), subject to a transfer limit of $400,000 (in the illustrative example) on each payment date. Again, in step 1226 a calculation is made to determine any shortfall in the Interest Collection Account 1219 to cover these amounts. The priority of the payments described here is fairly strict and not subject to much variation; provided, however, that ultimately waterfalls are the result of negotiations among the collateral manager, noteholders and credit rating agencies.

Figure 30B:
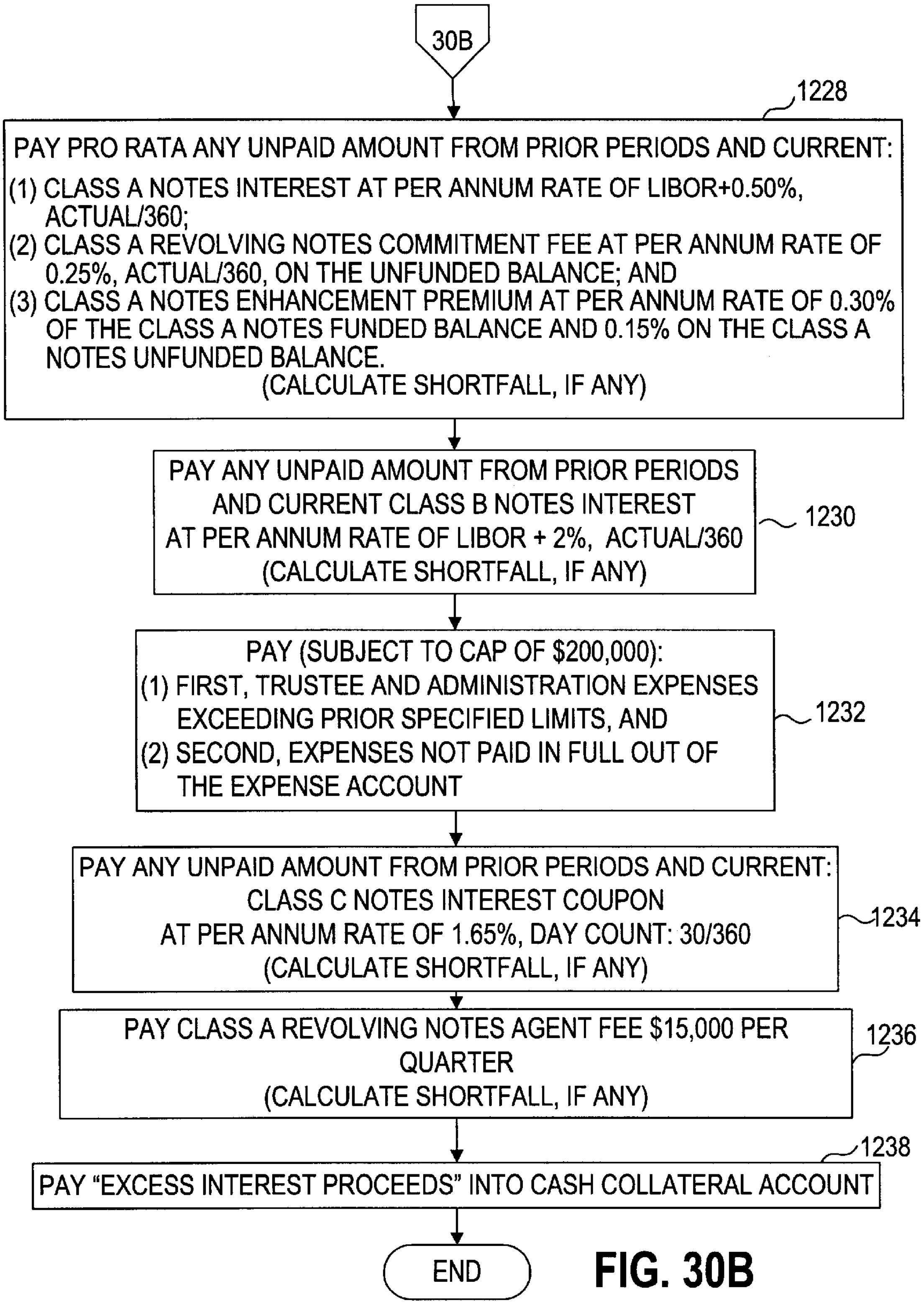

As shown in the illustrative example in FIG. 30B, any remaining funds in the Interest Collection Account 1219 are used to pay in step 1228, on a pro rata basis, any unpaid amount from prior periods and the current period of (1)

Class A Notes interest at a per annum rate of LIBOR plus 0.50%, (2) Class A Revolving Notes commitment fee at a per annum rate of 0.25% on the unfunded balance, and (3) Class A Notes enhancement premium (i.e. amounts paid as premium for any "wrap policy" for the Class A Notes) at a per annum rate of 0.30% of the Class A Notes funded balance and a per annum rate of 0.15% on the Class A Notes unfunded balance (all percentages and rates are illustrative examples). Any shortfall in the amount of the Interest Collection Account balance 1218 to cover these interest payments is also calculated in step 1228. any remaining Interest Collection Account balance is then applied to any unpaid amount from prior periods and the current period of Class B Notes interest at a per annum rate of LIBOR plus 2% (step 1230 in the illustrative example). In step 1230, a calculation is also made of any shortfall if the balance in the Interest Collection Account 1219 is not sufficient to pay this Class B Notes interest. Any remaining balance in the Interest Collection Account 1219 is then used to pay (subject to a cap of $200,000) (1) trustee and administration expenses exceeding limits as described above and, thereafter, (2) expenses not paid in full out of the Expense Account 1215 (step 1232). Any remaining funds in the Interest Collection Account 1219 are then used to pay any unpaid amount from prior periods and the current period of Class C Notes interest coupon at a per annum rate of 1.65% (in the illustrative example) for the duration of the period, and any shortfall in the Interest Collection Account proceeds to cover this Class C Notes interest is calculated in step 1234. Any remaining balance in the Interest Collection Account 1219 is then used to pay Class A Revolving Notes agent fees of $15,000 per quarter (step 1236 in the illustrative example), and any shortfall is calculated in step 1236. After all of the foregoing payments are made from the balance in the Interest Collection Account 1219, any excess interest proceeds are paid into the Cash Collateral Account described below in connection with FIGS. 34A–34B.

Principal Proceeds Waterfall

Figure 31A:
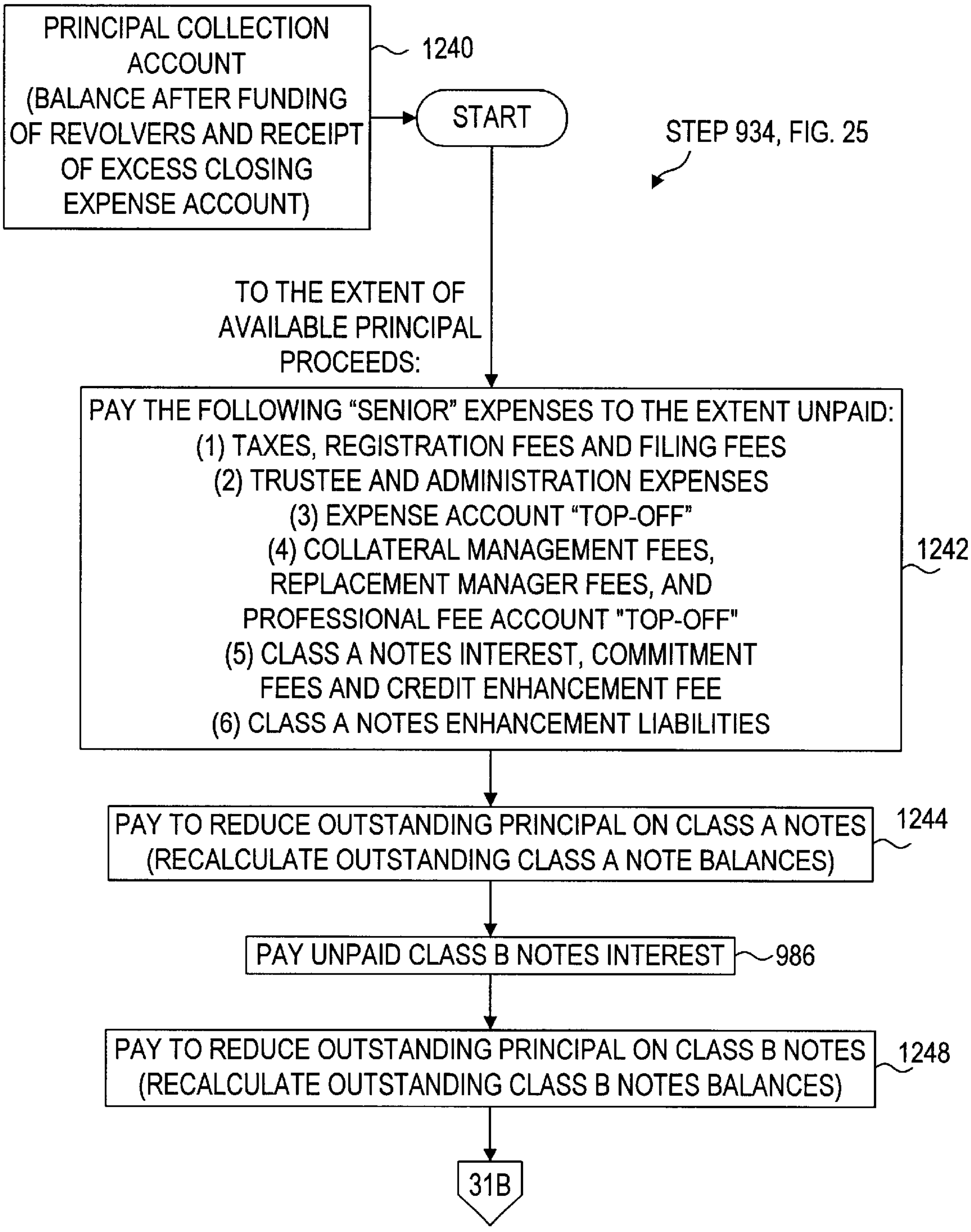
Figure 31B:
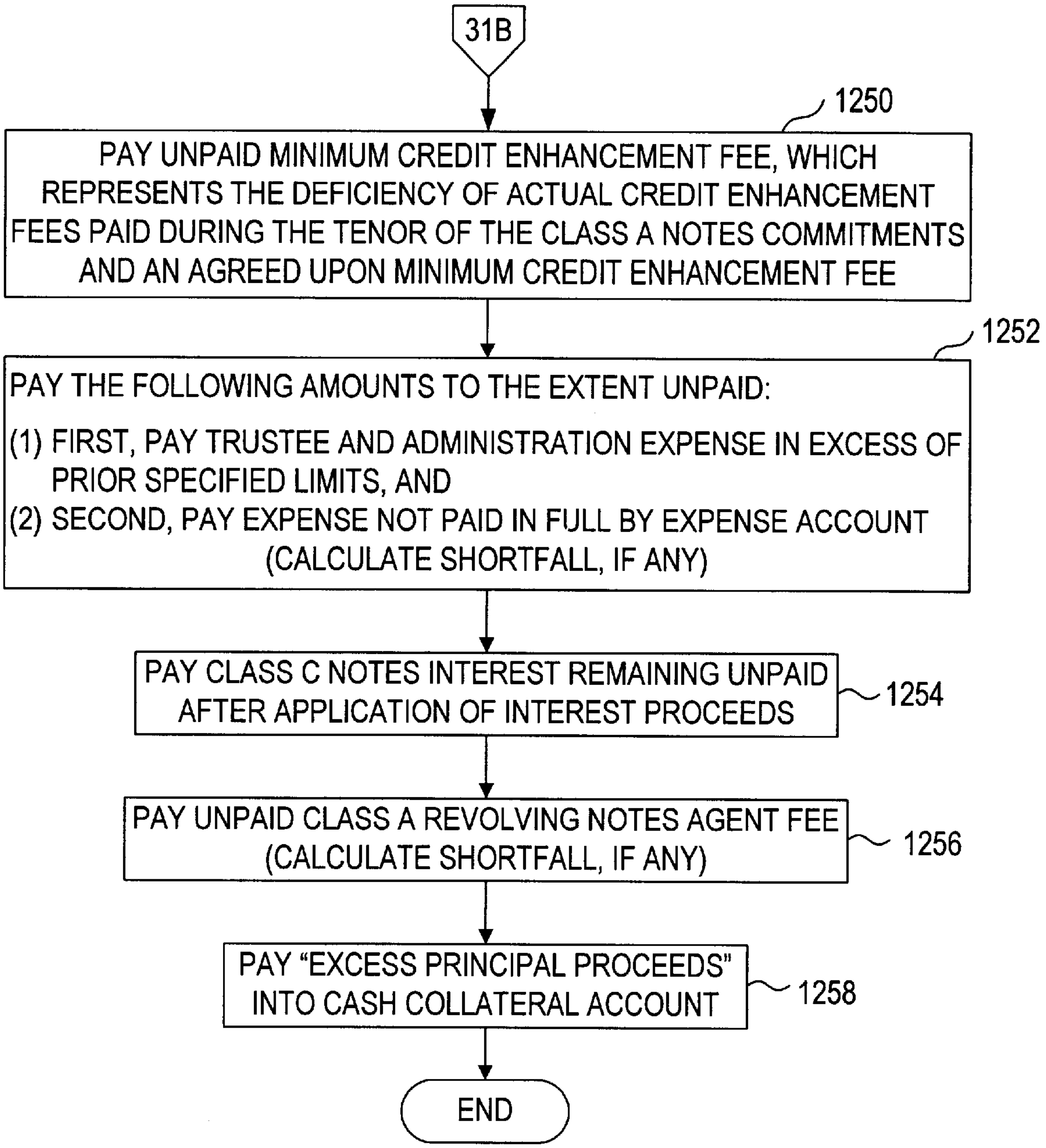

As shown in the illustrative example in FIGS. 31A–31B, the balance in the Principal Collection Account 1240 (adjusted to reflect funding of revolving loans and other unfunded commitments and receipt of any excess amount remaining in the Closing Expense Account from the prior period) is used to the extent of available principal proceeds to pay certain "senior" expenses to the extent that those expenses have not been paid from the Interest Collection Account as described above. Specifically, in the illustrative example, these "senior" expenses include: (1) taxes, registration fees and filing fees of the SPE; (2) trustee and administration expenses; (3) Expense Account "top-off;" (4) collateral management fees, replacement manager fees, and a Professional Fee Account "top-off;" (5) Class A Notes interest, commitment fees and credit enhancement fee; and (6) Class A Notes enhancement liabilities (step 1242). Remaining proceeds in the Principal Collection Account 1240, if any, are used to reduce outstanding principal on Class A Notes (step 1244). Following this payment in step 1244, the outstanding balances of Class A Notes are recalculated in accordance with payments made. Thereafter, any remaining balance in the Principal Collection Account is used to pay unpaid Class B Notes interest (step 1246), and to reduce outstanding principal on the Class B Notes (step 1248). Again, in the event of payment of Class B Notes in step 1248, the outstanding balances on Class B Notes are recalculated according to the amounts paid. Notwithstanding the foregoing discussion, in the illustrative example, principal paid on the Class A Notes, Class B Notes and Class C Notes will be paid in accordance with the strict priority of the principal proceeds waterfall, which requires payment in full of the Class A Notes prior to any payments of principal on the Class B Notes, and payment in full of the Class A Notes and the Class B Notes prior to any payments of principal on the Class C Notes.

As shown in the illustrative example in FIG. 31B, any balance remaining in the Principal Collection Account 1240 after the payment in step 1248 is used to pay any unpaid amount of the minimum credit enhancement fee, which represents the deficiency of actual credit enhancement fees paid during the duration of the Class A Notes commitments, together with an agreed-upon minimum credit enhancement fee (step 1250). Any remaining balance in the Principal Collection Account 1240 is then used to cover trustee and administration expenses in excess of the limits specified above and thereafter to cover expenses not paid in full from the Expense Account, to the extent that these expenses were not paid from the Interest Collection Account 1219 (FIG. 30A), and any shortfall in the Principal Collection Account 1240 is calculated (step 1252). Any remaining balance in the Principal Collection Account 1240 is then used to pay Class C Notes interest remaining unpaid after application of interest proceeds (step 1254), and to pay unpaid Class A Revolving Notes agent fees (step 1256). Finally, any remaining balance or "excess principal proceeds" is paid into the Cash Collateral Account as described in more detail below in connection with FIGS. 34A–34B.

Senior Interest Reserve Account Utilization

Figure 32:
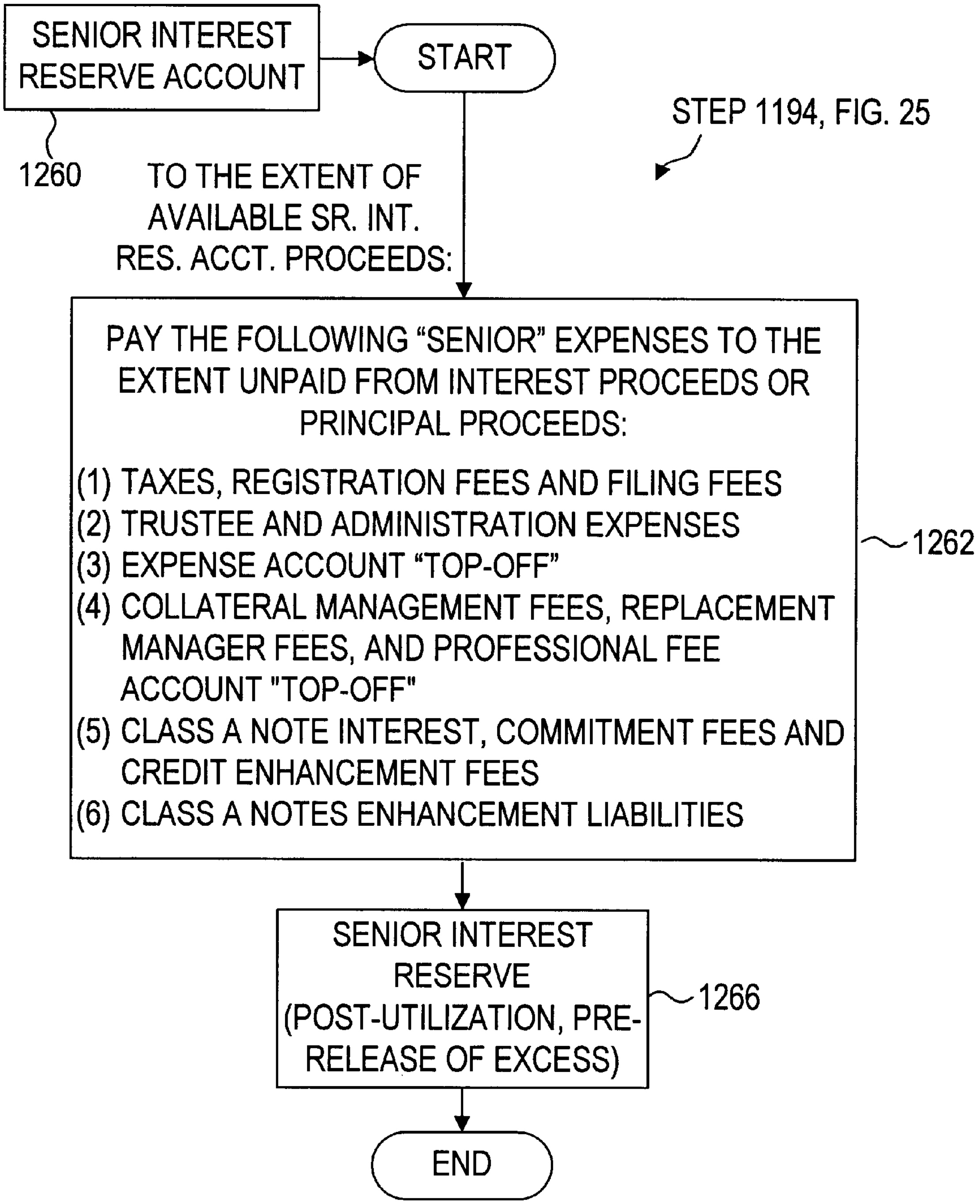

As shown in the illustrative example in FIG. 32, the Senior Interest Reserve Account 1260 is used to the extent of available Senior Interest Reserve Account proceeds to pay "senior" expenses to the extent those expenses were not covered by the Interest Collection Account 1219 or the Principal Collection Account 1240 (step 1262). Specifically, these expenses include: (1) taxes, registration fees and filing fees of the SPE; (2) trustee and administration expenses; (3) Expense Account "top-off"; (4) collateral management fees, replacement manager fees, and Professional Fee Account "top-off," (5) Class A Notes interest, commitment fees, and credit enhancement fees; and (6) Class A Notes enhancement liabilities. As mentioned above, in a securitization, as in the illustrative example, which includes a credit enhancement for the Class A Notes, if at any time the SPE interest and principal waterfalls and appropriate reserve account waterfalls are insufficient to pay principal and interest on the Class A Notes, or senior expenses of the SPE, then such amounts will be paid by the Class A credit enhancer (either directly, or by paying an equivalent amount to the SPE) and will be treated by the SPE as Class A Notes credit enhancement liabilities subject to future repayment by the SPE, and appropriate accounting entries are made to reflect this treatment (step 1264). The balance 1266 in the Senior Interest Reserve Account following these disbursements (i.e., after utilization of the Senior Interest Reserve Account) and before release of excess is represented in the illustrative example in FIG. 32 in step 1266. Further allocation of this Senior Interest Reserve Account balance 1266 is described below in connection with FIG. 36.

URDA Balance

Figure 33:
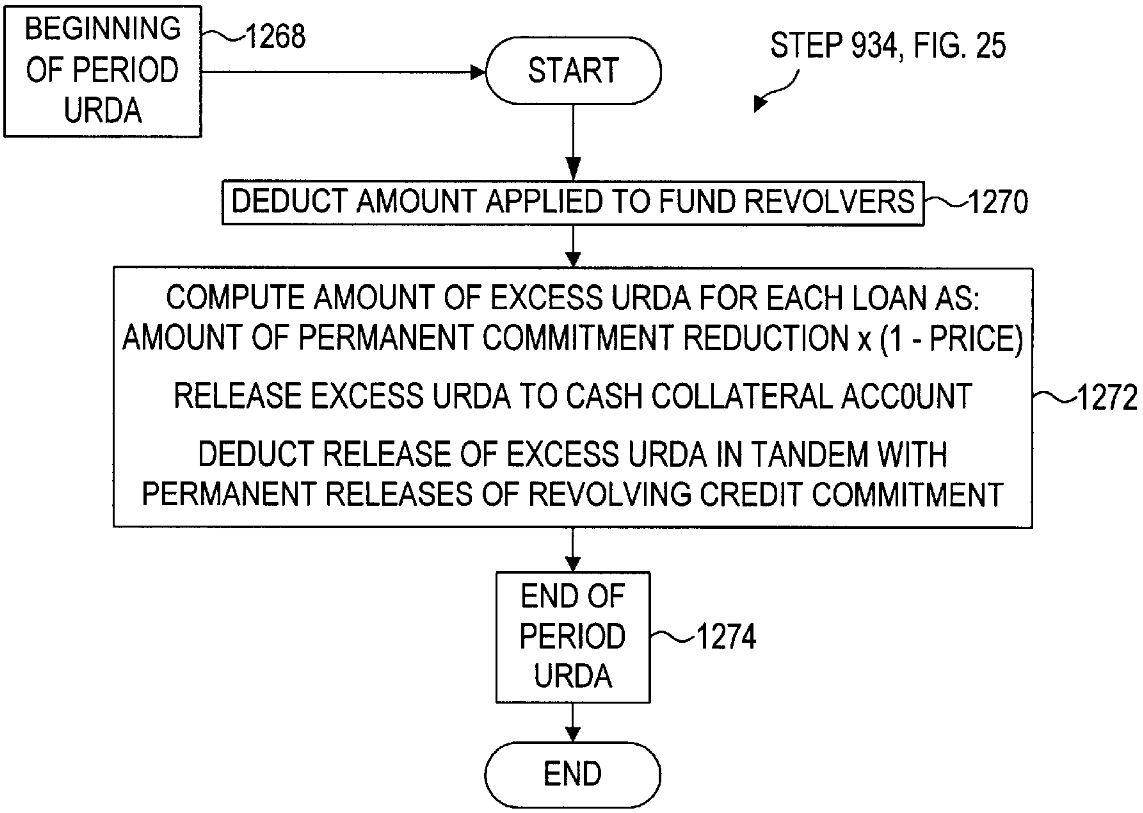

As shown in the illustrative example in FIG. 33, the balance in the Unfunded Revolver Discount Account (URDA) 1268 at the beginning of the period is used to fund revolving loan commitments (step 1270) as described above in connection with FIG. 28. A computation is made in step 1272 to determine the amount of excess URDA for each loan as the product of the amount of permanent commitment reduction for that loan and (1-price) for the loan (in the illustrative example, (1–55%)=45%). This excess URDA amount for each loan is then released to the Cash Collateral Account described below in connection with FIGS. 34A–34B, and the amount of the release of excess URDA is deducted from the URDA balance in tandem with permanent releases of revolving loan commitments in step 1272 in order to arrive at the ending balance 1274 of the Unfunded Revolver Discount Account.

Cash Collateral Account Waterfall

Figure 34A:
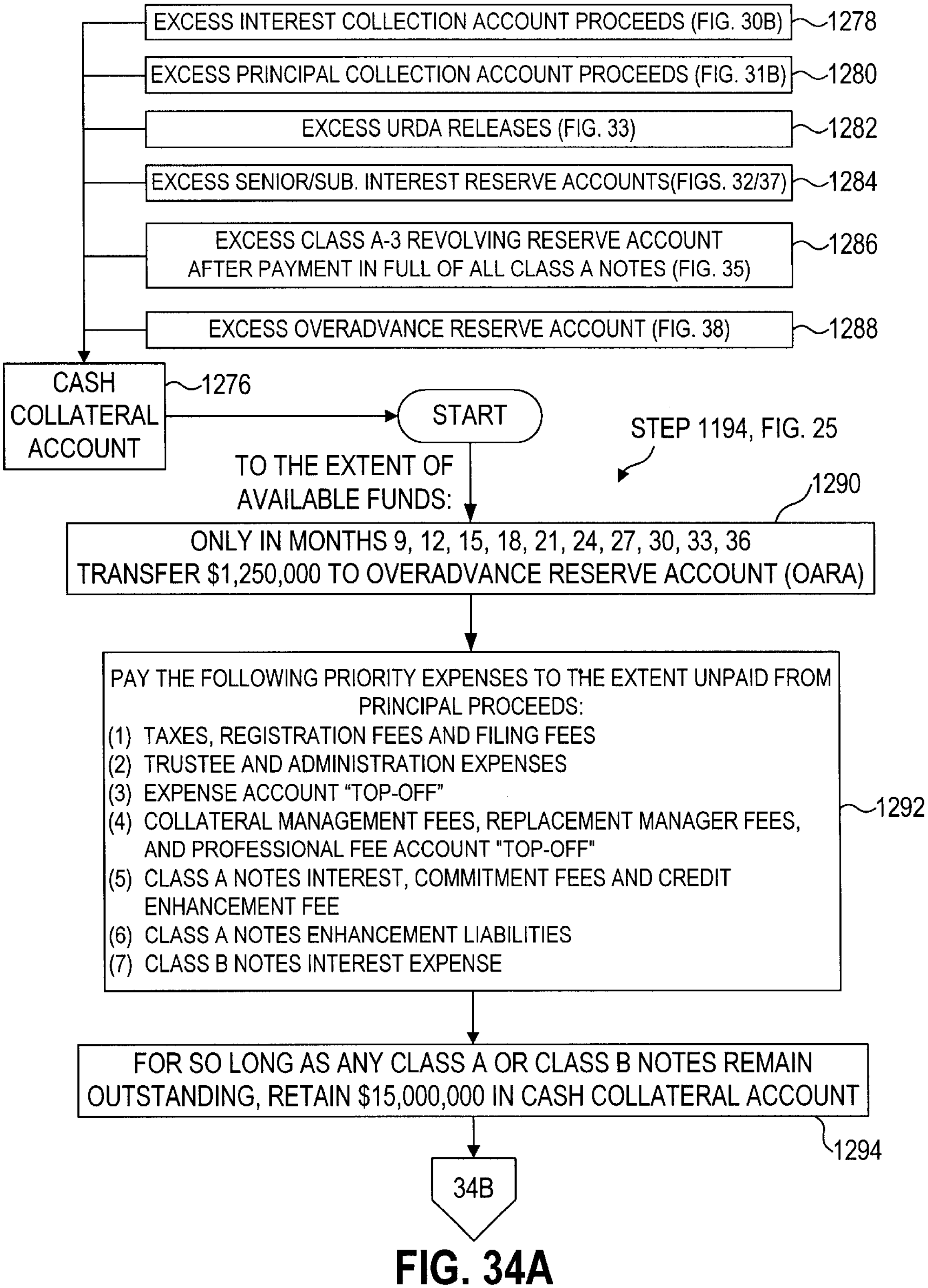
Figure 34B:
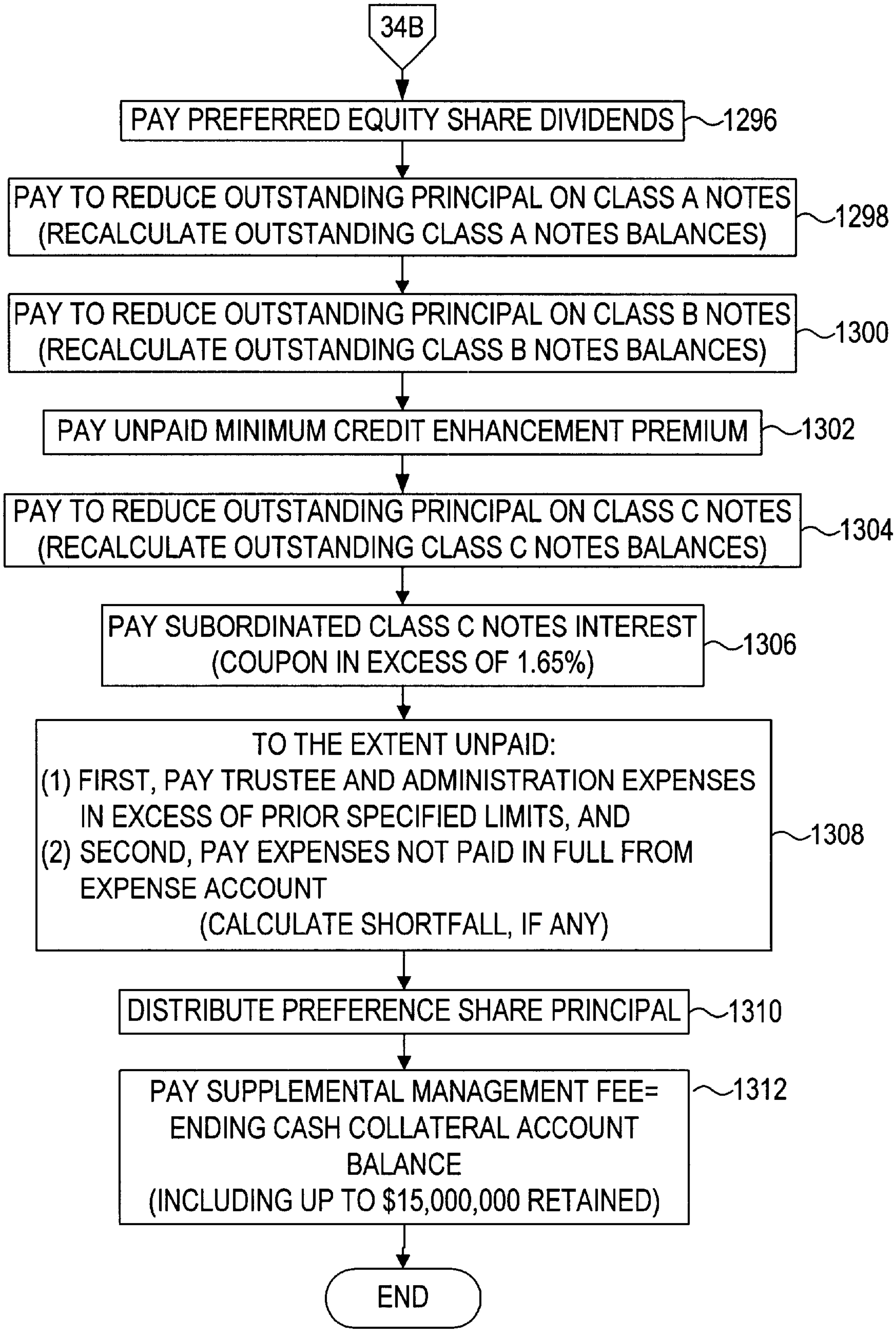

In the illustrative example, FIGS. 34A–34B illustrate the cash flow waterfall or payment sequence from the Cash Collateral Account 1276. As shown, the Cash Collateral Account 1276 is funded from: an Interest Proceeds Account excess 1278 (FIG. 30B), a Principal Proceeds Account excess 1280 (FIG. 31B), excess URDA releases 1282 (FIG. 33), Senior and Subordinate Interest Reserve Accounts excesses 1284 (FIG. 32 and FIG. 37, respectively), a Class A-3 Revolving Reserve Account excess 1286 (FIG. 35), and an Overadvance Reserve Account excess 1288 (FIG. 38). As illustrated in FIG. 34A, the balance in the Cash Collateral Account is used to the extent of available funds to transfer $1,250,000 (in the illustrative example) to the Overadvance Reserve Account ("OARA") in each of months 9, 12, 15, 18, 21, 24, 27, 30, 33 and 36 in step 1290. Thereafter, if proceeds remain in the Cash Collateral Account, such proceeds are used to pay certain priority expenses, to the extent those expenses were unpaid by principal proceeds (step 1292). In particular, the priority expenses include: (1) taxes, registration fees and filing fees of the SPE; (2) trustee and administration expenses; (3) Expense Account "top-off;" (4) collateral management fee, replacement manager fee, and Professional Fees Account "top-off;" (5) Class A Notes interest, commitment fees and credit enhancement fee; (6) Class A Notes enhancement liabilities; and (7) Class B Notes interest expense. For so long as any Class A Notes or Class B Notes remain outstanding, a reserve amount ($15,000,000 in the illustrative example) is then retained in the Cash Collateral Account (step 1294).

As shown in the illustrative example in FIG. 34B, remaining proceeds (after retaining the $15,000,000 reserve amount in the illustrative example as described above) are used to pay preferred equity share dividends (step 1296), and then to reduce outstanding principal on Class A Notes (step 1298), thereafter recalculating outstanding Class A Notes balances. Any remaining proceeds in the Cash Collateral Account 1276 are thereafter used to reduce outstanding principal on Class B Notes, again recalculating outstanding balances on the Class B Notes (step 1300).

In the illustrative example, any remaining balance in the Cash Collateral Account 1276 is then used to pay unpaid minimum credit enhancement premiums (step 1302), to reduce outstanding principal on Class C Notes, recalculating the outstanding balance on such Class C Notes (step 1304). Any remaining balance in the Cash Collateral Account 1276 is then used to pay subordinated Class C Notes interest (i.e., coupon interest in excess of 1.65% in the illustrative example) (step 1306). Thereafter, the Cash Collateral Account balance, if any, is used to pay, to the extent unpaid, trustee and administration expenses in excess of the limits stated above, and then expenses not paid in full from the Expense Account 1215 (step 1308). Any shortfall in the Cash Collateral Account from those expenses is calculated in step 1308. If any balance remains in the Cash Collateral Account 1276, that balance is then used to distribute preference share principal (step 1310), and then supplemental management fees (step 1312). "Preference shares" must be the last dollars at risk, not repaid until the Class C Notes have been paid in full. They are "quasi-debt-like" as they receive a dividend stream the total amount of which is capped ($22.0 million in the illustrative example), plus their face amount. The ending Cash Collateral Account balance (including up to the $15,000,000 reserve amount retained in step 1294 in the illustrative example) (FIG. 34A) is represented in FIG. 34B in step 1314.

Class A Revolving Note Availability and Class A-3 Revolving Reserve Account

Figure 35:
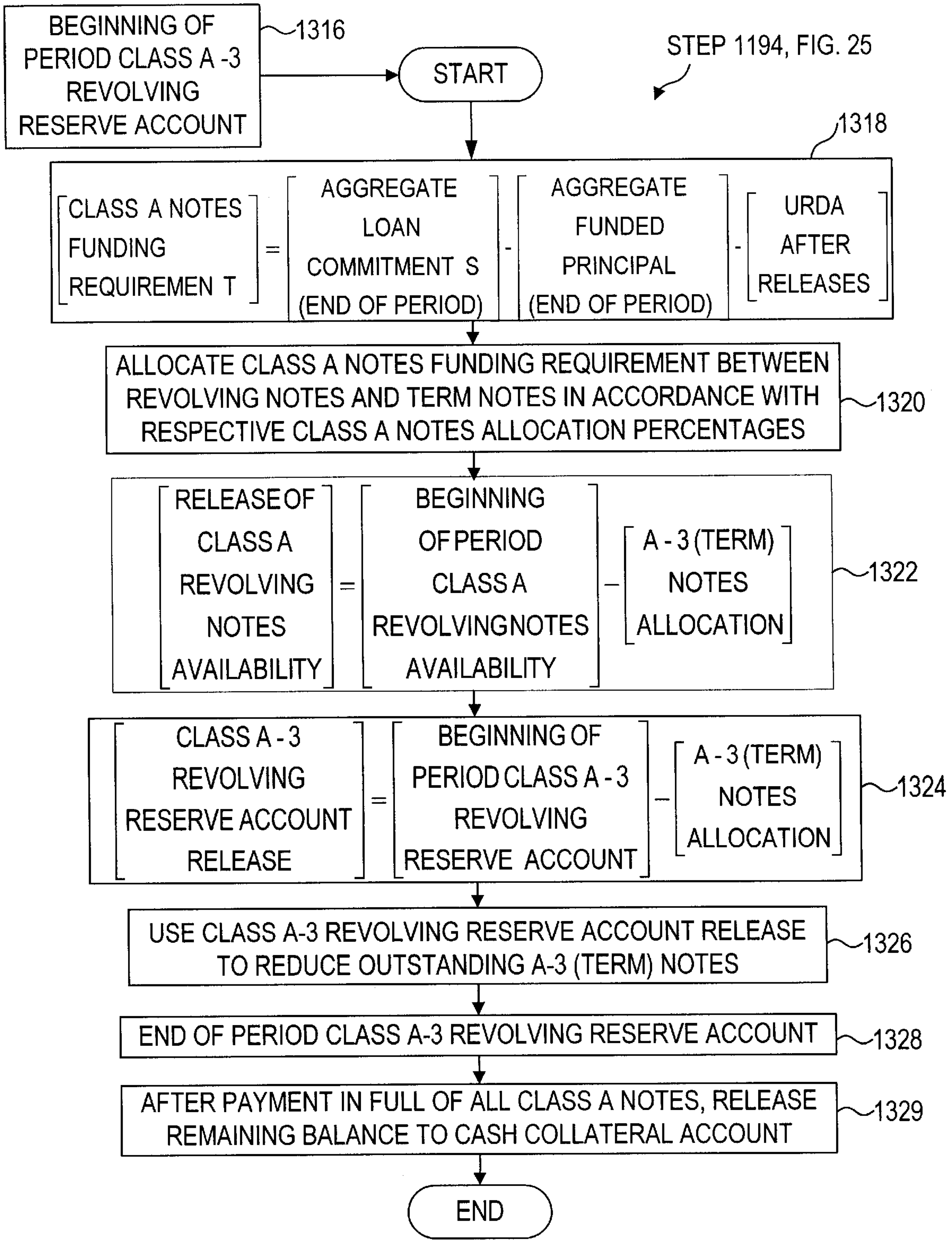

In the illustrative example, FIG. 35 illustrates the disposition of the balance in the Class A-3 Revolving Reserve Account 1316 for any period. The initial balance in the Class A-3 Revolving Reserve Account was determined in step 1148 (FIG. 21D). As shown, the Class A Notes funding requirement is computed by subtracting from the aggregate loan commitments at the end of the period the amount of aggregate funded principal at the end of the period and the amount of the URDA after releases described above in connection with FIG. 33 (step 1318). The Class A Notes funding requirement is then allocated between Class A Revolving Notes and Class A Term Notes in accordance with their respective Class A Notes allocation percentages (step 1320). The release of Class A Revolving Notes availability is then computed by subtracting the A-3 (term) Notes allocation from the beginning-of-period Class A Revolving Notes availability (step 1322). The Class A-3 Revolving Reserve Account release is then computed by subtracting the A-3 (term) Notes allocation from the beginning-of-period Class A-3 Revolving Reserve Account (step 1324), and the Class A-3 Revolving Reserve Account release is then used to reduce outstanding A-3 (term) Notes (step 1326) to thereby arrive at the end-of-period Class A-3 Revolving Reserve Account balance 1328. After payment in full of all Class A Notes, any excess remaining in the Class A-3 Revolving Reserve Account is released to the Cash Collateral Account (step 1329).

Release of Senior Interest Reserve Account

Figure 36:
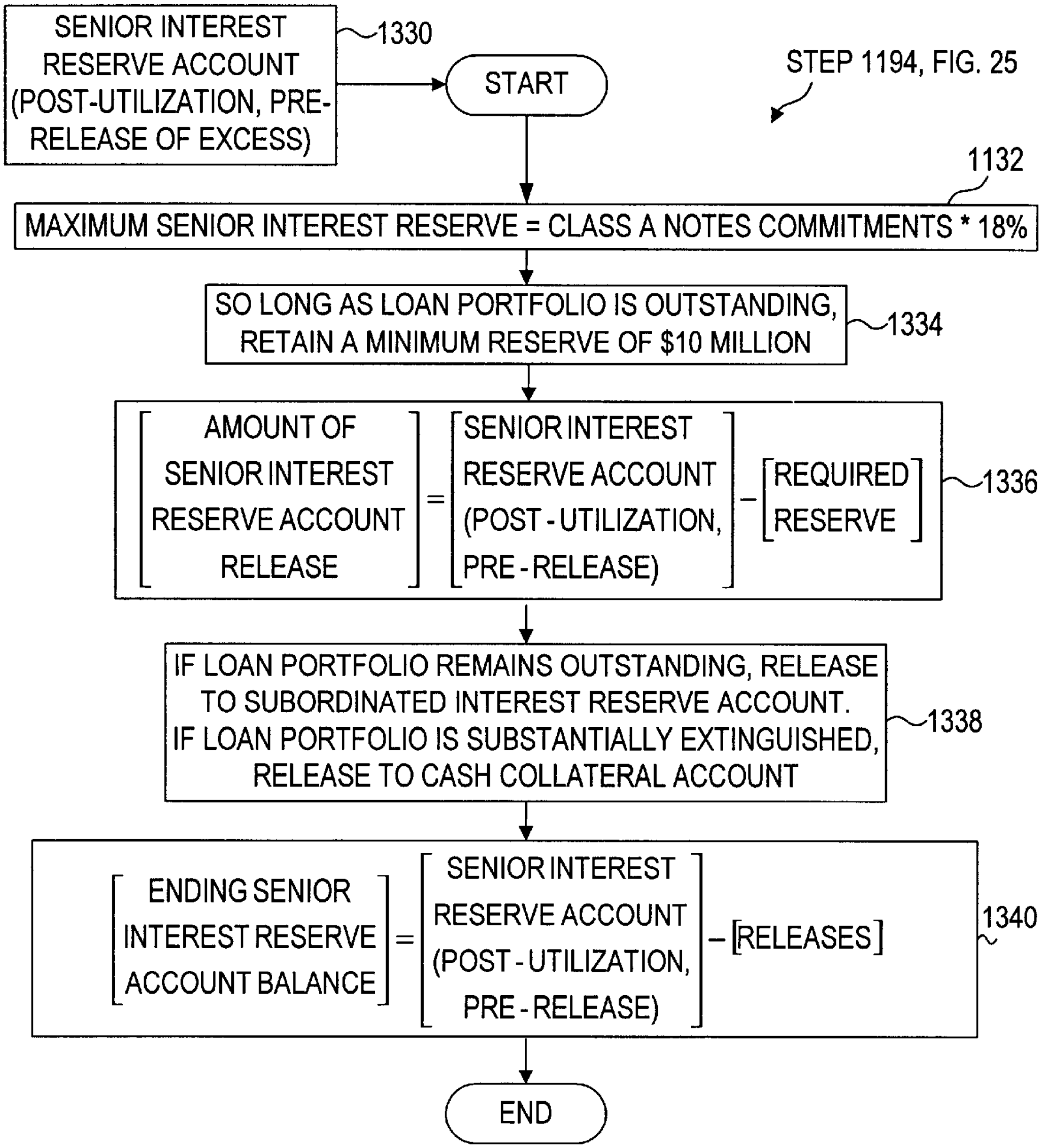

In the illustrative example, FIG. 36 illustrates the allocation of the remaining Senior Interest Reserve Account 1330 (post utilization and pre-release of excess) described above in connection with step 1266 of FIG. 32. As shown in FIG. 36, the maximum senior interest reserve is calculated as 18% (in the illustrative example) of Class A Notes commitments (step 1332). For so long as any portion of the distressed credit facility portfolio remains outstanding, a minimum reserve ($10,000,000 in the illustrative example) is retained (step 1334). An amount of Senior Interest Reserve Account release is computed by subtracting the required reserve from the Senior Interest Reserve Account 1330 (post-utilization, pre-release) (step 1336). Thereafter, if any portion of the distressed credit facility portfolio remains outstanding, this amount is released to a Subordinated Interest Reserve Account 1342 (described below in connection with FIG. 37), and if, instead, the distressed credit facility portfolio is substantially extinguished, then the amount of release computed by the step 1336 is released to the Cash Collateral Account (step 1338). The end-of-period balance in the Senior Interest Reserve Account 1330 may then be computed by subtracting the amount of releases from the Senior Interest Reserve Account balance (post-utilization, pre-releases) (step 1340).

Release of Subordinated Interest Reserve Account

Figure 37:
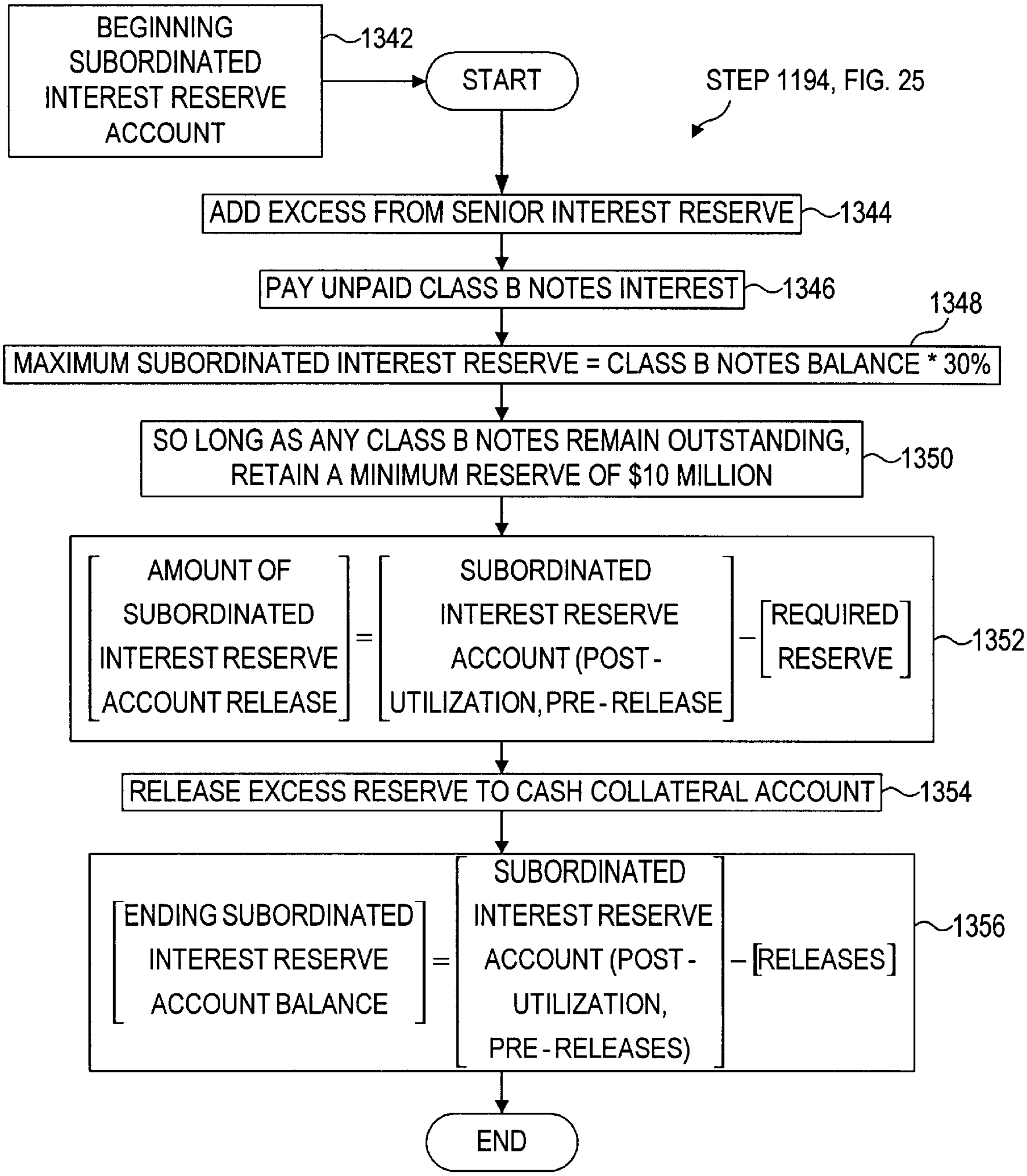
Figure 38:
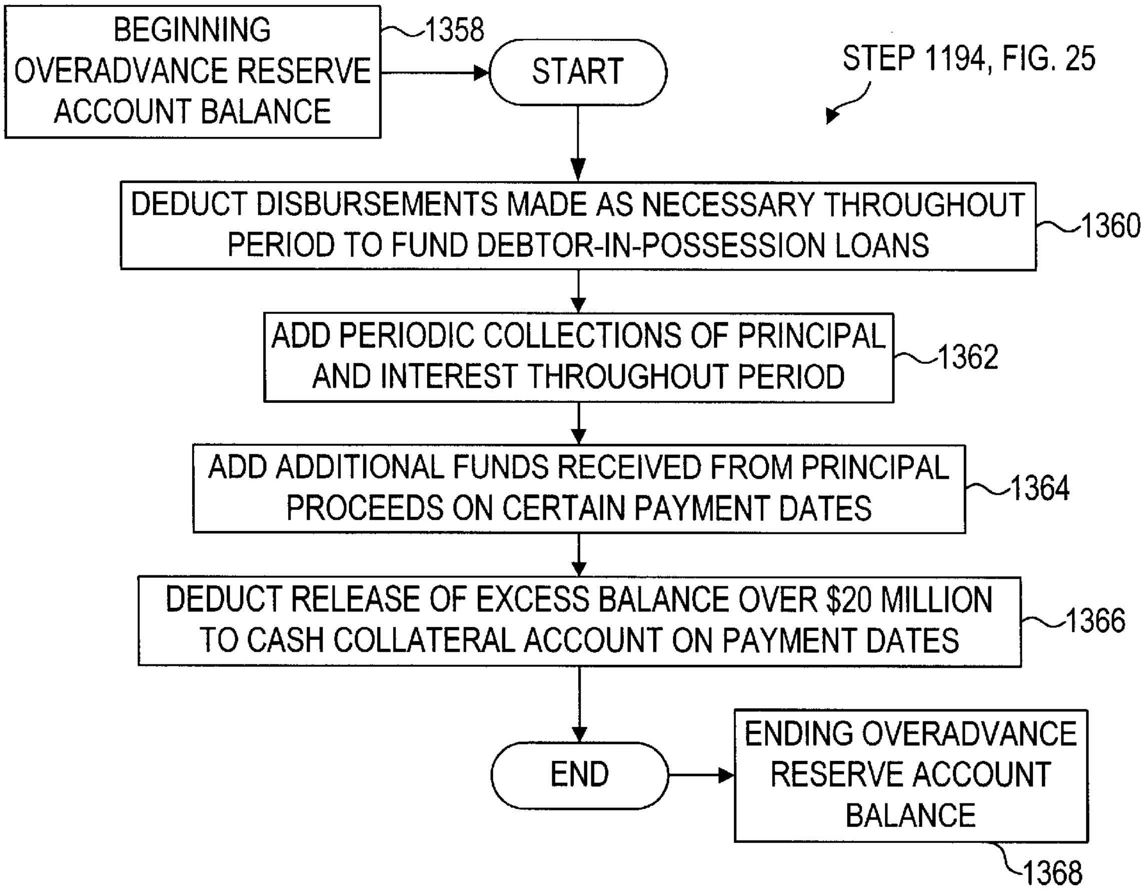

In the illustrative example, FIG. 37 illustrates allocation of the Subordinated Interest Reserve Account 1342. As shown, the beginning-of-period balance in the Subordinated Interest Reserve Account 1342 is augmented by any excess released to the Subordinated Interest Reserve Account 1342 from the Senior Interest Reserve Account 1330 as described above in connection with step 1338 of FIG. 36 (step 1334). From the augmented balance in the Subordinated Interest Reserve Account 1342, unpaid Class B Notes interest is paid (step 1346). The maximum subordinated interest reserve is then calculated as a percentage (30% in the illustrative example) of the Class B Notes outstanding principal balance (step 1348). For so long as any Class B Notes remain outstanding, a minimum subordinated interest reserve ($10, 000,000 in the illustrative example) is retained (step 1350). The amount of subordinated interest reserve release is then calculated by subtracting the required reserve from the Subordinated Interest Reserve Account (post utilization, pre-release) (step 1352), and any excess subordinated interest reserve is released to the Cash Collateral Account (step 1354) as described above in connection with FIG. 34A. The ending balance in the Subordinated Interest Reserve Account 1342 is then calculated by subtracting the amount of the releases from the Subordinated Interest Reserve Account balance (post-utilization, pre-releases) (step 1356).

Overadvance Reserve Account

In the illustrative example, FIG. 38 illustrates allocation of the Overadvance Reserve Account ("OARA") 1358. The initial balance in the Overadvance Reserve Account was determined by the collateral manager and funded on the closing date of the securitization ($7.5 million in step 1128 (FIG. 21B) in the illustrative example). The collateral manager also determines a maximum amount for the Overadvance Reserve Account based, for example, on the size and characteristics of the distressed commercial loan portfolio and the prior experience of the collateral manager, ($20 million in the illustrative example). As shown in FIG. 38, the beginning balance in the Overadvance Reserve Account 1358 is reduced throughout the period as disbursements are made, as necessary, to fund debtor-in-possession (DIP) loans and last-in-first-out ("LIFO") loans (step 1360) and is augmented throughout the period by periodic collections of principal and interest on the DIP loans (step 1362) and by additional funds received from excess proceeds in the Cash Collateral Account on certain payment dates (step 1364) (in the illustrative example, $1.25 million in months 9, 12, 15, 18, 21, 24, 27, 30, 33 and 36 as shown in step 1290 (FIG. 34A)). The balance in the Overadvance Reserve Account 1358 is also reduced by the release of excess over the maximum amount of the Overadvance Reserve Account ($20 million in the illustrative example) to the Cash Collateral Account on payment dates as described above in connection with the step 1288 of FIG. 34A (step 1366). The ending balance in the Overadvance Reserve Account is represented in the illustrative example by step 1368 in FIG. 38.

Closing Expense Account

Figure 39:
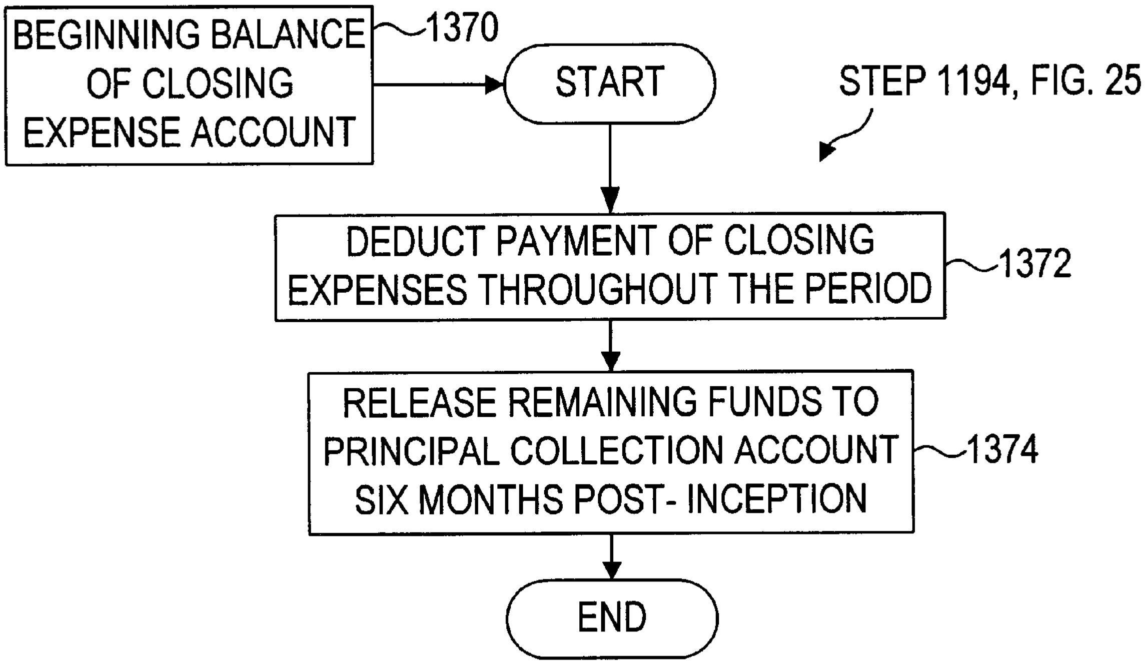

In the illustrative example, FIG. 39 illustrates allocation of the Closing Expense Account beginning balance 1370 from which payment of closing expenses throughout the period is deducted (step 1372). In step 1374, six months after the closing date of the securitization the remaining funds in the Closing Expense Account are released to the Principal Collection Account 1240 as described above in connection with FIG. 31A (step 1114).

The foregoing description is for the purpose of teaching those skilled in the art the best mode of carrying out the invention and is to be construed as illustrative only. Numerous modifications and alternative embodiments of the invention will be apparent to those skilled in the art in view of this description, and the details of the disclosed structure may be varied substantially without departing from the spirit of the invention. Accordingly, the exclusive use of all modifications within the scope of the appended claims is reserved.

What is desired to be secured by a Letters Patent is as follows:

1. A securitization method, comprising the steps of:

(a) selecting loans meeting predetermined performance criteria from a group of commercial loans of one or more lending institutions, each loan having a corresponding borrower and involving at least one obligation of the corresponding borrower to make a payment to the corresponding lending institution;

(b) further selecting loans from among the group of loans selected in step (a) to create a portfolio in which loans comprising at least 30% of (i) the portfolio market value, (ii) the portfolio outstanding principal balance, or (iii) the portfolio commitment amount, are distressed loans which: (i) have a payment default, or (ii) where payment default is considered likely, by the corresponding institution, said further selecting step analyzing at least one of: (i) unsecured credit facilities, (ii) borrower diversity, and (iii) loan commitment diversity, of the group of loans selected in step (a);

(c) creating a computerized database model for evaluating the loans in said portfolio individually, in order to provide tabulated information including: (i) recovery rate information comprising borrower cash flow, projected net payments, and related collateral; and at least one of the following: (ii) borrower cash flow information, (iii) loan information including principal amount, interest rate, unfunded commitment amounts, credit information, and amortization information, (iv) loan pricing parameters, (v) loan cash pay rate information, (vi) loan collateral value, (vii) workout parameters including borrower debt capacity and liquidation information, and (viii) loan discounted cash flow valuation;

(d) providing the tabulated information for said portfolio to one or more credit agencies in such form so that said one or more credit agencies independently (i) examines each loan and its corresponding recovery rate information, and (ii) determines the projected performance of the portfolio;

(e) establishing a bankruptcy remote special purpose entity (SPE) as an investment vehicle for said portfolio;

(f) determining a price to be paid to a lending institution for its loans within said portfolio, said price being determined in accordance with the tabulated information from the computerized database model for said portfolio;

(g) providing the tabulated information from the computerized database model for said portfolio to said lending institution; and (h) forming a capital structure for the SPE for said portfolio, said capital structure including a source of funds and an enforcement mechanism;

(i) modeling cash flows of said capital structure, and providing the modeled cash flows and said tabulated information to said one or more credit agencies in such a form that said one or more credit agencies provides investment grade credit ratings to all of the securities, other than equity or equity-like tranches, issued by the SPE upon completing the creation of the securitization; and (j) completing the creation of the securitization by (i) the SPE paying the one or more lending institutions the price calculated in step (f) for the lending institution to transfer the portfolio to the SPE, and (ii) the SPE issuing its securities.

2. The method of claim 1, wherein said further selecting step analyzes all of: (i) the maturity date, (ii) the unsecured credit facilities, (iii) the borrower diversity, and (iv) the loan commitment diversity, of the group of loans selected in step (a).

3. The method of claim 1, wherein said further selecting step further analyzes industry concentration limits.

4. The method of claim 1, wherein said further selecting step further analyzes industry diversification.

5. The method as recited in claim 1, wherein said further selecting step includes the step of eliminating loans which mature late in the term of the securitization.

6. The method as recited in claim 1, wherein said further selecting step includes the step of eliminating loans from the portfolio secured only by stock or other equity interests.

7. The method as recited in claim 1, wherein said further selecting step includes the step of eliminating loans from the portfolio that are denominated in foreign currency.

8. The method as recited in claim 1, wherein said further selecting step includes the step of eliminating loans from the portfolio that are extended to non-U.S. borrowers.

9. The method as recited in claim 1, wherein said further selecting step includes the step of eliminating loans from the portfolio extended to borrowers that are tainted by accounting irregularities.

10. The method as recited in claim 1, wherein said further selecting step includes the step of eliminating loans from the portfolio extended to borrowers that are tainted by environmental problems.

11. The method as recited in claim 1, wherein said further selecting step includes the step of eliminating loans from the portfolio extended to borrowers that are tainted by protracted litigation.

12. The method as recited in claim 1, wherein said further selecting step includes the step of eliminating loans from the portfolio extended to borrowers supported by no collateral.

13. The method as recited in claim 1, wherein said further selecting step includes the step of eliminating loans from the portfolio extended to borrowers supported by minimal restrictive covenants.

14. The method as recited in claim 1, wherein said further selecting step includes the step of determining the diversity of the borrowers in the portfolio.

15. The process as recited an claim 14, wherein said further selecting step includes the step of selecting loans to meet predetermined borrower diversity criteria of one or more credit rating agencies.

16. The process as recited in claim 15, wherein said further selecting step includes the step of balancing the portfolio so that the number of borrowers is greater than 30.

17. The process as recited in claim 15, wherein said further selecting step includes the step of determining the industry diversity of the borrowers in the portfolio.

18. The process as recited in claim 17, wherein said further selecting step includes the step of selecting the loans so that the portfolio meets the industry diversity criteria of one or more credit rating agencies.

19. The process as recited in claim 18, wherein said further selecting step includes the step of balancing the portfolio so that the selected loans have been extended to borrowers representing at least 12 industries.

20. The process as recited in claim 18, wherein said further selecting step includes the step of determining the ratio of the loan commitments to any one borrower relative to the aggregate loan commitments to all borrowers.

21. The process as recited in claim 20, wherein said further selecting step includes the step of determining the ratio of the aggregate loan commitments to all borrowers in an industry relative to the aggregate loan commitments to all borrowers.

22. The process as recited in claim 21, wherein said further selecting step includes the step of selecting the loans to meet predetermined loan commitment concentration criteria of one or more selected credit racing agencies.

23. The process as recited in claim 22, wherein said further selecting step includes the step of balancing the portfolio so that the loan commitments to any one borrower do not represent more than 5% of the aggregate loan commitments to all borrowers.

24. The process as recited in claim 23, wherein said further selecting step includes the step of selecting loans so that the loan commitment concentration is less than 5% for at least 4 industries.

25. The process as recited in claim 23, wherein said further selecting step includes the step of balancing the portfolio so that the loan commitment concentration is less than 5% for at least 4 industries.

26. The process as recited in claim 24, wherein said further selecting step includes the step of selecting loans so that the loan commitment concentration is greater than or equal to 5% and less than 8% in at most 5 industries.

27. The process as recited in claim 25, wherein said further selecting step includes the step of balancing the portfolio so that the loan commitment concentration is greater than or equal to 5% and less than 8% in at most 5 industries.

28. The process as recited in claim 26, wherein said further selecting step includes the step of selecting loans so that the loan commitment concentration is greater than or equal to 8% and less than 12% in at most 2 industries.

29. The process as recited in claim 27, wherein said further selecting step includes the step of balancing the portfolio so that the loan commitment concentration is greater than or equal to 8% and less than 12% in at most 2 industries.

30. The process as recited in claim 28, wherein said further selecting step includes the step of selecting loans so that the loan commitment concentration is greater than or equal to 12% and less than 16% in at most 1 industry or said at least 4 industries.

31. The process as recited in claim 29, wherein said further selecting step includes the step of balancing the portfolio so that the loan commitment concentration is greater than or equal to 12% and less than 16% in at most 1 industry of said at least 4 industries.

32. The process as recited in claim 30, wherein said further selecting step includes the step of selecting loans so that the loan commitment concentration is less than 16% for each of said at least 4 industries.

33. The process as recited in claim 32, wherein said further selecting step includes the step of rebalancing the portfolio so that the loan commitment concentration is less than 16% for each of said at least 4 industries.

34. The method as recited in claim 1, wherein steps (a)–(j) having been completed, the improvement further comprising the step of the one or more lending institutions that originated all or a portion of the distressed loans in the portfolio obtaining and continuing to own, directly or indirectly through an affiliate, one or more of the investment grace securities issued by the SPE.

35. The method as recited in claim 1, wherein steps (a)–(j) having been completed, the improvement further comprising the step of the SPE collecting payments on its portfolio of loans and making payments on the securities at has issued.

* * * * *